(12) United States Patent
Kwong et al.

(10) Patent No.: US 12,467,050 B2
(45) Date of Patent: Nov. 11, 2025

(54) METHODS AND COMPOSITIONS FOR ENGINEERING SYNTHETIC BIOSWITCHES FOR REMOTE CONTROL OF BIOLOGICAL ACTIVITY

(71) Applicant: Georgia Tech Research Corporation, Atlanta, GA (US)

(72) Inventors: Gabriel A. Kwong, Atlanta, GA (US); Ian C. Miller, Atlanta, GA (US); Marielena Gamboa, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 982 days.

(21) Appl. No.: 16/652,905

(22) PCT Filed: Oct. 2, 2018

(86) PCT No.: PCT/US2018/053962
§ 371 (c)(1),
(2) Date: Apr. 1, 2020

(87) PCT Pub. No.: WO2019/070704
PCT Pub. Date: Apr. 11, 2019

(65) Prior Publication Data
US 2020/0299686 A1    Sep. 24, 2020

Related U.S. Application Data

(60) Provisional application No. 62/566,670, filed on Oct. 2, 2017.

(51) Int. Cl.
| | |
|---|---|
| *C12N 15/11* | (2006.01) |
| *A61K 40/11* | (2025.01) |
| *A61K 40/31* | (2025.01) |
| *A61K 40/42* | (2025.01) |
| *A61K 48/00* | (2006.01) |
| *C07K 14/705* | (2006.01) |
| *C12N 15/86* | (2006.01) |
| *C07K 14/725* | (2006.01) |
| *C12N 15/63* | (2006.01) |

(52) U.S. Cl.
CPC ............. *C12N 15/11* (2013.01); *A61K 40/11* (2025.01); *A61K 40/31* (2025.01); *A61K 40/4211* (2025.01); *A61K 48/005* (2013.01); *C07K 14/70596* (2013.01); *C12N 15/86* (2013.01); *A61K 48/0066* (2013.01); *A61K 2239/23* (2023.05); *A61K 2239/31* (2023.05); *A61K 2239/48* (2023.05); *C07K 14/7051* (2013.01); *C12N 15/635* (2013.01); *C12N 2320/50* (2013.01); *C12N 2740/15043* (2013.01); *C12N 2830/001* (2013.01); *C12N 2830/002* (2013.01)

(58) Field of Classification Search
CPC ...... C12N 15/11; C12N 15/86; C12N 15/635; C12N 2320/50; C12N 2740/15043; C12N 2830/001; C12N 2830/002; C12N 15/63; C12N 15/85; A61K 48/005; A61K 48/0066; A61K 39/0011; A61K 2039/5156; A61K 2039/5158; C07K 14/70596; C07K 14/7051; C07K 2319/03; C07K 14/47
See application file for complete search history.

(56) References Cited

U.S. PATENT DOCUMENTS

| | | | | |
|---|---|---|---|---|
| 5,811,231 | A | * | 9/1998 | Farr ..................... C12Q 1/6897 424/94.1 |
| 2005/0251872 | A1 | | 11/2005 | Bear et al. |
| 2005/0266569 | A1 | * | 12/2005 | Van Dyk ............. C07K 14/245 435/471 |
| 2009/0105170 | A1 | * | 4/2009 | Czerny ................ C12N 9/0069 800/13 |
| 2009/0162321 | A1 | * | 6/2009 | Parks ..................... A61P 31/12 435/239 |
| 2012/0278912 | A1 | * | 11/2012 | Farrar ................ A61K 48/0066 435/325 |
| 2014/0162894 | A1 | | 6/2014 | Hatchwell et al. |
| 2017/0159072 | A9 | | 6/2017 | Arbeit et al. |
| 2017/0335281 | A1 | * | 11/2017 | Loew ............. A61K 39/001192 |
| 2018/0142260 | A1 | * | 5/2018 | Logan .................... C12N 15/86 |

FOREIGN PATENT DOCUMENTS

| | | | |
|---|---|---|---|
| AU | 2001231171 A1 | * | 1/2007 |
| WO | 2012005898 | | 1/2012 |

OTHER PUBLICATIONS

Search Report and Written Opinion from PCT application No. PCT/US18/53962 dated Feb. 7, 2019 (22 pages).
Piraner, et al., "Tunable Thermal Bioswitches for in Vivo Control of Microbial Therapeutics," Nature Chemical Biology, Nov. 14, 2016, vol. 3, pp. 75-80.

* cited by examiner

*Primary Examiner* — Titilayo Moloye
(74) *Attorney, Agent, or Firm* — Meunier Carlin & Curfman LLC

(57) ABSTRACT

Embodiments of the present disclosure relate generally to compositions and methods for the design of remote controlled biological systems, and more specifically to synthetic bioswitches that provide the ability to non-invasively and remotely control the function and activity of live cells, such as for example and not limitation, the expression of biologically active proteins or biological therapeutics, and the manipulation of physiologic or genetic processes and/or protein expression in live cells, in vivo (including, e.g., at desired anatomical sites) or ex vivo.

40 Claims, 25 Drawing Sheets

Specification includes a Sequence Listing.

- SEQ ID NO: 32 (2 HSEs):

AGAACGTTCTAGAAGTCtAGAACGTTCTAGAACTTGCCATTAATAgagacctgaagcaccgcctgctaaaaataccggctgggcacaCATAAAgcacgctgggctccagtcgtccggcacttctcggatcctcagccagtgtcttctagatcctcagcctgaccagccaagaacatgac

- SEQ ID NO: 33 (3 HSEs):

tGAAaGTTCTAGAAaCgaCGAGAACGTTCTAGAAgGTCtAGAAACGTTCTAGAACTTGCCATTAATAgagacctgaagcaccgcctgctaaaaataccggctgggcacaCATAAAAgcacgctgggctccagtccggcacttctcggatcctcagccagtgtcttctagatcctcagcctgaccagccaagaacatgac

- SEQ ID NO: 34 (4 HSEs):

AGAAgcTTCTAGAAtGTgctGAAaGTTCTAGAACgaCGAGAACGTTCTAGAAgGTCtAGAAACGTTCTAGAACgacacgctgggctccagtcgtccggcacttctAgagacctgaagcaccgcctgctaaaaataccggctgggcacaCATAAAAgcacgctgggctccagtccggcacttctcggatcctcagccagtgtcttctagatcctcagcctgaccagccaagaacatgac

- SEQ ID NO: 35 (5 HSEs):

AGAACGTTCTAGAACCtgGAGAAGcTTCTAGAACgaCGAGAACGTTCTAGAAgGTCtAGAAACGTTCTAGAACTTGCCATTAATAgagacctgaagcaccgcctgctaaaaataccggctgggcacaCATAAAAgcacgctgggtccagtccggtcacttctcggatcctcagccagtgtcttctagatcctcagcctgaccagccaagaacatgac

- SEQ ID NO: 36 (6 HSEs):

AGAACGTTCatGAACGctGAGAACGTTCTAGAACCtgGAGAAgcTTCTAGAACgaCGAGAACGTTCTAGAAgGTCtAGAAtGTgctGAAaGTTCTAGAAtGTgctGAAaGTTCTAGAACTTGCCATTAATAgagacctgaagcaccgcctgctaaaaataccggctgggcacaCATAAAgcacgctgggtccagtccggtcacttctcggatcctcagccagtgtcttctagatcctcagcctgaccagccaagaacatgac

- SEQ ID NO: 37 (7 HSEs):

AGAAgcTTCatGAACGTgcAGAACGTTCatGAACCtgGAGAACgctGAGAACGTTCTAGAACCtgGAGAAgcTTCTAGAACTGCCATTAATAgagacctgaagcaccgcctgctaaaaatacccggctgggcacaCATAAAgcacgctgggctccagtccggcacttctcggatcctcagccagtgtcttctagatcctcagcctgaccagccaagaacatgac

Fig. 10F

METHODS AND COMPOSITIONS FOR ENGINEERING SYNTHETIC BIOSWITCHES FOR REMOTE CONTROL OF BIOLOGICAL ACTIVITY

CROSS-REFERENCE TO RELATED APPLICATIONS

This application claims priority to U.S. Provisional Application No. 62/566,670, filed on Oct. 2, 2017, the disclosure of which is herein incorporated by reference in its entirety.

GOVERNMENT STATEMENT REGARDING FEDERALLY SPONSORED RESEARCH

This invention was made with government support under grant numbers DP2HD091793 and 5T32EB006343 awarded by the National Institutes of Health. The government has certain rights in the invention.

SEQUENCE LISTING

The instant application contains a Sequence Listing which has been filed electronically in ASCII format and is hereby incorporated by reference in its entirety. Said ASCII copy, created on Mar. 22, 2023, is named GTRC7422_SL.txt and is 107,530 bytes in size.

BACKGROUND OF THE DISCLOSURE

1. Field of the Disclosure

Embodiments of the present disclosure relate generally to compositions and methods for the design of remote controlled biological systems, and more specifically to synthetic gene bioswitches that provide the ability to non-invasively and remotely control the function and activity of live cells, such as for example and not limitation, the expression of biologically active proteins or biological therapeutics, and the manipulation of physiologic or genetic processes and/or protein expression in live cells, in vivo or ex vivo.

2. Background

A problem with genetic engineering and gene therapy has been the ability to precisely and tightly regulate the expression of heterologous genes to lessen off-target and potentially toxic side effects. Use of endogenous promoters to achieve these goals has been problematic, as endogenous promoters tend to have variable on/off ratios, problems with packaging into viruses due to length, and they tend to respond to multiple stress stimuli and have a complex network of regulators.

Systems based on endogenous inducible or tunable promoters have been developed in an attempt to provide better control over gene expression (see, e.g., WO 2018/098315, US 2003/0045495, US 2010/0175141, CA 2340929, US 2002/0165191, US 2007/0190028, and U.S. Pat. No. 6,759,236). However, these promoters still do not provide precise remote control of gene expression because such promoters generally have high background activity in the off state (meaning a likelihood of increased off-target effects, such as toxicity in healthy tissues), lack sharp on-off transitions (i.e., they are turned on gradually and their output functions do not look like 'biological switches'), and they are turned on by multiple biological cues (such as heavy metal toxicity, hypoxia, and shear stress simultaneously, etc.).

This lack of precise, sharp on/off (i.e., high induction/activation) and single cue control results in "noisy" or "leaky" promoters that make them limited for use in cell-based therapies, tissue engineering, and broadly, medicine. These endogenous promoters are particularly unsuitable for in vivo therapies using biologic drugs because toxicity is a primary concern, and these drugs often must be dosed within precise therapeutic windows and amounts (e.g., an underdose could facilitate resistance, while an overdose could mean off-target toxicity).

What is needed, therefore, is a composition and method that enables precise, sharp on/off (i.e., high induction/activation) remote control of the function and activity of live cells. The composition and method should take advantage of advances in synthetic biology to provide synthetic bioswitches to enable new applications in in vivo and cell-based therapies by improving the ability to remotely and non-invasively control the function and activity of live cells (e.g., improved manipulation of physiologic or genetic processes and/or protein expression in live cells), in vivo (including, e.g., at desired anatomical sites) or ex vivo. These synthetic bioswitches should be switch-like and digital with very sharp on-off ratios within a narrow activation window (i.e., a small change in the activating cue leads to a very high induction of the switch), no basal activity, and each synthetic bioswitch should only be activated or turned on by a single stimulus. In a non-limiting exemplary embodiment, the synthetic bioswitch is only activated by heat (not cold shock, heavy metal toxicity, etc.) and has an activation window of 37±3° C. such that a less than 8% change in input signal can lead to greater than 10,000% output change. In some embodiments, the composition and method also provide precise, sharp on/off (i.e., high induction/activation) remote control of gene expression or manipulation of physiologic or genetic processes, such as for example and not limitation, tunable, remote-controlled expression and/or synthesis of desired biologically active proteins (e.g., biologic drugs) at desired sites in a subject's body (e.g., at a tumor or cancer). In another non-limiting exemplary embodiment, the composition comprises more than one synthetic bioswitch that are activated by stimuli that are orthogonal to each other, such that synthetic bioswitch A responds to stimulus A and synthetic bioswitch B responds to stimulus B, but not vice versa. In this embodiment, the synthetic bioswitches can be present in the same cell, with the outcome based on the stimulus applied to the cell. In this embodiment, the stimulus can be either a single stimulus or a combination of stimuli (e.g., A "AND" B). If multiple, orthogonally-controlled synthetic bioswitches are present in a cell, it is possible to select which synthetic bioswitch to manipulate by delivering the appropriate stimulus or combination of stimuli. It is to such a composition and method that embodiments of the present disclosure are directed.

BRIEF SUMMARY OF THE DISCLOSURE

As specified in the Background Section, there is a great need in the art to identify technologies for precise, sharp on/off (i.e., high induction/activation) and single cue control of the function and activity of live cells and use this understanding to develop novel compositions and methods. The present disclosure satisfies this and other needs. Embodiments of the present disclosure relate generally to compositions and methods for the design of remote controlled biological systems, and more specifically to synthetic gene bioswitches that provide the ability to non-invasively and remotely control the function and activity of live cells, such as for example and not limitation, the expression of biologically active proteins or biological therapeutics, and the manipulation of physiologic or genetic processes and/or protein expression in live cells, in vivo (including, e.g., at desired anatomical sites) or ex vivo. In some embodiments, the composition and method also provide precise, sharp on/off (i.e., high induction/activation) remote control of gene expression or manipulation of physiologic or genetic processes, such as for example and not limitation, tunable, remote-controlled expression and/or synthesis of desired biologically active proteins (e.g., biologic drugs) at desired sites in a subject's body (e.g., at a tumor or cancer). In some embodiments, this remote control can be achieved by use of a synthetic bioswitch that is activated by a single stimulus. In other embodiments, the composition comprises more than one synthetic bioswitch that are activated by stimuli that are orthogonal to each other, such that synthetic bioswitch A responds to stimulus A and synthetic bioswitch B responds to stimulus B, but not vice versa. In this embodiment, the synthetic bioswitches can be present in the same cell, with the outcome based on the stimulus applied to the cell. In this embodiment, the stimulus can be either a single stimulus or a combination of stimuli (e.g., A "AND" B). If multiple, orthogonally-controlled synthetic bioswitches are present in a cell, it is possible to select which synthetic bioswitch to manipulate by delivering the appropriate stimulus or combination of stimuli.

In an aspect, the present disclosure provides a nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus. In some embodiments, the synthetic bioswitch has no activity to normal basal activity in the absence of the single stimulus. In some embodiments, the synthetic bioswitch has high activity in the presence of the single stimulus. In some embodiments, the synthetic bioswitch has a strong induction or activation. In some embodiments, the synthetic bioswitch has no activity to normal basal activity with an orthogonal stimulus.

In another aspect, the present disclosure provides a nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus, wherein the synthetic bioswitch has no activity to normal basal activity in the absence of the single stimulus, wherein the synthetic bioswitch has high activity in the presence of the single stimulus, wherein the synthetic bioswitch has a strong induction or activation, and wherein the synthetic bioswitch has no activity to normal basal activity with an orthogonal stimulus.

In another aspect, the present disclosure provides a nucleic acid molecule comprising: a synthetic bioswitch; and a heterologous nucleic acid, wherein the synthetic bioswitch is operably linked to the heterologous nucleic acid and comprises one or more heat shock elements (HSEs) that are collectively regulated by heat such that the synthetic bioswitch is regulated by heat, wherein the synthetic bioswitch has no activity to normal basal activity in the absence of heat, wherein the synthetic bioswitch has high activity in the presence of heat, wherein the synthetic bioswitch has a strong induction or activation, and wherein the synthetic bioswitch has no activity to normal basal activity with an orthogonal stimulus.

In another aspect, the present disclosure provides a nucleic acid molecule comprising: a synthetic bioswitch; and a heterologous nucleic acid, wherein the synthetic bioswitch is operably linked to the heterologous nucleic acid and comprises one or more hypoxia responsive elements (HSRs) that are collectively regulated by hypoxia such that the synthetic bioswitch is regulated by hypoxia, wherein the synthetic bioswitch has no activity to normal basal activity in a non-hypoxic environment, wherein the synthetic bioswitch has high activity in a hypoxic environment, wherein the synthetic bioswitch has a strong induction or activation, and wherein the synthetic bioswitch has no activity to normal basal activity with an orthogonal stimulus.

In another aspect, the present disclosure provides a nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus, wherein the synthetic bioswitch has no activity to normal basal activity in the absence of the single stimulus, wherein the synthetic bioswitch has high activity in the presence of the single stimulus, wherein the synthetic bioswitch has a strong induction or activation, wherein the synthetic bioswitch has no activity to normal basal activity with an orthogonal stimulus, and wherein the synthetic bioswitch comprises a nucleic acid sequence selected from the group consisting of SEQ ID NOs 1, 2, 3, 4, 5, 6, 7, 8, 32, 33, 34, 35, 36, and 37 and nucleic acid sequences having at least 95% identity to one of SEQ ID NOs 1, 2, 3, 4, 5, 6, 7, 8, 32, 33, 34, 35, 36, and 37.

In another aspect, the present disclosure provides a nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus, wherein the synthetic bioswitch has no activity to normal basal activity in the absence of the single stimulus, wherein the synthetic bioswitch has high activity in the presence of the single stimulus, wherein the synthetic bioswitch has a strong induction or activation, wherein the synthetic bioswitch has no activity to normal basal activity with an orthogonal stimulus, and wherein the at least one control element has a nucleic acid sequence selected from the group consisting of SEQ ID NOs 9, 10, 11, 12, 13, 14, 15, 16, 17, 18, 19, 20, 21, 22, 23, 24, 25, 26, 27, 28, 29, 30, 31, 38, 39, 40, 41, 42, and 43 and nucleic acid sequences having at least 80% identity to one of SEQ ID NOs 9, 10, 11, 12, 13, 14, 15, 16, 17, 18, 19, 20, 21, 22, 23, 24, 25, 26, 27, 28, 29, 30, 31, 38, 39, 40, 41, 42, and 43.

In any of the foregoing aspects, the present disclosure provides for embodiments that further comprise at least a second nucleic acid molecule which comprises: a second synthetic bioswitch; and a second heterologous nucleic acid, wherein the second synthetic bioswitch is operably linked to the second heterologous nucleic acid and comprises one or more control elements that are collectively regulated by a second single stimulus such that the second bioswitch is regulated by the second single stimulus, and wherein the combination of the first nucleic acid molecule and the second nucleic acid molecule enable differential regulation of the expression of the first heterologous nucleic acid and the second heterologous nucleic acid in response to the first single stimulus and the second single stimulus.

In any of the foregoing aspects, the present disclosure provides for embodiments that further comprise at least a second nucleic acid molecule which comprises: a second synthetic bioswitch; and the first heterologous nucleic acid, wherein the second synthetic bioswitch is operably linked to the first heterologous nucleic acid and comprises one or more control elements that are collectively regulated by a second single stimulus such that the second bioswitch is regulated by the second single stimulus, and wherein the combination of the first nucleic acid molecule and the second nucleic acid molecule enable differential regulation of the expression of the first heterologous nucleic acid in response to the first single stimulus and the second single stimulus.

In any of the foregoing, the present disclosure provides for embodiments wherein the second synthetic bioswitch has no activity to normal basal activity in the absence of the second single stimulus, wherein the second synthetic bioswitch has high activity in the presence of the second single stimulus, wherein the second synthetic bioswitch has a strong induction or activation, and wherein the second synthetic bioswitch has no activity to normal basal activity with an orthogonal stimulus.

In any of the foregoing, the present disclosure provides for embodiments wherein the synthetic bioswitch (and optionally the second bioswitch if present) further comprises a spacer region between the last control element and the heterologous nucleic acid.

In any of the foregoing, the present disclosure provides for embodiments wherein the spacer region comprises an untranslated region.

In any of the foregoing, the present disclosure provides for embodiments wherein the untranslated region has a length between 1 to 500 nucleotides.

In any of the foregoing, the present disclosure provides for embodiments wherein the untranslated region comprises at least one regulatory element.

In any of the foregoing, the present disclosure provides for embodiments wherein the at least one regulatory element comprises a binding site for one or more of E2F, Ik-2, LXRalpha:RXRalpha, TBP, TBX5, AR, ELF1, Nkx3A, SPI1, CDX-2, SOX10, Kid3, MAFB, IRF-7, RXR::RAR, UNR, and/or Mushashi.

In any of the foregoing, the present disclosure provides for embodiments wherein the spacer region comprises one or more of upstream AUGs, upstream open reading frames (uORFs), and internal ribosomal entry sites (IRES).

In any of the foregoing, the present disclosure provides for embodiments wherein the heterologous nucleic acid comprises genes that encode biologically active proteins or biological therapeutics, or nucleic acids that enable the manipulation of physiologic or genetic processes and/or protein expression in live cells.

In any of the foregoing, the present disclosure provides for embodiments wherein the heterologous nucleic acid is selected from the group consisting of genome editing or modifying proteins (e.g., CRISPR/Cas9 and any variant of CRISPR [e.g., catalytically inactive Cas9, Cpf1/Cas12, RNA editing Cas13], Argonaut, nucleases such as zinc finger nucleases (ZFNs), transcription activator-like effector nucleases (TALENs), and engineered nucleases and meganucleases); therapeutic antibodies (e.g., Proleukin (Novartis), Yervoy, and Opdivo (BMS); BiTEs; chimeric antigen receptors; transgenic T-cell receptors; transferases (e.g., kinases, phosphotransferases, methylases, etc.); differentiating factors (e.g., Shox 2 for pacemaker cells); Yamanaka factors for induced pluripotency; transcription factors (e.g., HIF1a); structural proteins (e.g., VE-cadherin, claudin-5, occludin, cx43 etc.); transposons (e.g., sleeping beauty); non-coding RNAs (e.g., RNA molecules involved in RNA silencing or RNA interference, e.g., miRNA, siRNA, piRNA), kinases (e.g., insulin receptor, thymidine kinases, HSV-TK and different versions of human thymidine kinase 2) and transport proteins (e.g., transferrin receptor, Glut1, Glut4, Lat1).

In any of the foregoing, the present disclosure provides for embodiments wherein the heterologous nucleic acid comprises a chimeric antigen receptor.

In a related aspect, the present disclosure provides a vector comprising a nucleic acid molecule as described herein. In some embodiments, the vector is selected from the group consisting of an expression vector and a retroviral vector.

In a related aspect, the present disclosure provides a cell comprising either a a nucleic acid molecule or a vector as described herein. In some embodiments, the cell is an immune cell, a pancreatic islet cell, a cardiac cell, or a stem cell. In some embodiments, the immune cell is selected from the group consisting of a T cell, a B cell, a natural killer cell, a dendritic cell, a neutrophil, and a macrophage. In some embodiments, the stem cell is selected from the group consisting of hematopoietic stem cells (HSCs), mesenchymal stem cells (MSCs), embryonic stem cells, tissue-specific stem cells, and induced pluripotent stem cells).

In a related aspect, the present disclosure provides a method of preventing or treating a disease in a patient in need thereof, comprising: administering a therapeutically effective amount of a composition to the patient, wherein the composition is selected from the group consisting of the nucleic acid molecule as described herein, the vector as described herein, and the cell as described herein, and wherein the composition optionally comprises a second therapeutic agent. In some embodiments, the patient has a cancer or leukemia and the heterologous gene comprises a chimeric antigen receptor that is capable of recognizing the cancer or leukemia.

In a related aspect, the present disclosure provides a method of controlling cell differentiation in a patient, comprising: administering a therapeutically effective amount of a composition to the patient, wherein the composition is selected from the group consisting of the nucleic acid molecule as described herein, the vector as described herein, and the cell as described herein, and wherein the heterologous nucleic acid comprises a genome editing or modifying protein that results in cell differentiation. In some embodiments, the cell is a stem cell or a cardiac cell. In some embodiments, the composition directly or indirectly induces cell differentiation.

In a related aspect, the present disclosure provides a method of altering the activity or function of at least one cell in a patient, comprising: administering a therapeutically effective amount of a composition to the patient, wherein the composition is selected from the group consisting of the nucleic acid molecule as described herein, the vector as described herein, and the cell as described herein, and introducing the appropriate stimulus or stimuli in order to activate the synthetic switches of the nucleic acid molecule. In some embodiments, the amount or concentration of the stimulus or stimuli is continuous or consistent. In some embodiments, the amount or concentration of the stimulus or stimuli are increased or decreased. In some embodiments, the amount or concentration of the stimulus or stimuli are linearly increased or decreased. In some embodiments, the amount or concentration of the stimulus or stimuli are non-linearly increased or decreased. In some embodiments, the amount or concentration of the stimulus or stimuli are increased or decreased in a non-continuous or irregular manner. In some embodiments, the amount or concentration of the stimulus or stimuli are increased or decreased in a pulsatile manner.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

FIG. 10A-10H show development of an exemplary synthetic bioswitch that is responsive to heat. (10A) Structure of the endogenous HSPA6 promoter, showing the multiple cues that affect its expression. (10B) Truncation of the HSPA6 promoter and responses to temperature increase (constructs i-viii correspond to SEQ ID NOs: 1-8, respectively). (10C) Structure of other endogenous heat shock protein (HSP) promoter regions, showing that the heat-response is driven by arrays of heat shock elements (HSEs) in the endogenous promoters. (10D) Proposed synthetic bioswitch that comprises an array of HSEs. (10E) Schematic of the synthetic bioswitches comprising different numbers of HSEs, corresponding to SEQ ID NOs 32-37 (top to bottom, respectively; SEQ ID NO: 32 has 2 HSEs, SEQ ID NO: 33 has 3 HSEs, SEQ ID NO: 34 has 4 HSEs, SEQ ID NO: 35 has 5 HSEs, SEQ ID NO: 36 has 6 HSEs, and SEQ ID NO: 37 has 7 HSEs). (10F) Sequences of SEQ ID NOs 32-37 (HSE elements are underlined; TATA box is bolded; 5'-UTR is italicized). (10G) Activation of SEQ ID NOs 32-37 by heat. (10H) Selectivity of SEQ ID NOs 32-37 activity resulting from different environmental stimuli (top left panel, activity at 37° C. after incubation in PCR tubes; top right panel, cold shock; bottom panel, hypoxia).

DETAILED DESCRIPTION OF THE DISCLOSURE

Figure 1:
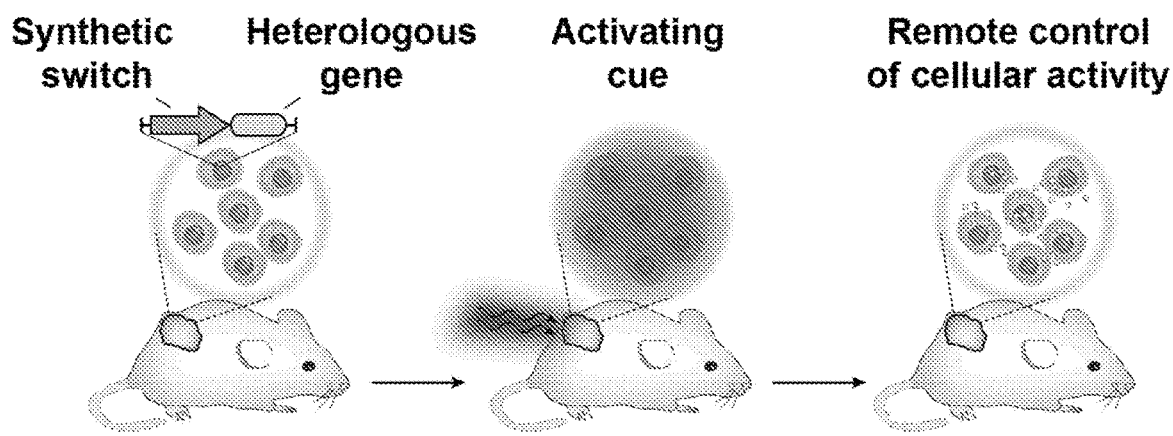
FIG. 1 depicts a schematic of an exemplary synthetic bioswitch system according to the disclosure.

As specified in the Background Section, there is a great need in the art to identify technologies for precise, sharp on/off (i.e., high induction/activation) and single cue control of the function and activity of live cells and use this understanding to develop novel compositions and methods. The present disclosure satisfies this and other needs. Embodiments of the present disclosure relate generally to compositions and methods for the design of remote controlled biological systems, and more specifically to synthetic gene switches that provide the ability to non-invasively and remotely control the function and activity of live cells, such as for example and not limitation, the expression of biologically active proteins or biological therapeutics, and the manipulation of physiologic or genetic processes and/or protein expression in live cells, in vivo (including, e.g., at desired anatomical sites) or ex vivo. In some embodiments, the composition and method also provide precise, sharp on/off (i.e., high induction/activation) remote control of gene expression or manipulation of physiologic or genetic processes, such as for example and not limitation, tunable, remote-controlled expression and/or synthesis of desired biologically active proteins (e.g., biologic drugs) at desired sites in a subject's body (e.g., at a tumor or cancer). In some embodiments, this remote control can be achieved by use of a synthetic bioswitch that is activated by a single stimulus. In other embodiments, the composition comprises more than one synthetic bioswitch that are activated by stimuli that are orthogonal to each other, such that synthetic bioswitch A responds to stimulus A and synthetic bioswitch B responds to stimulus B, but not vice versa. In this embodiment, the synthetic bioswitches can be present in the same cell, with the outcome based on the stimulus applied to the cell. In this embodiment, the stimulus can be either a single stimulus or a combination of stimuli (e.g., A "AND" B). If multiple, orthogonally-controlled synthetic bioswitches are present in a cell, it is possible to select which synthetic bioswitch to manipulate by delivering the appropriate stimulus or combination of stimuli.

As discussed herein, precise, sharp on/off (i.e., high induction/activation) remote control systems for modulating the function and activity of live cells are needed. Features of such a system further include but are not limited to (i) spatial control, meaning that the compositions containing the synthetic bioswitch can be targeted to any site in the body with external stimuli; (ii) temporal control, meaning that the compositions containing the synthetic bioswitch can modulate on/off biological activity precisely in time; (iii) high levels of activity in the presence of the stimulus, such as, e.g., high local concentration of an operably linked heterologous nucleic acid or its gene product, which can increase drug efficacy and lower systemic toxicity; (iv) tunable drug synthesis in response to small changes in the stimuli; (v) precise single-stimuli control of each synthetic bioswitch, such that more than one synthetic bioswitch can be present to enable precise, sharp on/off remote control using multiple orthogonal stimuli that activate the cognate bioswitch only; and (vi) applicability to all biologic drugs.

Many potent biologic drugs are toxic, resulting in delivering low doses of the drugs to lower the toxicity and risk of off-target activity and negative sequelae or side effects. Further, these drugs are often found in high concentrations in healthy tissue and low concentrations in the tissue targeted by the drug. Many classes of drugs have these problems, including small molecule drugs; gene modulators and editing proteins (e.g., siRNA, CRISPR); biologics (e.g., antibody-based therapeutics, IL-2, checkpoint inhibitors); and cell-based therapies (e.g., CAR-T, transgenic TCRs).

Three possible ways of generating a synthetic switch for use in these remote control systems include, for example and not limitation, (i) altering endogenous promoters (e.g., by truncation and/or mutation); (ii) modular assembly of genetic motifs; and (iii) incorporation of genes that allow suppression of genes (e.g., Cas9 or other blocking proteins).

Definitions

To facilitate an understanding of the principles and features of the various embodiments of the disclosure, various illustrative embodiments are explained below. Although exemplary embodiments of the disclosure are explained in detail, it is to be understood that other embodiments are contemplated. Accordingly, it is not intended that the disclosure is limited in its scope to the details of construction and arrangement of components set forth in the following description or examples. The disclosure is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms a, an, and the do not denote a limitation of quantity, but rather denote the presence of at least one of the referenced item.

As used herein, the term "and/or" may mean "and," it may mean "or," it may mean exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Similarly, as used herein, "substantially free" of something, or "substantially pure", and like characterizations, can include both being "at least substantially free" of something, or "at least substantially pure", and being "completely free" of something, or "completely pure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented. The terms first, second, and the like, primary, secondary, and the like, do not denote any order, quantity, or importance, but rather are used to distinguish one element from another.

It is noted that terms like "specifically," "preferably," "typically," "generally," and "often" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean about 50 mm.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure, for example. Any dimensions listed in the various drawings are for illustrative purposes only and are not intended to be limiting. Other dimensions and proportions are contemplated and intended to be included within the scope of the disclosure.

As used herein, the term "subject" or "patient" refers to mammals and includes, without limitation, human and veterinary animals. In a preferred embodiment, the subject is human.

As used herein, the term combination of a composition according to the disclosure and at least a second pharmaceutically active ingredient means at least two, but any desired combination of compounds can be delivered simultaneously or sequentially (e.g., within a 24 hour period). It is contemplated that when used to treat various diseases, the compositions and methods of the present disclosure can be utilized with other therapeutic methods/agents suitable for the same or similar diseases. Such other therapeutic methods/agents can be co-administered (simultaneously or sequentially) to generate additive or synergistic effects. Suitable therapeutically effective dosages for each agent may be lowered due to the additive action or synergy.

A "disease" is a state of health of a subject wherein the subject cannot maintain homeostasis, and wherein if the disease is not ameliorated then the subject's health continues to deteriorate. In contrast, a "disorder" in a subject is a state of health in which the subject is able to maintain homeostasis, but in which the subject's state of health is less favorable than it would be in the absence of the disorder. Left untreated, a disorder does not necessarily cause a further decrease in the subject's state of health.

The terms "treat" or "treatment" of a state, disorder or condition include: (1) preventing or delaying the appearance of at least one clinical or sub-clinical symptom of the state, disorder or condition developing in a subject that may be afflicted with or predisposed to the state, disorder or condition but does not yet experience or display clinical or subclinical symptoms of the state, disorder or condition; or (2) inhibiting the state, disorder or condition, i.e., arresting, reducing or delaying the development of the disease or a relapse thereof (in case of maintenance treatment) or at least one clinical or sub-clinical symptom thereof; or (3) relieving the disease, i.e., causing regression of the state, disorder or condition or at least one of its clinical or sub-clinical symptoms. The benefit to a subject to be treated is either statistically significant or at least perceptible to the patient or to the physician.

The term "therapeutic" as used herein means a treatment and/or prophylaxis. A therapeutic effect is obtained by suppression, diminution, remission, or eradication of a disease state.

As used herein the term "therapeutically effective" applied to dose or amount refers to that quantity of a compound or pharmaceutical composition that when administered to a subject for treating (e.g., preventing or ameliorating) a state, disorder or condition, is sufficient to effect such treatment. The "therapeutically effective amount" will vary depending on the compound or bacteria or analogues administered as well as the disease and its severity and the age, weight, physical condition and responsiveness of the mammal to be treated.

The phrase "pharmaceutically acceptable", as used in connection with compositions of the disclosure, refers to molecular entities and other ingredients of such compositions that are physiologically tolerable and do not typically produce untoward reactions when administered to a mammal (e.g., a human). Preferably, as used herein, the term pharmaceutically acceptable means approved by a regulatory agency of the Federal or a state government or listed in the U.S. Pharmacopeia or other generally recognized pharmacopeia for use in mammals, and more particularly in humans.

The terms pharmaceutical carrier" or "pharmaceutically acceptable carrier" refer to a diluent, adjuvant, excipient, or vehicle with which the compound is administered. Such pharmaceutical carriers can be sterile liquids, such as water and oils, including those of petroleum, animal, vegetable or synthetic origin, such as peanut oil, soybean oil, mineral oil, sesame oil and the like. Water or aqueous solution saline solutions and aqueous dextrose and glycerol solutions are preferably employed as carriers, particularly for injectable solutions. Alternatively, the pharmaceutical carrier can be a solid dosage form carrier, including but not limited to one or more of a binder (for compressed pills), a glidant, an encapsulating agent, a flavorant, and a colorant. Suitable pharmaceutical carriers are described in "Remington's Pharmaceutical Sciences" by E. W. Martin.

The term "analog" or "functional analog" refers to a related modified form of a polypeptide, wherein at least one amino acid substitution, deletion, or addition has been made such that said analog retains substantially the same biological activity as the unmodified form, in vivo and/or in vitro.

The term "agent" includes any substance, metabolite, molecule, element, compound, or a combination thereof. It includes, but is not limited to, e.g., protein, oligopeptide, small organic molecule, glycan, polysaccharide, polynucleotide, and the like. It can be a natural product, a synthetic compound, a chemical compound, or a combination of two or more substances. Unless otherwise specified, the terms "agent," "substance," and "compound" can be used interchangeably. Further, a "test agent" or "candidate agent" is generally a subject agent for use in an assay of the disclosure.

The term "binding" refers to a direct association between at least two molecules, due to, for example, covalent, electrostatic, hydrophobic, ionic and/or hydrogen-bond interactions.

The term "gene" as used herein refers to the nucleotide sequences which encode the amino acids found in the nascent polypeptide as a result of translation of a mRNA molecule. The coding region is bounded, in eukaryotes, on the 5'-side by the nucleotide triplet "ATG" which encodes the initiator methionine and on the 3'-side by one of the three triplets which specify stop codons (i.e., TAA, TAG, TGA). In addition to containing introns, genomic forms of a gene may also include sequences located on both the 5'- and 3'-end of the sequences which are present on the RNA transcript, which are termed "5' untranslated regions" or 5'UTR and 3' untranslated regions (3'UTR) respectively. These sequences are also referred to as "flanking" sequences or regions (these flanking sequences are located 5' or 3' to the nontranslated sequences present on the mRNA transcript). The 5'-flanking region may contain regulatory sequences such as promoters and enhancers which control or influence the transcription of the gene. The 3'-flanking region may contain sequences which direct the termination of transcription, post-transcriptional cleavage and polyadenylation.

The term "expression" as used herein is defined as the transcription and/or translation of a particular nucleotide sequence driven by its promoter, preferably the transcription and/or translation of a nucleotide sequence, for example an endogenous gene or a heterologous gene, in a cell. For example, in the case of a heterologous nucleic acid sequence, expression involves transcription of the heterologous nucleic acid sequence into mRNA and, optionally, the subsequent translation of mRNA into one or more polypeptides.

The terms "alter" or "modulate" are used interchangeably herein in reference to the expression of a nucleotide sequence in a cell, meaning that the level of expression of the nucleotide sequence in a cell after applying a composition or method of the present invention is different from its expression in the cell before applying the composition or method.

The term "expression construct" and "nucleic acid construct" as used herein are synonyms and refer to a nucleic acid sequence capable of directing the expression of a particular nucleotide sequence, such as the heterologous target gene sequence in an appropriate host cell (e.g., a mammalian cell). If translation of the desired heterologous target gene is required, it also typically comprises sequences required for proper translation of the nucleotide sequence. The coding region may code for a protein of interest but may also code for a functional RNA of interest, for example antisense RNA, dsRNA, or a nontranslated RNA, in the sense or antisense direction. The nucleic acid construct as disclosed herein can be chimeric, meaning that at least one of its components is heterologous with respect to at least one of its other components.

"Expression vector" refers to a vector comprising a recombinant polynucleotide comprising expression control sequences operably linked to a nucleotide sequence to be expressed. An expression vector comprises sufficient cis-acting elements for expression; other elements for expression can be supplied by the host cell or in an in vitro expression system. Expression vectors include all those known in the art, such as cosmids, plasmids (e.g., naked or contained in liposomes) and viruses (e.g., lentiviruses, retroviruses, adenoviruses, and adeno-associated viruses) that incorporate the recombinant polynucleotide. Other expression vectors can be used in different embodiments of the invention, for example, but are not limited to, plasmids, episomes, bacteriophages or viral vectors, and such vectors can integrate into the host's genome or replicate autonomously in the particular cell. Other forms of expression vectors known by those skilled in the art which serve the equivalent functions can also be used. Expression vectors comprise expression vectors for stable or transient expression encoding the DNA.

The term "vector" is used interchangeably with "plasmid" to refer to a nucleic acid molecule capable of transporting another nucleic acid to which it has been linked. In general, expression vectors of utility in recombinant DNA techniques are often in the form of "plasmids" which refer to circular double stranded DNA loops which, in their vector form are not bound to the chromosome. A vector can be a plasmid, bacteriophage, bacterial artificial chromosome or yeast artificial chromosome. A vector can be a DNA or RNA vector. A vector can be either a self-replicating extrachromosomal vector or a vector which integrate into a host genome.

The term "foreign gene" or "heterologous gene" are used interchangeably herein and refer to any nucleic acid (e.g., gene sequence) which is introduced into the genome of a cell. Heterologous gene sequences may include gene sequences found in that cell so long as the introduced gene to be expressed at different levels as compared to the level naturally occurring in the host cell and/or contains some modification (e.g., a point mutation, the presence of a selectable marker gene, etc.) relative to the naturally-occurring gene, or is not expressed at the same level normally in the cells as compared to the level which is being induced.

The terms "genome" or "genomic DNA" as used herein refers to the heritable genetic information of a host organism. Genomic DNA comprises the DNA of the nucleus (also referred to as chromosomal DNA) but also the DNA of the plastids (e.g., chloroplasts) and other cellular organelles (e.g., mitochondria). The terms genome or genomic DNA typically refers to the chromosomal DNA of the nucleus.

The terms "nucleic acids" and "nucleotides" refer to naturally occurring or synthetic or artificial nucleic acid or nucleotides. The terms "nucleic acids" and "nucleotides" comprise deoxyribonucleotides or ribonucleotides or any nucleotide analogue and polymers or hybrids thereof in either single- or double-stranded, sense or antisense form. Unless otherwise indicated, a particular nucleic acid sequence also implicitly encompasses conservatively modified variants thereof (e.g., degenerate codon substitutions) and complementary sequences, as well as the sequence explicitly indicated. The term "nucleic acid" is used interchangeably herein with "gene", "oligonucleotide," and "polynucleotide". Nucleotide analogues include nucleotides having modifications in the chemical structure of the base, sugar and/or phosphate, including, but not limited to, 5-position pyrimidine modifications, 8-position purine modifications, modifications at cytosine exocyclic amines, substitution of 5-bromo-uracil, and the like; and 2'-position sugar modifications, including but not limited to, sugar-modified ribonucleotides in which the 2'-OH is replaced by a group selected from H, OR, R, halo, SH, SR, $NH_2$, $NH_R$, $NR_2$, or CN. Nucleic acids also can comprise non-natural elements such as non-natural bases, e.g., ionosin and xanthine, non-natural sugars, e.g., 2'-methoxy ribose, or non-natural phosphodiester linkages, e.g., methylphosphonates, phosphorothioates and peptides. The term "nucleic acid" or "oligonucleotide" or "polynucleotide" are used interchangeably herein and refers to at least two nucleotides covalently linked together. As will be appreciated by those in the art, the depiction of a single strand also defines the sequence of the complementary strand. Thus, a nucleic acid also encompasses the complementary strand of a depicted single strand. As will also be appreciated by those in the art, many variants of a nucleic acid can be used for the same purpose as a given nucleic acid. Thus, a nucleic acid also encompasses substantially identical nucleic acids and complements thereof. As will also be appreciated by those in the art, a single strand provides a probe for a probe that can hybridize to the target sequence under stringent hybridization conditions. Thus, a nucleic acid also encompasses a probe that hybridizes under stringent hybridization conditions.

The term "nucleic acid sequence" refers to a single or double-stranded polymer of deoxyribonucleotide or ribonucleotide bases read from the 5'- to the 3'-end. It includes chromosomal DNA, self-replicating plasmids, infectious polymers of DNA or RNA and DNA or RNA that performs a primarily structural role. "Nucleic acid sequence" also refers to a consecutive list of abbreviations, letters, characters or words, which represent nucleotides.

Nucleic acids can be single stranded or double stranded, or can contain portions of both double stranded and single stranded sequence. The nucleic acid can be DNA, both genomic and cDNA, RNA, or a hybrid, where the nucleic acid can contain combinations of deoxyribo- and ribonucleotides, and combinations of bases including uracil, adenine, thymine, cytosine, guanine, inosine, xanthine hypoxanthine, isocytosine and isoguanine. Nucleic acids can be obtained by chemical synthesis methods or by recombinant methods.

A nucleic acid will generally contain phosphodiester bonds, although nucleic acid analogs can be included that can have at least one different linkage, e.g., phosphoramidate, phosphorothioate, phosphorodithioate, or O-methylphosphoroamidite linkages and peptide nucleic acid backbones and linkages. Other analog nucleic acids include those with positive backbones; non-ionic backbones, and non-ribose backbones, including those described in U.S. Pat. Nos. 5,235,033 and 5,034,506, which are incorporated by reference. Nucleic acids containing one or more non-naturally occurring or modified nucleotides are also included within one definition of nucleic acids. The modified nucleotide analog can be located for example at the 5'-end and/or the 3'-end of the nucleic acid molecule. Representative examples of nucleotide analogs can be selected from sugar- or backbone-modified ribonucleotides. It should be noted, however, that also nucleobase-modified ribonucleotides, i.e. ribonucleotides, containing a non-naturally occurring nucleobase instead of a naturally occurring nucleobase such as uridines or cytidines modified at the 5-position, e.g. 5-(2-amino)propyl uridine, 5-bromo uridine; adenosines and guanosines modified at the 8-position, e.g. 8-bromo guanosine; deaza nucleotides, e. g. 7 deaza-adenosine; 0 and N-alkylated nucleotides, e.g. N6-methyl adenosine are suitable. The 2' OH group can be replaced by a group selected from H, OR, R, halo, SH, SR, $NH_2$, NHR, $NR_2$ or CN, wherein R is C C6 alkyl, alkenyl or alkynyl and halo is F, Cl, Br or I. Modifications of the ribose-phosphate backbone can be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs can be made.

The terms "sequence identity" and "percent identity" are used interchangeably herein. For the purpose of this disclosure, it is defined here that in order to determine the percent identity of two amino acid sequences or two nucleic acid sequences, the sequences are aligned for optimal comparison purposes (e.g., gaps can be introduced in the sequence of a first amino acid or nucleic acid for optimal alignment with a second amino or nucleic acid sequence). The amino acid or nucleotide residues at corresponding amino acid or nucleotide positions are then compared. When a position in the first sequence is occupied by the same amino acid or nucleotide residue as the corresponding position in the second sequence, then the molecules are identical at that position. The percent identity between the two sequences is a function of the number of identical positions shared by the sequences (i.e., % identity=number of identical positions/total number of positions (i.e., overlapping positions)×100). Preferably, the two sequences are the same length.

Several different computer programs are available to determine the degree of identity between two sequences. For instance, a comparison of sequences and determination of percent identity between two sequences can be accomplished using a mathematical algorithm. In a preferred embodiment, the percent identity between two amino acid or nucleic acid sequences is determined using the Needleman and Wunsch (J. Mol. Biol. (48): 444-453 (1970)) algorithm which has been incorporated into the GAP program in the Accelrys GCG software package (available at www.accelrys.com/products/gcg), using either a Blosum 62 matrix or a PAM250 matrix, and a gap weight of 16, 14, 12, 10, 8, 6, or 4 and a length weight of 1, 2, 3, 4, 5, or 6. These different parameters will yield slightly different results but the overall percentage identity of two sequences is not significantly altered when using different algorithms.

A sequence comparison may be carried out over the entire lengths of the two sequences being compared or over fragments of the two sequences. Typically, the comparison will be carried out over the full length of the two sequences being compared. However, sequence identity may be carried out over a region of, for example, twenty, fifty, one hundred or more contiguous amino acid residues.

"Sequence identity" as it is known in the art refers to a relationship between two or more polypeptide sequences or two or more polynucleotide sequences, namely a reference sequence and a given sequence to be compared with the reference sequence. Sequence identity is determined by comparing the given sequence to the reference sequence after the sequences have been optimally aligned to produce the highest degree of sequence similarity, as determined by the match between strings of such sequences. Upon such alignment, sequence identity is ascertained on a position-by-position basis, e.g., the sequences are "identical" at a particular position if at that position, the nucleotides or amino acid residues are identical. The total number of such position identities is then divided by the total number of nucleotides or residues in the reference sequence to give % sequence identity. Sequence identity can be readily calculated by known methods, including but not limited to, those described in Computational Molecular Biology, Lesk, A. N., ed., Oxford University Press, New York (1988), Biocomputing: Informatics and Genome Projects, Smith, D. W., ed., Academic Press, New York (1993); Computer Analysis of Sequence Data, Part I, Griffin, A. M., and Griffin, H. G., eds., Humana Press, New Jersey (1994); Sequence Analysis in Molecular Biology, von Heinge, G., Academic Press (1987); Sequence Analysis Primer, Gribskov, M. and Devereux, J., eds., M. Stockton Press, New York (1991); and Carillo, H., and Lipman, D., SIAM J. Applied Math., 48: 1073 (1988), the teachings of which are incorporated herein by reference. Preferred methods to determine the sequence identity are designed to give the largest match between the sequences tested. Methods to determine sequence identity are codified in publicly available computer programs which determine sequence identity between given sequences. Examples of such programs include, but are not limited to, the GCG program package (Devereux, J., et al., Nucleic Acids Research, 12(1):387 (1984)), BLASTP, BLASTN and FASTA (Altschul, S. F. et al., J. Molec. Biol., 215:403-410 (1990). The BLASTX program is publicly available from NCBI and other sources (BLAST Manual, Altschul, S. et al., NCVI NLM NIH Bethesda, Md. 20894, Altschul, S. F. et al., J. Molec. Biol., 215:403-410 (1990), the teachings of which are incorporated herein by reference). These programs optimally align sequences using default gap weights in order to produce the highest level of sequence identity between the given and reference sequences. As an illustration, by a polynucleotide having a nucleotide sequence having at least, for example, 95%, e.g., at least 96%, 97%, 98%, 99%, or 100% "sequence identity" to a reference nucleotide sequence, it is intended that the nucleotide sequence of the given polynucleotide is identical to the reference sequence except that the given polynucleotide sequence may include up to 5, 4, 3, 2, 1, or 0 point mutations per each 100 nucleotides of the reference nucleotide sequence. In other words, in a polynucleotide having a nucleotide sequence having at least 95%, e.g., at least 96%, 97%, 98%, 99%, or 100% sequence identity relative to the reference nucleotide sequence, up to 5%, 4%, 3%, 2%, 1%, or 0% of the nucleotides in the reference sequence may be deleted or substituted with another nucleotide, or a number of nucleotides up to 5%, 4%, 3%, 2%, 1%, or 0% of the total nucleotides in the reference sequence may be inserted into the reference sequence. These mutations of the reference sequence may occur at the 5' or 3' terminal positions of the reference nucleotide sequence or anywhere between those terminal positions, interspersed either individually among nucleotides in the reference sequence or in one or more contiguous groups within the reference sequence. Analogously, by a polypeptide having a given amino acid sequence having at least, for example, 95%, e.g., at least 96%, 97%, 98%, 99%, or 100% sequence identity to a reference amino acid sequence, it is intended that the given amino acid sequence of the polypeptide is identical to the reference sequence except that the given polypeptide sequence may include up to 5, 4, 3, 2, 1, or 0 amino acid alterations per each 100 amino acids of the reference amino acid sequence. In other words, to obtain a given polypeptide sequence having at least 95%, e.g., at least 96%, 97%, 98%, 99%, or 100% sequence identity with a reference amino acid sequence, up to 5%, 4%, 3%, 2%, 1%, or 0% of the amino acid residues in the reference sequence may be deleted or substituted with another amino acid, or a number of amino acids up to 5%, 4%, 3%, 2%, 1%, or 0% of the total number of amino acid residues in the reference sequence may be inserted into the reference sequence. These alterations of the reference sequence may occur at the amino or the carboxy terminal positions of the reference amino acid sequence or anywhere between those terminal positions, interspersed either individually among residues in the reference sequence or in the one or more contiguous groups within the reference sequence. Preferably, residue positions which are not identical differ by conservative amino acid substitutions. However, conservative substitutions are not included as a match when determining sequence identity.

The terms "target", "target gene" and "target nucleotide sequence" are used equivalently herein and refers to a target gene can be any gene of interest present in an organism. A target gene may be endogenous or introduced. For example, a target gene is a gene of known function or is a gene whose function is unknown, but whose total or partial nucleotide sequence is known. Alternatively, the function of a target gene and its nucleotide sequence are both unknown. A target gene can be a native gene of the eukaryotic cell or can be a heterologous gene which has previously been introduced into the eukaryotic cell or a parent cell of said eukaryotic cell, for example by genetic transformation. A heterologous target gene can be stably integrated in the genome of the eukaryotic cell or is present in the eukaryotic cell as an extrachromosomal molecule, e.g. as an autonomously replicating extrachromosomal molecule. A target gene can include polynucleotides comprising a region that encodes a polypeptide or polynucleotide region that regulates replication, transcription, translation, or other process important in expression of the target protein; or a polynucleotide comprising a region that encodes the target polypeptide and a region that regulates expression of the target polypeptide; or non-coding regions such as the 5' or 3' UTR or introns. A target gene may refer to, for example, an mRNA molecule produced by transcription a gene of interest.

The term "operable linkage" or "operably linked" or "operatively linked" are used interchangeably herein, are to be understood as meaning, for example, the sequential arrangement of a regulatory element (e.g., a promoter) with a nucleic acid sequence to be expressed and, if appropriate, further regulatory elements (such as e.g., a terminator) in such a way that each of the regulatory elements can fulfill its intended function to allow, modify, facilitate or otherwise influence expression of the linked nucleic acid sequence. The expression may result depending on the arrangement of the nucleic acid sequences in relation to sense or antisense RNA. To this end, direct linkage in the chemical sense is not necessarily required. Genetic control sequences such as, for example, enhancer sequences, can also exert their function on the target sequence from positions which are further away, or indeed from other DNA molecules. In some embodiments, arrangements are those in which the nucleic acid sequence to be expressed recombinantly is positioned behind the sequence acting as promoter, so that the two sequences are linked covalently to each other. The distance between the promoter sequence and the nucleic acid sequence to be expressed recombinantly can be any distance, and in some embodiments is less than 200 base pairs, especially less than 100 base pairs, less than 50 base pairs. In some embodiments, the nucleic acid sequence to be transcribed is located behind the promoter in such a way that the transcription start is identical with the desired beginning of the chimeric RNA of the invention. Operable linkage, and an expression construct, can be generated by means of customary recombination and cloning techniques as described (e.g., in Maniatis T, Fritsch E F and Sambrook J (1989) Molecular Cloning: A Laboratory Manual, 2nd Ed., Cold Spring Harbor Laboratory, Cold Spring Harbor (N.Y.); Silhavy et al. (1984) Experiments with Gene Fusions, Cold Spring Harbor Laboratory, Cold Spring Harbor (N.Y.); Ausubel et al. (1987) Current Protocols in Molecular Biology, Greene Publishing Assoc and Wiley Interscience; Gelvin et al. (Eds) (1990) Plant Molecular Biology Manual; Kluwer Academic Publisher, Dordrecht, The Netherlands). However, further sequences, which, for example, act as a linker with specific cleavage sites for restriction enzymes, or as a signal peptide, may also be positioned between the two sequences. The insertion of sequences may also lead to the expression of fusion proteins. In some embodiments, the expression construct, consisting of a linkage of promoter and nucleic acid sequence to be expressed, can exist in a vector integrated form and be inserted into a plant genome, for example by transformation.

The terms "promoter," "promoter element," or "promoter sequence" are equivalents and as used herein, refers to a DNA sequence which when operatively linked to a nucleotide sequence of interest is capable of controlling the transcription of the nucleotide sequence of interest into mRNA. A promoter is typically, though not necessarily, located 5' (i.e., upstream) of a nucleotide sequence of interest (e.g., proximal to the transcriptional start site of a structural gene) whose transcription into mRNA it controls, and provides a site for specific binding by RNA polymerase and other transcription factors for initiation of transcription. A polynucleotide sequence is "heterologous to" an organism or a second polynucleotide sequence if it originates from a foreign species, or, if from the same species, is modified from its original form. For example, a promoter operably linked to a heterologous coding sequence refers to a coding sequence from a species different from that from which the promoter was derived, or, if from the same species, a coding sequence which is not naturally associated with the promoter (e.g. a genetically engineered coding sequence or an allele from a different ecotype or variety). Suitable promoters can be derived from genes of the host cells where expression should occur or from pathogens for this host cells (e.g., tissue promoters or pathogens like viruses). If a promoter is an inducible promoter, then the rate of transcription increases in response to an inducing agent. In contrast, the rate of transcription is not regulated by an inducing agent if the promoter is a constitutive promoter. Also, the promoter may be regulated in a tissue-specific or tissue preferred manner such that it is only active in transcribing the associated coding region in a specific tissue type(s) such as leaves, roots or meristem. The term "tissue specific" as it applies to a promoter refers to a promoter that is capable of directing selective expression of a nucleotide sequence of interest to a specific type of tissue (e.g., liver) in the relative absence of expression of the same nucleotide sequence of interest in a different type of tissue (e.g., kidney). Tissue specificity of a promoter may be evaluated by, for example, operably linking a reporter gene to the promoter sequence to generate a reporter construct, introducing the reporter construct into the genome of an organism, e.g. an animal model such that the reporter construct is integrated into every tissue of the resulting transgenic animal, and detecting the expression of the reporter gene (e.g., detecting mRNA, protein, or the activity of a protein encoded by the reporter gene) in different tissues of the transgenic animal. The detection of a greater level of expression of the reporter gene in one or more tissues relative to the level of expression of the reporter gene in other tissues shows that the promoter is specific for the tissues in which greater levels of expression are detected. The term "constitutive" when made in reference to a promoter means that the promoter is capable of directing transcription of an operably linked nucleic acid sequence in the absence of a stimulus (e.g., heat shock, chemicals, agents, light, etc.). Typically, constitutive promoters are capable of directing expression of a transgene in substantially any cell and any tissue. In contrast, the term "regulatable" or "inducible" promoter referred to herein is one which is capable of directing a level of transcription of an operably linked nucleic acid sequence in the presence of a stimulus (e.g., heat shock, chemicals, light, agent etc.) which is different from the level of transcription of the operably linked nucleic acid sequence in the absence of the stimulus.

As used herein, the terms "synthetic switch", "synthetic gene switch", "bioswitch", and "synthetic bioswitch" are used interchangeably to refer to (i) a nucleic acid that contains a unique sequence of control elements (which can be the native sequence or a sequence designed to alter the binding kinetics of its regulatory protein(s)) that are not normally found in naturally occurring systems; and (ii) truncations or deletions in endogenous promoters that result in non-naturally occurring arrangements of control elements. There can be one or a multiplicity of such control elements. Multiple control elements can allow tuning of the synthetic bioswitch's response to stimuli, such that small changes in the stimuli or cue can affect the activity of the synthetic bioswitch. Each synthetic bioswitch is capable of being selectively activated by a single stimulus, and is not activated by an orthogonal stimulus. Such selectivity enables a multiplexed remote control system comprising multiple synthetic bioswitches that are capable of being activated by discrete stimuli. A non-limiting example of such a multiplexed system includes three synthetic bioswitches, each operably linked to a different heterologous nucleic acid molecule, wherein bioswitch A is activated by heat, bioswitch B is activated by cold temperatures, and bioswitch C is activated by a hypoxic environment, and each bioswitch is activated only by its cognate stimulus. Absent a stimulus, a synthetic bioswitch exhibits no activity to normal basal activity (e.g., no activity includes less than 1% of the maximum signal from the synthetic bioswitch). In the presence of a stimulus, the synthetic bioswitch turns on (e.g., activates) at very high levels (e.g., greater than 10-1000 fold over basal levels). The activity or output from the synthetic bioswitch can be tuned by, for example and not limitation, (i) increasing or decreasing the number of control elements; (ii) increasing or decreasing the amount or concentration of the activating stimulus (e.g., less heat, more heat); and/or (iii) changing the delivery profile of the activating stimulus (e.g., pulsed vs. continuous). In the presence of an orthogonal stimulus, the synthetic bioswitch exhibits no activity to normal levels of basal activity (e.g., less than 1% of maximum signal). The nucleic acid sequence of the control element(s) may be the native sequence, a consensus sequence, or the sequence can be modified such that the regulatory protein that binds the control element binds less tightly or more tightly. If more than one control element is present in the bioswitch, then at least one of the order, number, sequence, and/or spacing of the control elements is different than in naturally occurring endogenous promoters. An exemplary bioswitch can include one or more heat shock elements (HSEs) that allow transcriptional regulation by application of heat, but not hypothermia or another cue. The nucleic acid sequence of an HSE may be modified to affect its affinity for a Heat Shock Factor (HSF) protein, and thus the ability and degree or potency to which heat activates that synthetic bioswitch. The sequence of an HSE may also be synthetic (i.e., non-naturally occurring). Another exemplary bioswitch can include one or more hypoxia responsive elements (HREs) that allow regulation in hypoxic environments (but are not regulated by temperature or other cues). The nucleic acid sequence of an HRE may be modified to affect its affinity for its regulatory protein, and thus the ability of the regulatory protein to control that synthetic bioswitch. The sequence of an HRE may also be synthetic (i.e., non-naturally occurring).

As used herein, the term "immune response" includes T-cell mediated and/or B-cell mediated immune responses. Exemplary immune responses include T cell responses, e.g., cytokine production and cellular cytotoxicity, and B cell responses, e.g., antibody production. In addition, the term immune response includes immune responses that are indirectly affected by T cell activation, e.g., antibody production (humoral responses) and activation of cytokine responsive cells, e.g., macrophages. Immune cells involved in the immune response include lymphocytes, such as B cells (e.g., CD19+ cells) and T cells (e.g., CD4+ and CD8+ cells); antigen presenting cells (e.g., professional antigen presenting cells such as dendritic cells, macrophages, B lymphocytes, Langerhans cells, and non-professional antigen presenting cells such as keratinocytes, endothelial cells, astrocytes, fibroblasts, oligodendrocytes); natural killer cells; myeloid cells, such as macrophages, eosinophils, mast cells, basophils, and granulocytes.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a host cell.

In the context of the field of medicine, the term "prevent" encompasses any activity which reduces the burden of mortality or morbidity from disease. Prevention can occur at primary, secondary and tertiary prevention levels. While primary prevention avoids the development of a disease, secondary and tertiary levels of prevention encompass activities aimed at preventing the progression of a disease and the emergence of symptoms as well as reducing the negative impact of an already established disease by restoring function and reducing disease-related complications.

The term "transfected" or "transformed" or "transduced" as used herein refers to a process by which exogenous nucleic acid is transferred or introduced into the host cell. A "transfected" or "transformed" or "transduced" cell is one which has been transfected, transformed or transduced with exogenous nucleic acid. The cell includes the primary subject cell and its progeny. Transformation of a cell may be stable or transient. The term "transient transformation" or "transiently transformed" refers to the introduction of one or more nucleic acids into a cell in the absence of integration of the nucleic acid into the host cell's genome. Transient transformation may be detected by, for example, enzyme linked immunosorbent assay (ELISA), which detects the presence of a polypeptide encoded by one or more of the nucleic acids. Alternatively, transient transformation may be detected by detecting the activity of the protein encoded by the nucleic acid. The term "transient transformant" refers to a cell which has transiently incorporated one or more nucleic acids. In contrast, the term "stable transformation" or "stably transformed" refers to the introduction and integration of one or more nucleic acids into the genome of a cell, preferably resulting in chromosomal integration and stable heritability through meiosis. Stable transformation of a cell may be detected by Southern blot hybridization of genomic DNA of the cell with nucleic acid sequences, which are capable of binding to one or more of the integrated nucleic acids. Alternatively, stable transformation of a cell may also be detected by the polymerase chain reaction of genomic DNA of the cell to amplify transgene sequences. The term "stable transformant" refers to a cell, which has stably integrated one or more nucleic acids into the genomic DNA. Thus, a stable transformant is distinguished from a transient transformant in that, whereas genomic DNA from the stable transformant contains one or more transgenes, genomic DNA from the transient transformant does not contain a transgene. Transformation also includes introduction of genetic material into plant cells in the form of plant viral vectors involving epichromosomal replication and gene expression, which may exhibit variable properties with respect to meiotic stability. Transformed cells, tissues, or plants are understood to encompass not only the end product of a transformation process, but also transgenic progeny thereof.

A variant" of a polypeptide according to the present disclosure may be (i) one in which one or more of the amino acid residues are substituted with a conserved or non-conserved amino acid residue (preferably a conserved amino acid residue) and such substituted amino acid residue may or may not be one encoded by the genetic code, (ii) one in which there are one or more modified amino acid residues, e.g., residues that are modified by the attachment of substituent groups, (iii) one in which the polypeptide is an alternative splice variant of the polypeptide of the present disclosure, (iv) fragments of the polypeptides and/or (v) one in which the polypeptide is fused with another polypeptide, such as a leader or secretory sequence or a sequence which is employed for purification (for example, His-tag) or for detection (for example, Sv5 epitope tag). The fragments include polypeptides generated via proteolytic cleavage (including multi-site proteolysis) of an original sequence. Variants may be post-translationally, or chemically modified. Such variants are deemed to be within the scope of those skilled in the art from the teaching herein.

Throughout this disclosure, various aspects of the disclosure can be presented in a range format. The description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

As used herein, the term "combination" of a composition according to the present disclosure and at least a second pharmaceutically active ingredient means at least two, but any desired combination of compounds can be delivered simultaneously or sequentially (e.g., within a 24 hour period).

Within the meaning of the present disclosure, the term conjoint administration is used to refer to administration of a composition according to the disclosure and another therapeutic agent simultaneously in one composition, or simultaneously in different compositions, or sequentially (preferably, within a 24 hour period).

In accordance with the present disclosure there may be employed conventional molecular biology, microbiology, and recombinant DNA techniques within the skill of the art. Such techniques are explained fully in the literature. See, e.g., Sambrook, Fritsch & Maniatis, *Molecular Cloning: A Laboratory Manual*, Second Edition (1989) Cold Spring Harbor Laboratory Press, Cold Spring Harbor, New York (herein Sambrook et al., 1989); *DNA Cloning: A Practical Approach*, Volumes I and II (D. N. Glover ed. 1985); *Oligonucleotide Synthesis* (M. J. Gait ed. 1984); *Nucleic Acid Hybridization* (B. D. Hames & S. J. Higgins eds. (1985); *Transcription and Translation* (B. D. Hames & S. J. Higgins, eds. (1984); *Animal Cell Culture* (R. I. Freshney, ed. (1986); *Immobilized Cells and Enzymes* (IRL Press, (1986); B. Perbal, *A Practical Guide To Molecular Cloning* (1984); F. M. Ausubel et al. (eds.), *Current Protocols in Molecular Biology*, John Wiley & Sons, Inc. (1994); among others.

Nucleic Acids of the Disclosure

Nucleic acids according to the disclosure comprise a synthetic bioswitch operably linked to a heterologous nucleic acid. The synthetic bioswitch enables the precise on/off and non-invasive remote control of the expression of the heterologous nucleic acid, such that the heterologous nucleic acid is expressed under desired conditions, including for example and not limitation, precise expression of the heterologous nucleic acid at a desired anatomical site in a patient's body. In some embodiments, the heterologous nucleic acid is a biologic drug (such as for example and not limitation, a silencing RNA), and the synthetic bioswitch enables tightly controlled, localized expression of the biologic drug at desired sites in a patient's body, thus avoiding associated problems of systemic administration of the drug, toxic off-site effects, and decreased efficacy of the drug due to inability to target it to specific sites. In some embodiments, the heterologous nucleic acid encodes a biologic drug (such as for example and not limitation, a therapeutic protein such as an antibody), and the synthetic bioswitch enables tightly controlled, localized expression of the biologic drug at desired sites in a patient's body, thus avoiding associated problems of systemic administration of the drug, toxic off-site effects, and decreased efficacy of the drug due to inability to target it to specific sites.

Synthetic bioswitches suitable for use with the compositions and methods disclosed herein have the following non-limiting features: 1. They are responsive to a single stimulus (e.g., temperature, hypoxia, etc.); 2. They are nonresponsive to an orthogonal stimulus; and 3. They have at least one control element that changes the output function of the synthetic bioswitch (e.g., the magnitude of the output, ratio of on to off activity, etc.). If the synthetic bioswitch contains more than one control element, the control elements may be arranged in a series of control elements, wherein at least one of the order, number, sequence, and/or spacing of the control elements is different than in naturally occurring endogenous promoters.

In some embodiments, the synthetic bioswitch is a synthetic promoter. In some embodiments, the synthetic bioswitch is a synthetic tunable promoter. In some embodiments, the synthetic bioswitch is a synthetic inducible promoter.

In some embodiments, the synthetic bioswitch is regulated (i.e., activated or repressed) by a stimulus such as, for example and not limitation, heat, light, stress (e.g., mechanical stress), hypoxia, and the presence of chemicals, including for example and not limitation, cAMP, retinoic acid, glucocorticoids, ions, metals, and interferons. Non-limiting exemplary control elements and their cognate regulatory proteins include (i) the cAMP response element (CRE), regulated by CREB (e.g., CRE found in the VEGF and HSPA1A promoters); (ii) AhR (aryl hydrocarbon receptor) responsive element, regulated by the aryl hydrocarbon receptor (e.g., AhR sites found in the VEGF and HSPA1B promoters); (iii) HIF-responsive elements (HREs), regulated by HIF1a, ARNT, EPAS1, ARNT2, HIF3A, ARNT3 (e.g., HRE sites found in the HSPB1 and HIF1A promoters); (iv) peroxisome proliferator hormone response elements (PPREs) which respond to hyperlipidemia and are regulated by peroxisome proliferator-activated receptors (e.g., PPRE sites found in the VEGF promoter); (v) metal-responsive element (MRE), regulated by metal regulatory transcription factor 1 (e.g., MRE sites found in the cytochrome P450, VEGF, HSPA1A, and FAS promoters); (vi) calcium-response element (CaRE1), regulated by calcium-responsive transcription factor (e.g., CaRE1 sites found in the VEGF, HSPB1, and NSF3 promoters); (vii) NFAT sites, regulated by Nuclear Factor of Activated T cells (e.g., NFAT sites found in the IL-2 and IL-4 promoters).

The control elements in the synthetic bioswitch govern which stimulus the bioswitch responds to and the degree of the response. As discussed herein, the synthetic bioswitch responds only to its cognate stimulus and not to orthogonal stimuli. This selective activation enables a multiplexed system comprising multiple synthetic bioswitches that are controlled by discrete stimuli, thus enabling differential remote control of the function or activity in a cell based on the application of those discrete stimuli.

In certain embodiments, the synthetic bioswitch comprises a nucleic acid sequence selected from the group consisting of SEQ ID NOs 1, 2, 3, 4, 5, 6, 7, 8, 32, 33, 34, 35, 36, and 37 and nucleic acid sequences that have at least 80% sequence identity to SEQ ID NOs 1, 2, 3, 4, 5, 6, 7, 8, 32, 33, 34, 35, 36, and 37 while still retaining the properties of the synthetic bioswitches described herein.

In some embodiments, the synthetic bioswitch comprises one or more control elements that regulate the expression of the operably linked heterologous nucleic acid. It is possible to regulate the expression of the operably linked heterologous nucleic acid by one or more of the order, sequence, number, orientation (e.g., inclusion of the control element on either or both of the plus and/or minus strand of the DNA), and spacing of the control elements relative to one another and to the transcription and/or translation start sites.

In some embodiments, the control elements are regulated by heat and are HSEs. The nucleic acid sequence of the HSE(s) may be the native sequence, a consensus sequence, a synthetic (i.e., non-naturally occurring) sequence, or the sequence can be modified such that the HSF binds less tightly or more tightly. In some embodiments, the nucleic acid sequence of a HSE is selected from the group consisting of SEQ ID NOs 16-25 and 38-43. In some embodiments, the synthetic bioswitch can comprise multiple HSEs arranged in series such that the synthetic bioswitch is tunable. If more than one HSE is present in the bioswitch, then at least one of the order, number, orientation, sequence, and/or spacing of the HSEs is different than in naturally occurring endogenous promoters. In some embodiments, there is a spacer region between each HSE in the series.

In some embodiments, the synthetic bioswitch comprises one or more control elements that are regulated by a hypoxic environment and are HREs. The nucleic acid sequence of the HRE(s) may be the native sequence, a consensus sequence, a synthetic (i.e., non-naturally occurring) sequence, or the sequence can be modified such that the regulatory protein binds less tightly or more tightly. In some embodiments, the nucleic acid sequence of a HRE is SEQ ID NO: 13. The synthetic bioswitch can comprise multiple HREs arranged in an array such that the synthetic bioswitch is tunable. If more than one HRE is present in the bioswitch, then at least one of the order, number, sequence, and/or spacing of the HREs is different than in naturally occurring endogenous promoters. In some embodiments, there is a spacer region between each HRE in the series.

In some embodiments, the synthetic bioswitch comprises one or more control elements comprising nucleic acid sequences that are capable of being bound by the regulatory proteins that are known to regulate gene expression in response to external stimuli, such as for example and not limitation, heat, light, stress (e.g., mechanical stress), hypoxia, and the presence of chemicals. The nucleic acid sequence of the control element(s) may be the native sequence, a consensus sequence, or the sequence can be modified such that the regulatory protein that binds the control element binds less tightly or more tightly. If more than one control element is present in the bioswitch, then at least one of the order, number, sequence, and/or spacing of the control elements is different than in naturally occurring endogenous promoters. In some embodiments, the control element(s) can comprise nucleic acid sequences comprising (i) the cAMP response element (CRE), regulated by CREB (e.g., CRE found in the VEGF and HSPA1A promoters); (ii) AhR (aryl hydrocarbon receptor) responsive element, regulated by the aryl hydrocarbon receptor (e.g., AhR sites found in the VEGF and HSPA1B promoters); (iii) HIF-responsive elements (HREs), regulated by HIF1a, ARNT, EPAS1, ARNT2, HIF3A, ARNT3 (e.g., HRE sites found in the HSPB1 and HIF1A promoters); (iv) peroxisome proliferator hormone response elements (PPREs) which respond to hyperlipidemia and are regulated by peroxisome proliferator-activated receptors (e.g., PPRE sites found in the VEGF promoter); (v) metal-responsive element (MRE), regulated by metal regulatory transcription factor 1 (e.g., MRE sites found in the cytochrome P450, VEGF, HSPA1A, and FAS promoters); (vi) calcium-response element (CaRE1), regulated by calcium-responsive transcription factor (e.g., CaRE1 sites found in the VEGF, HSPB1, and NSF3 promoters); (vii) NFAT sites, regulated by Nuclear Factor of Activated T cells (e.g., NFAT sites found in the IL-2 and IL-4 promoters), and nucleic acid sequences having at least 80% identity to those control elements while still being able to interact with the appropriate regulatory protein.

In some embodiments, the synthetic bioswitch comprises one or more nucleic acid sequences selected from the group consisting of SEQ ID NOs 9, 10, 11, 12, 13, 14, 15, 16, 17, 18, 19, 20, 21, 22, 23, 24, 25, 26, 27, 28, 29, 30, 31, 38, 39, 40, 41, 42, and 43 and nucleic acid sequences having at least 80% identity to SEQ ID NOs 9, 10, 11, 12, 13, 14, 15, 16, 17, 18, 19, 20, 21, 22, 23, 24, 25, 26, 27, 28, 29, 30, 31, 38, 39, 40, 41, 42, and 43 while still being able to interact with the appropriate regulatory protein.

The disclosure also provides for multiplexed systems that comprise multiple nucleic acid molecules with different synthetic switches that are regulated by discrete stimuli. In some embodiments, the multiple synthetic switches can be operably linked to different heterologous nucleic acids to enable regulation of the expression of the different heterologous nucleic acids in response to the discrete stimuli. In other embodiments, the multiple synthetic switches can be operably linked to the same heterologous nucleic acid to enable its regulation in response to the discrete stimuli. In these synthetic switches, the control element(s) can be varied in order, sequence, number, orientation (e.g., inclusion of the control element on either or both of the plus and/or minus strand of the DNA), and spacing of the control elements relative to one another and to the transcription and/or translation start sites in order to provide differential regulation of the heterologous nucleic acid(s).

In an exemplary multiplexed system comprising more than one synthetic bioswitch, a first synthetic bioswitch can comprise one or more HSEs as described herein (such as for example and not limitation, a HSE comprising a nucleic acid sequence selected from the group consisting of SEQ ID NOs 16-25 and 38-43 and combinations thereof), while a second bioswitch can comprise one or more HREs as described herein (for example and not limitation, comprising SEQ ID NO 13), and a third bioswitch can comprise one or more cAMP-regulated control elements as described herein. Such an exemplary multiplexed system would be activated by each of heat, a hypoxic environment, and the presence of cAMP.

The nucleic acid further comprises a spacer region between the synthetic switch and the operably linked heterologous nucleic acid. In some embodiments, the spacer region comprises a 5' untranslated region (5' UTR). In some embodiments, the translational efficiency of the 5' UTR is altered by modifying one or more of the following: (i) length of the UTR; (ii) the start site consensus sequence (e.g., Kozak Sequence); (iii) the secondary structure of the UTR; (iv) presence of upstream AUGs; (v) presence of upstream open reading frames (uORFs); (vi) presence of internal ribosomal entry sites (IRES); and (vii) regulatory protein binding sequences. In some embodiments, the 5' UTR comprises regulatory elements such as for example and not limitation, binding sites for one or more of E2F, Ik-2, LXRalpha:RXRalpha, TBP, TBX5, AR, ELF1, Nkx3A, SPI1, CDX-2, SOX10, Kid3, MAFB, IRF-7, RXR::RAR, UNR, and/or Mushashi (the nucleic acid sequence of the binding sites can be the native sequence, a consensus sequence, a sequence modified to increase or decrease the binding affinity of the appropriate regulatory protein, and/or a synthetic sequence). In some embodiments, the 5'UTR can be increased in length. Modifying the regulatory sites and/or length of the 5' UTR can affect the magnitude of switch activation; change the basal activity in the absence of an activating stimulus; and can affect the translational efficiency of the mRNA (e.g., by altering ribosomal binding to the 5' UTR to either enhance or inhibit translation of the mRNA into protein). In some embodiments, the spacer region comprises between 1 and 500 nucleotides, preferably between 2 and 300 nucleotides, more preferably between 3 and 250 nucleotides, and most preferably between 5 and 150 nucleotides.

Heterologous nucleic acids suitable for use in the compositions and methods described herein include genes that encode biologically active proteins or biological therapeutics, and nucleic acids that enable the manipulation of physiologic or genetic processes and/or protein expression in live cells, in vivo or ex vivo. For example and not limitation, such heterologous nucleic acids can encode genome editing or modifying proteins (e.g., CRISPR/Cas9 and any variant of CRISPR [e.g., catalytically inactive Cas9, Cpf1/Cas12, RNA editing Cas13], Argonaut, nucleases such as zinc finger nucleases (ZFNs), transcription activator-like effector nucleases (TALENs), and engineered nucleases and meganucleases); therapeutic antibodies (e.g., Proleukin (Novartis), Yervoy, and Opdivo (BMS); BiTEs; chimeric antigen receptors; transgenic T-cell receptors; transferases (e.g., kinases, phosphotransferases, methylases, etc.); differentiating factors (e.g., Shox 2 for pacemaker cells); Yamanaka factors for induced pluripotency; transcription factors (e.g., HIF1a); structural proteins (e.g., VE-cadherin, claudin-5, occludin, cx43 etc.); transposons (e.g., sleeping beauty); non-coding RNAs (e.g., RNA molecules involved in RNA silencing or RNA interference, e.g., miRNA, siRNA, piRNA), kinases (e.g., insulin receptor, thymidine kinases, HSV-TK and different versions of human thymidine kinase 2) and transport proteins (e.g., transferrin receptor, Glut1, Glut4, Lat1).

Vectors of the Disclosure

In a related aspect, the disclosure provides vectors comprising the nucleic acids described herein. In some embodiments, the vectors are expression vectors. In some embodiments, the vectors are adenoviral vectors (e.g., adeno-associated vectors) or retroviral vectors. In some embodiments, the vectors are nanoparticles or microparticles. In some embodiments, the vectors comprise liposomes.

Cells of the Disclosure

In a related aspect, the disclosure provides cells comprising the vectors and/or nucleic acids described herein. The vectors and/or nucleic acids may be transformed or transfected into the cells, as appropriate. For example, vectors and/or nucleic acids according to the disclosure may be transfected into immune cells, such as for example and not limitation, T cells, B cells, natural killer cells, dendritic cells, neutrophils, macrophages, and other cell types such as for example and not limitation, endothelial cells (including vascular endothelial cells), pancreatic islet cells, cardiac cells (e.g., cardiomyocytes), and stem cells (e.g., hematopoietic stem cells (HSCs), mesenchymal stem cells (MSCs), embryonic stem cells, tissue-specific stem cells, and induced pluripotent stem cells). In some embodiments, vectors and/or nucleic acids comprising, e.g., chimeric antigen receptors, transgenic T-cell receptors, or genome editing or modifying proteins are transfected into T cells. In some embodiments, vectors and/or nucleic acids comprising genome editing or modifying proteins are transfected into stem cells and enable control of the differentiation of those stem cells. The differentiation can be controlled directly by transfection into the target stem cell, or indirectly by transfecting neighboring cells which can produce factors necessary to differentiate nearby cells (e.g., stem cells, monocytes, etc.). In some embodiments, vectors and/or nucleic acids comprising genome editing or modifying proteins are transfected into cardiomyocytes to enable their differentiation into pacemaker cells. In some embodiments, vectors and/or nucleic acids comprising genome editing or modifying proteins such as, e.g., a Cas9 variant such as dCas9 are transfected into a target cell to modulate its existing genome and/or its physiologic or genetic processes and/or certain protein expression in the cell to achieve different outcomes, e.g., changing the epigenetic state of the cell with targeted methylation of histones ("epigenome editing").

Stimuli of the Disclosure

Various stimuli are able to activate the synthetic bioswitches described herein. In some embodiments, the stimulus is delivered by an external source (e.g., heat may be supplied by a laser such as a near-infrared laser, or by ultrasound). In some embodiments, the stimulus is inherently present in the desired area for activation (e.g., the hypoxic, high-ion environment of a tumor or cancer). In some embodiments, the stimulus is consistent or continuous. In some embodiments, the amount, concentration, or intensity of the stimulus is increased or decreased. In some embodiments, the increase or decrease is linear. In other embodiments, the increase or decrease is non-linear. In other embodiments, the increase or decrease is irregular. In other embodiments, the increase or decrease is pulsatile.

Therapeutic Methods of the Disclosure

In a related aspect, the disclosure provides methods of treating and/or preventing a disease in a patient in need thereof by administering a nucleic acid, vector, and/or cell comprising a synthetic bioswitch operably linked to a heterologous nucleic acid as described herein. Non-limiting examples of such methods include providing a nucleic acid comprising a heat-regulated synthetic bioswitch (e.g., a nucleic acid sequence selected from the group consisting of SEQ ID NOs 1, 2, 3, 4, 5, 6, 7, 8, 32, 33, 34, 35, 36, and 37) operably linked to a chimeric antigen receptor, or a vector comprising such nucleic acid, or a T cell transfected with either the nucleic acid or vector, to a patient in need thereof, such as a patient with a cancer expressing the protein recognized by the chimeric antigen receptor. Another non-limiting example includes providing a heat-regulated synthetic bioswitch operably linked to a genome editing or modifying protein, such as for example and not limitation, a Cas protein, such as dCas9, to a T cell, and then introducing the modified T cell into a patient with a cancer or tumor, wherein the epigenetic state of the T cell can be modified by the Cas protein once it reaches the cancer or tumor microenvironment in order to become cytotoxic. Another non-limiting example includes methods of suppressing genes that inhibit immune cell function when the immune cells detect elevated ion concentrations in a tumor, by providing an immune cell comprising a synthetic bioswitch regulated by high ion concentrations (e.g., calcium) that is operably linked to a nucleic acid comprising one or more therapeutic siRNAs (e.g., siRNAs that target one or more of Ppp2r2d Cblb, Dgka, Dgkz, Ptpn2, Smad2, Socs1, Socs3 or Egr2).

Therapeutic Compositions and Administration

In one embodiment of any of the compositions of the disclosure, the composition is formulated for delivery by a route such as, e.g., oral, topical, rectal, mucosal, sublingual, nasal, naso/oro-gastric gavage, parenteral, intraperitoneal, intradermal, transdermal, intrathecal, nasal, and intratumoral administration. In one embodiment of any of the compositions of the disclosure, the composition is in a form of a liquid, foam, cream, spray, powder, or gel. In one embodiment of any of the compositions of the disclosure, the composition comprises a buffering agent (e.g., sodium bicarbonate, infant formula or sterilized human milk).

Administration of the compounds and compositions in the methods of the disclosure can be accomplished by any method known in the art. Non-limiting examples of useful routes of delivery include oral, rectal, fecal (by enema), and via naso/oro-gastric gavage, as well as parenteral, intraperitoneal, intradermal, transdermal, intrathecal, nasal, and intratumoral administration. The active agent may be systemic after administration or may be localized by the use of regional administration, intramural administration, or use of an implant that acts to retain the active dose at the site of implantation. As discussed herein, the activity of the compositions of the disclosure is spatio-temporally controlled by a synthetic switch operatively linked to the heterologous gene responsible for the activity.

The useful dosages of the compounds and formulations of the disclosure can vary widely, depending upon the nature of the disease, the patient's medical history, the frequency of administration, the manner of administration, the clearance of the agent from the host, and the like. The initial dose may be larger, followed by smaller maintenance doses. The dose may be administered as infrequently as weekly or biweekly, or fractionated into smaller doses and administered daily, semi-weekly, etc., to maintain an effective dosage level. It is contemplated that a variety of doses may be effective to achieve a therapeutic effect. While it is possible to use a compound of the present disclosure for therapy as is, it may be preferable to administer it in a pharmaceutical formulation, e.g., in admixture with a suitable pharmaceutical excipient, diluent or carrier selected with regard to the intended route of administration and standard pharmaceutical practice. The excipient, diluent and/or carrier must be "acceptable" in the sense of being compatible with the other ingredients of the formulation and not deleterious to the recipient thereof. Acceptable excipients, diluents, and carriers for therapeutic use are well known in the pharmaceutical art, and are described, for example, in Remington: The Science and Practice of Pharmacy. Lippincott Williams & Wilkins (A. R. Gennaro edit. 2005). The choice of pharmaceutical excipient, diluent, and carrier can be selected with regard to the intended route of administration and standard pharmaceutical practice. Although there are no physical limitations to delivery of the formulations of the present disclosure, oral delivery is preferred for delivery to the digestive tract because of its ease and convenience, and because oral formulations readily accommodate additional mixtures, such as milk, yogurt, and infant formula.

Formulations suitable for parenteral administration include aqueous and nonaqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives.

Solutions or suspensions can include any of the following components, in any combination: a sterile diluent, including by way of example without limitation, water for injection, saline solution, fixed oil, polyethylene glycol, glycerine, propylene glycol or other synthetic solvent; antimicrobial agents, such as benzyl alcohol and methyl parabens; antioxidants, such as ascorbic acid and sodium bisulfite; chelating agents, such as ethylenediaminetetraacetic acid (EDTA); buffers, such as acetates, citrates and phosphates; and agents for the adjustment of tonicity, such as sodium chloride or dextrose.

In instances in which the agents exhibit insufficient solubility, methods for solubilizing agents may be used. Such methods are known to those of skill in this art, and include, but are not limited to, using co-solvents, such as, e.g., dimethylsulfoxide (DMSO), using surfactants, such as TWEEN® 80, or dissolution in aqueous sodium bicarbonate. Pharmaceutically acceptable derivatives of the agents may also be used in formulating effective pharmaceutical compositions.

The composition can contain along with the active agent, for example and without limitation: a diluent such as lactose, sucrose, dicalcium phosphate, or carboxymethylcellulose; a lubricant, such as magnesium stearate, calcium stearate and talc; and a binder such as starch, natural gums, such as gum acacia gelatin, glucose, molasses, polyvinylpyrrolidone, celluloses and derivatives thereof, povidone, crospovidones and other such binders known to those of skill in the art. Liquid pharmaceutically administrable compositions can, for example, be prepared by dissolving, dispersing, or otherwise mixing an active agent as defined above and optional pharmaceutical adjuvants in a carrier, such as, by way of example and without limitation, water, saline, aqueous dextrose, glycerol, glycols, ethanol, and the like, to thereby form a solution or suspension. If desired, the pharmaceutical composition to be administered may also contain minor amounts of nontoxic auxiliary substances such as wetting agents, emulsifying agents, or solubilizing agents, pH buffering agents and the like, such as, by way of example and without limitation, acetate, sodium citrate, cyclodextrin derivatives, sorbitan monolaurate, triethanolamine sodium acetate, triethanolamine oleate, and other such agents. Actual methods of preparing such dosage forms are known, or will be apparent, to those skilled in this art (e.g., Remington's Pharmaceutical Sciences, Mack Publishing Company, Easton, Pa., 15th Edition, 1975). The composition or formulation to be administered will, in any event, contain a quantity of the active agent in an amount sufficient to alleviate the symptoms of the treated subject.

The active agents or pharmaceutically acceptable derivatives may be prepared with carriers that protect the agent against rapid elimination from the body, such as time release formulations or coatings. The compositions may include other active agents to obtain desired combinations of properties.

Parenteral administration, generally characterized by injection, either subcutaneously, intramuscularly or intravenously, is also contemplated herein. Injectables can be prepared in conventional forms, either as liquid solutions or suspensions, solid forms suitable for solution or suspension in liquid prior to injection, or as emulsions. Suitable excipients include, by way of example and without limitation, water, saline, dextrose, glycerol or ethanol. In addition, if desired, the pharmaceutical compositions to be administered may also contain minor amounts of non-toxic auxiliary substances, such as wetting or emulsifying agents, pH buffering agents, stabilizers, solubility enhancers, and other such agents, such as, for example, sodium acetate, sorbitan monolaurate, triethanolamine oleate and cyclodextrins.

Implantation of a slow-release or sustained-release system, such that a constant level of dosage is maintained (e.g., U.S. Pat. No. 3,710,795) is also contemplated herein. Briefly, an inhibitor of Nt5E or MR is dispersed in a solid inner matrix (e.g., polymethylmethacrylate, polybutylmethacrylate, plasticized or unplasticized polyvinylchloride, plasticized nylon, plasticized polyethyleneterephthalate, natural rubber, polyisoprene, polyisobutylene, polybutadiene, polyethylene, ethylene-vinylacetate copolymers, silicone rubbers, polydimethylsiloxanes, silicone carbonate copolymers, hydrophilic polymers such as hydrogels of esters of acrylic and methacrylic acid, collagen, cross-linked polyvinylalcohol and cross-linked partially hydrolyzed polyvinyl acetate) that is surrounded by an outer polymeric membrane (e.g., polyethylene, polypropylene, ethylene/propylene copolymers, ethylene/ethyl acrylate copolymers, ethylene/vinylacetate copolymers, silicone rubbers, polydimethyl siloxanes, neoprene rubber, chlorinated polyethylene, polyvinylchloride, vinylchloride copolymers with vinyl acetate, vinylidene chloride, ethylene and propylene, ionomer polyethylene terephthalate, butyl rubber epichlorohydrin rubbers, ethylene/vinyl alcohol copolymer, ethylene/vinyl acetate/vinyl alcohol terpolymer, and ethylene/vinyloxyethanol copolymer) that is insoluble in body fluids. The agent diffuses through the outer polymeric membrane in a release rate controlling step. The percentage of active agent contained in such parenteral compositions is highly dependent on the specific nature thereof, as well as the activity of the agent and the needs of the subject.

Lyophilized powders can be reconstituted for administration as solutions, emulsions, and other mixtures or formulated as solids or gels. The sterile, lyophilized powder is prepared by dissolving an agent provided herein, or a pharmaceutically acceptable derivative thereof, in a suitable solvent. The solvent may contain an excipient which improves the stability or other pharmacological component of the powder or reconstituted solution, prepared from the powder. Excipients that may be used include, but are not limited to, dextrose, sorbital, fructose, corn syrup, xylitol, glycerin, glucose, sucrose or other suitable agent. The solvent may also contain a buffer, such as citrate, sodium or potassium phosphate or other such buffer known to those of skill in the art at, typically, about neutral pH. Subsequent sterile filtration of the solution followed by lyophilization under standard conditions known to those of skill in the art provides the desired formulation. Generally, the resulting solution can be apportioned into vials for lyophilization. Each vial can contain, by way of example and without limitation, a single dosage (10-1000 mg, such as 100-500 mg) or multiple dosages of the agent. The lyophilized powder can be stored under appropriate conditions, such as at about 4° C. to room temperature. Reconstitution of this lyophilized powder with water for injection provides a formulation for use in parenteral administration. For reconstitution, about 1-50 mg, such as about 5-35 mg, for example, about 9-30 mg of lyophilized powder, is added per mL of sterile water or other suitable carrier. The precise amount depends upon the selected agent. Such amount can be empirically determined.

The inventive composition or pharmaceutically acceptable derivatives thereof may be formulated as aerosols for application e.g., by inhalation or intranasally (e.g., as described in U.S. Pat. Nos. 4,044,126, 4,414,209, and 4,364,923). These formulations can be in the form of an aerosol or solution for a nebulizer, or as a microfine powder for insufflation, alone or in combination with an inert carrier such as lactose. In such a case, the particles of the formulation can, by way of example and without limitation, have diameters of less than about 50 microns, such as less than about 10 microns.

The agents may be also formulated for local or topical application, such as for application to the skin and mucous membranes (e.g., intranasally), in the form of nasal solutions, gels, creams, and lotions.

Other routes of administration, such as transdermal patches are also contemplated herein. Transdermal patches, including iontophoretic and electrophoretic devices, are well known to those of skill in the art. For example, such patches are disclosed in U.S. Pat. Nos. 6,267,983, 6,261,595, 6,256,533, 6,167,301, 6,024,975, 6,010,715, 5,985,317, 5,983,134, 5,948,433, and 5,860,957.

EXAMPLES

The present disclosure is also described and demonstrated by way of the following examples. However, the use of these and other examples anywhere in the specification is illustrative only and in no way limits the scope and meaning of the disclosure or of any exemplified term. Likewise, the disclosure is not limited to any particular preferred embodiments described here. Indeed, many modifications and variations of the disclosure may be apparent to those skilled in the art upon reading this specification, and such variations can be made without departing from the disclosure in spirit or in scope. The disclosure is therefore to be limited only by the terms of the appended claims along with the full scope of equivalents to which those claims are entitled.

Three possible ways of generating a tunable synthetic bioswitch for use in the remote control systems described herein include, for example and not limitation, (i) altering endogenous promoters (e.g., by truncation and/or mutation); (ii) modular assembly of genetic motifs; and (iii) incorporation of genes that allow suppression of genes (e.g., Cas9 or other blocking proteins).

Example 1. Remote Control of Mammalian Cells with Heat-Triggered Gene Switches and Photothermal Pulse Trains Engineered T cells are transforming broad fields in biomedicine, yet the ability to control cellular activity at specific anatomical sites remains limited. Herein is described the engineering of thermal gene switches to allow spatial and remote control of transcriptional activity using pulses of heat. These gene switches were constructed from the heat shock protein HSP70B' (HSPA6) promoter, showed negligible basal transcriptional activity, and activated within an elevated temperature window of 40 45° C. Using engineered Jurkat T cells implanted in vivo, plasmonic photothermal heating was used to trigger gene expression at specific sites to levels greater than 200-fold. Herein it is shown that delivery of heat as thermal pulse trains significantly increased cellular thermal tolerance compared to continuous heating curves with identical area-under-the-curve (AUC), enabling long-term control of gene expression in Jurkat T cells.

Recent developments in mammalian synthetic biology are providing new approaches to control complex cellular activity, such as cell signaling, communication, and differentiation using orthogonal cues including small-molecules, proteins, or light[1-3]. These advances are leading to numerous applications for synthetic immunology; in particular, the design of engineered T cells with entirely new abilities[4] such as the capacity to migrate toward synthetic chemical cues[5], deliver drugs to tumors[6], employ logic-gates to sense antigens[7], and target cancer with chimeric receptors[8]. Despite these advances, the ability to precisely control T cell gene expression at specific anatomical sites in vivo remains limited. This is particularly important for therapeutic applications of engineered T cells. Clinically used methods to control T cells that involve systemic administration of potent immune-modulating drugs[9] or biologics[10,11] generally lack spatial and temporal precision and can be associated with significant adverse effects[12]. Engineered T cells capable of being locally activated at desired locations in the body by externally applied cues such as light[3,13] or radio waves[14] can increase the precision of engineered T cell applications for use in humans.

Inspired by the precision with which pulses of heat can be delivered to sites located both superficially and at depth inside the body (e.g., by laser heating[15], induction heating[16], or focused ultrasound[17]), the inventors engineered Jurkat T cells with heat-triggered gene switches for remote control of transcriptional activity by plasmonic photothermal heating. Temperature control has a rich and longstanding clinical history such as the use of freezing temperatures for cryoablation[18] and hyperthermia to increase radiosensitivity[19] or enhance drug delivery[20]. Despite this, few engineered genetic systems have been designed that leverage temperature triggers to regulate cellular activity. Past work on mammalian gene switches include transcriptional activity triggered by small molecules, protein ligands, and light[1]. Genetically encoded thermal switches such as RNA thermometers[21] or temperature-sensitive transcriptional regulators[22,23] have been developed for bacterial systems, but the prokaryotic origin of these approaches raises concerns with immunogenicity in T cells and potentially limits their use for cellular control in mammalian systems. By contrast, the thermal gene switches described herein were constructed from endogenous promoters that drive the heat shock (HS) response a highly conserved reactive mechanism to transient elevations in temperature (~3 5° C. above basal temperature) that triggers expression of protective HS proteins at levels comparable to the strongest known viral promoters[24]. The ubiquity of the HS response has driven past work on thermal gene regulatory systems in mammals, worms, fish and other organisms[25], including the use of plasmonic nanomaterials to remotely activate engineered cells[26-29]. However, these approaches activated wild-type promoters with continuous heating methods that result in low cellular viability[30] and preclude their use for longitudinal control of cells.

Herein it is shown that Jurkat T cells engineered with thermal gene switches constructed from the heat shock protein 70B' (HSPA6) promoter have negligible activity at basal body temperatures but trigger gene expression to levels greater than 200-fold following exposure to elevated temperatures within a narrow transition window (40 42° C.). The inventors were able to spatially control Jurkat T cell activity with heat delivered by the photothermal effect using the precision of near infrared (NIR) laser light for targeting and plasmonic gold nanorods as transducers to convert incident NIR light into localized heat[15]. The inventors also demonstrated that the use of thermal pulse trains compared to heat delivered at a constant temperature significantly increased thermal tolerance to allow long-term control of Jurkat T cells for weeks in a living host.

Results

Engineering a Thermal Gene Switch

Within the mammalian family of HS promoters, heat responsiveness is primarily mediated by Heat Shock Factor 1 (HSF1) a transcription factor that is normally present as an inactive monomer under basal conditions. During hyperthermia, HSF1 is converted to a homotrimer that then binds to heat shock response elements (HSEs) arrayed upstream of the transcription start site[31,32] These HSEs, together with putative negative regulatory regions, dictate the heat response characteristics of a promoter. Therefore, the inventors sought to perform truncation analysis on the HSPA6 locus to characterize different regions of the wild-type promoter sequence to identify constructs with low basal activity and high fold-induction[33,34]. The inventors cloned 8 candidate constructs (labelled i viii, FIG. 2A; SEQ ID NOs 1-8) into HEK 293T cells starting at four upstream sites at 2964, 1231, 648, and 71 bp relative to the transcriptional start site, and ending at two downstream sites at +48 and +119 bp the latter corresponding to the beginning of the open reading frame (ORF) of the HSPA6 gene. From this library, the inventors selected construct ii (SEQ ID NO: 2) for use in further studies based on several considerations: it had a high fold-induction, absolute level of activity, and small base pair footprint to allow larger gene inserts into viral vectors.

Figure 6:
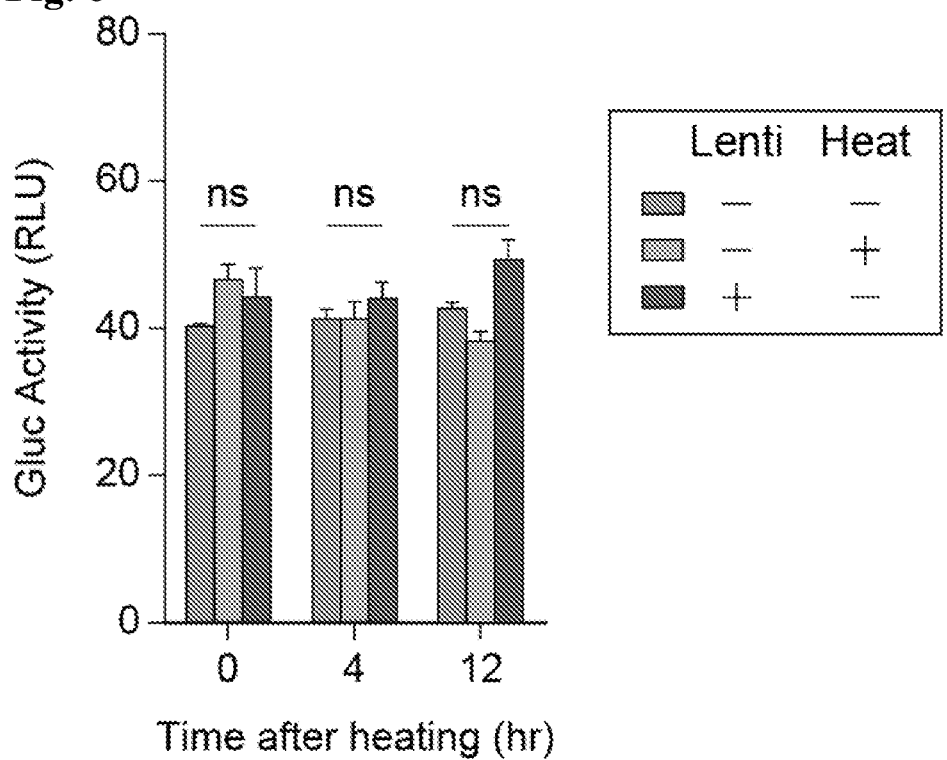
FIG. 6 shows basal activity of the synthetic HSPA6 switch in Jurkat T cells. T cell radiance after heating for 1 hr at 42° C. (+) or 37° C. ( ) in cells transduced (+) or untransduced ( ) with lentivirus, n=3, two-way ANOVA and Dunnett's multiple comparison test, error bars=SEM.
Figure 7:
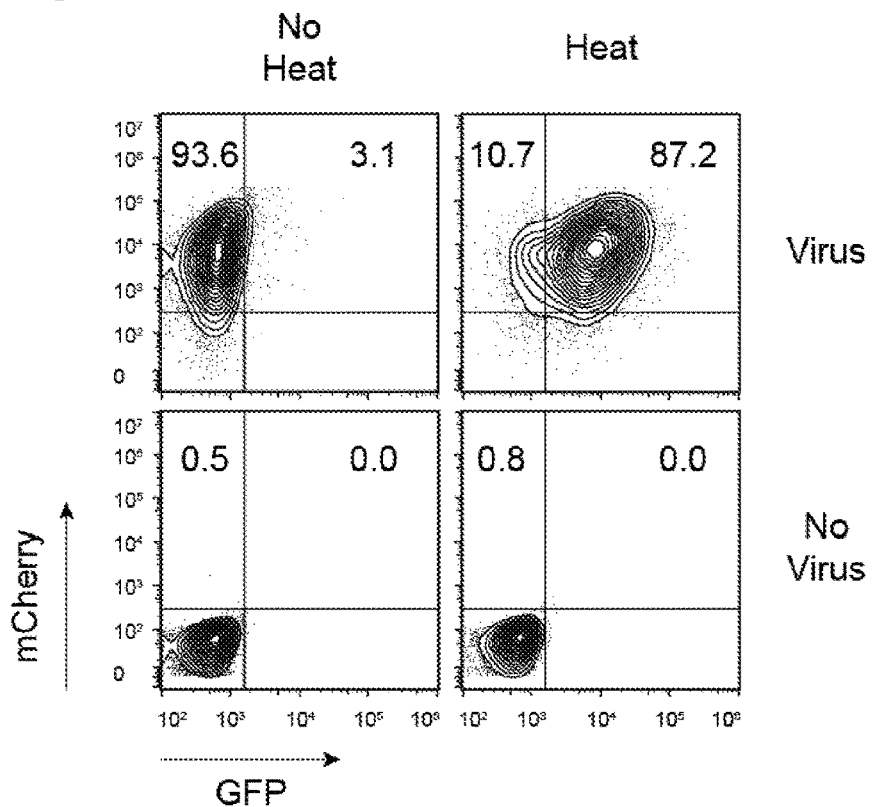
FIG. 7 shows heat actuation of engineered Jurkat T cells. Thermal treatments of transduced or untransduced Jurkats containing a heat-activated GFP reporter and a constitutively expressed mCherry reporter under the SFFV promoter. Heating was performed for 15 min at 42° C. and cells were assayed 24 hrs after heating.

The inventors next evaluated thermal switch activity in Jurkat T cells. While both transduced and untransduced cells did not produce measurable levels of Gluc luminescence at 37° C. (FIG. 6), transduced Jurkat T cells incubated at 42° C. showed a sharp switch-on transition 6 hours after heat treatment that resulted in a 70-fold increase in luminescent signals (FIG. 2B). At time points greater than 9 hours, no appreciable decrease in signals were observed that would indicate a switch-off transition. The inventors attributed this result to the Gluc reporter that was used because it is naturally secreted and not subject to intracellular degradation pathways such as ubiquitination. Therefore, to measure the thermal switch-off kinetics, the inventors repeatedly sampled and replaced the cellular supernatant after maximum Gluc activity was attained at 9 hours and determined a decay constant half-life of ~1 hour (FIG. 2C). Additionally, incorporation of a GFP reporter revealed that 90% of transduced Jurkats were actuated by heat treatments (FIG. 7). These results show that thermal switches constructed from the HSPA6 promoter exhibit sharp switch-on and switch-off kinetics in transduced Jurkat T cells.

Triggering Cellular Activity with Pulses of Heat

Figure 3A:
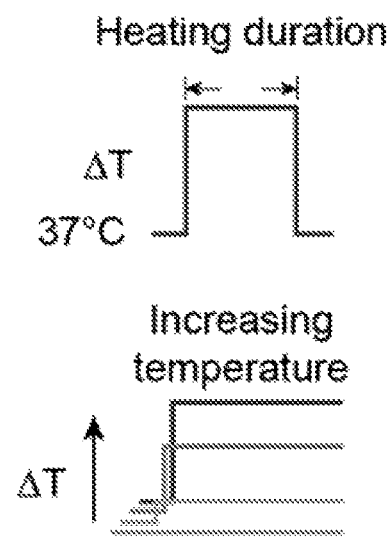
FIG. 3A-3F show thermal pulse trains augment switch activity and enhance Jurkat thermal tolerance. (3A) Continuous heat treatment profiles with increasing time or temperature. (3B) Luminescent traces showing that increases in both duration and temperature of heating augment switch activity in a pathway-independent fashion, n=3, error bars=SEM. (3C) Diagram of thermal pulse trains at a 67% duty cycle (10 min on, 5 min off) and continuous heat treatments. Total heated time for last two regimens were identical (30 min). (3D) Supernatant luminescence after discrete pulses (1, 2, or 3 cycles) or continuous heating at 40 and 42° C., n=3, **P<0.01, one-way ANOVA and Tukey's multiple comparison test, error bars=SEM. (3E) Propidium Iodide (PI) and Annexin V stains of Jurkat T cells heated at 42° C. (3F) Quantification of Jurkat viability across replicate samples and duty cycles. Total heating time=30 min, n=3.
Figure 3B:
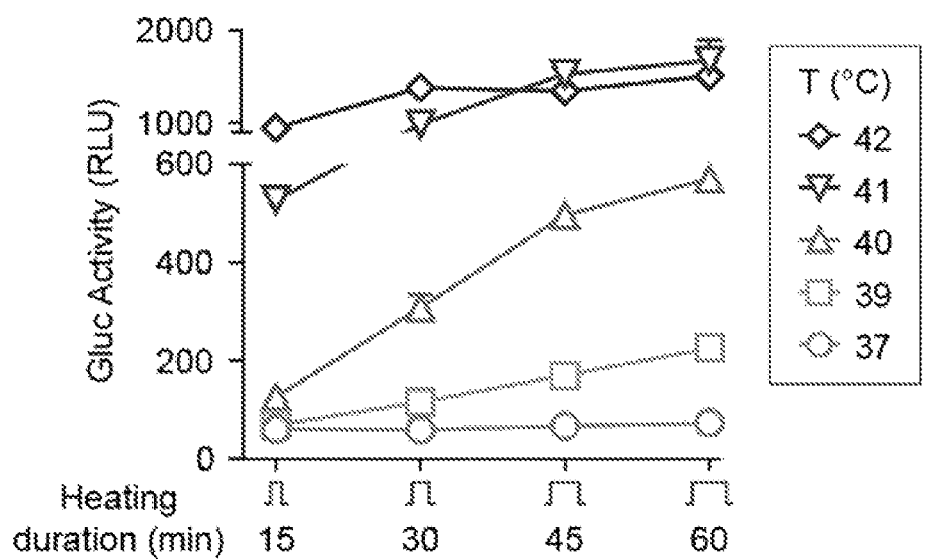

To determine the relationship between heating duration, temperature, and thermal switch activity using continuous temperature inputs, the inventors heated transduced Jurkat T cells for 15 60 minutes at temperatures ranging between 37 and 42° C. (FIG. 3A, 3B). Elevations in temperature as low as 39° C. ($\Delta T=2°$ C.) were sufficient to induce switch activity, and either higher temperatures or extended heating durations increased output activity, with maximal levels occurring at 41 42° C. Moreover, these data showed that the level of thermal switch activity was independent of path; therefore, the inventors hypothesized that milder heating conditions using discrete pulses of heat could be used to increase T cell thermal tolerance yet achieve similar levels of thermal switch activity.

Figure 3C:
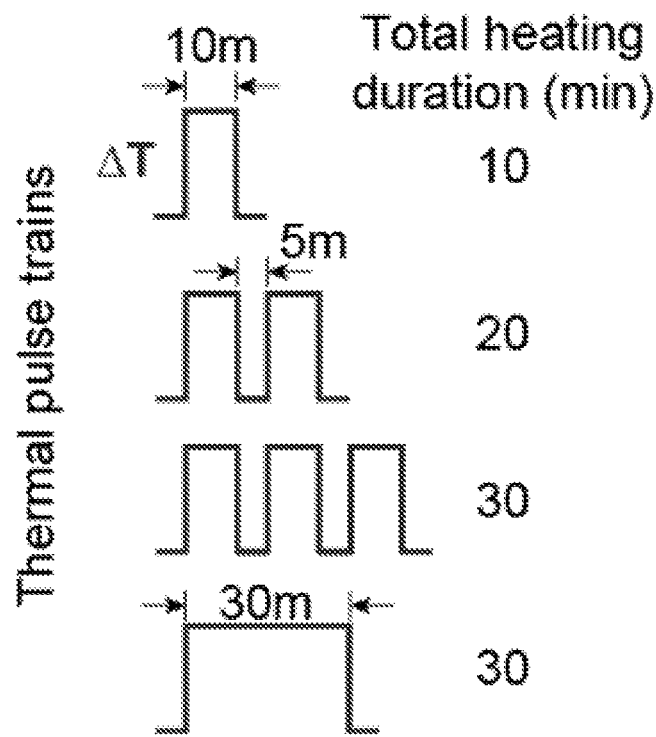
Figure 3D:
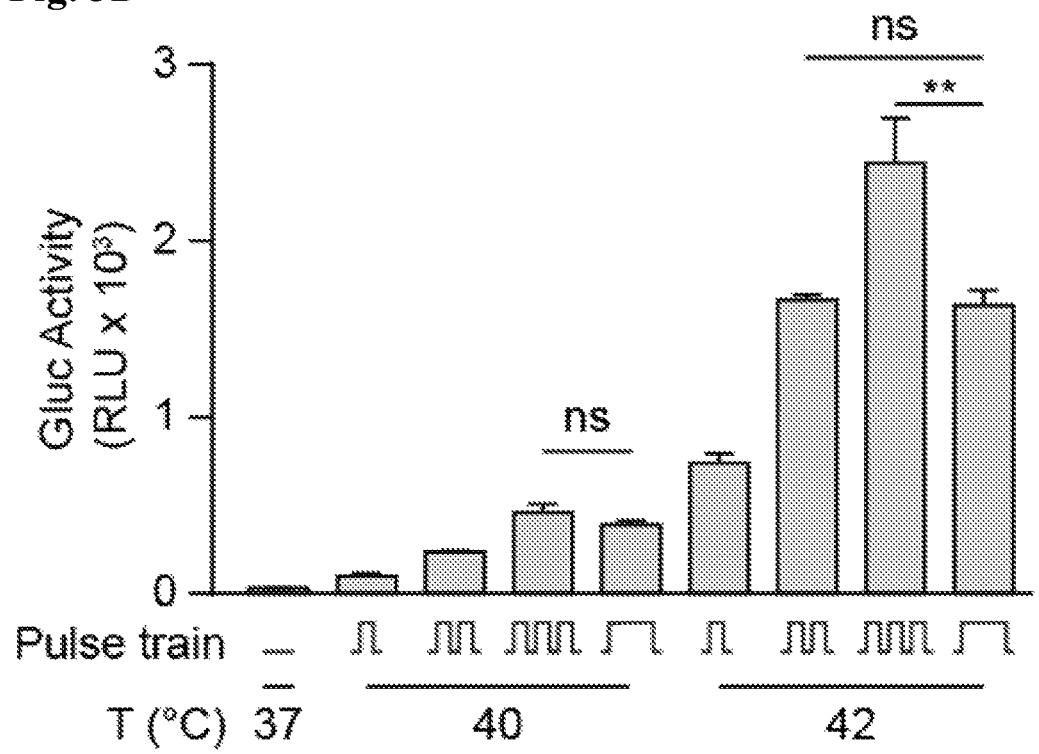
Figure 3E:
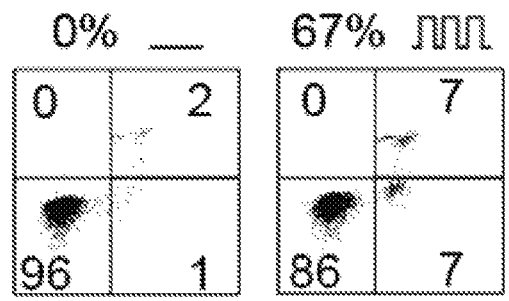
Figure 3E:
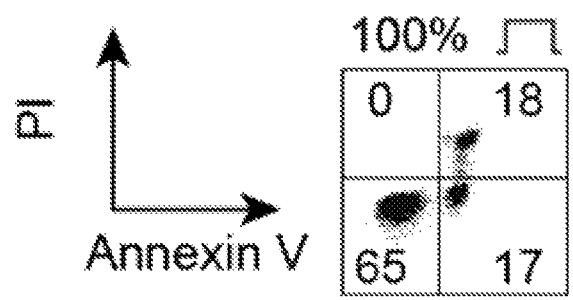
Figure 3F:
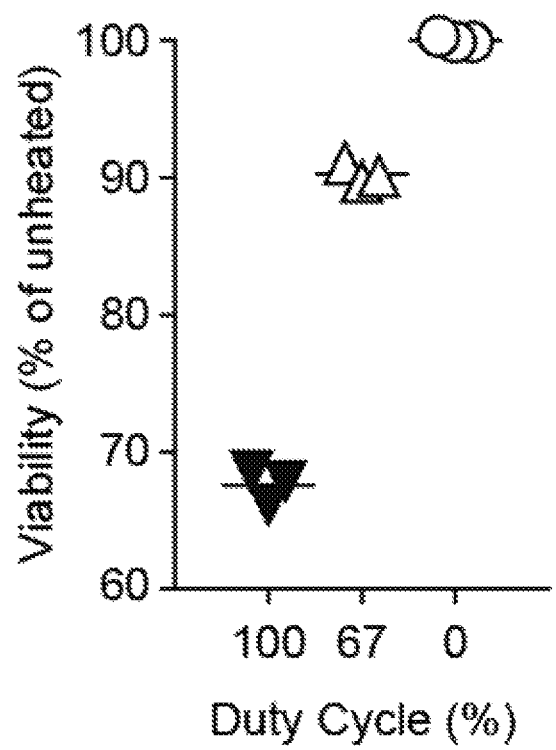
Figure 8:
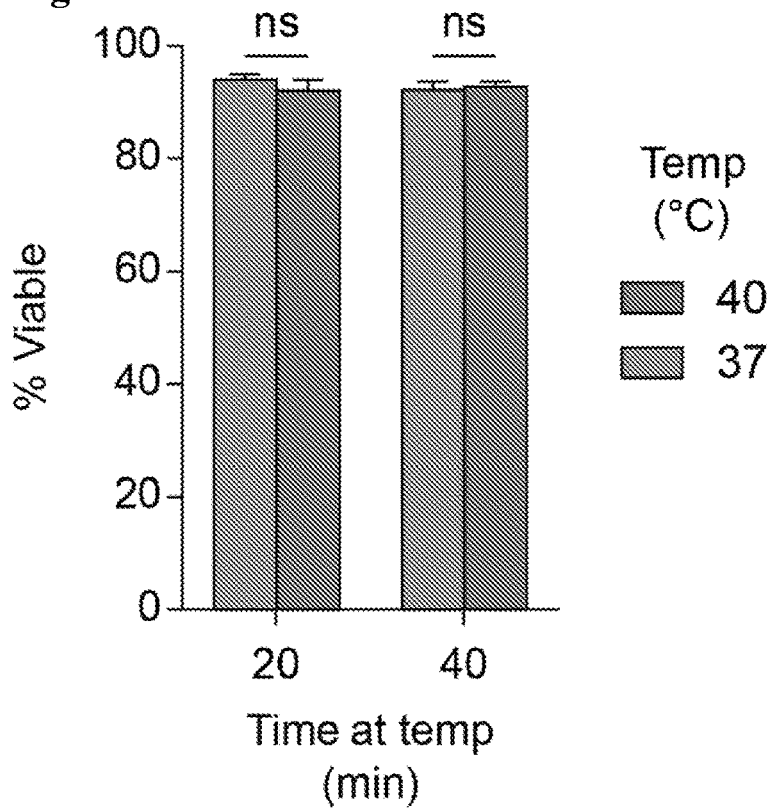
FIG. 8 shows that mild hyperthermia is well-tolerated by Jurkat T cells. Quantification of PI and Annexin V viability stains of Jurkat T cells. Viable=PI AnnexV population 24 hr after heat, n=3, two-way ANOVA with Bonferroni's multiple comparison test, error bars=SEM.

To test this hypothesis, the inventors compared the efficacy of delivering heat using pulse train or constant temperature profiles (FIG. 3C). Under a 67% duty cycle comprised of a 10 minute heat step at 42° C. and 5 minute rest period at 37° C., each additional thermal pulse progressively increased cell output activity such that the cumulative effect from three pulses was 50% higher compared to the intensity obtained using a constant temperature profile (i.e., 100% duty cycle) with an identical area under the curve (AUC) (FIG. 3D). A similar trend was observed where output activity increased with the number of pulses at a lower activating temperature of 40° C.; however, the level of activity between three pulses and continually heated samples was statistically identical. This difference between 40 and 42° C. was attributed to the ability of Jurkats to better tolerate smaller elevations in temperature. To test this, the inventors analyzed Jurkat viability by Annexin V and propidium iodide (PI) stains for apoptosis and cell death respectively, and found that at 42° C., a 67% duty cycle significantly reduced double positive cells by over 70% compared to continuous heating, and maintained a cell viability of 90% relative to that of unheated cells (FIG. 3E, 3F). Conversely, no significant differences in cell death and viability were observed at 40° C. even after 40 minutes of constant heating (FIG. 8). Collectively, these data showed that the number of pulses in a thermal train controls the level of output activity and significantly increases thermal tolerance of Jurkat T cells compared to constant temperature inputs.

Photothermal Targeting of Jurkat T Cells

Figure 4A:
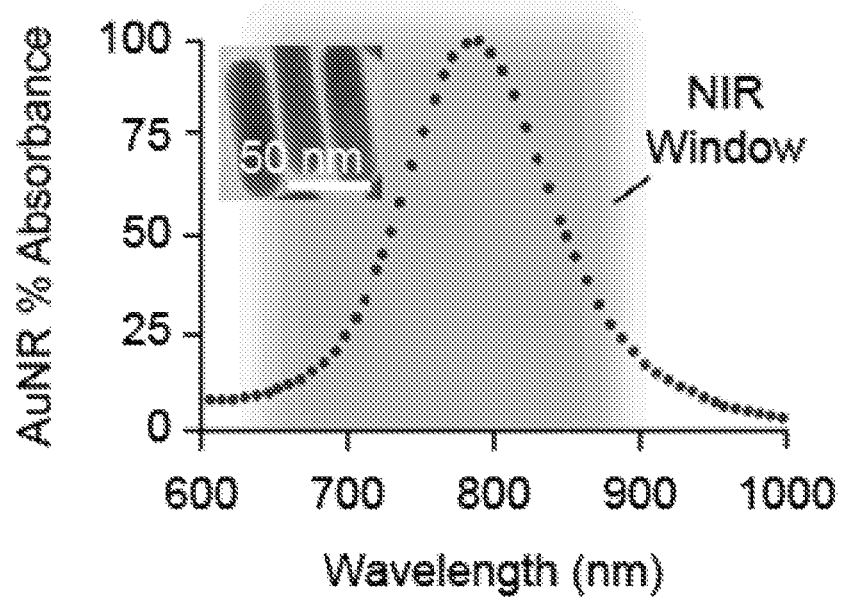
FIG. 4A-4F show photothermal control of mammalian cells in vivo. (4A) Absorbance spectrum of AuNRs with a with a maximum absorbance (805 nm) within the NIR window (~650 900 nm). (4B) Top: thermograph of 96-well plate with wells containing engineered Jurkats with (+) and without (−) AuNRs and heated with NIR laser light (+) or unheated (−). Bottom: Luminescent image showing Fluc activity of engineered Jurkats contained only to wells with AuNRs (+) and heated with laser light (+) for 20 min at 42° C. (4C) Photograph of nude mouse with subcutaneous matrigel implants (inset) containing engineered Jurkat T cells and AuNRs before heating. (4D) Serial thermal images of mouse bearing AuNR-matrigel implants within 5 min after laser activation. (4E) Kinetic thermal traces showing average skin temperature of 3×3 pixel ROI centered on implant site immediately after laser is activated (triangle). Shaded regions around trace averages show STD of all heating runs, n=3. (4F) Radiant image of nude mouse with Jurkat implants after heating at skin temperatures of 37, 42 and 45° C. for 20 min. Radiance calculated as the difference in value between implant site luminescence and background radiance of mouse skin, n=3, error bars=SEM.
Figure 4B:
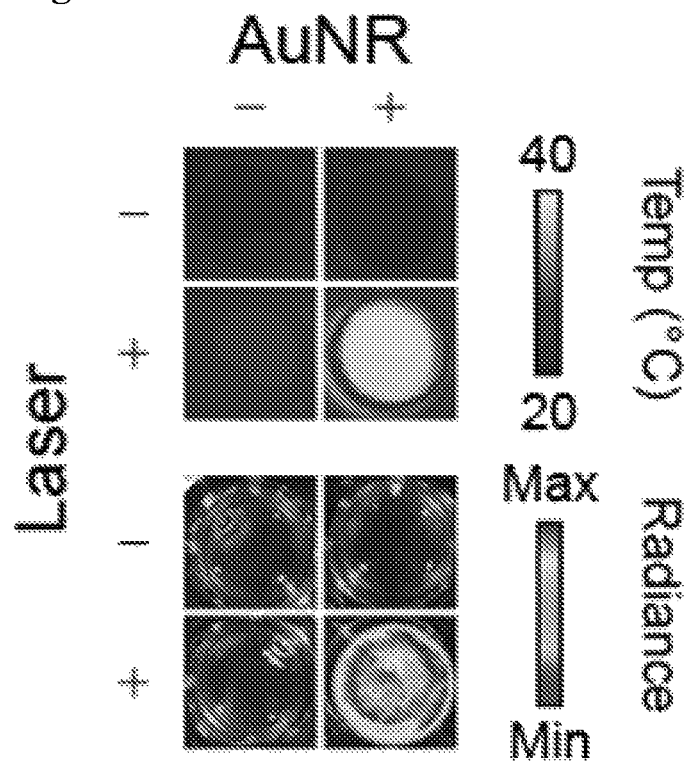
Figure 4C:
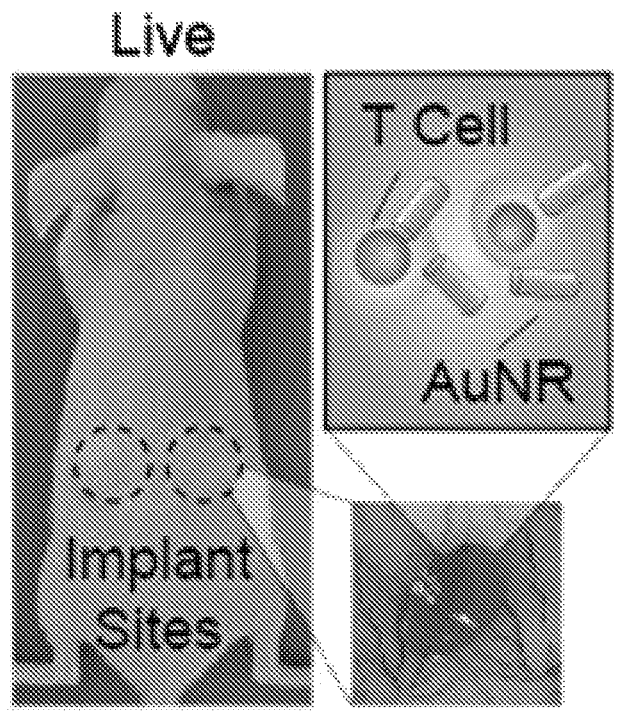
Figure 4D:
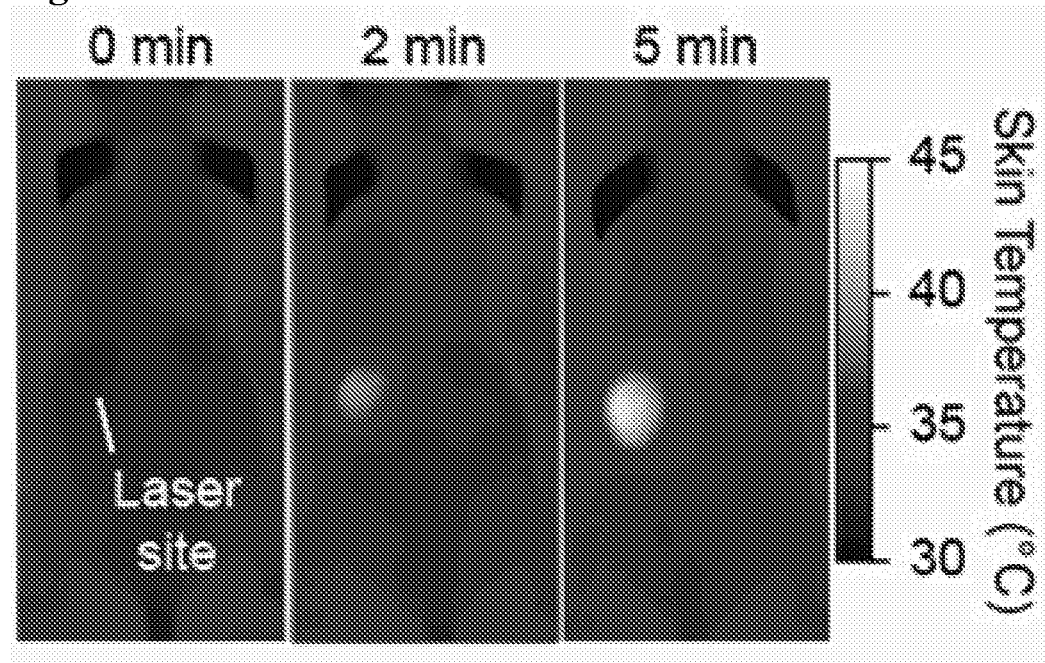
Figure 4E:
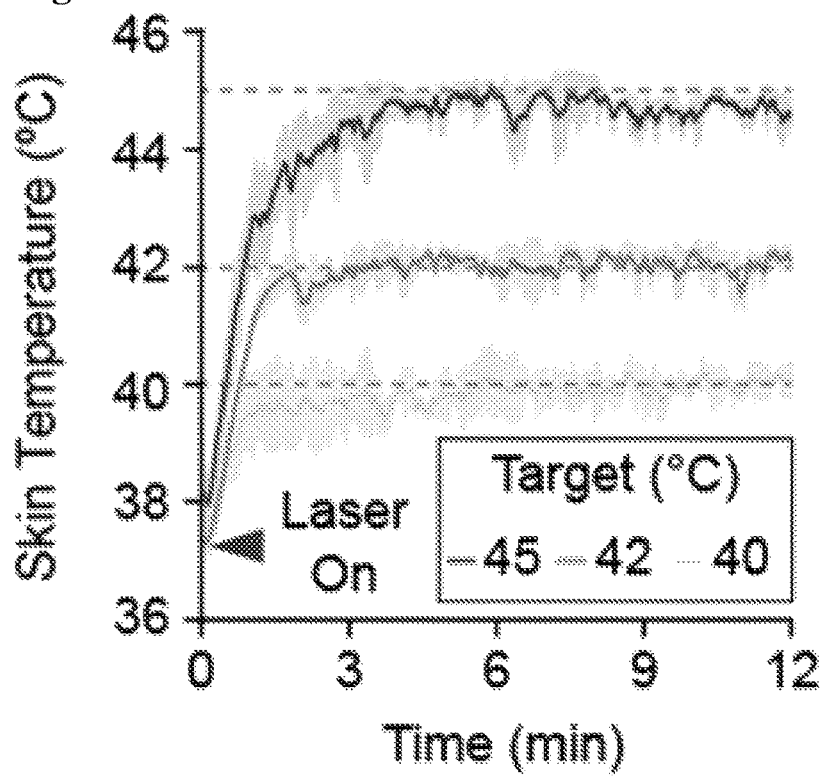
Figure 4F:
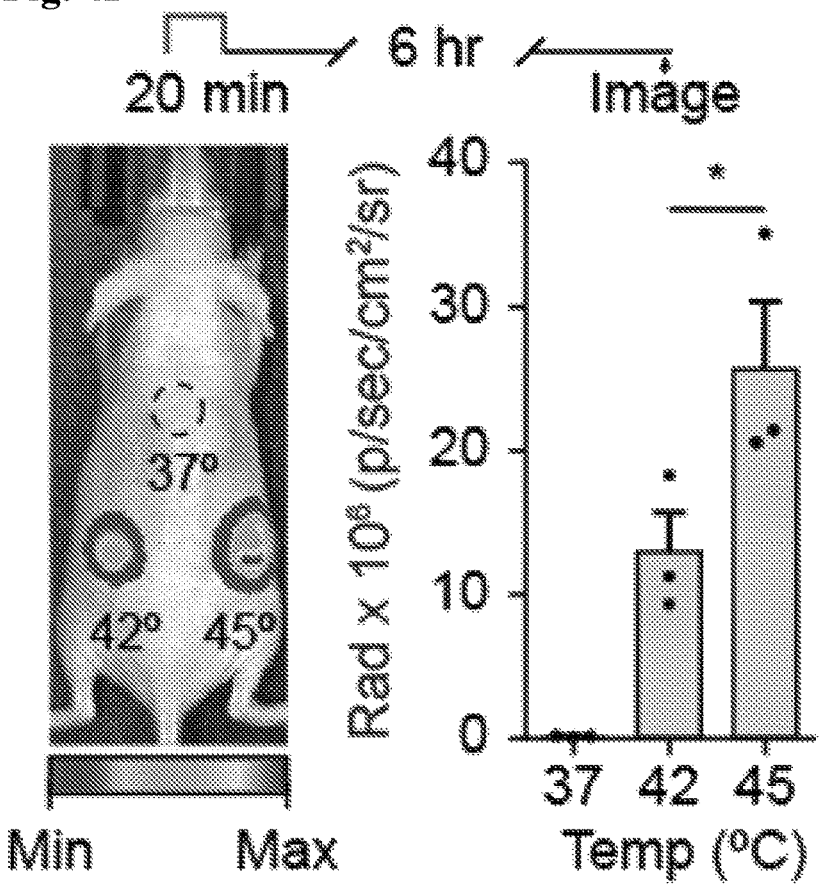
Figure 9:
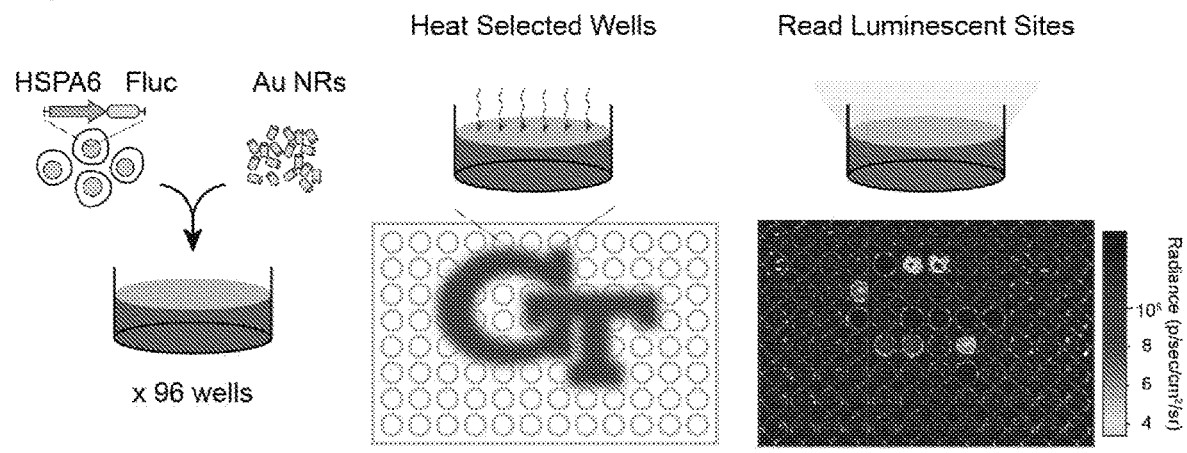
FIG. 9 shows spatially selective activation of thermal synthetic bioswitches. Select wells were heated in pattern of the Georgia Tech logo using 808 nm laser light. Plate imaged with IVIS Spectrum CT 24 hrs after heating.

The inventors next set out to demonstrate temperature control of Jurkat T cells using externally applied triggers. Spatially targeted heating in human patients can be achieved in deep tissues using multiple platforms including focused ultrasound, inductive heating, and microwave heating[20]. Here, the inventors chose photothermal heating using near infrared (NIR) laser light ($\lambda=808$ nm) irradiation of plasmonic gold nanorods (AuNRs)[15]. AuNRs are long-circulating nanomaterials whose geometry can be precisely tuned to absorb and convert incident NIR light into thermal energy by surface plasmon resonance (SPR) (FIG. 4A). Passively targeted AuNRs accumulate in tissue across fenestrated endothelium such as tumors[35, 36] and allow for localized heating when the site is exposed to otherwise benign NIR light. To test this approach, the inventors arrayed mixtures of AuNRs and luciferized Jurkats into a 96-well plate and confirmed coincident increases in both temperature and luciferase activity in wells treated with NIR laser light (FIG. 4B), allowing spatial targeting of cellular expression in patterns such as the Georgia Tech logo (FIG. 9). This system was then tested in vivo by laser heating subcutaneous matrigel implants encapsulated with Jurkat T cells and AuNRs (FIG. 4C) under the guidance of a thermal camera to allow maintenance of target skin temperatures in real time (FIG. 4D, 4E). At implant sites heated to focal skin surface temperatures of 42° C. and 45° C., over 105-fold and 209-fold increases in luciferase activity were observed, respectively, compared to unheated sites kept at body temperature (FIG. 4F). In contrast to the in vitro studies showing maximum cell activation at 42° C. (FIG. 3B), a surface skin temperature of 45° C. was required to robustly trigger the thermal switch in vivo. This difference was attributed to measuring temperature at the surface of the skin compared to the core of the implant. The inventors did not observe tissue damage to the skin surface at 45° C. and chose to work with this activating temperature for further in vivo studies. Taken together, these data showed that photothermal heating using NIR light and AuNRs effectively allows spatial targeting and control of cellular activity in vivo.

Thermal Pulse Trains for Long-Term Control of Jurkat T Cells In Vivo

Figure 5A:
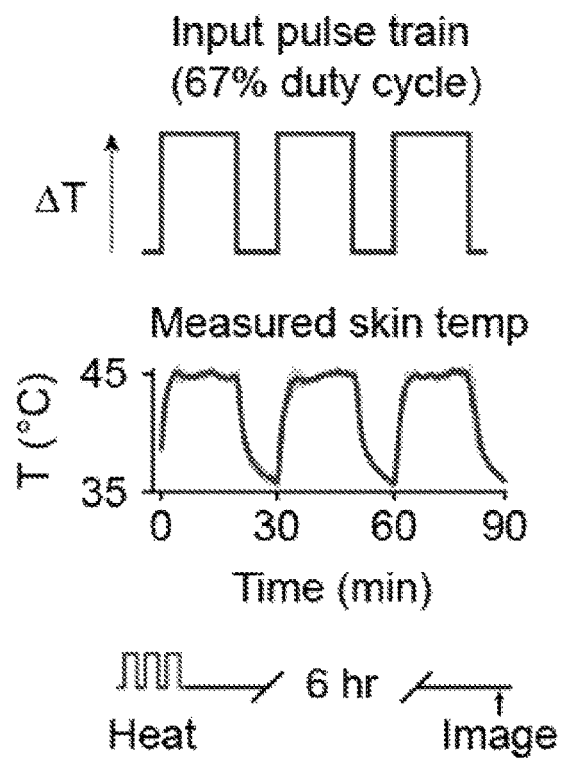
FIG. 5A-5E show in vivo pulsatile heating enables long-term control of mammalian cell activity. (5A) Idealized pulse-wave thermal input with a 67% duty cycle (top) and temperature trace of murine skin temperature during photothermal treatment (bottom). Black line trace=average temperature of 3×3 pixel ROI centered on implant site during heating. Shaded regions around average trace show STD of three heating series, n=3. (5B) PI and Annexin V viability flow plots of Jurkats harvested from pulsatile and continuously heated implants, with (5C) quantification, n=5 6, error bars=SEM. (5D) Radiance trace of implant sites after pulsatile heat treatments on days 1, 3, 7, 10, and 14 after implantation, n=4, error bars=SEM. Inset: luminescent images of representative implant sites on days 1 and 14. (5E) PI and Annexin V viability staining of Jurkats recovered from 37 and 45° C. heated implants in (5D), n=3, error bars=SEM. *P<0.05, two-tailed t-test.
Figure 5B:
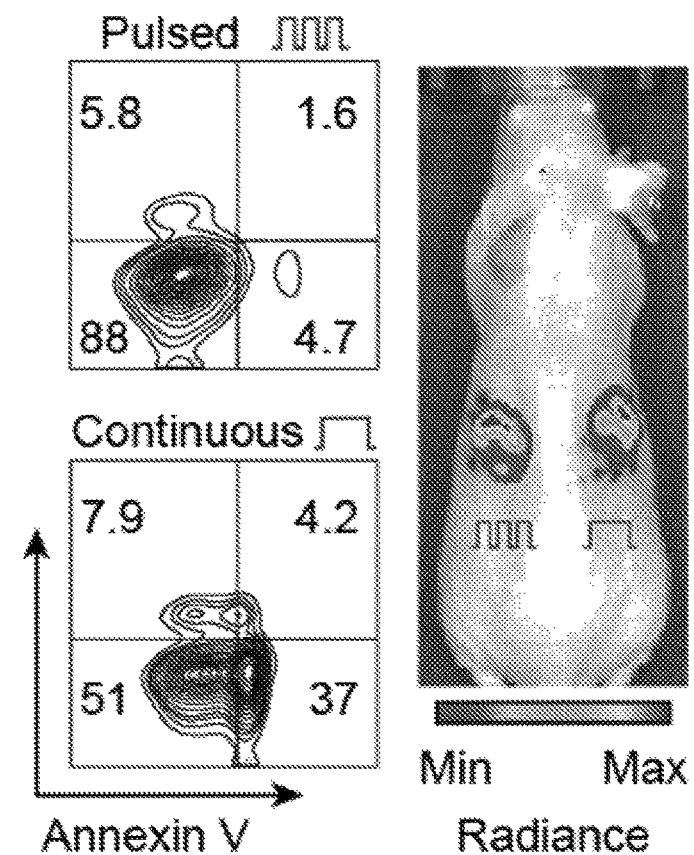
Figure 5C:
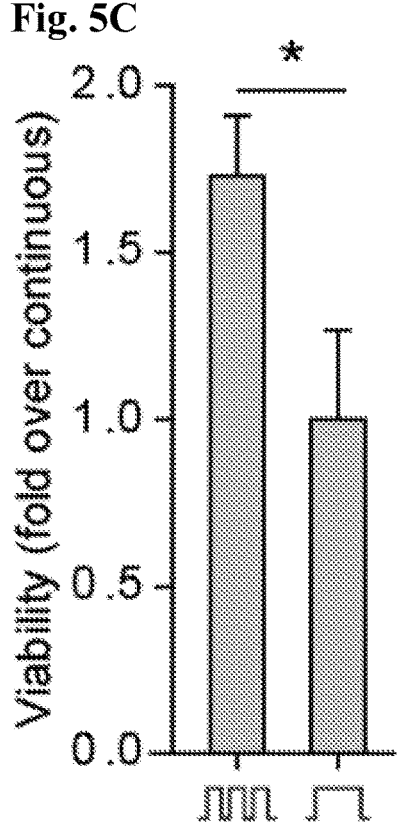
Figure 5D:
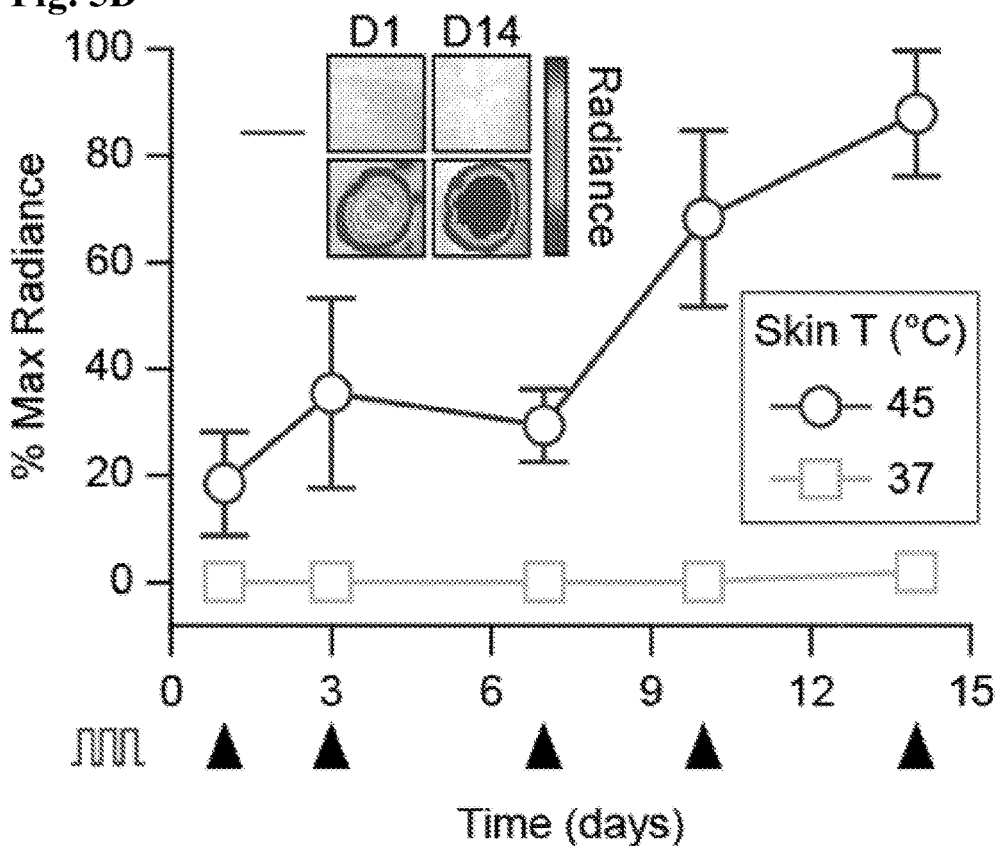
Figure 5E:
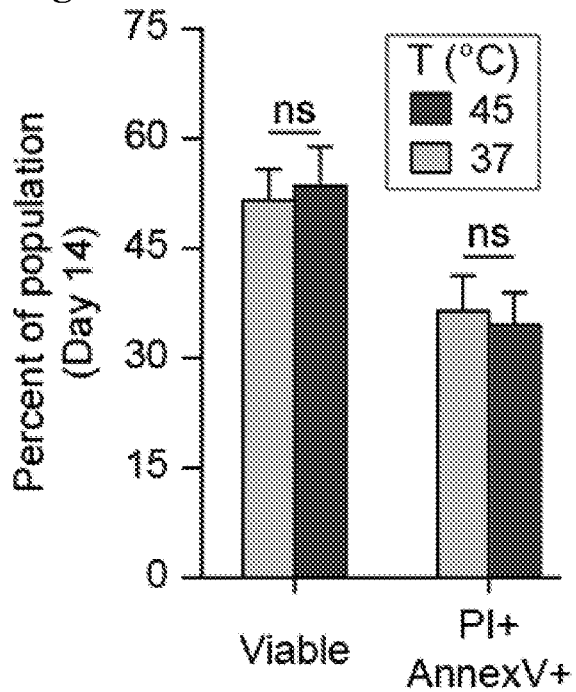

Based on the in vitro studies which showed the benefits of heat delivery using thermal pulse trains, the inventors sought to determine whether this method could be used to control Jurkat T cells over several weeks without significant reductions in cell viability and function. Serial modulation of T cell phenotype is especially relevant to chronic diseases such as HIV or refractory cancer that produce exhausted or anergic T cell populations[37] and where recovering T cell effector functions requires repeated administration of activating drugs (e.g., cytokines and checkpoint blockade antibodies). To enable localized, extended control over Jurkat T cell behavior while maintaining high cell viability, thermal pulse trains were applied to heat matrigel implant sites serially using NIR laser light and AuNRs. To confirm that the rate of heat transfer in vivo would allow on-off cycling of thermal pulses, implant sites were irradiated at a 67% duty cycle which produced discrete skin temperature profiles characterized by a decay half-life of 1.7 minutes between pulses and an area under the curve (AUC) of 1.2 compared to the ideal square wave input (FIG. 5A). The inventors then compared the viability of Jurkats recovered from in vivo matrigel implants heated with thermal pulse trains to those treated by continuous heating (FIG. 5B) and, consistent with in vitro studies (FIG. 3E, 3F), found greater than a 1.7-fold increase in viability (Annexin V, PI) within pulsed cells after one day (FIG. 5C). Because of this significant reduction in viability using a constant temperature profile, the inventors explored long-term control of cell behavior using repeated pulsatile heat treatments. Over the course of 14 days, implanted Jurkats steadily increased switch activity compared to unheated controls such that signals by Day 14 were more than 4-fold higher than on Day 1 (FIG. 5D, 5E). To confirm long-term pulsatile heating did not adversely affect implanted cells, the Jurkat T cells were analyzed on Day 15 and no significant differences in apoptosis and cell death markers (Annexin V and PI) was observed between pulsed and unheated cells kept at body temperature that were implanted concomitantly on Day 0 (FIG. 5F). Together these data shows that heat delivered in discrete pulses preserved cell viability and allowed remote control of Jurkat T cells for weeks in vivo.

Discussion

Inspired by remote control of biological systems, the inventors established a framework for engineering mammalian cells with thermal gene switches for in vivo control using pulses of heat. Thermal gene switches constructed from the HSPA6 promoter activated within a narrow temperature window of 40 42° C. and triggered gene expression to hundreds of folds above basal levels while remaining silent at normal body temperature. Here the inventors used wild-type promoter sequences but key thermal switch properties, including thermal activation temperatures and on-off ratios, could be further developed by directed evolution or incorporating similar genetic architectures from a wide range of species that have different temperature thresholds for heat shock activation (e.g., Arabian camel and zebrafish). Such modifications could provide orthogonal thermal bandpass circuits that express different genes depending on the temperature of the hyperthermic input as demonstrated recently in bacteria[23].

In this Example, the inventors found that pulsatile heat delivery significantly improved thermal tolerance of Jurkat T cells compared to continuous heating profiles with identical AUCs, which allowed long-term control of cells in vivo without reduction in output activity or cellular viability. In past studies, thermal tolerance was achieved by pretreatment of cells with mild heat followed by a rest period to allow expression of protective HSPs before full thermal induction[38]; however, this mechanism is unlikely to explain these results as the off-cycle time (~10 minutes) was short for protein expression. Without wishing to be bound by theory, it is suggested that the induction of thermal tolerance under this heating schedule may be related to HSF1's trimerization mechanism in which hydrophobic regions in repeated heptad domains are disrupted and form intermolecular coiled coils in response to hyperthermic conditions. These interactions could then allow HSF1 to stably trimerize and bind with high affinity to HSEs to initiate transcription[24, 31, 32]. It is hypothesized that this pulsed delivery method may influence the rate at which these hydrophobic domains are exposed, or the population frequency of trimers since higher-order oligomers are formed as well[39, 40]. The exact mechanism may be elucidated by examining the heat-response of substitution or deletion mutations within the hydrophobic domains that govern and regulate HSF1 trimerization[39, 41-44].

To heat specific sites in vivo, the inventors chose to use NIR laser light and plasmonic gold nanorods to induce local hyperthermia in matrigel implants. The well-established biodistribution of nanoparticles[45] in tissues with porous vessels such as secondary lymphoid organs (e.g., spleen or lymph nodes) or sites of disease (e.g., tumors) could allow engineered cells within these tissues to be remotely controlled. In humans, modalities such as focused ultrasound, radio- or microwaves are routinely used to precisely heat deeper tissues where targeting with optical techniques remains challenging[20]. In a clinical setting, a future application is to incorporate thermal gene switches into engineered T cell therapies for cancer to allow local expression of potent immune-modulating biologics[10, 11] which are otherwise associated with significant off-target toxicity when administered systemically to combat tumor immunosuppression. Moreover, local heating may be targeted to sites implanted with biomaterials designed to enhance T cell function, including wafers that expand and disperse tumor-reactive T cells[46]. Looking forward, this framework of activating gene expression by heat provides an orthogonal mechanism to control cellular activity in addition to small-molecule[47] or light-based methods[13]. Such platforms may be integrated across different immune cell types for remote control of synthetic immunological systems.

Methods

Plasmid Construction and Viral Production.

Figure 2A:
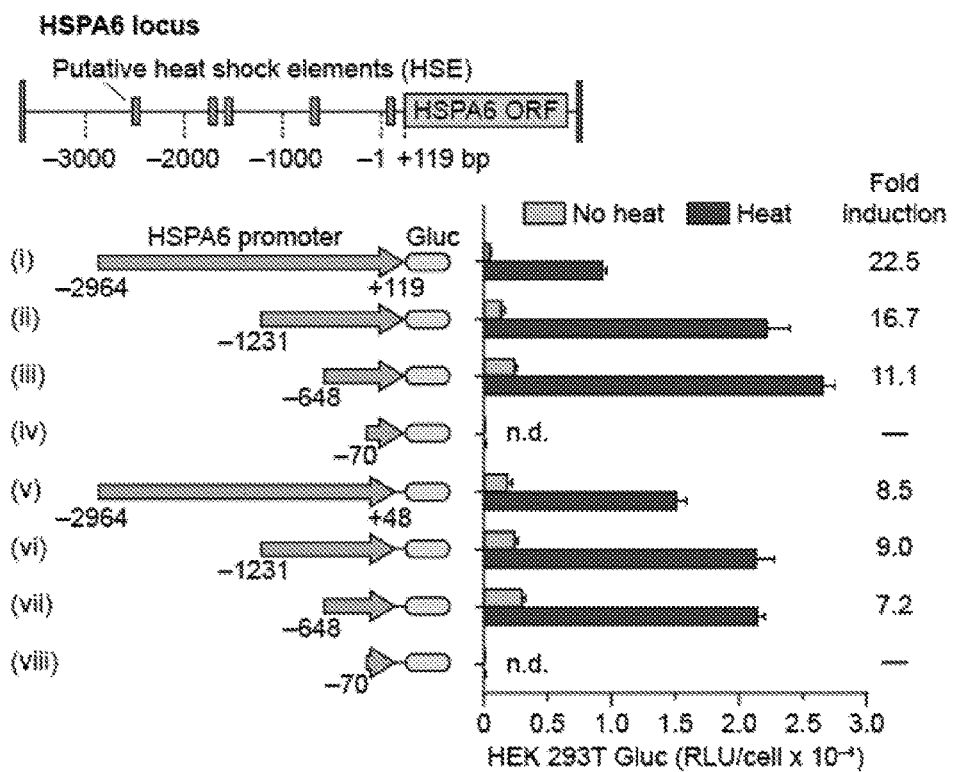
FIG. 2A-2C show heat-triggered gene switches in Jurkat T cells. (2A) Eight constructs (i-viii) cloned from the heat shock protein HSPA6 locus used to evaluate sensitivity to thermal activation in HEK 293T cells. Constructs i-iv extend to +119 bp beyond transcriptional start site while constructs v-viii terminate at +48 bp. Fold inductions of normalized luminescence (Heat/No heat) are listed to the right of each construct. RLU: Relative Luminescence Units, n=3, error bars=SEM. (2B) Kinetic trace of cumulative switch activity at 42° C. in Jurkat T cells following 1 hr heating, n=3, error bars show SEM and are smaller than the displayed data points, ****P<0.0001, one-way ANOVA and Dunnett's multiple comparison test. (2C) Decay kinetics of switch activation after 1 hr heating at 42° C. Luminescent values were determined by sampling and replacing supernatant after maximum activity was reached, n=3, error bars=SEM.
Figure 2B:
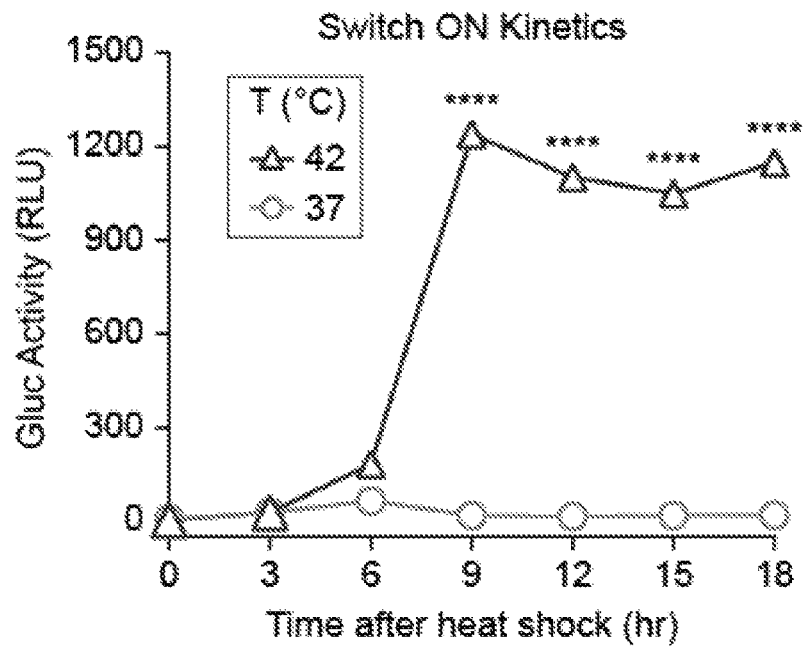
Figure 2C:
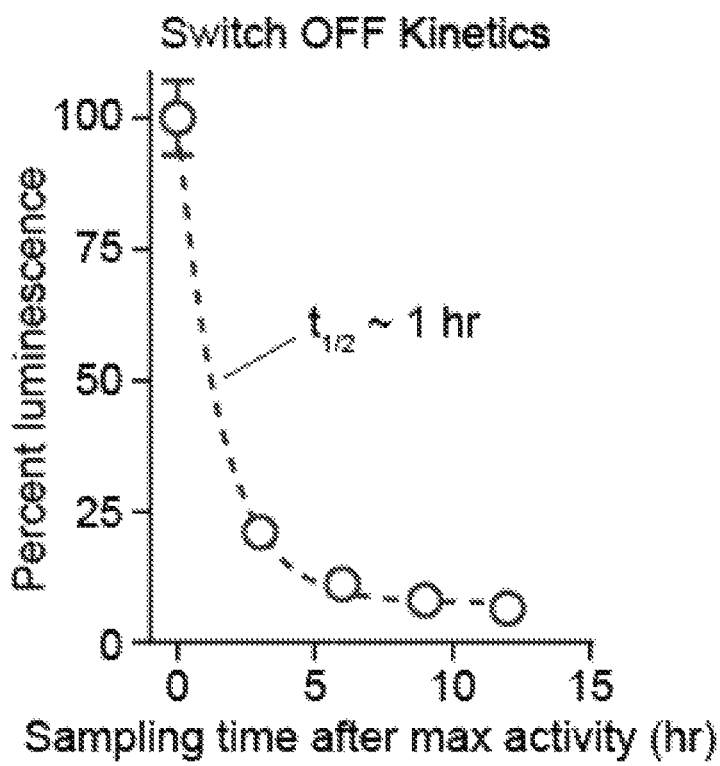

The promoter of the HSPA6 gene (Uniprot P17066) was amplified from human genomic DNA (Clontech #636401) at positions indicated in FIG. 2A similar to previous studies[33]. XbaI and XhoI sites were added to the 5' and 3' ends of annealing sequences listed in the Supplementary Methods, digested, and used to insert the promoters into the Lego-C plasmid (Addgene #27348) that contains the reporter mCherry as a selectable marker. This fluorescent reporter was used to sort transduced cells using FACS. Additional reporters including Gluc (LifeTech 16146), emGFP (Imanis DNA1023) and Fluc (Addgene #33307) were added under control of the heat shock promoter via restriction enzyme digestion and ligation. Plasmid DNA was purified using a Plasmid Maxi Kit (Qiagen cat #12163) and packaged into lentiviral vectors with psPAX2 (Addgene #12260) and pMD2.G (Addgene #12259). Cells were transduced in 10 μg/mL of protamine sulfate (Sigma) before FACS (BD FACS Aria) and downstream use.

Preparation of AuNRs.

AuNRs were purchased from Nanopartz (item #A12-10-808-CTAB-500) and pegylated (Laysam Bio cat # MPEG-SH-5000-5g) to replace the CTAB coating before being resuspended in DI at 0.5 mg/mL. This solution was used in a 1:100 dilution for all laser mediated heating experiments in mice and 96-well plates.

Viability Studies.

Jurkats were heated in a thermal cycler (Biorad) in HEPES buffered RPMI (25 mM) at a density of $10^6$ cells/mL and incubated at 37° C. and 5% $CO_2$. After 24 hours, cells were assayed for viability using the Apoptosis Detection Kit (BD cat #556547). For cells recovered from implant sites, matrigel was excised from mice, physically dissociated and incubated in Cell Recovery Solution (Corning) according to manufacturer's instructions before analysis with Apoptosis Detection Kit 24 hours after conclusion of heating. All samples were analyzed with FlowJo, Version 10 (FlowJo LLC).

In Vitro Heating Assays.

Cells were heated in a thermal cycler and immediately transferred to a 96-well plate and incubated until assayed. Unless otherwise indicated, cellular supernatant was sampled for reporter activity 24 hrs after heating. Density inside PCR tubes was $10^6$ cells/mL. Luminescent activity was measured using a Cytation 5 plate reader (BioTek) and *Gaussia* Luciferase Assay Kit (New England Biolabs) according to manufacturer's instructions.

In Vivo Laser Heating.

0.5 μg AuNRs and $2 \times 10^6$ engineered cells per 100 μL matrigel were used for laser heating with in vivo implants after subcutaneous injection into in nude mice (Jackson Labs). Mice were anesthetized with isoflurane gas and implant sites were heated using an 808 nm laser (Coherent) at a power density of ~9.5 A/cm². All in vivo pulsatile heating profiles were performed for a total of 30 min of heat with a 67% duty cycle. Surface temperature was continually measured using a thermal camera (FLIR model 450sc). Rest periods during cyclic heating began when measured skin temperature reached 37±1° C.

In Vivo Bioluminescence and Imaging.

Fluc activity was measured using an IVIS Spectrum CT (Perkin Elmer) after intraperitoneal (i.p.) injections of luciferin (Gold Bio) administered 4.5 hr after conclusion of activating heat shock. Integration time was set to automatic and imaging was conducted for up to 1.5 hr after injection. ROIs were defined within the Living Image software package (Perkin Elmer) and measured as average radiance (photons $s^{-1}$ $cm^{-1}$ $sr^{-1}$).

Statistical Analysis.

All results are presented as mean, and error bars show SEM. Statistical analysis was performed using statistical software (GraphPad Prism 6; GraphPad Software). *p<0.05, **p<0.01.

Example 2. Heat-Triggered Synthetic Bioswitches Control CAR-T Cell Activity in Primary Human T Cells The inventors next studied expression of an exemplary synthetic switch in primary human CD3+ T cells. The synthetic switches were each activated by heat in primary human T cells, and enabled tunable expression of an intracellular protein emGFP (12A). Next, the inventors utilized K562 cells which constitutively express CD19 to test the cytotoxicity of a T cell bearing a CD19 CAR controlled by the exemplary heat-regulated synthetic switch. It was found that heat induction of the exemplary heat-regulated synthetic switch induced killing of the K562 cells by the CD19 CAR-expressing T cells when the temperature was increased (12B). The inventors performed numerous control experiments to demonstrate that heat did not affect T cell functions such as proliferation (13A), migration (13B), viability (13C), or cytotoxicity (13D).

Figure 10A:
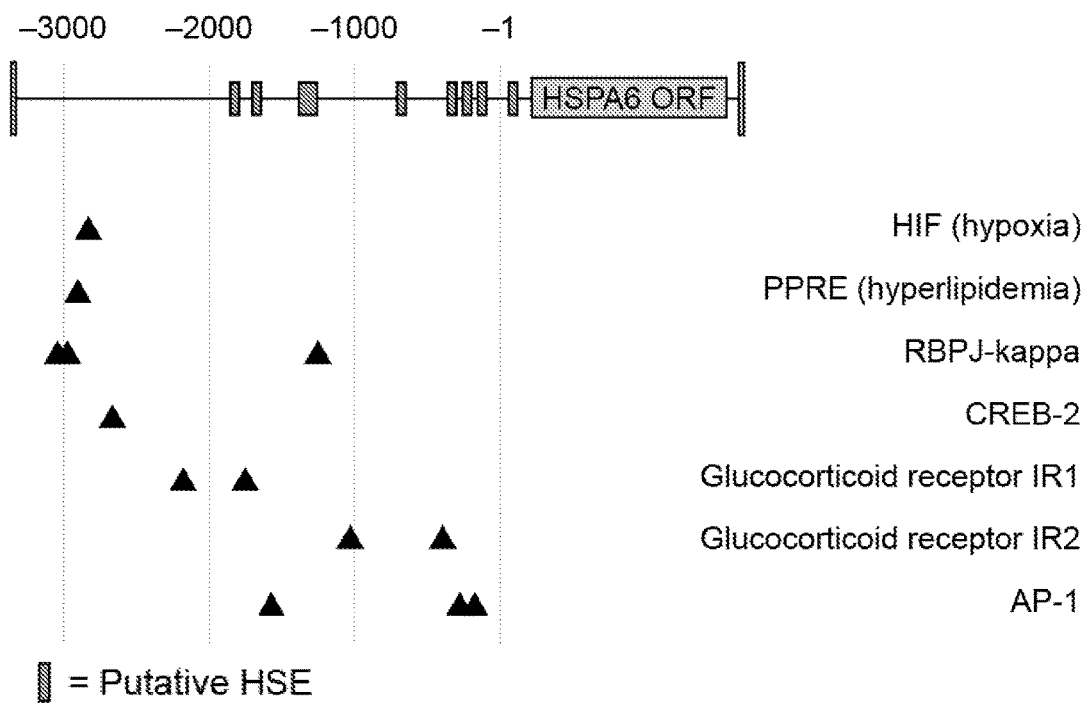
Figure 10B:
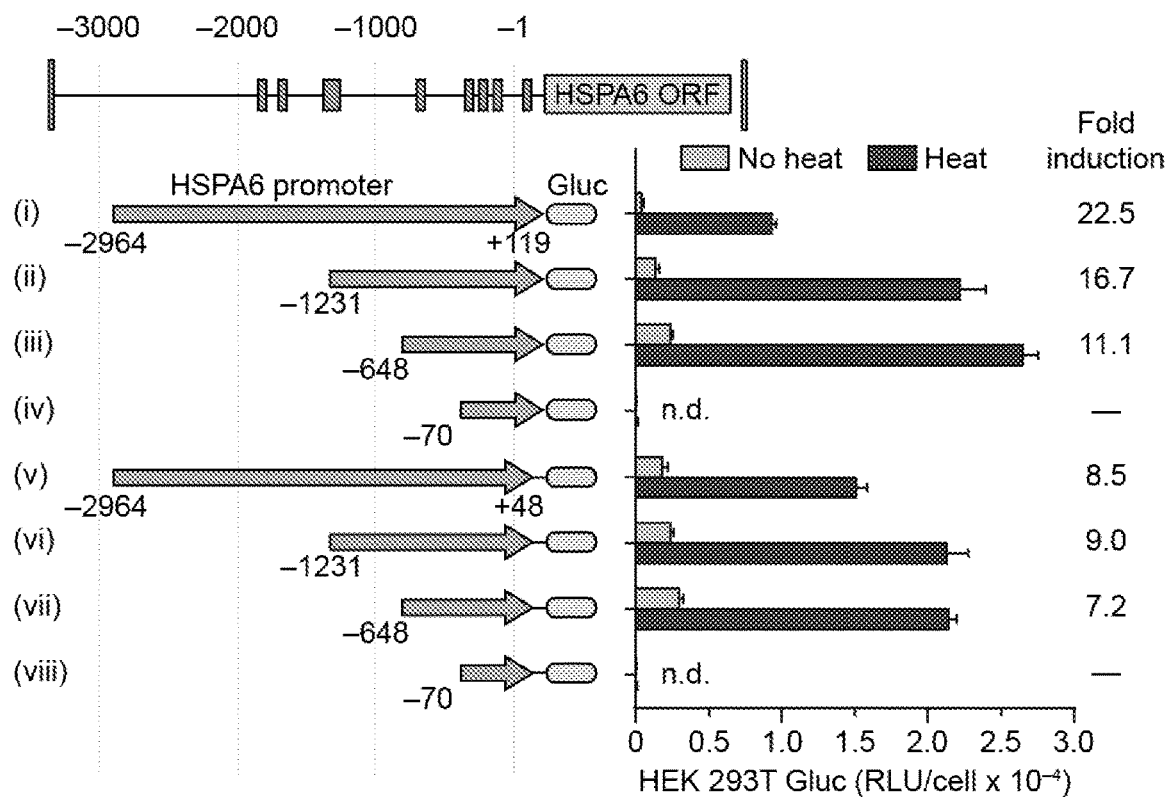
Figure 10C:
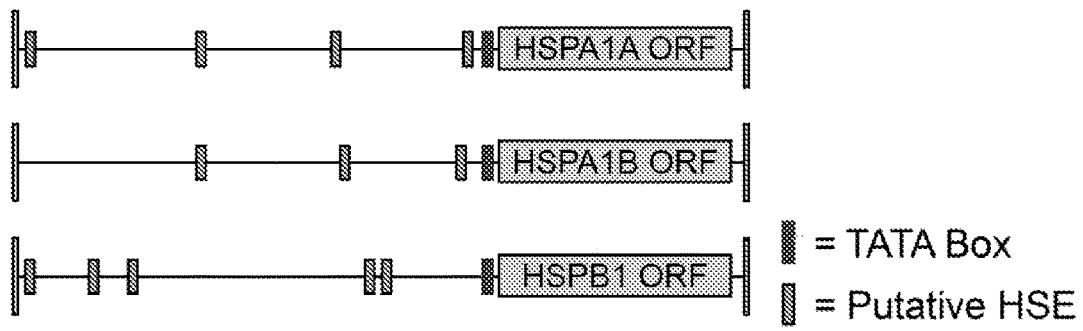
Figure 10D:
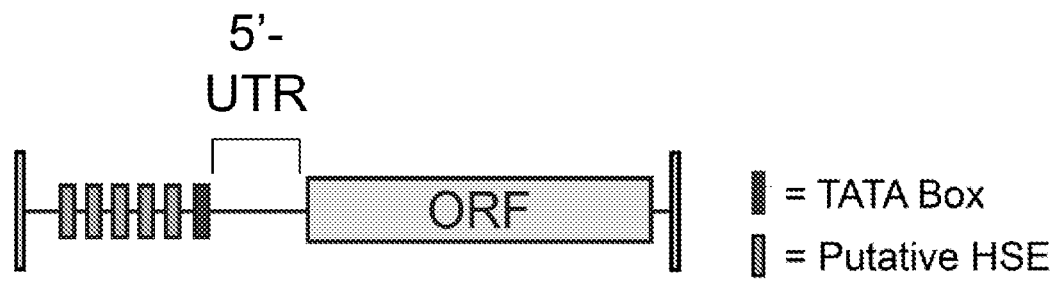
Figure 10E:
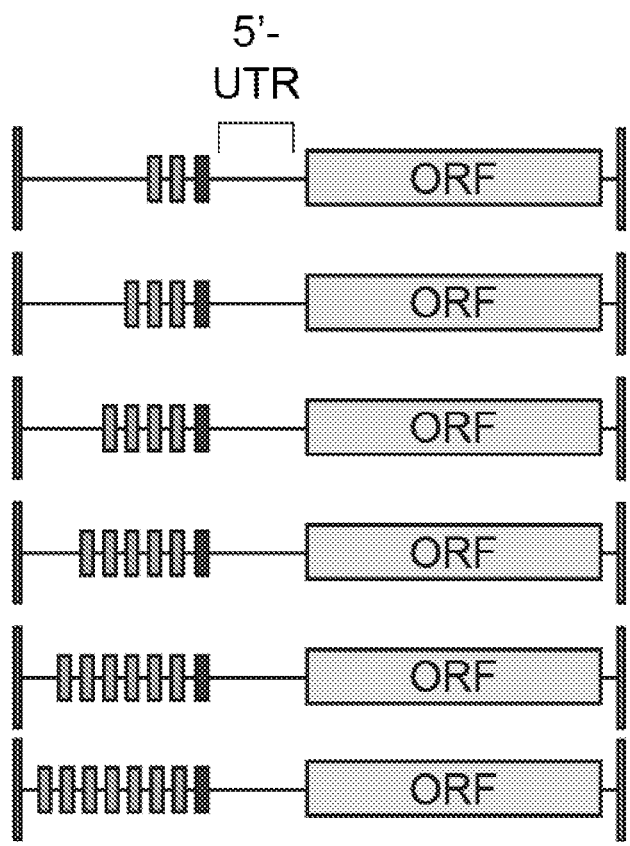
Figure 10G:
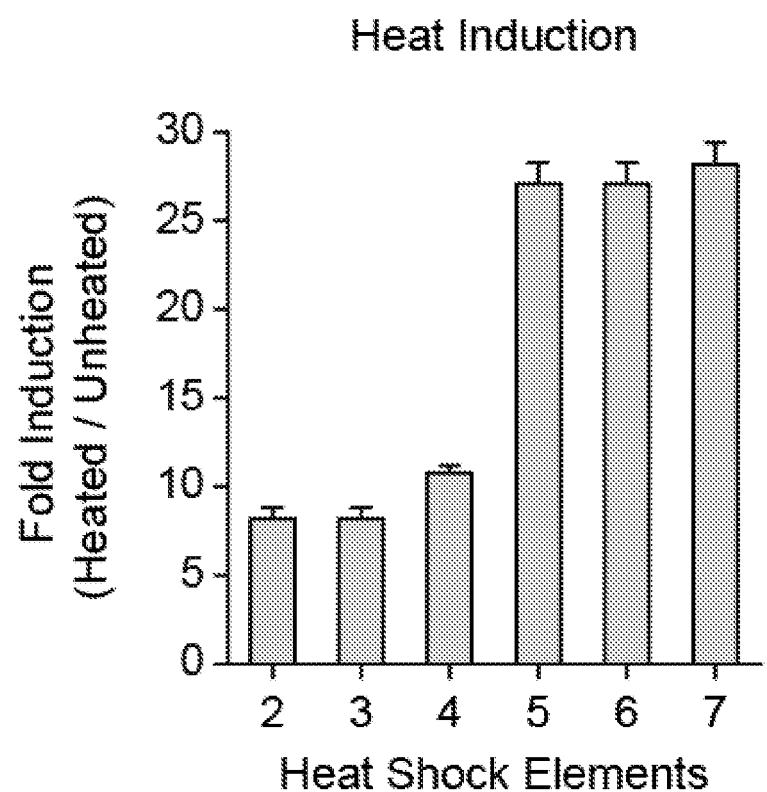
Figure 10H:
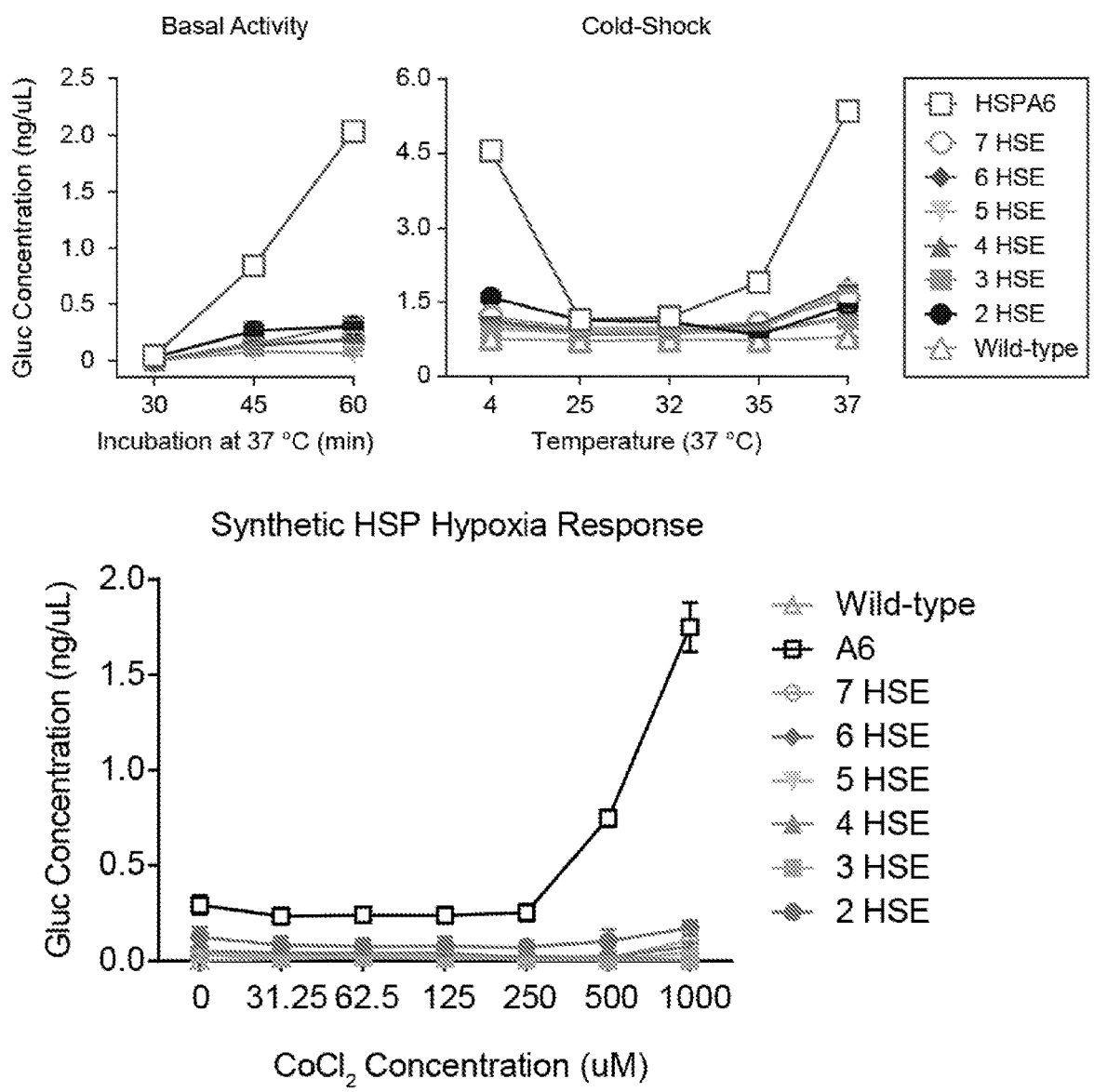

Example 3. Development of Synthetic Switches Using Arrays of Control Elements A representative endogenous promoter, HSPA6, is shown in FIG. 10A, with the numerous stress-responsive elements shown relative to the start of the HSPA6 open reading frame (ORF). This promoter is able to respond to multiple stress stimuli and a complex network of regulators (e.g., heat, hypoxia, hyperlipidemia, RBPJ-kappa, CREB-2, glucocorticoid receptors, and Activator Protein (AP)-1). This promoter has multiple heat-responsive elements (HSEs) indicated by gray boxes.

Truncation of the HSPA6 promoter (10B) into constructs i-viii corresponding to SEQ ID NOs: 1-8, respectively, resulted in different responses to temperature increases. The structure of other endogenous heat shock protein (HSP) promoter regions (10C) was studied including the patterns of HSEs, showing that the heat-response is driven by arrays of HSEs. Based on these experiments, a series of exemplary heat-activated synthetic switches comprising an array of increasing numbers of HSEs were designed (10D-10E), corresponding to SEQ ID NOs 32-37 (top to bottom of 10E, respectively; SEQ ID NO: 32 has 2 HSEs, SEQ ID NO: 33 has 3 HSEs, SEQ ID NO: 34 has 4 HSEs, SEQ ID NO: 35 has 5 HSEs, SEQ ID NO: 36 has 6 HSEs, and SEQ ID NO: 37 has 7 HSEs). The annotated sequences of SEQ ID NOs 32-37 is shown in FIG. 10F, with HSE elements underlined; the TATA box bolded; and the 5-UTR italicized. Activation of SEQ ID NOs 32-37 by heat showed that the number of HSEs plays a role in the level to which the operably linked gene is transcribed (10G). The exemplary synthetic switches (SEQ ID NOs 32-37) were specifically activated by heat; the environmental stresses of cold shock and hypoxia do not induce activity of the operably linked reporter gene (10H). The endogenous HSPA6 promoter exhibited higher activity than the exemplary synthetic switches at regular temperatures when incubated in PCR tubes, under hypothermic conditions, and under hypoxic conditions.

Based on the experiments described herein, other elements that can optionally be included in synthetic switches include TATA boxes (e.g., SEQ ID NO 31, and the TATA boxes of well-studied genes such as for example and not limitation, GAPDH and EF1a); AP-1 sites which can enable activation of the operably linked heterologous nucleic acid (e.g., SEQ ID NOs 26-28); RBPJ-kappa sites which can enable suppression of the operably linked heterologous nucleic acid (e.g., SEQ ID NOs 9-11), and 5' UTRs (e.g., the 5' UTRs of HSPA6, HSPA1A, and HSPA1B). Other control elements can be included in the synthetic switches to enable regulation by different stimuli, such as for example and not limitation, (i) the cAMP response element (CRE), regulated by CREB (e.g., CRE found in the VEGF and HSPA1A promoters); (ii) AhR (aryl hydrocarbon receptor) responsive element, regulated by the aryl hydrocarbon receptor (e.g., AhR sites found in the VEGF and HSPA1B promoters); (iii) HIF-responsive elements (HREs), regulated by HIF1a, ARNT, EPAS1, ARNT2, HIF3A, ARNT3 (e.g., HRE sites found in the HSPB1 and HIF1A promoters); (iv) peroxisome proliferator hormone response elements (PPREs) which respond to hyperlipidemia and are regulated by peroxisome proliferator-activated receptors (e.g., PPRE sites found in the VEGF promoter); (v) metal-responsive element (MRE), regulated by metal regulatory transcription factor 1 (e.g., MRE sites found in the cytochrome P450, VEGF, HSPA1A, and FAS promoters); (vi) calcium-response element (CaRE1), regulated by calcium-responsive transcription factor (e.g., CaRE1 sites found in the VEGF, HSPB1, and NSF3 promoters); (vii) NFAT sites, regulated by Nuclear Factor of Activated T cells (e.g., NFAT sites found in the IL-2 and IL-4 promoters).

Materials and Methods

Stress Experiments with Synthetic Bioswitches.

Jurkat T cells engineered with synthetic bioswitches were cultured in RPMI (10% FBS, 1% penstrep) and incubated at 37° C. and 5% $CO_2$ before thermal treatments. 24 hrs after thermal treatments, supernatant was harvested and assayed for Gluc activity with the *Gaussia* Luciferase Glow Assay Kit (Fisher #PI16161) according to manufacturer's instructions. For hyperthermic experiments, $10^6$ cells were heated in a PCR tube (VWR #53509-304) using a thermal cycler (BioRad) for 15, 30, 45, and 60 min at 37, 40, 41, and 42° C. Fold induction (42/37° C.) for the 45 min timepoints is displayed along with the basal activity (37° C.) of 30, 45, and 60 min timepoints. Hypothermic experiments utilized the same procedure with 60 min treatments in the thermal cycler; supernatant Gluc activity is displayed. For the hypoxia stress experiment, $10^6$ cells were incubated in RPMI (10% FBS, 1% penstrep) supplemented with indicated concentrations of $CoCl_2$ (Sigma #232696) for 24 hrs before harvesting supernatant and quantifying Gluc activity.

Example 4. Gene Suppression Using Synthetic Switches

In an application of the current disclosure, the synthetic switches were also capable of suppressing specific target genes using heterologous genes such as CRISPR-Cas9. By switching out the variant of Cas9 that was operably linked to the synthetic switch (such as for example and not limitation, Cas9, dCas9, KRAB-dCas9, dCas9-VP64, DnmtdCas9, Tet-dCas9), it is possible to also modulate the type of modulation that occurs. For example, the use of a version of dCas9 fused to a transcriptional repressor (e.g., KRAB) results in suppression of the endogenous target gene. The use of a different variant of dCas9 fused to a transcriptional activator (e.g., VP64) results in activation of endogenous target genes. Additionally, the use of Dnmt-dCas9 and Tet-dCas9 could allow the regulatable methylation and demethylation of histones, respectively, enabling control of broad epigenetic states.

In one instance, the synthetic bioswitch enabled tunable control of suppression of d2GFP by dCas9. Heat treatments delivered at different time intervals (FIG. 11A) and the total number of heat doses delivered (FIG. 11B) modulated the overall suppression kinetics of the target gene. Based on these experiments, gene expression was remotely controlled with the CRISPR platform.

In some embodiments, the synthetic switch is operably linked to a genome editing or modifying protein, such as for example and not limitation, CRISPR, Cas9 or a variant thereof, Argonaut, and/or a nuclease. Genes that could be edited or modified include, for example and not limitation, intracellular protein targets such as transcription factors such as the Yamanaka Factors (Oct3/4, Sox2, Klf4, c-Myc) for induced pluripotency, HIF-1α for enhanced injury response, and tissue-specific factors such as Shox2.

It is also possible to modify the sgRNA itself, where its length, scaffold, and sequence all affect the activity of the synthetic bioswitch. For example, shortening the length can dictate whether Cas9 activates or suppresses a gene. Further, the sgRNA scaffold can be engineered to recruit various factors that can enhance the suppression or activation of the target gene (e.g., the scaffold can recruit the MS2-P65-HSF1 transcriptional activation complex in order to enhance activity). Additionally, the sequence of the sgRNA can be replaced to target the dCas9 protein to other biologics (such as, e.g., IL-2, checkpoint blockade genes [e.g. PD-1, CTLA-4]). Additionally, multiple sgRNAs can be included to either a) increase potency of modulation and/or b) target multiple genes at once under a single stimulus.

In another example of the gene suppression, siRNA is induced in a cancer or tumor using the hypoxic environment of the cancer or tumor to activate synthetic switches that produce siRNAs that can repress therapeutic targets such as Ppp2r2d, Cblb, Dgka, Dgkz, Ptpn2, Smad2, Socs1, Socs3 or Egr2. In such an example, the different siRNAs are activated in response to the hypoxic environment.

Methods

Gene Suppression Using dCas9.

Figure 11A:
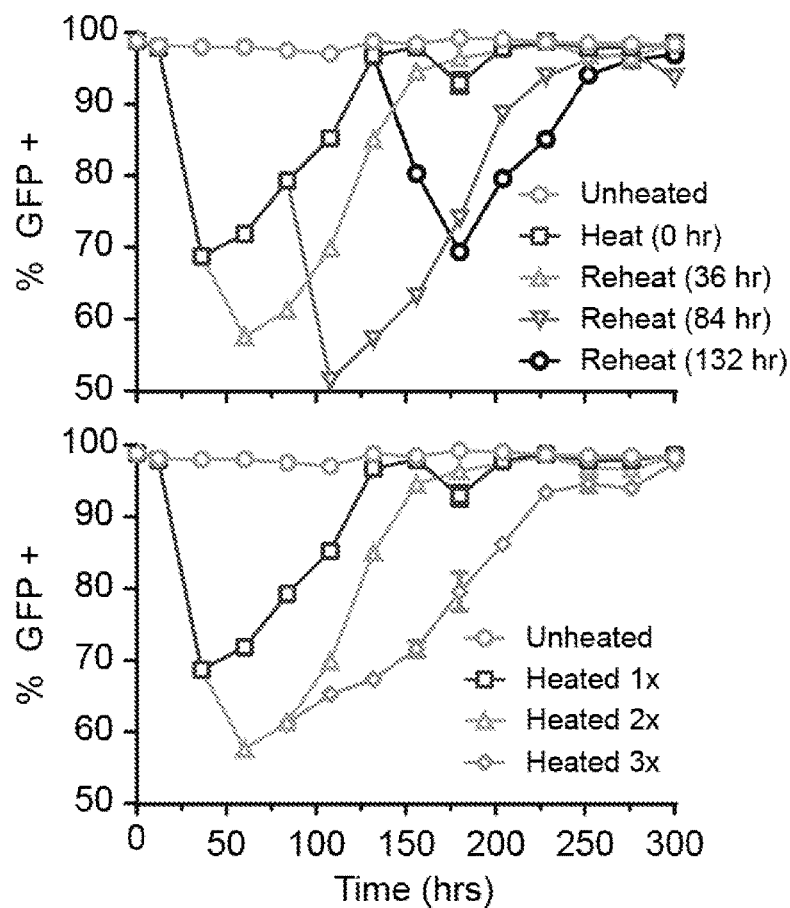
FIG. 11A-11B show development of an exemplary synthetic bioswitch that enables suppression of genes. (11A) Suppression of GFP expression by a synthetic bioswitch containing a heat-activated dCas9 gene by increasing the temperature. (11B) Repeated heating results in increased repression of GFP expression by the synthetic bioswitch.
Figure 11B:
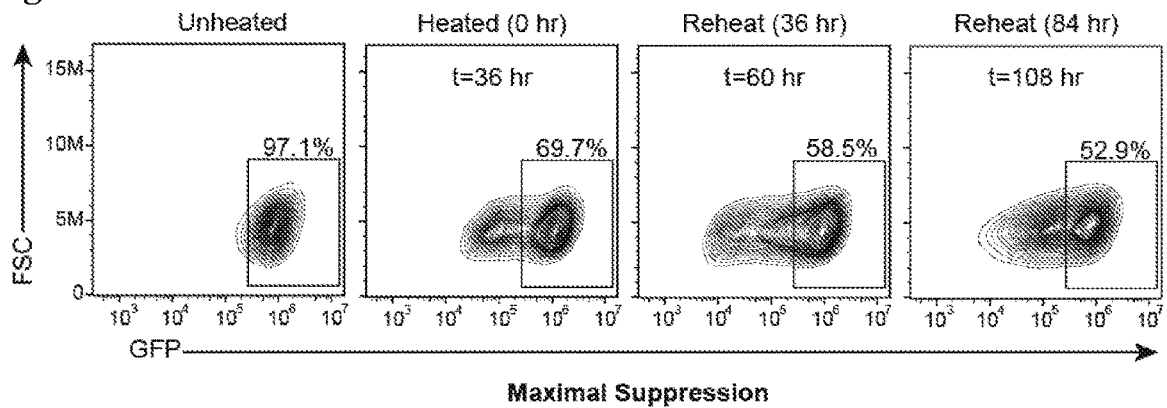
Figure 12A:
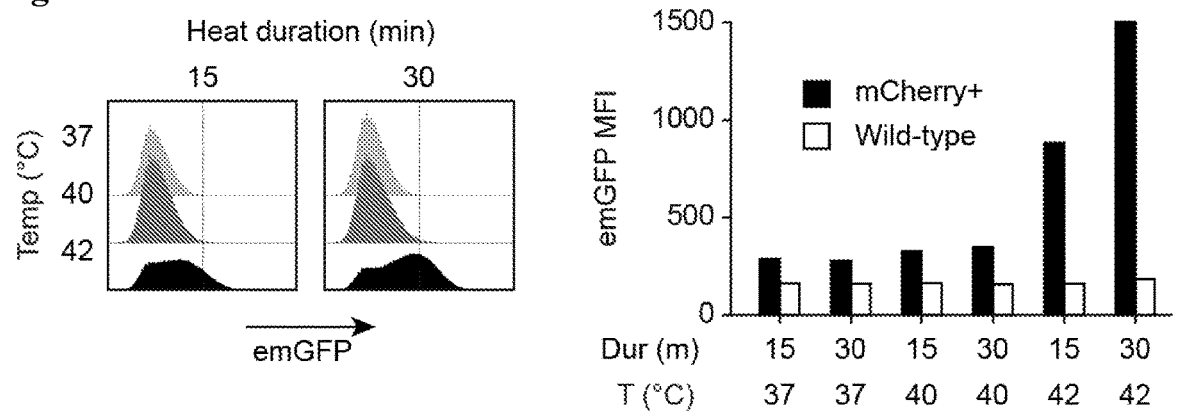
FIG. 12A-12C show expression of an exemplary synthetic bioswitch in primary human CD3+ T cells. (12A) The synthetic bioswitch is activated by heat in primary human T cells, and enables tunable expression of an intracellular protein emGFP. (12B) Schematic of expression of a CAR by an exemplary heat-regulated synthetic bioswitch. (12C) Heat induction of the exemplary heat-regulated synthetic bioswitch induces T cell cytotoxicity via a CD-19 specific CAR.
Figure 12B:
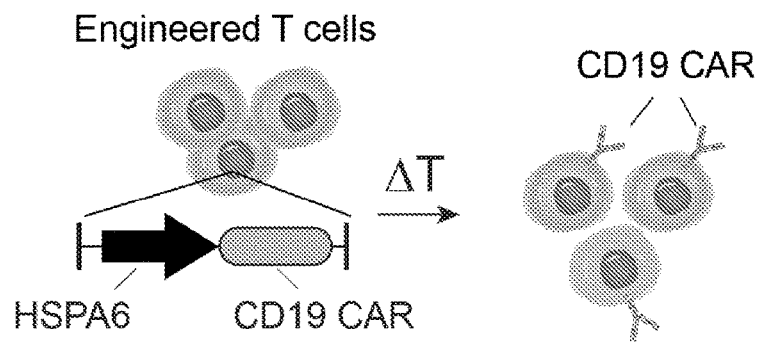
Figure 12C:
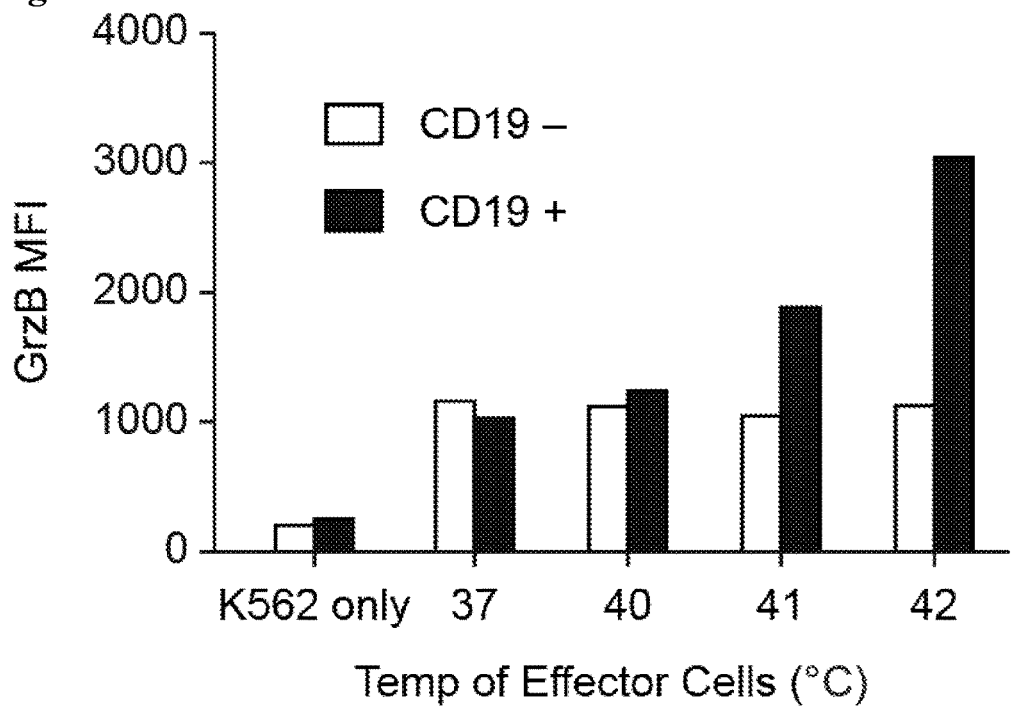
Figure 12C:
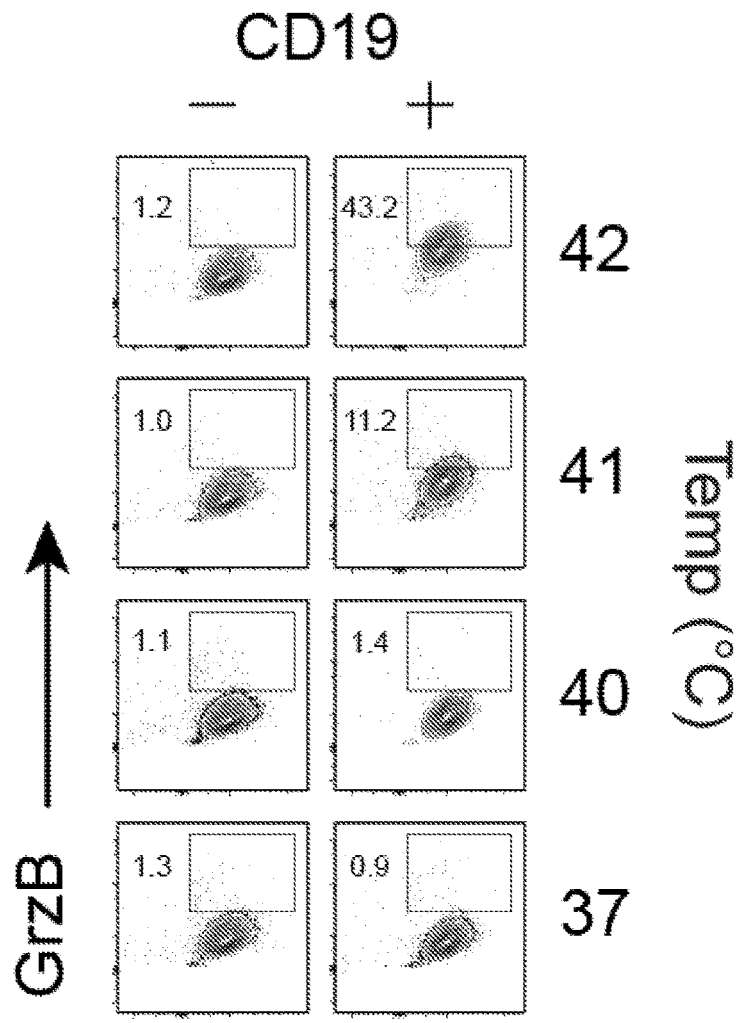
Figure 13A:
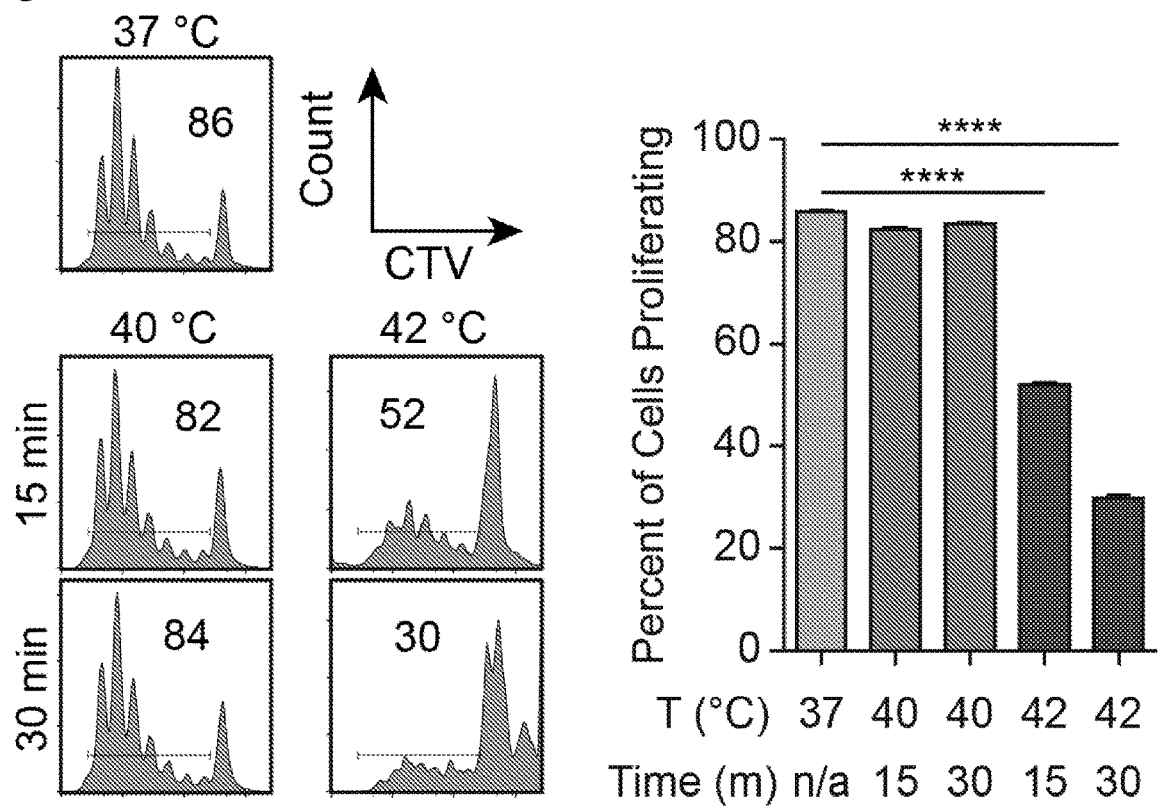
FIG. 13A-13D show that heat does not affect T cell functions. (13A) Heat does not affect T cell proliferation. (13B) Heat does not affect T cell migration. (13C) Heat does not affect T cell viability in primary murine cells (top panel) or primary human cells (bottom panel). (13D) Heat does not affect T cell cytotoxicity.
Figure 13B:
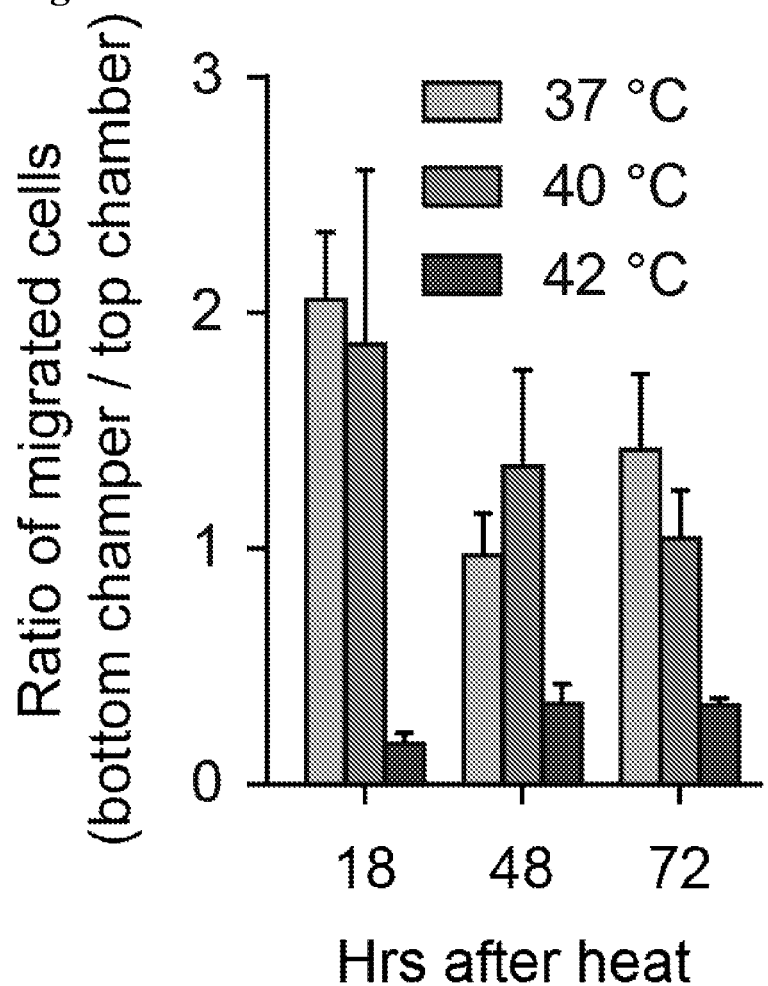
Figure 13C:
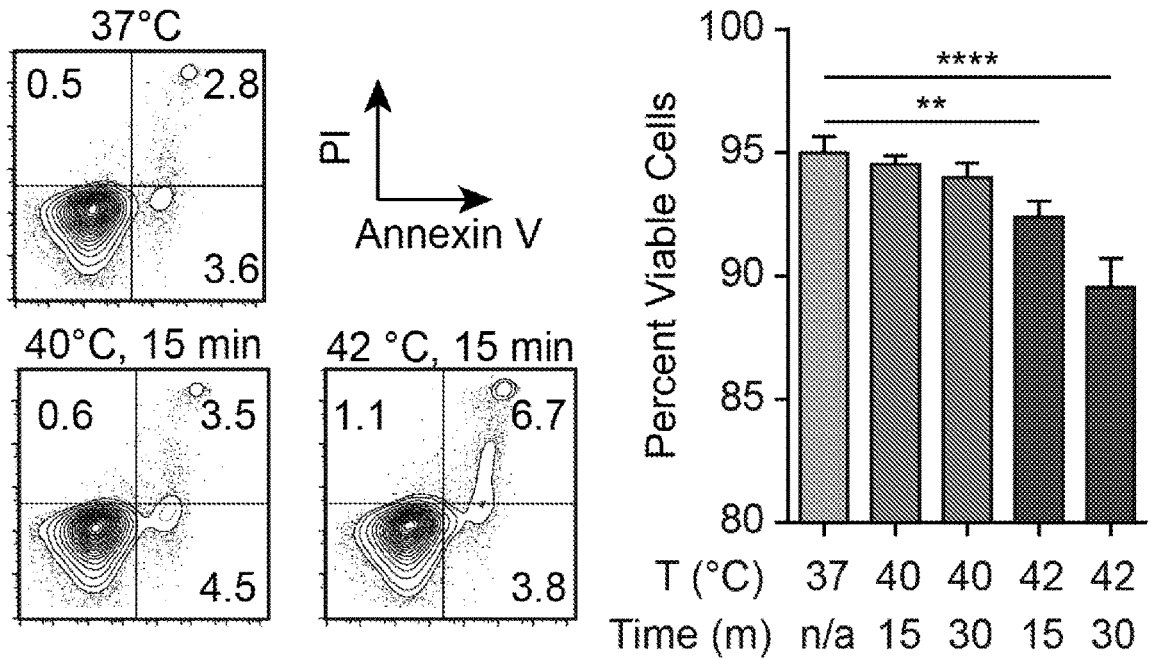
Figure 13C:
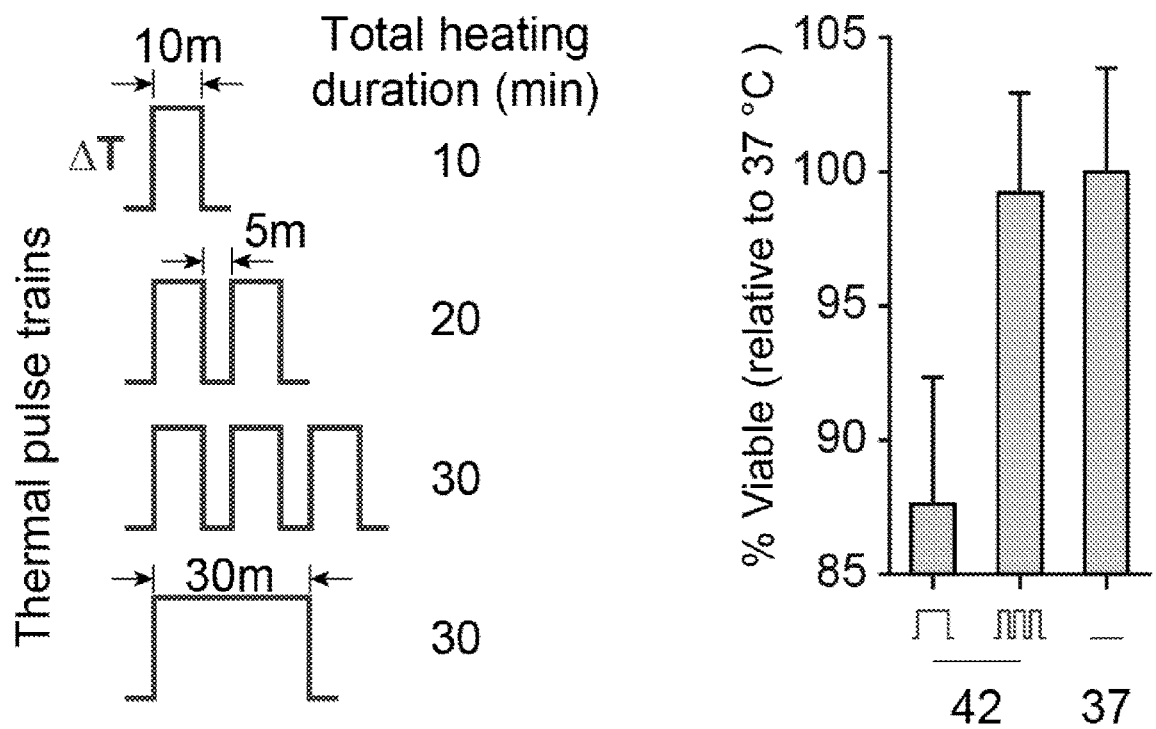
Figure 13D:
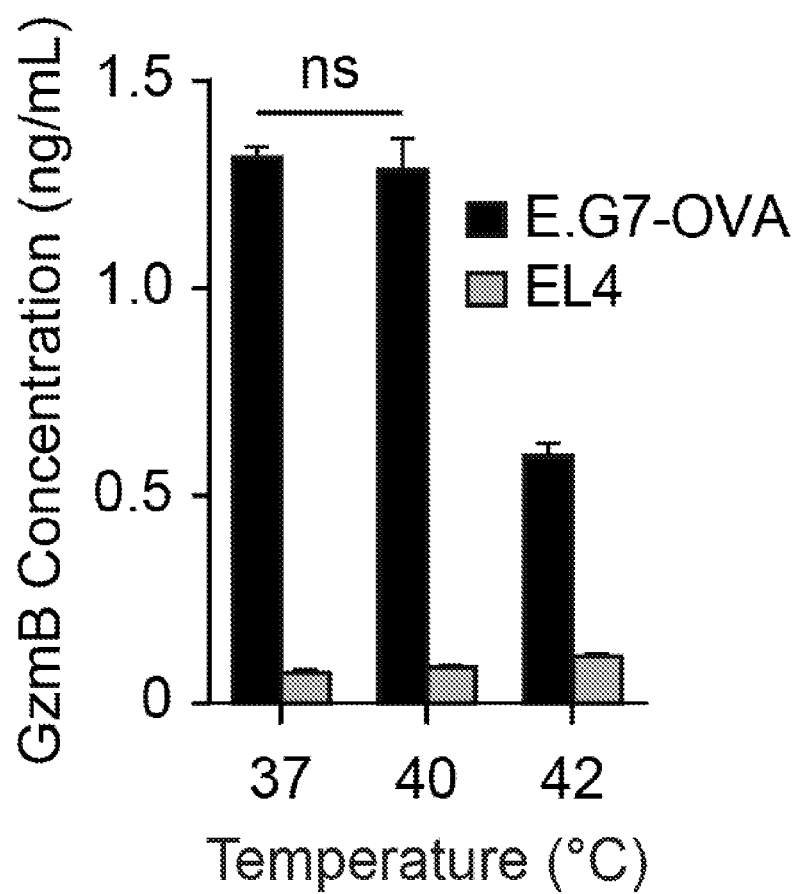

HEK 293T cells were engineered to constitutively express destabilized GFP (d2GFP) and a sgRNA targeted to the d2GFP sequence. Additional incorporation of a synthetic bioswitch controlling a catalytically inactive Cas9 gene (dCas9) enabled transient suppression of d2GFP expression. Additional heat treatments at indicated timepoints (FIG. 11A, top plot) and longitudinal heat treatments spaced every 36 hrs (FIG. 11B, bottom plot) were also tested. Flow plots (FIG. 11B) are representative of top panel (FIG. 11A). Heat treatments were performed on $5 \times 10^4$ cells at 42° C. for 30 min using a thermal cycler (Biorad). Cells were maintained in DMEM (10% FBS, 1% penstrep).

Example 5. Multiplexed Synthetic Bioswitches Using Discrete Stimuli

As discussed herein, it is possible to design a multiplexed system of synthetic bioswitches, each responding to a discrete stimulus, that can enable the modulation of a cell's activity or function in response to those stimuli. For example and not limitation, the different synthetic switches in the multiplexed system can be operably linked to heterologous nucleic acids that can activate or repress other targets (e.g., siRNAs or genome editing or modifying proteins) or can express therapeutic proteins (e.g., CAR, TCR, antibodies, etc.) in response to those stimuli. For example, a multiplexed system according to the disclosure can include a synthetic switch that is activated by the increased calcium ion concentration in a tumor (e.g., by comprising one or more CaRE1 elements) that is operably linked to a gene encoding IL-2 in combination with a synthetic switch that is activated by the hypoxic environment in that tumor (e.g., by comprising one or more HRE elements) that is operably linked to a CAR gene. A therapeutic application of such a multiplexed system could include transfecting the system into an immune cell, preferably a T cell, and then introducing that transfected T cell intravenously or directly into a patient's tumor, where the CAR expressed by the T cell enables recognition and killing of the tumor cells. Another exemplary multiplexed system comprises a synthetic switch that is activated by one of the stimuli described herein and is operably linked to a heterologous nucleic acid molecule comprising one or more siRNAs, such as for example and not limitation, siRNAs targeting checkpoint blockade genes (e.g., PD-1, CTLA-4) or therapeutic genes (e.g., Ppp2r2d, Cblb, Dgka, Dgkz, Ptpn2, Smad2, Socs1, Socs3 or Egr2). Another exemplary multiplexed system comprises synthetic switch that is activated by one of the stimuli described herein and is operably linked to a genome editing or modifying protein, such as Cas9 or a Cas9 variant including dCas9-VP64, such that activation of IL-2 in response to the stimulus is enabled.

Example 6. Further Examples of Heterologous Genes for Use in Synthetic Switches

Intracellular Targets.

Using a Cas9 or other genome editing platform, engineered intratumoral cells could be induced to upregulate or downregulate entire libraries of genes to determine the best combination of gene targets for tumor regression. Furthermore, by switching out the variant of Cas9 that is operably linked to the synthetic switch (such as for example and not limitation, Cas9, dCas9, KRAB-dCas9, dCas9-VP64, Dnmt-dCas9, Tet-dCas9), it is possible to also alter the type of modulation that occurs. For example, the use of a different variant of dCas9 fused to a transcriptional activator (e.g., VP64) could instead activate endogenous target genes. Additionally, the use of Dnmt-dCas9 and Tet-dCas9 could allow the regulatable methylation and demethylation of histones, respectively, enabling control of broad epigenetic states. In some embodiments, the synthetic switch is operably linked to a genome editing or modifying protein, such as for example and not limitation, CRISPR, Cas9 or a variant thereof, Argonaut, and/or a nuclease.

Other intracellular protein targets include, for example and not limitation, transcription factors such as the Yamanaka Factors (Oct3/4, Sox2, Klf4, c-Myc) for induced pluripotency, HIF-1α for enhanced injury response, and tissue-specific factors such as Shox2. Multiplexed systems allowing inducible expression of these genes could be introduced into macrophages to skew the local environment at a wound site towards an M2 phenotype for improved healing; additionally, the controlled reprogramming of cardiomyocytes into pacemaker cells via Shox2 expression represents a valuable capability for the field of cardiac engineering. Finally, transferases the class of enzymes that catalyze the transfer of chemical groups represent another target that could have significant impact as these enzymes transmit molecular signals that determine the cell's phenotype, either by epigenetics or modifying endogenous factors in the cell.

Membrane-Bound Targets.

Proteins embedded in the cell membrane may be targeted to allow precise control of cellular behavior. These include, for example and not limitation, signaling molecules which allow cells to sense and react to their surroundings such as chimeric antigen receptors (CARs), transgenic T Cell Receptors (TCRs), or inhibitory receptors (e.g., CTLA-4 and PD-1) in engineered lymphocytes. Structural proteins, such as for example and not limitation, VE-cadherin, claudin-5, occludin, and cx43 may also be upregulated in engineered vascular endothelial cells to bolster vascular integrity during sepsis or downregulated to temporarily increase diffusion across the blood-brain barrier (BBB). Other non-limiting exemplary applications include the modulation of transport proteins such as, e.g., the insulin receptor, transferrin receptor, GLUT1, or LAT1 to alter the exchange of select molecules across the BBB.

Secreted Targets.

Another class of target genes and proteins include those which are secreted or isolated from cells during manufacturing and are often used as, or are targeted by, biologic drugs. These include, for example and not limitation, antibodies, cytokines, chemokines, and other recombinant therapeutics such as Bispecific T cell Engagers (BiTEs). Many of these therapeutic biologics target natural epitopes such as CD19 on cells (rituximab), cancer-specific mutations (trastuzumab), or other proteins such as C5a, and broad classes include costimulatory blockade (CTLA-4 Ig, αCD40, αCD25 antibodies) or checkpoint inhibitors (αCTLA-4, PD-1, PD-L1). All such biologic drugs represent genes that can be incorporated into the synthetic bioswitches for localized synthesis at a targeted area. For example, Tumor Infiltrating Lymphocytes (TILs) represent natural vehicles for trafficking into tumor sites and could be used to more precisely target immuno-oncology agents. Additionally, engineered cells that home to organ transplants could help prevent rejection by locally expressing immunosuppresive drugs such as beletacept.

LIST OF EXEMPLARY EMBODIMENTS

Embodiment 1

A nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus.

Embodiment 2

The nucleic acid molecule of embodiment 1, wherein the synthetic bioswitch has no activity to normal basal activity in the absence of the single stimulus.

Embodiment 3

The nucleic acid molecule of embodiments 1 or 2, wherein the synthetic bioswitch has high activity in the presence of the single stimulus.

Embodiment 4

The nucleic acid molecule of any of embodiments 1-3, wherein the synthetic bioswitch has a strong induction or activation.

Embodiment 5

The nucleic acid molecule of any of embodiments 1-4, wherein the synthetic bioswitch has no activity to normal basal activity with an orthogonal stimulus.

Embodiment 6

A nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus, wherein the synthetic bioswitch has no activity to normal basal activity in the absence of the single stimulus, wherein the synthetic bioswitch has high activity in the presence of the single stimulus, wherein the synthetic bioswitch has a strong induction or activation, and wherein the synthetic bioswitch has no activity to normal basal activity with an orthogonal stimulus.

Embodiment 7

A nucleic acid molecule comprising: a synthetic bioswitch; and a heterologous nucleic acid, wherein the synthetic bioswitch is operably linked to the heterologous nucleic acid and comprises one or more heat shock elements (HSEs) that are collectively regulated by heat such that the synthetic bioswitch is regulated by heat, wherein the synthetic bioswitch has no activity to normal basal activity in the absence of heat, wherein the synthetic bioswitch has high activity in the presence of heat, wherein the synthetic bioswitch has a strong induction or activation, and wherein the synthetic bioswitch has no activity to normal basal activity with an orthogonal stimulus.

Embodiment 8

A nucleic acid molecule comprising: a synthetic bioswitch; and a heterologous nucleic acid, wherein the synthetic bioswitch is operably linked to the heterologous nucleic acid and comprises one or more hypoxia responsive elements (HSRs) that are collectively regulated by hypoxia such that the synthetic bioswitch is regulated by hypoxia, wherein the synthetic bioswitch has no activity to normal basal activity in a non-hypoxic environment, wherein the synthetic bioswitch has high activity in a hypoxic environment, wherein the synthetic bioswitch has a strong induction or activation, and wherein the synthetic bioswitch has no activity to normal basal activity with an orthogonal stimulus.

Embodiment 9

A nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus, wherein the synthetic bioswitch has no activity to normal basal activity in the absence of the single stimulus, wherein the synthetic bioswitch has high activity in the presence of the single stimulus, wherein the synthetic bioswitch has a strong induction or activation, wherein the synthetic bioswitch has no activity to normal basal activity with an orthogonal stimulus, and wherein the synthetic bioswitch comprises a nucleic acid sequence selected from the group consisting of SEQ ID NOs 1, 2, 3, 4, 5, 6, 7, 8, 32, 33, 34, 35, 36, and 37 and nucleic acid sequences having at least 95% identity to one of SEQ ID NOs 1, 2, 3, 4, 5, 6, 7, 8, 32, 33, 34, 35, 36, and 37.

Embodiment 10

A nucleic acid molecule comprising: a synthetic bioswitch; and a heterologous nucleic acid, wherein the synthetic bioswitch is operably linked to the heterologous nucleic acid and comprises one or more control elements that are collectively regulated by a single stimulus such that the synthetic bioswitch is regulated by the single stimulus, wherein the synthetic bioswitch has no activity to normal basal activity in the absence of the single stimulus, wherein the synthetic bioswitch has high activity in the presence of the single stimulus, wherein the synthetic bioswitch has a strong induction or activation, wherein the synthetic bioswitch has no activity to normal basal activity with an orthogonal stimulus, and wherein the at least one control element has a nucleic acid sequence selected from the group consisting of SEQ ID NOs 9, 10, 11, 12, 13, 14, 15, 16, 17, 18, 19, 20, 21, 22, 23, 24, 25, 26, 27, 28, 29, 30, 31, 38, 39, 40, 41, 42, and 43 and nucleic acid sequences having at least 80% identity to one of SEQ ID NOs 9, 10, 11, 12, 13, 14, 15, 16, 17, 18, 19, 20, 21, 22, 23, 24, 25, 26, 27, 28, 29, 30, 31, 38, 39, 40, 41, 42, and 43.

Embodiment 11

The nucleic acid molecule of any of embodiments 1-10, further comprising at least a second nucleic acid molecule which comprises: a second synthetic bioswitch; and a second heterologous nucleic acid, wherein the second synthetic bioswitch is operably linked to the second heterologous nucleic acid and comprises one or more control elements that are collectively regulated by a second single stimulus such that the second bioswitch is regulated by the second single stimulus, and wherein the combination of the first nucleic acid molecule and the second nucleic acid molecule enable differential regulation of the expression of the first heterologous nucleic acid and the second heterologous nucleic acid in response to the first single stimulus and the second single stimulus.

Embodiment 12

The nucleic acid molecule of any of embodiments 1-10, further comprising at least a second nucleic acid molecule which comprises: a second synthetic bioswitch; and the first heterologous nucleic acid, wherein the second synthetic bioswitch is operably linked to the first heterologous nucleic acid and comprises one or more control elements that are collectively regulated by a second single stimulus such that the second bioswitch is regulated by the second single stimulus, and wherein the combination of the first nucleic acid molecule and the second nucleic acid molecule enable differential regulation of the expression of the first heterologous nucleic acid in response to the first single stimulus and the second single stimulus.

Embodiment 13

The nucleic acid molecule of any of embodiments 1-12, wherein the second synthetic bioswitch has no activity to normal basal activity in the absence of the second single stimulus, wherein the second synthetic bioswitch has high activity in the presence of the second single stimulus, wherein the second synthetic bioswitch has a strong induction or activation, and wherein the second synthetic bioswitch has no activity to normal basal activity with an orthogonal stimulus.

Embodiment 14

The nucleic acid molecule of any of embodiments 1-13, wherein the synthetic bioswitch (and optionally the second bioswitch if present) further comprises a spacer region between the last control element and the heterologous nucleic acid.

Embodiment 15

The nucleic acid molecule of embodiment 14, wherein the spacer region comprises an untranslated region.

Embodiment 16

The nucleic acid molecule of embodiment 15, wherein the untranslated region has a length between 1 to 500 nucleotides.

Embodiment 17

The nucleic acid molecule of embodiment 16, wherein the untranslated region comprises at least one regulatory element.

Embodiment 18

The nucleic acid molecule of embodiment 17, wherein the at least one regulatory element comprises a binding site for one or more of E2F, Ik-2, LXRalpha:RXRalpha, TBP, TBX5, AR, ELF1, Nkx3A, SPI1, CDX-2, SOX10, Kid3, MAFB, IRF-7, RXR::RAR, UNR, and/or Mushashi.

Embodiment 19

The nucleic acid molecule of any of embodiments 14-18, wherein the spacer region comprises one or more of upstream AUGs, upstream open reading frames (uORFs), and internal ribosomal entry sites (IRES).

Embodiment 20

The nucleic acid molecule of any of embodiments 1-19, wherein the heterologous nucleic acid comprises genes that encode biologically active proteins or biological therapeutics, or nucleic acids that enable the manipulation of physiologic or genetic processes and/or protein expression in live cells.

Embodiment 21

The nucleic acid molecule of embodiment 20, wherein the heterologous nucleic acid is selected from the group consisting of genome editing or modifying proteins (e.g., CRISPR/Cas9 and any variant of CRISPR [e.g., catalytically inactive Cas9, Cpf1/Cas12, RNA editing Cas13], Argonaut, nucleases such as zinc finger nucleases (ZFNs), transcription activator-like effector nucleases (TALENs), and engineered nucleases and meganucleases); therapeutic antibodies (e.g., Proleukin (Novartis), Yervoy, and Opdivo (BMS); BiTEs; chimeric antigen receptors; transgenic T-cell receptors; transferases (e.g., kinases, phosphotransferases, methylases, etc.); differentiating factors (e.g., Shox 2 for pacemaker cells); Yamanaka factors for induced pluripotency; transcription factors (e.g., HIF1a); structural proteins (e.g., VE-cadherin, claudin-5, occludin, cx43 etc.); transposons (e.g., sleeping beauty); non-coding RNAs (e.g., RNA molecules involved in RNA silencing or RNA interference, e.g., miRNA, siRNA, piRNA), kinases (e.g., insulin receptor, thymidine kinases, HSV-TK and different versions of human thymidine kinase 2) and transport proteins (e.g., transferrin receptor, Glut1, Glut4, Lat1).

Embodiment 22

The nucleic acid molecule of any of embodiments 1-21, wherein the heterologous nucleic acid comprises a chimeric antigen receptor.

Embodiment 23

A vector comprising the nucleic acid molecule of any of embodiments 1-22.

Embodiment 24

The vector of embodiment 23, wherein the vector is selected from the group consisting of an expression vector and a retroviral vector.

Embodiment 25

A cell comprising the nucleic acid molecule of any of embodiments 1-22.

Embodiment 26

A cell comprising the vector of embodiments 23 or 24.

Embodiment 27

The cell of embodiments 25 or 26, wherein the cell is an immune cell, a pancreatic islet cell, a cardiac cell, or a stem cell.

Embodiment 28

The cell of embodiment 27, wherein the immune cell is selected from the group consisting of a T cell, a B cell, a natural killer cell, a dendritic cell, a neutrophil, and a macrophage.

Embodiment 29

The cell of embodiment 28, wherein the stem cell is selected from the group consisting of hematopoietic stem cells (HSCs), mesenchymal stem cells (MSCs), embryonic stem cells, tissue-specific stem cells, and induced pluripotent stem cells).

Embodiment 30

A method of preventing or treating a disease in a patient in need thereof, comprising: administering a therapeutically effective amount of a composition to the patient, wherein the composition is selected from the group consisting of the nucleic acid molecule of any of embodiments 1-22, the vector of embodiments 24 or 25, and the cell of embodiments 25-29, and wherein the composition optionally comprises a second therapeutic agent.

Embodiment 31

The method of embodiment 30, wherein the patient has a cancer or leukemia and the heterologous gene comprises a chimeric antigen receptor that is capable of recognizing the cancer or leukemia.

Embodiment 32

A method of controlling cell differentiation in a patient, comprising: administering a therapeutically effective amount of a composition to the patient, wherein the composition is selected from the group consisting of the nucleic acid molecule of any of embodiments 1-22, the vector of embodiments 24 or 25, and the cell of embodiments 25-29, and wherein the heterologous nucleic acid comprises a genome editing or modifying protein that results in cell differentiation.

Embodiment 33

The method of embodiment 32, wherein the cell is a stem cell or a cardiac cell.

Embodiment 34

The method of embodiment 32, wherein the composition directly or indirectly induces cell differentiation.

Embodiment 35

A method of altering the activity or function of at least one cell in a patient, comprising: administering a therapeutically effective amount of a composition to the patient, wherein the composition is selected from the group consisting of the nucleic acid molecule of any of embodiments 1-22, the vector of embodiments 24 or 25, and the cell of embodiments 25-29, and introducing the appropriate stimulus or stimuli in order to activate the synthetic switches of the nucleic acid molecule.

Embodiment 36

The method of embodiment 35, wherein the amount or concentration of the stimulus or stimuli is continuous or consistent.

Embodiment 37

The method of embodiment 35, wherein the amount or concentration of the stimulus or stimuli are increased or decreased.

Embodiment 38

The method of embodiment 37, wherein the amount or concentration of the stimulus or stimuli are linearly increased or decreased.

Embodiment 39

The method of embodiment 37, wherein the amount or concentration of the stimulus or stimuli are non-linearly increased or decreased.

Embodiment 40

The method of embodiment 39, wherein the amount or concentration of the stimulus or stimuli are increased or decreased in a non-continuous or irregular manner.

Embodiment 41

The method of embodiment 40, wherein the amount or concentration of the stimulus or stimuli are increased or decreased in a pulsatile manner.

Sequence Description

```
Truncated HSPA6 Promoter Construct 1; synthetic bioswitch comprises a truncated
promoter (2622-5702) and a reporter (5709-6266)
                                                                     SEQ ID NO: 1
gtcgacggatcgggagatctcccgatcccctatggtgcactctcagtacaatctgactgatgccgcatagttaagccagtatctgacc ctgcttgtgtgttggaggtcgctgagtagtgcgcgagcaaaatttaagctacaacaaggcaaggcttgaccgacaattgcatgaagaa tctgcttagggttaggcgttttgcgctgatcgcgatgtacgggccagatatacgcgttgacattgattattgactagttattaatagt aatcaattacggggtcattagttcatagcccatatatggagttccgcgttacataacttacggtaaatggcccgcctggctgaccgcc caacgaccccgcccattgacgtcaataatgacgtatgttcccatagtaacgccaatagggactttccattgacgtcaatgggtggag tatttacggtaaactgcccacttggcagtacatcaagtgtatcatatgccaagtacgccccctattgacgtcaatgacggtaaatggc ccgcctggcattatgcccagtacatgaccttatgggactttcctacttggcagtacatctacgtattagtcatcgctattaccatggt gatgcggttttggcagtacatcaatgggcgtggatagcggtttgactcacggggatttccaagtaccaccccattgacgtcaatggga gtttgattggcaccaaaatcaacgggactttccaaaatgtcgtaacaactccgccccattgacgcaaatgggcggtaggcgtgtacgg tgggaggtctatataagcagcgcgttttgcctgtactgggtactctggttagaccagatctgagcctgggagactctggctaactagg gaacccactgcttaagcctcaataaagcttgccttgagtgcttcaagtagtgtgtgcccgtctgttgtgtgactctggtaactagaga tccctcagacccttttagtcagtgtggaaaatctctagcagtggcgcccgaacagggacttgaaagcgaaagggaaaccagaggagac tacgacgcaggactcggcttgctgaagcgcgcacggcaagaggcgaggggcggcgactggtgagtacgccaaaaattttgactagcgg aggctagaaggagagagatgggtgcgagagcgtcagtattaagcgggggagaattagatcgcgatgggaaaaaattcggttaaggcca gggggaagaaaaaatataaattaaaacatatagtatgggcaagcagggagctagaacgattcgcagttaatcctggcctgttagaaa catcagaaggctgtagacaaatactgggacagctacaaccatccatcagacaggatcagaagaacttagatcattatataatacagta gcaaccactattgtgtgcatcaaaggatagagataaaagacaccaaggaagctttagacaagatagaggaagagcaaaacaaaagtaa gaccaccgcacagcaagcggccggccgcgctgatcttcagacctggaggaggagatatgagggacaattggagaagtgaattatataa atataaagtagtaaaaattgaaccattaggagtagcacccaccaaggcaaagagaagagtggtgcagagagaaaaaagagcagtggga ataggagctttgttccttgggttcttgggagcagcaggaagcactatgggcgcagcgtcaatgacgctgacggtacaggccagacaat tattgtctggtatagtgcagcagcagaacaatttgctgagggctattgaggcgcaacagcatctgttgcaactcacagtctggggcat caagcagaccaggcaagaatcctggctgtggaaagatacctaaaggatcaacagctcctggggatttggggttgactggaaaactcat ttgcaccactgctgtgccttggaatgctagttggagtaataaatctctggaacagatttggaatcacacgacctggatggagtgggac agagaaattaacaattacacaagcttaatacactccttaattgaagaatcgcaaaaccagcaagaaaagaatgaacaagaattattgg aattagataaatgggcaagtttgtggaattggtttaacataacaaattggctgtggtatataaaattattcataatgatagtaggagg cttggtaggtttaagaatagtttttgctgtactttctatagtgaatagagttaggcagggatattcaccattatcgtttcagaccac ctcccaaccccgaggggacccgacaggcccgaaggaatagaagaagaaggtggagagagagacagagacagatccattcgattagtga acggatcggcactgcgtgcgccaattctgcagacaaatggcagtattcatccacaattttaaaagaaaaggggggattgggggtaca gtgcaggggaaagaatagtagacataatagcaacagacatacaaactaaagaattacaaaaacaaattacaaaaattcaaaattttcg ggtttattacagggacagcagagatccagtttggttagtaccgggcccgctctagatcatcttgaattcccacaacacatgggaggga cccagtggaaggtaactgaatcatggggcaggtcttttcccatgctgttcttgtgatagtgaataagtctcatgagatctgatggtttt aaaaaggggagtttccctgcacaagctctctcttctcttgtttgccaccatgtgagacatgactttcacctttgccatgattgtgag
```

-continued

```
gcctcccagccacgtggaactgtaagtccattaaacctctttatttgtaaattgcccgtctcaggtatgtattattagcagtgtgag aatgggctaacacatacaacttgcttttttttttgtactcaatattgagtcgtgagattgcaccacattagaatgtctatttaagtcat tactttaaggtcggttctattttaaagctactcaaactaagctactaaacataagtggatatatttaagtgtatgtataaaatttat actaggccagctgcagtggctcatgcctgtaatcccaaagctgtggaaggtagaggtgggactgattgaggccacggagttcaaggctg cagtgagctgtgattgcatcactgtactccagcctgagggacagagcaggaaccagaaaaaaataaaataaaaagaaacaaacaaaaa aaccccccaacaaccctacagtggctcttttagaaaaaacaaacaaacaaaaccaaaactgtactgcatgcataagctcccctatgcta tgtttgaaccactctgaagagatcaattaaaaagaagtgagtgatattggaagcatgcctctgtgatgctgtggtaacattcataggc tgcgttagggctatgcctgtaactcttggagatgagtgggtaagtggggttttgaggtggctgggggctggaagagaaggttggagga gcccacacaagacagccccttaacacgccggggcacagaaccccaggctgggccaacttttccctgctgaggtgaagacccgtctctt gcaggccgttggcaaatgtcttgactctggcatccaggtgtgaccagatagaccctgagagtgagtgaatttaaagttgacagatatt ccttttggaattatgaaataggttacttcttttcaaggacagtttgattttccactgtgtaagtcatatattgcacatttctttaaa cattcccttttttcctgaactgatcaccttaccagtacggctgatcctctcaagcagcaaactctaccagctgtcactggtgctctcg gagagacgattaaccaaggaacccagcccgggaacagtactgacctctacttctggactcctgcctccctcttaaaaagtcccttgaa cttcctagtgggttctaacctgtcaaaggagaaaatagccatctatggagtaagggtttttagtttctattttacaaatggaagtttc ctctgaatcaggcaagtaacgttaaatagaagccaacttttaagtttctctaacacactgctaaattgtaacaccagactgtaccaca tactctccagctgccagctattgcagttgccatccttgttactatagtggtgagtatctctgcctgtcatgcgtgagagaggggtcg attccccgacggggaggtcacgggaaattgtgtgaggattttgtcaaccttcagaagtctcagaaatgtctccttgttttggctttca gcggaaatccgaacgccagcagatctgaatggaatgttctggattgaagaaagtgggaaatggcctcaattcacaaagtcacaacctg ataaaaaccagtgtgactttactgcccagtgaacccatctcgtcctccagcctttaggaggtaggttggactggagcctgcagtagtt tactctccacctgagtcctggtctccagctgggaacccacttaggccataaagaaaaacgcacactgtgcctctccaccgggcctctg gagacgaggctcctcggggatacaaacagtggggagaacatgagggacatcccgaccgtactctgcgtcctccttccccaggtgttgc gttctctcttgggctgagtggcgaggtctctcccgagtcccagggccacagtgcaatgtcacatctcctttgtggaaagtgactggta aaggagagaacaaaactggaggaatgtaaagtatcagccacctggtttaatttattcaagagtgattaatcctagatgagaaaaag aattgaaatggatcggaaaaaaatgaaagtgcattggccgggaatcgaacccgggcctcccgcgtggcaggcgagaattctaccactg aaccaccaatgctactgtcagctaaagacctgcagtattgtctcttaaagctcactatctctggccattcactaaggaaccaggcacc gtataaatcgcggtttggaaaatattttgttcaagataaaactgttttaagatacgtgtatatatcttatatatctgtattcgcat ggtaacatatcttcggccttcctgagccgctgggctctcagcggcctccaaggcagcccgcaggcccctgtgtgcctcagggatccg acctcccacagccccggggagaccttgcctctaaagttgctgcttttgcagcctctgccacaaccgcgcgtcctcagagccagcccgg aggagctagaaccttccccgcatttctttcagcagcctgagtcagaggcgggctggcctggcgtagccgcccagcctcgcggctcatg ccccgatctgcccgaaccttctcccggggtcagcgccgcgccgcgccacccggctgagtcagcccgggcgggcgagaggctctcaact gggcgggaaggtgcgggaaggtgcggaaaggttcgcgaaagttcgcggcggcgggggtcgggtgaggcgcaaaaggataaaaagcccg tggaagcggagctgagcagatccgagccgggctggctgcagagaaaccgcagggagagcctcactgctgagcgcccctcgacggcgga gcggcagcagcctccgtggcctccagcatccgacaagaagatcagccaccggtatgggagtcaaagttctgtttgccctgatctgcat cgctgtggccgaggccaagcccaccgagaacaacgaagacttcaacatcgtggccgtggccagcaacttcgcgaccacggatctcgat gctgaccgcgggaagttgcccggcaagaagctgccgctggaggtgctcaaagagatggaagccaatgcccggaaagctggctgcacca ggggctgtctgatctgcctgtcccacatcaagtgcacgcccaagatgaagaagttcatcccaggacgctgccacacctacgaaggcga caaagagtccgcacagggcggcataggcgaggcgatcgtcgacattcctgagattcctgggttcaaggacttggagcctatggagcag ttcatcgcacaggtcgatctgtgtgtggactgcacaactggctgcctcaaagggcttgccaacgtgcagtgttctgacctgctcaaga agtggctgccgcaacgctgtgcgacctttgccagcaagatccagggccaggtggacaagatcaagggggccggtggtgactaactcga ggtcgacggtatcgataagctcgcttcacgagattccagcaggtcgagggacctaataacttcgtatagcatacattatacgaagtta
```

-continued

```
tattaagggttccaagcttaagcggccgctgaaagaccccacctgtaggtttggcaagctagctgcagtaacgccattttgcaaggca tggaaaaataccaaaccaagaatagagaagttcagatcaagggcgggtacatgaaaatagctaacgttgggccaaacaggatatctgc ggtgagcagtttcggccccggcccggggccaagaacagatggtcaccgcagtttcggccccggcccgaggccaagaacagatggtccc cagatatggcccaaccctcagcagtttcttaagacccatcagatgtttccaggctccccaaggacctgaaatgaccctgcgccttat ttgaattaaccaatcagcctgcttctcgcttctgttcgcgcgcttctgcttcccgagctctataaaagagctcacaacccctcactcg gcgcgccagtcctccgattgactgagtcgcccggatcccgccaccatggtgagcaagggcgaggaggataacatggccatcatcaagg agttcatgcgcttcaaggtgcacatggagggctccgtgaacggccacgagttcgagatcgagggcgagggcgagggccgcccctacga gggcacccagaccgccaagctgaaggtgaccaagggtggccccctgcccttcgcctgggacatcctgtccctcagttcatgtacggc tccaaggcctacgtgaagcaccccgccgacatccccgactacttgaagctgtccttccccgagggcttcaagtgggagcgcgtgatga acttcgaggacggcggcgtggtgaccgtgacccaggactcctccctgcaggacggcgagttcatctacaaggtgaagctgcgcggcac caacttcccctccgacggccccgtaatgcagaagaagaccatgggctgggaggcctcctccgagcggatgtaccccgaggacggcgcc ctgaagggcgagatcaagcagaggctgaagctgaaggacggcggccactacgacgctgaggtcaagacccctacaaggccaagaagc ccgtgcagctgcccggcgcctacaacgtcaacatcaagttggacatcacctcccacaacgaggactacaccatcgtggaacagtacga acgcgccgagggccgccactccaccggcggcatggacgagctgtacaagtaagaattcgtcgagggacctaataacttcgtatagcat acattatacgaagttatacatgtttaagggttccggttccactaggtacaattcgatatcaagcttatcgataatcaacctctggatt acaaaatttgtgaaagattgactggtattcttaactatgttgctccttttacgctatgtggatacgctgctttaatgcctttgtatca tgctattgcttcccgtatggctttcattttctcctccttgtataaatcctggttgctgtctctttatgaggagttgtggcccgttgtc aggcaacgtggcgtggtgtgcactgtgtttgctgacgcaaccccactggttggggcattgccaccacctgtcagctcctttccggga ctttcgctttccccctccctattgccacggcggaactcatcgccgcctgccttgcccgctgctggacagggctcggctgttgggcac tgacaattccgtggtgttgtcggggaaatcatcgtcctttccttggctgctcgcctgtgttgccacctggattctgcgcgggacgtcc ttctgctacgtcccttcggccctcaatccagcggaccttccttcccgcggcctgctgccggtctgcgggctcttccgcgtcttcgcc ttcgccctcagacgagtcggatctcccttttgggccgcctccccgcatcgataccgtcgacctcgatcgagacctagaaaaacatggag caatcacaagtagcaatacagcagctaccaatgctgattgtgcctggctagaagcacaagaggaggaggaggtgggttttccagtcac acctcaggtacctttaagaccaatgacttacaaggcagctgtagatcttagccacttttaaaagaaaaggggggactggaagggcta attcactcccaacgaagacaagatatccttgatctgtggatctaccacacacaaggctacttccctgattggcagaactacacaccag ggccagggatcagatatccactgacctttggatggtgctacaagctagtaccagttgagcaagagaaggtagaagaagccaatgaagg agagaacacccgcttgttacaccctgtgagcctgcatgggatggatgacccggagagagaagtattagagtggaggtttgacagccgc ctagcatttcatcacatggcccgagagctgcatccggactgtactgggtctctctggttagaccagatctgagcctgggagctctctg gctaactagggaacccactgcttaagcctcaataaagcttgccttgagtgcttcaagtagtgtgtgcccgtctgttgtgtgactctgg taactagagatccctcagaccctttagtcagtgtggaaaatctctagcagcatgtgagcaaaaggccagcaaaaggccaggaaccgt aaaaaggccgcgttgctggcgtttttccataggctccgcccccctgacgagcatcacaaaaatcgacgctcaagtcagaggtggcgaa acccgacaggactataaagataccaggcgtttccccctggaagctccctcgtgcgctctcctgttccgaccctgccgcttaccggata cctgtccgcctttctcccttcgggaagcgtggcgctttctcatagctcacgctgtaggtatctcagttcggtgtaggtcgttcgctcc aagctgggctgtgtgcacgaaccccccgttcagcccgaccgctgcgccttatccggtaactatcgtcttgagtccaacccggtaagac acgacttatcgccactggcagcagccactggtaacaggattagcagagcgaggtatgtaggcggtgctacagagttcttgaagtggtg gcctaactacggctacactagaagaacagtatttggtatctgcgctctgctgaagccagttaccttcggaaaaagagttggtagctct tgatccggcaaacaaaccaccgctggtagcggtggtttttttgtttgcaagcagcagattacgcgcagaaaaaaggatctcaagaag atcctttgatcttttctacggggtctgacgctcagtggaacgaaaactcacgttaagggattttggtcatgagattatcaaaaaggat cttcacctagatcctttttaaattaaaaatgaagttttaaatcaatctaaagtatatatgagtaaacttggtctgacagttaccaatgc ttaatcagtgaggcacctatctcagcgatctgtctatttcgttcatccatagttgcctgactccccgtcgtgtagataactacgatac gggagggcttaccatctggccccagtgctgcaatgataccgcgagacccacgctcaccggctccagatttatcagcaataaaccagcc
```

-continued

```
agccggaagggccgagcgcagaagtggtcctgcaactttatccgcctccatccagtctattaattgttgccgggaagctagagtaagt
agttcgccagttaatagtttgcgcaacgttgttgccattgctacaggcatcgtggtgtcacgctcgtcgtttggtatggcttcattca
gctccggttcccaacgatcaaggcgagttacatgatcccccatgttgtgcaaaaaagcggttagctccttcggtcctccgatcgttgt
cagaagtaagttggccgcagtgttatcactcatggttatggcagcactgcataattctcttactgtcatgccatccgtaagatgcttt
tctgtgactggtgagtactcaaccaagtcattctgagaatagtgtatgcggcgaccgagttgctcttgcccggcgtcaatacgggata
ataccgcgccacatagcagaactttaaaagtgctcatcattggaaaacgttcttcggggcgaaaactctcaaggatcttaccgctgtt
gagatccagttcgatgtaacccactcgtgcacccaactgatcttcagcatcttttactttcaccagcgtttctgggtgagcaaaaaca
ggaaggcaaaatgccgcaaaaaagggaataagggcgacacggaaatgttgaatactcatactcttcctttttcaatattattgaagca
tttatcagggttattgtctcatgagcggatacatatttgaatgtatttagaaaaataaacaaatagggggttccgcgcacatttccccg
aaaagtgccacctgac
```

Truncated HSPA6 Promoter Construct 2; synthetic bioswitch comprises a truncated
promoter (2622-3970) and a reporter (3977-4534)
SEQ ID NO: 2

```
gtcgacggatcgggagatctcccgatcccctatggtgcactctcagtacaatctgctctgatgccgcatagttaagccagtatctgct
ccctgcttgtgtgttggaggtcgctgagtagtgcgcgagcaaaatttaagctacaacaaggcaaggcttgaccgacaattgcatgaag
aatctgcttagggttaggcgttttgcgctgcttcgcgatgtacgggccagatatacgcgttgacattgattattgactagttattaat
agtaatcaattacggggtcattagttcatagcccatatatggagttccgcgttacataacttacggtaaatggcccgcctggctgacc
gcccaacgaccccgcccattgacgtcaataatgacgtatgttcccatagtaacgccaataggactttccattgacgtcaatgggtg
gagtatttacggtaaactgcccacttggcagtacatcaagtgtatcatatgccaagtacgccccctattgacgtcaatgacggtaaat
ggcccgcctggcattatgcccagtacatgaccttatgggactttcctacttggcagtacatctacgtattagtcatcgctattaccat
ggtgatgcggttttggcagtacatcaatgggcgtggatagcggtttgactcacggggatttccaagtctccaccccattgacgtcaat
gggagtttgttttggcaccaaaatcaacgggactttccaaaatgtcgtaacaactccgccccattgacgcaaatgggcggtaggcgtg
tacggtgggaggtctatataagcagcgcgttttgcctgtactgggtctctctggttagaccagatctgagcctgggagctctctggct
aactagggaacccactgcttaagcctcaataaagcttgccttgagtgcttcaagtagtgtgtgcccgtctgttgtgtgactctggtaa
ctagagatccctcagacccttttagtcagtgtggaaaatctctagcagtggcgcccgaacagggacttgaaagcgaaagggaaaccag
aggagctctctcgacgcaggactcggcttgctgaagcgcgcacggcaagaggcgaggggcggcgactggtgagtacgccaaaaatttt
gactagcggaggctagaaggagagagatgggtgcgagagcgtcagtattaagcggggagaattagatcgcgatgggaaaaaattcgg
ttaaggccaggggggaaagaaaaaatataaattaaaacatatagtatgggcaagcagggagctagaacgattcgcagttaatcctggcc
tgttagaaacatcagaaggctgtagacaaatactgggacagctacaaccatccatcagacaggatcagaagaacttagatcattatat
aatacagtagcaaccctctattgtgtgcatcaaaggatagagataaaagacaccaaggaagctttagacaagatagaggaagagcaaa
acaaaagtaagaccaccgcacagcaagcggccggccgcgctgatcttcagacctggaggaggagatatgagggacaattggagaagtg
aattatataaatataaagtagtaaaaattgaaccattaggagtagcacccaccaaggcaaagagaagagtggtgcagagagaaaaaag
agcagtgggaataggagctttgttccttgggttcttgggagcagcaggaagcactatgggcgcagcgtcaatgacgctgacggtacag
gccagacaattattgtctggtatagtgcagcagcagaacaatttgctgagggctattgaggcgcaacagcatctgttgcaactcacag
tctgggcatcaagcagctccaggcaagaatcctggctgtggaaagatacctaaaggatcaacagctcctggggatttggggttgctc
tggaaaactcatttgcaccactgctgtgccttggaatgctagttggagtaataaatctctggaacagatttggaatcacacgacctgg
atggagtgggacagagaaattaacaattacacaagataatacactccttaattgaagaatcgcaaaaccagcaagaaaagaatgaaca
agaattattggaattagataaatgggcaagtttgtggaattggtttaacataacaaattggctgtggtatataaaattattcataatg
atagtaggaggcttggtaggtttaagaatagttttctgtgtactttctatagtgaatagagttaggcagggatattcaccattatcgt
ttcagacccacctcccaaccccgaggggacccgacaggcccgaaggaatagaagaagaaggtggagagagagacagagacagatccat
tcgattagtgaacggatcggcactgcgtgcgccaattctgcagacaaatggcagtattcatccacaattttaaaagaaaaggggggat
tgggggtacagtgcaggggaaagaatagtagacataatagcaacagacatacaaactaaagaattacaaaaacaaattacaaaaatt
```

-continued

```
caaaattttcgggtttattacagggacagcagagatccagtttggttagtaccgggcccgctctagagatctgaatggaatgttctgg attgaagaaagtgggaaatggcctcaattcacaaagtcacaacctgataaaaaccagtgtgactttactgcccagtgaacccatctcg tcctccagcctttaggaggtaggttggactggagcctgcagtagtttactctccacctgagtcctggtctccagctgggaacccactt aggccataaagaaaaacgcacactgtgcctctccaccgggcctctggagacgaggctcctcggggatacaaacagtggggagaacatg agggacatcccgaccgtactctgcgtcctcctttcccaggtgttgcgttctctcttgggctgagtggcgaggtctctcccgagtccca gggccacagtgcaatgtcacatctcctttgtggaaagtgactggtaaaggagagagaacaaaactggaggaatgtaaagtcttcagcc acctggtttaatttattcaagagtgattaatcctagatgagaaaaagaattgaaatggatcggaaaaaaatgaaagtgcattggccgg gaatcgaacccgggcctcccgcgtggcaggcgagaattctaccactgaaccaccaatgctactgtcagctaaagacctgcagtattgt ctcttaaagctcactatctctggccattcactaaggaaccaggcaccgtataaatcgcggtttggaaaatattttgttcaagataaaa ctgttttaagatatacgtgtatatatcttatatatctgtattcgcatggtaacatatcttcggccttcctgagccgctgggctctcag cggccctccaaggcagcccgcaggccctgtgtgcctcagggatccgacctcccacagcccggggagaccttgcctctaaagttgct gcttttgcagcctctgccacaaccgcgcgtcctcagagccagcccggaggagctagaaccttccccgcatttctttcagcagcctgag tcagaggcgggctggcctggcgtagccgcccagcctcgcggctcatgccccgatctgcccgaaccttctcccggggtcagcgccgcgc cgcgccaccggctgagtcagcccgggcgggcgagaggctctcaactgggcgggaaggtgcgggaaggtgcggaaaggttcgcgaaag ttcgcggcggcgggggtcgggtgaggcgcaaaaggataaaaagcccgtggaagcggagctgagcagatccgagccgggctggctgcag agaaaccgcagggagagcctcactgctgagcgcccctcgacggcggagcggcagcagcctccgtggcctccagcatccgacaagaagc ttcagccaccggtatgggagtcaaagttctgtttgccctgatctgcatcgctgtggccgaggccaagcccaccgagaacaacgaagac ttcaacatcgtggccgtggccagcaacttcgcgaccacggatctcgatgctgaccgcgggaagttgcccggcaagaagctgccgctgg aggtgctcaaagagatggaagccaatgcccggaaagctggctgcaccaggggctgtctgatctgcctgtcccacatcaagtgcacgcc caagatgaagaagttcatcccaggacgctgccacacctacgaaggcgacaaagagtccgcacagggcggcataggcgaggcgatcgtc gacattcctgagattcctgggttcaaggacttggagcctatggagcagttcatcgcacaggtcgatctgtgtgtggactgcacaactg gctgcctcaaagggcttgccaacgtgcagtgttctgacctgctcaagaagtggctgccgcaacgctgtgcgacctttgccagcaagat ccagggccaggtggacaagatcaagggggccggtggtgactaactcgaggtcgacggtatcgataagctcgcttcacgagattccagc aggtcgagggacctaataacttcgtatagcatacattatacgaagttatattaagggttccaagcttaagcggccgctgaaagacccc acctgtaggtttggcaagctagctgcagtaacgccatttttgcaaggcatggaaaaataccaaaccaagaatagagaagttcagatcaa gggcgggtacatgaaaatagctaacgttgggccaaacaggatatctgcggtgagcagtttcggccccggcccggggccaagaacagat ggtcaccgcagtttcggccccggcccgaggccaagaacagatggtccccagatatggcccaaccctcagcagtttcttaagacccatc agatgtttccaggctcccccaaggacctgaaatgaccctgcgccttatttgaattaaccaatcagcctgcttctcgcttctgttcgcg cgcttctgcttcccgagctctataaaagagctcacaaccccctcactcggcgcgccagtcctccgattgactgagtcgcccggatcccg ccaccatggtgagcaagggcgaggaggataacatggccatcatcaaggagttcatgcgcttcaaggtgcacatggagggctccgtgaa cggccacgagttcgagatcgagggcgagggcgagggccgcccctacgagggcacccagaccgccaagctgaaggtgaccaagggtggc cccctgcccttcgcctgggacatcctgtccctcagttcatgtacggctccaaggcctacgtgaagcaccccgccgacatccccgact acttgaagctgtccttccccgagggcttcaagtgggagcgcgtgatgaacttcgaggacggcggcgtggtgaccgtgacccaggactc ctccctgcaggacggcgagttcatctacaaggtgaagctgcgcggcaccaacttcccctccgacggccccgtaatgcagaagaagacc atgggctgggaggcctcctccgagcggatgtaccccgaggacggcgccctgaagggcgagatcaagcagaggctgaagctgaaggacg gcggccactacgacgctgaggtcaagaccacctacaaggccaagaagcccgtgcagctgcccggcgcctacaacgtcaacatcaagtt ggacatcacctcccacaacgaggactacaccatcgtggaacagtacgaacgcgccgagggccgccactccaccggcggcatggacgag ctgtacaagtaagaattcgtcgagggacctaataacttcgtatagcatacattatacgaagttatacatgtttaagggttccggttcc actaggtacaattcgatatcaagcttatcgataatcaacctctggattacaaaatttgtgaaagattgactggtattcttaactatgt tgctccttttacgctatgtggatacgctgctttaatgcctttgtatcatgctattgcttcccgtatggctttcattttctcctccttg
```

-continued tataaatcctggttgctgtctattatgaggagttgtggcccgttgtcaggcaacgtggcgtggtgtgcactgtgtttgctgacgcaac
ccccactggttggggcattgccaccacctgtcagctccttccgggactttcgctttccccctcccattgccacggcggaactcatc
gccgcctgccttgcccgctgctggacaggggctcggctgttgggcactgacaattccgtggtgttgtcggggaaatcatcgtcctttc
cttggctgctcgcctgtgttgccacctggattctgcgcgggacgtccttctgctacgtccttcggccctcaatccagcggaccttcc
ttcccgcggcctgctgccggctctgcggctcttccgcgtcttcgccttcgccctcagacgagtcggatctccctttgggccgcctcc
ccgcatcgataccgtcgacctcgatcgagacctagaaaaacatggagcaatcacaagtagcaatacagcagctaccaatgctgattgt
gcctggctagaagcacaagaggaggaggaggtgggttttccagtcacacctcaggtacctttaagaccaatgacttacaaggcagctg
tagatcttagccacttttaaaagaaaaggggggactggaagggctaattcactcccaacgaagacaagatatccttgatctgtggat
ctaccacacaaggctacttccctgattggcagaactacacaccagggccaggatcagatatccactgacctttggatggtgctac
aagctagtaccagttgagcaagagaaggtagaagaagccaatgaaggagagaacaccgcttgttacaccctgtgagcctgcatggga
tggatgacccggagagaagtattagagtggaggtttgacagccgcctagcatttcatcacatggcccgagagctgcatccggactg
tactgggtctctctggttagaccagatctgagcctgggagctctctggctaactagggaacccactgcttaagcctcaataaagcttg
ccttgagtgcttcaagtagtgtgtgcccgtctgttgtgtgactctggtaactagagatccctcagaccccttttagtcagtgtggaaaa
tctctagcagcatgtgagcaaaaggccagcaaaaggccaggaaccgtaaaaaggccgcgttgctggcgttttccataggctccgccc
ccctgacgagcatcacaaaaatcgacgctcaagtcagaggtggcgaaacccgacaggactataaagataccaggcgtttccccctgga
agctccctcgtgcgctctcctgttccgaccctgccgcttaccggatacctgtccgcctttctcccttcgggaagcgtggcgctttctc
atagctcacgctgtaggtatctcagttcggtgtaggtcgttcgctccaagctgggctgtgtgcacgaaccccccgttcagcccgaccg
ctgcgccttatccggtaactatcgtcttgagtccaacccggtaagacacgacttatcgccactggcagcagccactggtaacaggatt
agcagagcgaggtatgtaggcggtgctacagagttcttgaagtggtggcctaactacggctacactagaagaacagtatttggtatct
gcgctctgctgaagccagttaccttcggaaaaagagttggtagctcttgatccggcaaacaaaccaccgctggtagcggtggtttttt
tgtttgcaagcagcagattacgcgcagaaaaaaaggatctcaagaagatcctttgatcttttctacggggtctgacgctcagtggaac
gaaaactcacgttaagggattttggtcatgagattatcaaaaaggatcttcacctagatccttttaaattaaaaatgaagttttaaat
caatctaaagtatatatgagtaaacttggtctgacagttaccaatgcttaatcagtgaggcacctatctcagcgatctgtctatttcg
ttcatccatagttgcctgactccccgtcgtgtagataactacgatacgggagggcttaccatctggccccagtgctgcaatgataccg
cgagacccacgctcaccggctccagatttatcagcaataaaccagccagccggaagggccgagcgcagaagtggtcctgcaactttat
ccgcctccatccagtctattaattgttgccgggaagctagagtaagtagttcgccagttaatagtttgcgcaacgttgttgccattgc
tacaggcatcgtggtgtcacgctcgtcgtttggtatggcttcattcagctccggttcccaacgatcaaggcgagttacatgatccccc
atgttgtgcaaaaaagcggttagctccttcggtcctccgatcgttgtcagaagtaagttggccgcagtgttatcactcatggttatgg
cagcactgcataattctcttactgtcatgccatccgtaagatgcttttctgtgactggtgagtactcaaccaagtcattctgagaata
gtgtatgcggcgaccgagttgctcttgcccggcgtcaatacgggataataccgcgccacatagcagaactttaaaagtgctcatcatt
ggaaaacgttcttcggggcgaaaactctcaaggatcttaccgctgttgagatccagttcgatgtaacccactcgtgcacccaactgat
cttcagcatcttttactttcaccagcgtttctgggtgagcaaaaacaggaaggcaaaatgccgcaaaaaagggaataagggcgacacg
gaaatgttgaatactcatactcttcctttttcaatattattgaagcatttatcagggttattgtctcatgagcggatacatatttgaa
tgtatttagaaaaataaacaaataggggttccgcgcacatttccccgaaaagtgccacctgac Truncated HSPA6 Promoter Construct 3; synthetic bioswitch comprises a truncated
promoter (2622-3388) and a reporter (3395-3952)

SEQ ID NO: 3 gtcgacggatcgggagatctcccgatcccctatggtgcactctcagtacaatctgctctgatgccgcatagttaagccagtatctgct
ccctgcttgtgtgttggaggtcgctgagtagtgcgcgagcaaaatttaagctacaacaaggcaaggcttgaccgacaattgcatgaag
aatctgcttagggttaggcgttttgcgctgcttcgcgatgtacgggccagatatacgcgttgacattgattattgactagttattaat
agtaatcaattacggggtcattagttcatagcccatatatggagttccgcgttacataacttacggtaaatggcccgcctggctgacc
gcccaacgacccccgcccattgacgtcaataatgacgtatgttcccatagtaacgccaataggggactttccattgacgtcaatgggtg -continued

```
gagtatttacggtaaactgcccacttggcagtacatcaagtgtatcatatgccaagtacgcccctattgacgtcaatgacggtaaat
ggcccgcctggcattatgcccagtacatgaccttatgggactttcctacttggcagtacatctacgtattagtcatcgctattaccat
ggtgatgcggttttggcagtacatcaatgggcgtggatagcggtttgactcacggggatttccaagtctccaccccattgacgtcaat
gggagtttgttttggcaccaaaatcaacgggactttccaaaatgtcgtaacaactccgccccattgacgcaaatgggcggtaggcgtg
tacggtgggaggtctatataagcagcgcgttttgcctgtactgggtctctctggttagaccagatctgagcctgggagctctctggct
aactagggaacccactgcttaagcctcaataaagcttgccttgagtgcttcaagtagtgtgtgcccgtctgttgtgtgactctggtaa
ctagagatccctcagaccccttttagtcagtgtggaaaatctctagcagtggcgcccgaacagggacttgaaagcgaaagggaaaccag
aggagctctctcgacgcaggactcggcttgctgaagcgcgcacggcaagaggcgaggggcggcgactggtgagtacgccaaaaatttt
gactagcggaggctagaaggagagagatgggtgcgagagcgtcagtattaagcgggggagaattagatcgcgatgggaaaaaattcgg
ttaaggccagggggaaagaaaaaatataaattaaaacatatagtatgggcaagcagggagctagaacgattcgcagttaatcctggcc
tgttagaaacatcagaaggctgtagacaaatactgggacagctacaaccatccatcagacaggatcagaagaacttagatcattatat
aatacagtagcaaccctctattgtgtgcatcaaaggatagagataaaagacaccaaggaagctttagacaagatagaggaagagcaaa
acaaaagtaagaccaccgcacagcaagcggccggccgcgctgatcttcagacctggaggaggagatatgagggacaattggagaagtg
aattatataaatataaagtagtaaaaattgaaccattaggagtagcacccaccaaggcaaagagaagagtggtgcagagagaaaaaag
agcagtgggaataggagctttgttccttgggttcttgggagcagcaggaagcactatgggcgcagcgtcaatgacgctgacggtacag
gccagacaattattgtctggtatagtgcagcagcagaacaatttgctgagggctattgaggcgcaacagcatctgttgcaactcacag
tctgggcatcaagcagctccaggcaagaatcctggctgtgaaagatacctaaaggatcaacagctcctggggatttgggggttgctc
tggaaaactcatttgcaccactgctgtgccttggaatgctagttggagtaataaatctctggaacagatttggaatcacacgacctgg
atggagtgggacagagaaattaacaattacacaagataatacactccttaattgaagaatcgcaaaaccagcaagaaaagaatgaaca
agaattattggaattagataaatgggcaagtttgtggaattggtttaacataacaaattggctgtggtatataaaattattcataatg
atagtaggaggcttggtaggtttaagaatagttttgctgtactttctatagtgaatagagttaggcagggatattcaccattatcgt
ttcagacccacctcccaaccccgaggggacccgacaggcccgaaggaatagaagaagaaggtggagagagagacagagacagatccat
tcgattagtgaacggatcggcactgcgtgcgccaattctgcagacaaatggcagtattcatccacaattttaaaagaaaaggggggat
tgggggtacagtgcaggggaaagaatagtagacataatagcaacagacatacaaactaaagaattacaaaaacaaattacaaaaatt
caaaattttcgggtttattacagggacagcagagatccagtttggttagtaccgggcccgctctagaaattctaccactgaaccacca
atgctactgtcagctaaagacctgcagtattgtctataaagctcactatctctggccattcactaaggaaccaggcaccgtcttaaat
cgcggtttggaaaatattttgttcaagataaaactgttttaagatatacgtgtatatatcttatatatctgtattcgcatggtaacat
atcttcggccttcctgagccgctgggctctcagcggccctccaaggcagcccgcaggcccctgtgtgcctcagggatccgacctccca
cagcccggggagaccttgcctctaaagttgctgcttttgcagcctctgccacaaccgcgcgtcctcagagccagcccggaggagcta
gaaccttccccgcatttctttcagcagcctgagtcagaggcgggctggcctggcgtagccgcccagcctcgcggctcatgccccgatc
tgcccgaaccttctcccggggtcagcgccgcgccgcgccacccggctgagtcagcccgggcgggcgagaggctctcaactgggcggga
aggtgcgggaaggtgcggaaaggttcgcgaaagttcgcggcggcggggtcggtgaggcgcaaaaggataaaaagcccgtggaagcg
gagctgagcagatccgagccgggctggctgcagagaaaccgcagggagagcctcactagctgagcgcccctcgacgcggagcggcag
cagcctccgtggcctccagcatccgacaagaagatcagccaccggtatgggagtcaaagtctctgtttgccctgatctgcatcgctgtg
gccgaggccaagcccaccgagaacaacgaagacttcaacatcgtggccgtggccagcaacttcgcgaccacggatctcgatgctgacc
gcgggaagttgcccggcaagaagctgccgctggaggtgctcaaagagatggaagccaatgcccggaaagctggctgcaccaggggctg
tctgatctgcctgtcccacatcaagtgcacgcccaagatgaagaagttcatcccaggacgctgccacacctacgaaggcgacaaagag
tccgcacagggcggcataggcgaggcgatcgtcgacattcctgagattcctgggttcaaggacttggagcctatggagcagttcatcg
cacaggtcgatctgtgtgtggactgcacaactggctgcctcaaagggcttgccaacgtgcagtgttctgacctgctcaagaagtggct
gccgcaacgctgtgcgacctttgccagcaagatccagggccaggtggacaagatcaaggggggccggtggtgactaactcgaggtcgac
ggtatcgataagctcgcttcacgagattccagcaggtcgagggacctaataacttcgtatagcatacattatacgaagttatattaag
```

-continued

```
ggttccaagcttaagcggccgctgaaagaccccacctgtaggtttggcaagctagctgcagtaacgccattttgcaaggcatggaaaa ataccaaaccaagaatagagaagttcagatcaagggcgggtacatgaaaatagctaacgttgggccaaacaggatatctgcggtgagc agtttcggccccggcccggggccaagaacagatggtcaccgcagtttcggccccggcccgaggccaagaacagatggtccccagatat ggcccaaccctcagcagtttcttaagacccatcagatgtttccaggctcccccaaggacctgaaatgaccctgcgccttatttgaatt aaccaatcagcctgcttctcgcttctgttcgcgcgcttctgcttcccgagctctataaaagagctcacaaccctcactcggcgcgcc agtcctccgattgactgagtcgcccggatcccgccaccatggtgagcaagggcgaggaggataacatggccatcatcaaggagttcat gcgcttcaaggtgcacatggagggctccgtgaacggccacgagttcgagatcgagggcgagggcgagggccgcccctacgagggcacc cagaccgccaagctgaaggtgaccaagggtggccccctgcccttcgcctgggacatcctgtcccctcagttcatgtacggctccaagg cctacgtgaagcaccccgccgacatccccgactacttgaagctgtccttccccgagggcttcaagtgggagcgcgtgatgaacttcga ggacggcggcgtggtgaccgtgacccaggactcctccctgcaggacggcgagttcatctacaaggtgaagctgcgcggcaccaacttc ccctccgacggccccgtaatgcagaagaagaccatgggctgggaggcctcctccgagcggatgtaccccgaggacggcgccctgaagg gcgagatcaagcagaggctgaagctgaaggacggcggccactacgacgctgaggtcaagaccacctacaaggccaagaagcccgtgca gctgcccggcgcctacaacgtcaacatcaagttggacatcacctcccacaacgaggactacaccatcgtggaacagtacgaacgcgcc gagggcgccgccactccaccggcggcatggacgagctgtacaagtaagaattcgtcgagggacctaataacttcgtatagcatacattat acgaagttatacatgtttaagggttccggttccactaggtacaattcgatatcaagatatcgataatcaacctctggattacaaaatt tgtgaaagattgactggtattataactatgttgctccttttacgctatgtggatacgctgctttaatgcctttgtatcatgctattgc ttcccgtatggattcattttctcctccttgtataaatcctggttgctgtctctttatgaggagttgtggcccgttgtcaggcaacgtg gcgtggtgtgcactgtgtttgctgacgcaaccccactggttggggcattgccaccacctgtcagctccttccgggactttcgcttt ccccctccctattgccacggcggaactcatcgccgcctgccttgcccgctgctggacaggggctcggctgttgggcactgacaattcc gtggtgttgtcggggaaatcatcgtcctttccttggctgctcgcctgtgttgccacctggattctgcgcgggacgtccttctgctacg tcccttcggccctcaatccagcggaccttccttcccgcggcctgctgccggctctgcggcctcttccgcgtcttcgccttcgccctca gacgagtcggatctccctttgggccgcctccccgcatcgataccgtcgacctcgatcgagacctagaaaaacatggagcaatcacaag tagcaatacagcagctaccaatgctgattgtgcctggctagaagcacaagaggaggaggaggtgggttttccagtcacacctcaggta cctttaagaccaatgacttacaaggcagctgtagatcttagccacttttttaaaagaaaaggggggactggaagggctaattcactccc aacgaagacaagatatccttgatctgtggatctaccacacacaaggctacttccctgattggcagaactacacaccagggccagggat cagatatccactgacctttggatggtgctacaagctagtaccagttgagcaagagaaggtagaagaagccaatgaaggagagaacacc cgcttgttacaccctgtgagcctgcatgggatggatgacccggagagagaagtattagagtggaggtttgacagccgcctagcatttc atcacatggcccgagagctgcatccggactgtactgggtctctctggttagaccagatctgagcctgggagctctctggctaactagg gaacccactgcttaagcctcaataaagcttgccttgagtgcttcaagtagtgtgtgcccgtctgttgtgtgactctggtaactagaga tccctcagacccttttagtcagtgtggaaaatctctagcagcatgtgagcaaaaggccagcaaaaggccaggaaccgtaaaaaggccg cgttgctggcgtttttccataggctccgcccccctgacgagcatcacaaaaatcgacgctcaagtcagaggtggcgaaacccgacagg actataaagataccaggcgtttccccctggaagctccctcgtgcgctctcctgttccgaccctgccgcttaccggatacctgtccgcc tttctcccttcgggaagcgtggcgctttctcatagctcacgctgtaggtatctcagttcggtgtaggtcgttcgctccaagctgggct gtgtgcacgaaccccccgttcagcccgaccgctgcgccttatccggtaactatcgtcttgagtccaacccggtaagacacgacttatc gccactggcagcagccactggtaacaggattagcagagcgaggtatgtaggcggtgctacagagttcttgaagtggtggcctaactac ggctacactagaagaacagtatttggtatctgcgctctgctgaagccagttaccttcggaaaaagagttggtagctcttgatccggca aacaaaccaccgctggtagcggtggtttttttgtttgcaagcagcagattacgcgcagaaaaaaaggatctcaagaagatcctttgat cttttctacggggtctgacgctcagtggaacgaaaactcacgttaagggattttggtcatgagattatcaaaaaggatcttcacctag atccttttaaattaaaaatgaagttttaaatcaatctaaagtatatatgagtaaacttggtctgacagttaccaatgcttaatcagtg aggcacctatctcagcgatctgtctatttcgttcatccatagttgcctgactccccgtcgtgtagataactacgatacgggagggctt
```

-continued accatctggccccagtgctgcaatgataccgcgagacccacgctcaccggctccagatttatcagcaataaaccagccagccggaagg gccgagcgcagaagtggtcctgcaactttatccgcctccatccagtctattaattgttgccgggaagctagagtaagtagttcgccag ttaatagtttgcgcaacgttgttgccattgctacaggcatcgtggtgtcacgctcgtcgtttggtatggcttcattcagctccggttc ccaacgatcaaggcgagttacatgatcccccatgttgtgcaaaaaagcggttagctccttcggtcctccgatcgttgtcagaagtaag ttggccgcagtgttatcactcatggttatggcagcactgcataattctcttactgtcatgccatccgtaagatgcttttctgtgactg gtgagtactcaaccaagtcattctgagaatagtgtatgcggcgaccgagttgctcttgcccggcgtcaatacgggataataccgcgcc acatagcagaactttaaaagtgctcatcattggaaaacgttcttcggggcgaaaactctcaaggatcttaccgctgttgagatccagt tcgatgtaacccactcgtgcacccaactgatcttcagcatcttttactttcaccagcgtttctgggtgagcaaaaacaggaaggcaaa atgccgcaaaaagggaataagggcgacacggaaatgttgaatactcatactcttcctttttcaatattattgaagcatttatcaggg ttattgtctcatgagcggatacatatttgaatgtatttagaaaaataaacaatagggtccgcgcacatttccccgaaaagtgcca cctgac Truncated HSPA6 Promoter Construct 4; synthetic bioswitch comprises a truncated
promoter (2622-2810) and a reporter (2817-3374)

SEQ ID NO: 4 gtcgacggatcgggagatctcccgatcccctatggtgcactctcagtacaatctgctctgatgccgcatagttaagccagtatctgct ccctgcttgtgtgttggaggtcgctgagtagtgcgcgagcaaaatttaagctacaacaaggcaaggcttgaccgacaattgcatgaag aatctgcttagggttaggcgttttgcgctgcttcgcgatgtacgggccagatatacgcgttgacattgattattgactagttattaat agtaatcaattacggggtcattagttcatagcccatatatggagttccgcgttacataacttacggtaaatggcccgcctggctgacc gcccaacgacccccgcccattgacgtcaataatgacgtatgttcccatagtaacgccaatagggactttccattgacgtcaatgggtg gagtatttacggtaaactgcccacttggcagtacatcaagtgtatcatatgccaagtacgccccctattgacgtcaatgacggtaaat ggcccgcctggcattatgcccagtacatgaccttatgggactttcctacttggcagtacatctacgtattagtcatcgctattaccat ggtgatgcggttttggcagtacatcaatgggcgtggatagcggtttgactcacggggatttccaagtctccaccccattgacgtcaat gggagtttgttttggcaccaaaatcaacgggactttccaaaatgtcgtaacaactccgccccattgacgcaaatgggcggtaggcgtg tacggtgggaggtctatataagcagcgcgttttgcctgtactgggtctctctggttagaccagatctgagcctgggagctctctggct aactagggaacccactgcttaagcctcaataaagcttgccttgagtgcttcaagtagtgtgtgcccgtctgttgtgtgactctggtaa ctagagatccctcagaccctttagtcagtgtggaaaatctctagcagtggcgcccgaacagggacttgaaagcgaaagggaaaccag aggagctctctcgacgcaggactcggcttgctgaagcgcgcacggcaagaggcgaggggcggcgactggtgagtacgccaaaaatttt gactagcggaggctagaaggagagagatgggtgcgagagcgtcagtattaagcggggagaattagatcgcgatgggaaaaaattcgg ttaaggccaggggaaagaaaaatataaattaaaacatatagtatgggcaagcagggagctagaacgattcgcagttaatcctggcc tgttagaaacatcagaaggctgtagacaaatactgggacagctacaaccatcccttcagacaggatcagaagaacttagatcattata taatacagtagcaaccctctattgtgtgcatcaaaggatagagataaaagacaccaaggaagctttagacaagatagaggaagagcaa aacaaaagtaagaccaccgcacagcaagcggccggccgcgctgatcttcagacctggaggaggagatatgagggacaattggagaagt gaattatataaatataaagtagtaaaaattgaaccattaggagtagcacccaccaaggcaaagagaagagtggtgcagagagaaaaa gagcagtgggaataggagctttgttccttgggttcttgggagcagcaggaagcactatgggcgcagcgtcaatgacgctgacggtaca ggccagacaattattgtctggtatagtgcagcagcagaacaatttgctgagggctattgaggcgcaacagcatctgttgcaactcaca gtctggggcatcaagcagctccaggcaagaatcctggctgtggaaagatacctaaaggatcaacagctcctggggatttggggttgct ctggaaaactcatttgcaccactgctgtgccttggaatgctagttggagtaataaatctctggaacagatttggaatcacacgacctg gatggagtgggacagagaaattaacaattacacaagcttaatacactccttaattgaagaatcgcaaaaccagcaagaaaagaatgaa caagaattattggaattagataaatgggcaagtttgtggaattggtttaacataacaaattggctgtggtatataaaattattcataa tgatagtaggaggcttggtaggtttaagaatagttttgctgtactttctatagtgaatagagttaggcagggatattcaccattatc gtttcagacccacctcccaaccccgaggggacccgacaggcccgaaggaatagaagaagaaggtggagagagagacagagacagatcc attcgattagtgaacggatcggcactgcgtgcgccaattctgcagacaaatggcagtattcatccacaattttaaaagaaaaggggg -continued

```
attgggggtacagtgcaggggaaagaatagtagacataatagcaacagacatacaaactaaagaattacaaaaacaaattacaaaaa ttcaaaattttcgggtttattacagggacagcagagatccagtttggttagtaccgggcccgctctagacgaaagttcgcggcggcgg gggtcggtgaggcgcaaaaggataaaaagcccgtggaagcggagctgagcagatccgagccgggctggctgcagagaaaccgcaggg agagcctcactgctgagcgcccctcgacggcggagcggcagcagcctccgtggcctccagcatccgacaagaagcttcagccaccggt atgggagtcaaagttctgtttgccctgatctgcatcgctgtggccgaggccaagcccaccgagaacaacgaagacttcaacatcgtgg ccgtggccagcaacttcgcgaccacggatctcgatgctgaccgcgggaagttgcccggcaagaagctgccgctggaggtgctcaaaga gatggaagccaatgcccggaaagctggctgcaccaggggctgtctgatctgcctgtcccacatcaagtgcacgcccaagatgaagaag ttcatcccaggacgctgccacacctacgaaggcgacaaagagtccgcacagggcggcataggcgaggcgatcgtcgacattcctgaga ttcctgggttcaaggacttggagcctatggagcagttcatcgcacaggtcgatctgtgtgtggactgcacaactggctgcctcaaagg gcttgccaacgtgcagtgttctgacctgctcaagaagtggctgccgcaacgctgtgcgacctttgccagcaagatccagggccaggtg gacaagatcaaggggccggtggtgactaactcgaggtcgacggtatcgataagctcgcttcacgagattccagcaggtcgagggacc taataacttcgtatagcatacattatacgaagttatattaagggttccaagcttaagcggccgctgaaagaccccacctgtaggtttg gcaagctagctgcagtaacgccattttgcaaggcatggaaaataccaaaccaagaatagagaagttcagatcaagggcgggtacatg aaaatagctaacgtttgggccaaacaggatatctgcggtgagcagtttcggccccggcccggggccaagaacagatggtcaccgcagtt tcggccccggcccgaggccaagaacagatggtccccagatatggcccaaccctcagcagtttcttaagacccatcagatgtttccagg ctcccccaaggacctgaaatgaccctgcgccttatttgaattaaccaatcagcctgcttctcgcttctgttcgcgcgcttctgcttcc cgagctctataaaagagctcacaacccctcactcggcgcgccagtcctccgattgactgagtcgcccggatcccgccaccatggtgag caagggcgaggaggataacatggccatcatcaaggagttcatgcgcttcaaggtgcacatggagggctccgtgaacggccacgagttc gagatcgagggcgagggcgagggccgcccctacgagggcacccagaccgccaagctgaaggtgaccaagggtggccccctgcccttcg cctgggacatcctgtcccctcagttcatgtacggctccaaggcctacgtgaagcaccccgccgacatccccgactacttgaagctgtc cttccccgagggcttcaagtgggagcgcgtgatgaacttcgaggacggcggcgtggtgaccgtgacccaggactcctccctgcaggac ggcgagttcatctacaaggtgaagctgcgcggcaccaacttcccctccgacggccccgtaatgcagaagaagaccatgggctgggagg cctcctccgagcggatgtaccccgaggacggcgcccctgaagggcgagatcaagcagaggctgaagctgaaggacggcggccactacga cgctgaggtcaagacccacctacaaggccaagaagcccgtgcagctgcccggcgcctacaacgtcaacatcaagttggacatcacctcc cacaacgaggactacaccatcgtggaacagtacgaacgcgccgagggccgccactccaccggcggcatggacgagctgtacaagtaag aattcgtcgagggacctaataacttcgtatagcatacattatacgaagttatacatgtttaagggttccggttccactaggtacaatt cgatatcaagcttatcgataatcaacctctggattacaaaatttgtgaaagattgactggtattcttaactatgttgctccttttacg ctatgtggatacgctgctttaatgcctttgtatcatgctattgcttcccgtatggctttcattttctcctccttgtataaatcctggt tgctgtctctttatgaggagttgtggcccgttgtcaggcaacgtggcgtggtgtgcactgtgtttgctgacgcaaccccactggttg gggcattgccaccacctgtcagctcctttccgggactttcgctttccccctccctattgccacggcggaactcatcgccgcctgcctt gcccgctgctggacaggggctcggctgttgggcactgacaattccgtggtgttgtcggggaaatcatcgtccttccttggctgctcg cctgtgttgccacctggattctgcgcgggacgtccttctgctacgtcccttcggccctcaatccagcggaccttcctccgcgcggcct gctgccggctctgcggcctcttccgcgtcttcgccttcgccctcagacgagtcggatctccctttgggccgcctccccgcatcgatac cgtcgacctcgatcgagacctagaaaaacatggagcaatcacaagtagcaatacagcagctaccaatgctgattgtgcctggctagaa gcacaagaggaggaggaggtgggttttccagtcacacctcaggtaccttaagaccaatgacttacaaggcagctgtagatcttagcc actttttaaaagaaaaggggggactggaagggctaattcactcccaacgaagacaagatatccttgatctgtggatctaccacacaca aggctacttccctgattggcagaactacacaccagggccagggatcagatatccactgacctttggatggtgctacaagctagtacca gttgagcaagagaaggtagaagaagccaatgaaggagagaacacccgcttgttacaccctgtgagcctgcatgggatggatgacccgg agagagaagtattagagtggaggtttgacagccgcctagcatttcatcacatggcccgagagctgcatccggactgtactgggtctct ctggttagaccagatctgagcctgggagctctctggctaactagggaacccactgcttaagcctcaataaagcttgccttgagtgctt caagtagtgtgtgcccgtctgttgtgtgactctggtaactagagatccctcagacccttttagtcagtgtggaaaatctctagcagca
``` tgtgagcaaaaggccagcaaaaggccaggaaccgtaaaaaggccgcgttgctggcgttttttccataggctccgcccccctgacgagca tcacaaaaatcgacgctcaagtcagaggtggcgaaacccgacaggactataaagataccaggcgtttccccctggaagctccctcgtg cgctctcctgttccgaccctgccgcttaccggatacctgtccgcctttctcccttcgggaagcgtggcgctttctcatagctcacgct gtaggtatctcagttcggtgtaggtcgttcgctccaagctgggctgtgtgcacgaaccccccgttcagcccgaccgctgcgccttatc cggtaactatcgtcttgagtccaacccggtaagacacgacttatcgccactggcagcagccactggtaacaggattagcagagcgagg tatgtaggcggtgctacagagttcttgaagtggtggcctaactacggctacactagaagaacagtatttggtatctgcgctctgctga agccagttaccttcggaaaaagagttggtagctcttgatccggcaaacaaaccaccgctggtagcggtggttatttgtttgcaagcag cagattacgcgcagaaaaaaaggatctcaagaagatcctttgatcttttctacggggtctgacgctcagtggaacgaaaactcacgtt aagggattttggtcatgagattatcaaaaaggatcttcacctagatccttttaaattaaaaatgaagttttaaatcaatctaaagtat atatgagtaaacttggtctgacagttaccaatgcttaatcagtgaggcacctatctcagcgatctgtctatttcgttcatccatagtt gcctgactccccgtcgtgtagataactacgatacgggagggcttaccatctggccccagtgctgcaatgataccgcgagacccacgct caccggctccagatttatcagcaataaaccagccagccggaagggccgagcgcagaagtggtcctgcaactttatccgcctccatcca gtctattaattgttgccgggaagctagagtaagtagttcgccagttaatagtttgcgcaacgttgttgccattgctacaggcatcgtg gtgtcacgctcgtcgtttggtatggcttcattcagctccggttcccaacgatcaaggcgagttacatgatcccccatgttgtgcaaaa aagcggttagctccttcggtcctccgatcgttgtcagaagtaagttggccgcagtgttatcactcatggttatggcagcactgcataa ttctcttactgtcatgccatccgtaagatgcttttctgtgactggtgagtactcaaccaagtcattctgagaatagtgtatgcggcga ccgagttgctcttgcccggcgtcaatacgggataataccgcgccacatagcagaactttaaaagtgctcatcattggaaaacgttctt cggggcgaaaactctcaaggatcttaccgctgttgagatccagttcgatgtaacccactcgtgcacccaactgatcttcagcatcttt tactttcaccagcgtttctgggtgagcaaaaacaggaaggcaaaatgccgcaaaaaagggaataagggcgacacggaaatgttgaata ctcatactcttcctttttcaatattattgaagcatttatcagggttattgtctcatgagcggatacatatttgaatgtatttagaaaa ataaacaaataggggttccgcgcacatttccccgaaaagtgccacctgac Truncated HSPA6 Promoter Construct 5; synthetic bioswitch comprises a truncated promoter (2622-5631) and a reporter (5709-6266)

SEQ ID NO: 5 gtcgacggatcgggagatctcccgatcccctatggtgcactctcagtacaatctgctctgatgccgcatagttaagccagtatctgct ccctgcttgtgtgttggaggtcgctgagtagtgcgcgagcaaaatttaagctacaacaaggcaaggcttgaccgacaattgcatgaag aatctgcttaggggttaggcgttttgcgctgcttcgcgatgtacgggccagatatacgcgttgacattgattattgactagttattaat agtaatcaattacggggtcattagttcatagcccatatatggagttccgcgttacataacttacggtaaatggcccgcctggctgacc gcccaacgaccccgcccattgacgtcaataatgacgtatgttcccatagtaacgccaatagggactttccattgacgtcaatgggtg gagtatttacggtaaactgcccacttggcagtacatcaagtgtatcatatgccaagtacgccccctattgacgtcaatgacggtaaat ggcccgcctggcattatgcccagtacatgaccttatgggactttcctacttggcagtacatctacgtattagtcatcgctattaccat ggtgatgcggttttggcagtacatcaatgggcgtggatagcggtttgactcacggggatttccaagtctccaccccattgacgtcaat gggagtttgttttggcaccaaaatcaacgggactttccaaaatgtcgtaacaactccgccccattgacgcaaatgggcggtaggcgtg tacggtgggaggtctatataagcagcgcgttttgcctgtactgggtctctctggttagaccagatctgagcctgggagctctctggct aactagggaacccactgcttaagcctcaataaagcttgccttgagtgcttcaagtagtgtgtgcccgtctgttgtgtgactctggtaa ctagagatccctcagacccttttagtcagtgtggaaaatctctagcagtggcgcccgaacagggacttgaaagcgaaagggaaaccag aggagctctctcgacgcaggactcggcttgctgaagcgcgcacgcaagaggcgaggggcggcgactggtgagtacgccaaaaatttt gactagcggaggctagaaggagagagatgggtgcgagagcgtcagtattaagcggggggagaattagatcgcgatgggaaaaaattcgg ttaaggccagggggaaagaaaaaatataaattaaaacatatagtatgggcaagcagggagctagaacgattcgcagttaatcctggcc tgttagaaacatcagaaggctgtagacaaatactgggacagctacaaccatcccttcagacaggatcagaagaacttagatcattata taatacagtagcaaccctctattgtgtgcatcaaaggatagagataaaagacaccaaggaagctttagacaagatagaggaagagcaa aacaaaagtaagaccaccgcacagcaagcggccggccgcgctgatcttcagacctggaggaggagatatgagggacaattggagaagt -continued

```
gaattatataaatataaagtagtaaaaattgaaccattaggagtagcacccaccaaggcaaagagaagagtggtgcagagagaaaaaa
gagcagtgggaataggagctttgttccttgggttcttgggagcagcaggaagcactatgggcgcagcgtcaatgacgctgacggtaca
ggccagacaattattgtctggtatagtgcagcagcagaacaatttgctgagggctattgaggcgcaacagcatctgttgcaactcaca
gtctggggcatcaagcagctccaggcaagaatcctggctgtggaaagatacctaaaggatcaacagctcctggggatttggggttgct
ctggaaaactcatttgcaccactgctgtgccttggaatgctagttggagtaataaatctctggaacagatttggaatcacacgacctg
gatggagtgggacagagaaattaacaattacacaagcttaatacactccttaattgaagaatcgcaaaaccagcaagaaaagaatgaa
caagaattattggaattagataaatgggcaagtttgtggaattggtttaacataacaaattggctgtggtatataaaattattcataa
tgatagtaggaggcttggtaggttttaagaatagttttgctgtacttctatagtgaatagagttaggcagggatattcaccattatc
gtttcagacccacctcccaaccccgaggggacccgacaggcccgaaggaatagaagaagaaggtggagagagagacagagacagatcc
attcgattagtgaacggatcggcactgcgtgcgccaattctgcagacaaatggcagtattcatccacaatttttaaaagaaaaggggggg
attgggggggtacagtgcaggggaaagaatagtagacataatagcaacagacatacaaactaaagaattacaaaaacaaattacaaaaa
ttcaaaattttcgggttttattacagggacagcagagatccagtttggttagtaccgggcccgctctagatcatcttgaattcccacaa
cacatgggagggacccagtggaaggtaactgaatcatggggcaggtcttccatgctgttcttgtgatagtgaataagtctcatgag
atctgatggttttaaaaagggggagtttccctgcacaagctctctcttctcttgtttgccaccatgtgagacatgactttcaccttttg
ccatgattgtgaggcctcccagccacgtggaactgtaagtccattaaacctctttatttgtaaattgcccgtctcaggtatgtatta
ttagcagtgtgagaatgggctaacacatacaacttgcttttttttttgtactcaatattgagtcgtgagattgcaccacattagaatgt
ctatttaagtcattactttaaggtcggttctattttttaaagctactcaaactaagctactaaacataagtggatatatttaagtgtat
gtataaaatttatactaggccagctgcagtggctcatgcctgtaatcccaaagctgtggaaggtagaggtgggactgattgaggccac
gagttcaaggctgcagtgagctgtgattgcatcactgtactccagcctgagggacagagcaggaaccagaaaaaaataaaataaaaag
aaacaaacaaaaaaccccccaacaaccctacagtggctcttttagaaaaaacaaacaaacaaaaccaaaactgtactgcatgcataag
ctccccctatgctatgtttgaaccactctgaagagatcaattaaaaagaagtgagtgatattggaagcatgcctctgtgatgctgtggt
aacattcataggctgcgttagggctatgcctgtaactcttggagatgagtgggtaagtggggttttgaggtggctggggggctggaaga
gaaggttggaggagcccacacaagacagcccctttaacacgccggggcacagaaccccaggctgggccaacttttcctgctgaggtga
agacccgtctcttgcaggccgttggcaaatgtcttgactctggcatccaggtgtgaccagatagaccctgagagtgagtgaatttaaa
gttgacagatattccctttgaaattatgaaataggttacttcttttcaaggacagtttgattttccactgtgtaagtcatatattgc
acatttcttaaacattccctttttttcctgaactgatcaccttaccagtacggctgatcctctcaagcagcaaactctaccagctgtc
actggtgctctcggagagacgattaaccaaggaacccagcccgggaacagtactgacctctacttctggactcctgcctccctcttaa
aaagtcccttgaacttcctagtgggttctaacctgtcaaaggagaaaatagccatctatggagtaagggttttttagtttctattttac
aaatggaagtttcctctgaatcaggcaagtaacgttaaatagaagccaacttttaagtttctctaacacactgctaaattgtaacacc
agactgtaccacatactctccagctgccagctattgcagttgccatccttgttactatagtggtgagtatctctgcctgtcatgcgtg
agagaggggtcgattccccgacggggaggtcacgggaaattgtgtgaggattttgtcaaccttcagaagtctcagaaatgtctcctt
gttttggctttcagcggaaatccgaacgccagcagatctgaatggaatgttctggattgaagaaagtgggaaatggcctcaattcaca
aagtcacaacctgataaaaaccagtgtgacttactgcccagtgaacccatctcgtcctccagcctttaggaggtaggttggactgga
gcctgcagtagtttactctccacctgagtcctggtctccagctgggaacccacttaggccataaagaaaaacgcacactgtgcctctc
caccgggcctctggagacgaggctcctcggggatacaaacagtggggagaacatgagggacatcccgaccgtactctgcgtcctcctt
tcccaggtgttgcgttctctcttgggctgagtggcgaggtctctcccgagtcccagggccacagtgcaatgtcacatctcctttgtgg
aaagtgactggtaaaggagagagaacaaaactggaggaatgtaaagtcttcagccacctggtttaatttattcaagagtgattaatcc
tagatgagaaaaagaattgaaatggatcggaaaaaaatgaaagtgcattggccgggaatcgaacccgggcctcccgcgtggcaggcga
gaattctaccactgaaccaccaatgctactgtcagctaaagacctgcagtattgtctcttaaagctcactatctctggccattcacta
aggaaccaggcaccgtcttaaatcgcggtttggaaaatattttgttcaagataaaactgttttaagatatacgtgtatatatcttata
```

-continued

```
tatctgtattcgcatggtaacatatcttcggccttcctgagccgctgggctctcagcggccctccaaggcagcccgcaggcccctgtg
tgcctcagggatccgacctcccacagcccggggagaccttgcctctaaagttgctgcttttgcagcctctgccacaaccgcgcgtcc
tcagagccagcccggaggagctagaaccttccccgcatttctttcagcagcctgagtcagaggcgggctggcctggcgtagccgccca
gcctcgcggctcatgccccgatctgcccgaaccttctcccggggtcagcgccgcgccgcgccacccggctgagtcagcccgggcgggc
gagaggctctcaactgggcgggaaggtgcgggaaggtgcggaaaggttcgcgaaagttcgcggcggcggggtcgggtgaggcgcaaa
aggataaaaagcccgtggaagcggagctgagcagatccgagccgggctggctgcagagaaaccgcagggagagcctcactgctgagcg
ccctcgacggcggagcggcagcagcctccgtggcctccagcatccgacaagaagcttcagccaccggtatgggagtcaaagttctgt
ttgccctgatctgcatcgctgtggccgaggccaagcccaccgagaacaacgaagacttcaacatcgtggccgtggccagcaacttcgc
gaccacggatctcgatgctgaccgcgggaagttgcccggcaagaagctgccgctggaggtgctcaaagagatggaagccaatgcccgg
aaagctggctgcaccagggggctgtctgatctgcctgtcccacatcaagtgcacgcccaagatgaagaagttcatcccaggacgctgcc
acacctacgaaggcgacaaagagtccgcacagggcggcataggcgaggcgatcgtcgacattcctgagattcctgggttcaaggactt
ggagcctatggagcagttcatcgcacaggtcgatctgtgtgtggactgcacaactggctgcctcaaagggcttgccaacgtgcagtgt
tctgacctgctcaagaagtggctgccgcaacgctgtgcgacctttgccagcaagatccagggccaggtggacaagatcaaggggggccg
gtggtgactaactcgaggtcgacggtatcgataagctcgcttcacgagattccagcaggtcgagggacctaataacttcgtatagcat
acattatacgaagttatattaagggttccaagcttaagcggccgctgaaagaccccacctgtaggtttggcaagctagctgcagtaac
gccattttgcaaggcatggaaaaataccaaaccaagaatagagaagttcagatcaagggcgggtacatgaaaatagctaacgttgggc
caaacaggatatctgcggtgagcagtttcggccccggcccggggccaagaacagatggtcaccgcagtttcggccccggcccgaggcc
aagaacagatggtccccagatatggcccaaccctcagcagtttcttaagacccatcagatgtttccaggctcccccaaggacctgaaa
tgaccctgcgccttatttgaattaaccaatcagcctgcttctcgcttctgttcgcgcgcttctgcttcccgagctctataaaagagct
cacaacccctcactcggcgcgccagtcctccgattgactgagtcgcccggatcccgccaccatggtgagcaagggcgaggaggataac
atggccatcatcaaggagttcatgcgcttcaaggtgcacatggagggctccgtgaacggccacgagttcgagatcgagggcgagggcg
agggccgcccctacgagggcacccagaccgccaagctgaaggtgaccaagggtggccccctgcccttcgcctgggacatcctgtcccc
tcagttcatgtacggctccaaggcctacgtgaagcaccccgccgacatccccgactacttgaagctgtccttccccgagggcttcaag
tgggagcgcgtgatgaacttcgaggacggcggcgtggtgaccgtgacccaggactcctccctgcaggacggcgagttcatctacaagg
tgaagctgcgcggcaccaacttcccctccgacggccccgtaatgcagaagaagaccatgggctgggaggcctcctccgagcggatgta
ccccgaggacggcgccctgaagggcgagatcaagcagaggctgaagctgaaggacggcggccactacgacgctgaggtcaagaccacc
tacaaggccaagaagcccgtgcagctgcccggcgcctacaacgtcaacatcaagttggacatcacctcccacaacgaggactacacca
tcgtggaacagtacgaacgcgccgagggccgccactccaccggcggcatggacgagctgtacaagtaagaattcgtcgagggacctaa
taacttcgtatagcatacattatacgaagttatacatgtttaagggttccggttccactaggtacaattcgatatcaagcttatcgat
aatcaacctctggattacaaaatttgtgaaagattgactggtattcttaactatgttgctccttttacgctatgtggatacgctgctt
taatgcctttgtatcatgctattgcttcccgtatggctttcattttctcctccttgtataaatcctggttgctgtctctttatgagga
gttgtggcccgttgtcaggcaacgtggcgtggtgtgcactgtgtttgctgacgcaacccccactggttggggcattgccaccacctgt
cagctcctttccgggactttcgctttccccctccctattgccacggcggaactcatcgccgcctgccttgcccgctgctggacagggg
ctcggctgttgggcactgacaattccgtggtgttgtcggggaaatcatcgtcctttccttggctgctcgcctgtgttgccacctggat
tctgcgcgggacgtccttctgctacgtcccttcggccctcaatccagcggaccttccttcccgcggcctgctgccggctctgcggcct
cttccgcgtcttcgccttcgccctcagacgagtcggatctccctttgggccgcctccccgcatcgataccgtcgacctcgatcgagac
ctagaaaaacatggagcaatcacaagtagcaatacagcagctaccaatgctgattgtgcctggctagaagcacaagaggaggaggagg
tgggttttccagtcacacctcaggtacctttaagaccaatgacttacaaggcagctgtagatcttagccacttttaaaagaaaaggg
gggactggaagggctaattcactcccaacgaagacaagatatccttgatctgtggatctaccacacacaaggctacttccctgattgg
cagaactacacaccagggccagggatcagatatccactgacctttggatggtgctacaagctagtaccagttgagcaagagaaggtag
aagaagccaatgaaggagagaacacccgcttgttacaccctgtgagcctgcatgggatggatgacccggagagagaagtattagagtg
```

-continued

```
gaggtttgacagccgcctagcatttcatcacatggcccgagagctgcatccggactgtactgggtctctctggttagaccagatctga
gcctgggagctctctggctaactagggaacccactgcttaagcctcaataaagcttgccttgagtgcttcaagtagtgtgtgcccgtc
tgttgtgtgactctggtaactagagatccctcagaccdtttagtcagtgtggaaaatctctagcagcatgtgagcaaaaggccagcaa
aaggccaggaaccgtaaaaaggccgcgttgctggcgttttttccataggctccgcccccctgacgagcatcacaaaaatcgacgctcaa
gtcagaggtggcgaaacccgacaggactataaagataccaggcgtttccccctggaagctccctcgtgcgctctcctgttccgaccct
gccgcttaccggatacctgtccgcctttctcccttcgggaagcgtggcgctttctcatagctcacgctgtaggtatctcagttcggtg
taggtcgttcgctccaagctgggctgtgtgcacgaaccccccgttcagcccgaccgctgcgccttatccggtaactatcgtcttgagt
ccaacccggtaagacacgacttatcgccactggcagcagccactggtaacaggattagcagagcgaggtatgtaggcggtgctacaga
gttcttgaagtggtggcctaactacggctacactagaagaacagtatttggtatctgcgctctgctgaagccagttaccttcggaaaa
agagttggtagctcttgatccggcaaacaaaccaccgctggtagcggtggtttttttgtttgcaagcagcagattacgcgcagaaaaa
aaggatctcaagaagatcctttgatcttttctacggggtctgacgctcagtggaacgaaaactcacgttaagggattttggtcatgag
attatcaaaaggatcttcacctagatccttttaaattaaaaatgaagttttaaatcaatctaaagtatatatgagtaaacttggtct
gacagttaccaatgcttaatcagtgaggcacctatctcagcgatctgtctatttcgttcatccatagttgcctgactccccgtcgtgt
agataactacgatacgggagggcttaccatctggccccagtgctgcaatgataccgcgagacccacgctcaccggctccagatttatc
agcaataaaccagccagccggaagggccgagcgcagaagtggtcctgcaactttatccgcctccatccagtctattaattgttgccgg
gaagctagagtaagtagttcgccagttaatagtttgcgcaacgttgttgccattgctacaggcatcgtggtgtcacgctcgtcgtttg
gtatggcttcattcagctccggttcccaacgatcaaggcgagttacatgatcccccatgttgtgcaaaaaagcggttagctccttcgg
tcctccgatcgttgtcagaagtaagttggccgcagtgttatcactcatggttatggcagcactgcataattctatactgtcatgccat
ccgtaagatgatttctgtgactggtgagtactcaaccaagtcattctgagaatagtgtatgcggcgaccgagttgctcttgcccggcg
tcaatacgggataataccgcgccacatagcagaactttaaaagtgctcatcattggaaaacgttatcggggcgaaaactctcaaggat
cttaccgctgttgagatccagttcgatgtaacccactcgtgcacccaactgatcttcagcatcttttactttcaccagcgtttctggg
tgagcaaaaacaggaaggcaaaatgccgcaaaaagggaataagggcgacacggaaatgttgaatactcatactcttcctttttcaat
attattgaagcatttatcagggttattgtctcatgagcggatacatatttgaatgtatttagaaaaataaacaaatagggttccgcg
cacatttccccgaaaagtgccacctgac
```

Truncated HSPA6 Promoter Construct 6; synthetic bioswitch comprises a truncated
promoter (2622-3899) and a reporter (3906-4463)

SEQ ID NO: 6

```
gtcgacggatcgggagatctcccgatcccctatggtgcactctcagtacaatctgctctgatgccgcatagttaagccagtatctgct
ccctgcttgtgtgttggaggtcgctgagtagtgcgcgagcaaaatttaagctacaacaaggcaaggcttgaccgacaattgcatgaag
aatctgcttagggttaggcgttttgcgctgcttcgcgatgtacgggccagatatacgcgttgacattgattattgactagttattaat
agtaatcaattacggggtcattagttcatagcccatatatggagttccgcgttacataacttacggtaaatggcccgcctggctgacc
gcccaacgacccccgcccattgacgtcaataatgacgtatgttcccatagtaacgccaatagggactttccattgacgtcaatgggtg
gagtatttacggtaaactgcccacttggcagtacatcaagtgtatcatatgccaagtacgccccctattgacgtcaatgacggtaaat
ggcccgcctggcattatgcccagtacatgaccttatgggactttcctacttggcagtacatctacgtattagtcatcgctattaccat
ggtgatgcggttttggcagtacatcaatgggcgtggatagcggtttgactcacggggatttccaagtctccaccccattgacgtcaat
gggagtttgttttggcaccaaaatcaacgggactttccaaaatgtcgtaacaactccgccccattgacgcaaatgggcggtaggcgtg
tacggtgggaggtctatataagcagcgcgttttgcctgtactgggtctctctggttagaccagatctgagcctgggagctctctggct
aactagggaacccactgcttaagcctcaataaagcttgccttgagtgcttcaagtagtgtgtgcccgtctgttgtgtgactctggtaa
ctagagatccctcagaccctttagtcagtgtggaaaatctctagcagtggcgcccgaacagggacttgaaagcgaaagggaaaccag
aggagctctctcgacgcaggactcggcttgctgaagcgcgcacggcaagaggcgaggggcggcgactggtgagtacgccaaaaatttt
gactagcggaggctagaaggagagagatgggtgcgagagcgtcagtattaagcggggagaattagatcgcgatgggaaaaaattcgg
ttaaggccagggggaaagaaaaaatataaattaaaacatatagtatgggcaagcagggagctagaacgattcgcagttaatcctggcc
```

-continued

```
tgttagaaacatcagaaggctgtagacaaatactgggacagctacaaccatcccttcagacaggatcagaagaacttagatcattata taatacagtagcaaccctctattgtgtgcatcaaaggatagagataaaagacaccaaggaagctttagacaagatagaggaagagcaa aacaaaagtaagaccaccgcacagcaagcggccggccgcgctgatcttcagacctggaggaggagatatgagggacaattggagaagt gaattatataaatataaagtagtaaaaattgaaccattaggagtagcacccaccaaggcaaagagaagagtggtgcagagagaaaaa gagcagtgggaataggagctttgttccttgggttcttgggagcagcaggaagcactatgggcgcagcgtcaatgacgctgacggtaca ggccagacaattattgtctggtatagtgcagcagcagaacaatttgctgagggctattgaggcgcaacagcatctgttgcaactcaca gtctggggcatcaagcagctccaggcaagaatcctggctgtggaaagatacctaaaggatcaacagctcctggggatttggggttgct ctggaaaactcatttgcaccactgctgtgccttggaatgctagttggagtaataaatctctggaacagatttggaatcacacgacctg gatggagtgggacagagaaattaacaattacacaagcttaatacactccttaattgaagaatcgcaaaaccagcaagaaaagaatgaa caagaattattggaattagataaatgggcaagtttgtggaattggtttaacataacaaattggctgtgtggtatataaaattattcataa tgatagtaggaggcttggtaggtttaagaatagttttgctgtacttctatagtgaatagagttaggcagggatattccaccattatc gtttcagacccacctcccaaccccgaggggacccgacaggcccgaaggaatagaagaagaaggtggagagagagagacagagacagatcc attcgattagtgaacggatcggcactgcgtgcgccaattctgcagacaaatggcagtattcatccacaattttaaaagaaaaggggggg attgggggtacagtgcaggggaaagaatagtagacataatagcaacagacatacaaactaaagaattacaaaaacaaattacaaaaa ttcaaaattttcgggtttattacagggacagcagagatccagtttggttagtaccgggcccgctctagagatctgaatggaatgttct ggattgaagaaagtgggaaatggcctcaattcacaaagtcacaacctgataaaaaccagtgtgactttactgcccagtgaacccatct cgtcctccagcctttaggaggtaggttggactggagcctgcagtagtttactctccacctgagtcctggtctccagctgggaacccac ttaggccataaagaaaaacgcacactgtgcctctccaccgggcctctggagacgaggctcctcggggatacaaacagtggggagaaca tgagggacatcccgaccgtactctgcgtcctccttcccaggtgttgcgttctctcttgggctgagtggcgaggtctctcccgagtcc cagggccacagtgcaatgtcacatctcctttgtggaaagtgactggtaaaggagagagaacaaaactggaggaatgtaaagtcttcag ccacctggtttaatttattcaagagtgattaatcctagatgagaaaaagaattgaaatggatcggaaaaaaatgaaagtgcattggcc gggaatcgaacccgggcctcccgcgtggcaggcgagaattctaccactgaaccaccaatgctactgtcagctaaagacctgcagtatt gtctcttaaagctcactatctctggccattcactaaggaaccaggcaccgtcttaaatcgcggtttggaaaatattttgttcaagata aaactgttttaagatatacgtgtatatatcttatatatctgtattcgcatggtaacatatcttcggccttcctgagccgctgggctct cagcggccctccaaggcagcccgcaggcccctgtgtgcctcagggatccgacctcccacagcccggggagaccttgcctctaaagtt gctgcttttgcagcctctgccacaaccgcgcgtcctcagagccagcccggaggagctagaaccttccccgcatttctttcagcagcct gagtcagaggcgggctggcctggcgtagccgcccagcctcgcggctcatgccccgatctgcccgaaccttctcccggggtcagcgccg cgccgcgccacccggctgagtcagcccgggcgggcgagaggctctcaactgggcgggaaggtgcgggaaggtgcggaaaggttcgcga aagttcgcggcggcggggtcgggtgaggcgcaaaaggataaaaagcccgtggaagcgggagctgagcagatccgagccgggctggctg cagagaaaccgcagggagagcctcactaccggtatgggagtcaaagttctgtttgccctgatctgcatcgctgtggccgaggccaagc ccaccgagaacaacgaagacttcaacatcgtggccgtggccagcaacttcgcgaccacggatctcgatgctgaccgcggggaagttgcc cggcaagaagctgccgctggaggtgctcaaagagatggaagccaatgcccggaaagctggctgcaccaggggctgtctgatctgcctg tcccacatcaagtgcacgcccaagatgaagaagttcatcccaggacgctgccacacctacgaaggcgacaaagagtccgcacagggcg gcataggcgaggcgatcgtcgacattcctgagattcctgggttcaaggacttggagcctatggagcagttcatcgcacaggtcgatct gtgtgtggactgcacaactggctgcctcaaagggcttgccaacgtgcagtgttctgacctgctcaagaagtggctgccgcaacgctgt gcgacctttgccagcaagatccagggccaggtggacaagatcaaggggccggtggtgactaactcgaggtcgacggtatcgataagc tcgcttcacgagattccagcaggtcgagggacctaataacttcgtatagcatacattatacgaagttatattaagggttccaagctta agcggccgctgaaagaccccacctgtaggtttggcaagctagctgcagtaacgccattttgcaaggcatggaaaaataccaaaccaag aatagagaagttcagatcaagggcgggtacatgaaaatagctaacgttgggccaaacaggatatctgcggtgagcagtttcggccccg gcccggggccaagaacagatggtcaccgcagtttcggccccggcccgaggccaagaacagatggtccccagatatggcccaaccctca
```

-continued

```
gcagtttcttaagacccatcagatgtttccaggctcccccaaggacctgaaatgaccctgcgccttatttgaattaaccaatcagcct
gcttctcgcttctgttcgcgcgcttctgcttcccgagctctataaaagagctcacaacccctcactcggcgcgccagtcctccgattg
actgagtcgcccggatcccgccaccatggtgagcaagggcgaggaggataacatggccatcatcaaggagttcatgcgcttcaaggtg
cacatggagggctccgtgaacggccacgagttcgagatcgagggcgagggcgagggccgcccctacgagggcacccagaccgccaagc
tgaaggtgaccaagggtggccccctgcccttcgcctgggacatcctgtcccctcagttcatgtacggctccaaggcctacgtgaagca
ccccgccgacatccccgactacttgaagctgtccttccccgagggcttcaagtgggagcgcgtgatgaacttcgaggacggcggcgtg
gtgaccgtgacccaggactcctccctgcaggacggcgagttcatctacaaggtgaagctgcgcggcaccaacttcccctccgacggcc
ccgtaatgcagaagaagaccatggctgggaggcctcctccgagcggatgtaccccgaggacggcgccctgaagggcgagatcaagca
gaggctgaagctgaaggacggcggccactacgacgctgaggtcaagaccacctacaaggccaagaagcccgtgcagctgcccggcgcc
tacaacgtcaacatcaagttggacatcacctcccacaacgaggactacaccatcgtggaacagtacgaacgcgccgagggccgccact
ccaccggcggcatggacgagctgtacaagtaagaattcgtcgagggacctaataacttcgtatagcatacattatacgaagttataca
tgtttaagggttccggttccactaggtacaattcgatatcaagatatcgataatcaacctctggattacaaaatttgtgaaagattga
ctggtattataactatgttgctccttttacgctatgtggatacgctgattaatgcctttgtatcatgctattgcttcccgtatggctt
tcattttctcctccttgtataaatcctggttgctgtctattatgaggagttgtggcccgttgtcaggcaacgtggcgtggtgtgcact
gtgtttgctgacgcaacccccactggttggggcattgccaccacctgtcagctcctttccgggactttcgctttcccccctccctattg
ccacggcggaactcatcgccgcctgccttgcccgctgctggacaggggctcggctgttgggcactgacaattccgtggtgttgtcggg
gaaatcatcgtcctttccttggctgctcgcctgtgttgccacctggattctgcgcgggacgtccttctgctacgtccatcggccctca
atccagcggaccttccttcccgcggcctgctgccggctctgcggcctatccgcgtatcgccttcgccctcagacgagtcggatctcca
ttgggccgcctccccgcatcgataccgtcgacctcgatcgagacctagaaaaacatggagcaatcacaagtagcaatacagcagctac
caatgctgattgtgcctggctagaagcacaagaggaggaggaggtgggttttccagtcacacctcaggtacctttaagaccaatgact
tacaaggcagctgtagatcttagccacttttttaaaagaaaaggggggactggaagggctaattcactcccaacgaagacaagatatcc
ttgatctgtggatctaccacacacaaggctacttccctgattggcagaactacacaccagggccagggatcagatatccactgacctt
tggatggtgctacaagctagtaccagttgagcaagagaaggtagaagaagccaatgaaggagagaacacccgcttgttacaccctgtg
agcctgcatgggatggatgacccggagagagaagtattagagtggaggtttgacagccgcctagcatttcatcacatggcccgagagc
tgcatccggactgtactgggtctctctggttagaccagatctgagcctgggagctctctggctaactagggaacccactgcttaagcc
tcaataaagcttgccttgagtgcttcaagtagtgtgtgcccgtctgttgtgtgactctggtaactagagatccctcagacccttttag
tcagtgtggaaaatctctagcagcatgtgagcaaaaggccagcaaaaggccaggaaccgtaaaaaggccgcgttgctggcgttttcc
ataggctccgcccccctgacgagcatcacaaaaatcgacgctcaagtcagaggtggcgaaacccgacaggactataaagataccaggc
gtttccccctggaagctccctcgtgcgctctcctgttccgaccctgccgcttaccggatacctgtccgcctttctcccatcgggaagcg
tggcgctttctcatagctcacgctgtaggtatctcagttcggtgtaggtcgttcgctccaagctgggctgtgtgcacgaaccccccgt
tcagcccgaccgctgcgccttatccggtaactatcgtcttgagtccaacccggtaagacacgacttatcgccactggcagcagccact
ggtaacaggattagcagagcgaggtatgtaggcggtgctacagagttcttgaagtggtggcctaactacggctacactagaagaacag
tatttggtatctgcgctctgctgaagccagttaccttcggaaaaagagttggtagctcttgatccggcaaacaaaccaccgctggtag
cggtggtttttttgtttgcaagcagcagattacgcgcagaaaaaaaggatctcaagaagatcctttgatcttttctacggggtctgac
gctcagtggaacgaaaactcacgttaagggattttggtcatgagattatcaaaaaggatcttcacctagatccttttaaattaaaaat
gaagttttaaatcaatctaaagtatatatgagtaaacttggtctgacagttaccaatgcttaatcagtgaggcacctatctcagcgatc
tgtctatttcgttcatccatagttgcctgactccccgtcgtgtagataactacgatacgggagggcttaccatctggccccagtgctg
caatgataccgcgagacccacgctcaccggctccagatttatcagcaataaaccagccagccggaagggccgagcgcagaagtggtcc
tgcaactttatccgcctccatccagtctattaattgttgccgggaagctagagtaagtagttcgccagttaatagtttgcgcaacgtt
gttgccattgctacaggcatcgtggtgtcacgctcgtcgtttggtatggcttcattcagctccggttcccaacgatcaaggcgagtta
catgatcccccatgttgtgcaaaaaagcggttagctccttcggtcctccgatcgttgtcagaagtaagttggccgcagtgttatcact
```

-continued catggttatggcagcactgcataattctatactgtcatgccatccgtaagatgatttctgtgactggtgagtactcaaccaagtcatt ctgagaatagtgtatgcggcgaccgagttgctcttgcccggcgtcaatacgggataataccgcgccacatagcagaactttaaaagtg ctcatcattggaaaacgttcttcggggcgaaaactctcaaggatcttaccgctgttgagatccagttcgatgtaacccactcgtgcac ccaactgatcttcagcatcttttactttcaccagcgtttctgggtgagcaaaaacaggaaggcaaatgccgcaaaaaagggaataag ggcgacacggaaatgttgaatactcatactcttccttttcaatattattgaagcatttatcagggttattgtctcatgagcggatac atatttgaatgtatttagaaaaataaacaaatagggttccgcgcacatttccccgaaaagtgccacctgac Truncated HSPA6 Promoter Construct 7; synthetic bioswitch comprises a truncated
promoter (2622-3316) and a reporter (3324-3881)

SEQ ID NO: 7 gtcgacggatcgggagatctcccgatcccctatggtgcactctcagtacaatctgctctgatgccgcatagttaagccagtatctgct ccctgcttgtgtgttggaggtcgctgagtagtgcgcgagcaaaatttaagctacaacaaggcaaggcttgaccgacaattgcatgaag aatctgcttagggttaggcgttttgcgctgcttcgcgatgtacgggccagatatacgcgttgacattgattattgactagttattaat agtaatcaattacggggtcattagttcatagcccatatatggagttccgcgttacataacttacggtaaatggcccgcctggctgacc gcccaacgacccccgcccattgacgtcaataatgacgtatgttcccatagtaacgccaatagggactttccattgacgtcaatgggtg gagtatttacggtaaactgcccacttggcagtacatcaagtgtatcatatgccaagtacgccccctattgacgtcaatgacggtaaat ggcccgcctggcattatgcccagtacatgaccttatgggactttcctacttggcagtacatctacgtattagtcatcgctattaccat ggtgatgcggttttggcagtacatcaatgggcgtggatagcggtttgactcacggggatttccaagtctccaccccattgacgtcaat gggagtttgttttggcaccaaaatcaacgggactttccaaaatgtcgtaacaactccgccccattgacgcaaatgggcggtaggcgtg tacggtgggaggtctatataagcagcgcgttttgcctgtactgggtctctctggttagaccagatctgagcctgggagctctctggct aactagggaacccactgcttaagcctcaataaagcttgccttgagtgcttcaagtagtgtgtgcccgtctgttgtgtgactctggtaa ctagagatccctcagacccttttagtcagtgtggaaaatctctagcagtggcgcccgaacagggacttgaaagcgaaagggaaaccag aggagctctctcgacgcaggactcggcttgctgaagcgcgcacggcaagaggcgaggggcggcgactggtgagtacgccaaaaatttt gactagcggaggctagaaggagagagatgggtgcgagagcgtcagtattaagcggggagaattagatcgcgatgggaaaaaattcgg ttaaggccaggggggaagaaaaaatataaattaaaacatatagtatgggcaagcagggagctagaacgattcgcagttaatcctggcc tgttagaaacatcagaaggctgtagacaaatactgggacagctacaaccatcccttcagacaggatcagaagaacttagatcattata taatacagtagcaaccctctattgtgtgcatcaaaggatagagataaaagacaccaaggaagctttagacaagatagaggaagagcaa aacaaaagtaagaccaccgcacagcaagcggccggccgcgctgatcttcagacctggaggaggagatatgagggacaattggagaagt gaattatataaatataaagtagtaaaaattgaaccattaggagtagcacccaccaaggcaaagaagaagtggtgcagagagaaaaaa gagcagtgggaataggagctttgttccttgggttcttgggagcagcaggaagcactatgggcgcagcgtcaatgacgctgacggtaca ggccagacaattattgtctggtatagtgcagcagcagaacaatttgctgagggctattgaggcgcaacagcatctgttgcaactcaca gtctggggcatcaagcagctccaggcaagaatcctggctgtggaaagataccctaaaggatcaacagctcctggggatttggggttgct ctggaaaactcatttgcaccactgctgtgccttggaatgctagttggagtaataaatctctggaacagatttggaatcacacgacctg gatggagtgggacagagaaattaacaattacacaagcttaatacactccttaattgaagaatcgcaaaaccagcaagaaaagaatgaa caagaattattggaattagataaatgggcaagtttgtggaattggtttaacataacaaattggctgtggtatataaaattattcataa tgatagtaggaggcttggtaggtttaagaatagttttgctgtactttctatagtgaatagagttaggcagggatattcaccattatc gtttcagacccacctcccaaccccgaggggacccgacaggcccgaaggaatagaagaagaaggtggagagagagacagagacagatcc attcgattagtgaacggatcggcactgcgtgcgccaattctgcagacaaatggcagtattcatccacaatttttaaaagaaaaggggggg attgggggtacagtgcaggggaaagaatagtagacataatagcaacagacatacaaactaaagaattacaaaaacaaattacaaaaa ttcaaaattttcgggtttattacagggacagcagagatccagtttggttagtaccgggcccgctctagaaattctaccactgaaccac caatgctactgtcagctaaagacctgcagtattgtctcttaaagctcactatctctggccattcactaaggaaccaggcaccgtctta aatcgcggtttggaaaatattttgttcaagataaaactgttttaagatatacgtgtatatatcttatatatctgtattcgcatggtaa catatcttcggccttcctgagccgctgggctctcagcggccctccaaggcagcccgcaggcccctgtgtgcctcagggatccgacctc

```
ccacagcccgggggagaccttgcctctaaagttgctgcttttgcagcctctgccacaaccgcgcgtcctcagagccagcccggaggag
ctagaaccttccccgcatttctttcagcagcctgagtcagaggcgggctggcctggcgtagccgcccagcctcgcggctcatgccccg
atctgcccgaaccttctcccggggtcagcgccgcgccgcgccacccggctgagtcagcccgggcgggcgagaggctctcaactgggcg
ggaaggtgcgggaaggtgcggaaaggttcgcgaaagttcgcggcggcgggggtcgggtgaggcgcaaaaggataaaaagcccgtggaa
gcggagctgagcagatccgagccgggctggctgcagagaaaccgcagggagagcctcactaaccggtatgggagtcaaagttctgttt
gccctgatctgcatcgctgtggccgaggccaagcccaccgagaacaacgaagacttcaacatcgtggccgtggccagcaacttcgcga
ccacggatctcgatgctgaccgcgggaagttgcccggcaagaagctgccgctggaggtgctcaaagagatggaagccaatgcccggaa
agctggctgcaccaggggctgtctgatctgcctgtcccacatcaagtgcacgcccaagatgaagaagttcatcccaggacgctgccac
acctacgaaggcgacaaagagtccgcacagggcggcataggcgaggcgatcgtcgacattcctgagattcctgggttcaaggacttgg
agcctatggagcagttcatcgcacaggtcgatctgtgtgtggactgcacaactggctgcctcaaagggcttgccaacgtgcagtgttc
tgacctgctcaagaagtggctgccgcaacgctgtgcgacctttgccagcaagatccagggccaggtggacaagatcaaggggccggt
ggtgactaactcgaggtcgacggtatcgataagctcgcttcacgagattccagcaggtcgagggacctaataacttcgtatagcatac
attatacgaagttatattaagggttccaagcttaagcggccgctgaaagaccccacctgtaggtttggcaagctagctgcagtaacgc
cattttgcaaggcatggaaaaataccaaaccaagaatagagaagttcagatcaagggcgggtacatgaaaatagctaacgttgggcca
aacaggatatctgcggtgagcagtttcggccccggcccggggccaagaacagatggtcaccgcagtttcggccccggcccgaggccaa
gaacagatggtccccagatatggcccaaccctcagcagtttcttaagacccatcagatgtttccaggctcccccaaggacctgaaatg
accctgcgccttatttgaattaaccaatcagcctgcttctcgcttctgttcgcgcgcttctgcttcccgagctctataaaagagctca
caaccctcactcggcgcgccagtcctccgattgactgagtcgcccggatcccgccaccatggtgagcaagggcgaggaggataacat
ggccatcatcaaggagttcatgcgcttcaaggtgcacatggagggctccgtgaacggccacgagttcgagatcgagggcgagggcgag
ggccgcccctacgagggcacccagaccgccaagctgaaggtgaccaagggtggccccctgcccttcgcctgggacatcctgtcccctc
agttcatgtacggctccaaggcctacgtgaagcaccccgccgacatccccgactacttgaagctgtccttccccgagggcttcaagtg
ggagcgcgtgatgaacttcgaggacggcggcgtggtgaccgtgacccaggactcctccctgcaggacggcgagttcatctacaaggtg
aagctgcgcggcaccaacttcccctccgacggccccgtaatgcagaagaagaccatgggctgggaggcctcctccgagcggatgtacc
ccgaggacggcgccctgaagggcgagatcaagcagaggctgaagctgaaggacggcggccactacgacgctgaggtcaagaccaccta
caaggccaagaagcccgtgcagctgcccggcgcctacaacgtcaacatcaagttggacatcacctcccacaacgaggactacaccatc
gtggaacagtacgaacgcgccgagggccgccactccaccggcggcatggacgagctgtacaagtaagaattcgtcgagggacctaata
acttcgtatagcatacattatacgaagttatacatgtttaagggttccggttccactaggtacaattcgatatcaagcttatcgataa
tcaacctctggattacaaaatttgtgaaagattgactggtattcttaactatgttgctccttttacgctatgtggatacgctgctta
atgcctttgtatcatgctattgcttcccgtatggctttcattttctcctccttgtataaatcctggttgctgtctctttatgaggagt
tgtggcccgttgtcaggcaacgtggcgtggtgtgcactgtgtttgctgacgcaaccccactggttgggcattgccaccacctgtca
gctcctttccgggactttcgctttcccccctccctattgccacggcggaactcatcgccgcctgccttgcccgctgctggacaggggct
cggctgttgggcactgacaattccgtggtgttgtcggggaaatcatcgtcctttccttggctgctcgcctgtgttgccacctggattc
tgcgcgggacgtccttctgctacgtcccttcggccctcaatccagcggaccttccttcccgcggcctgctgccggctctgcggcctct
tccgcgtcttcgccttcgccctcagacgagtcggatctccctttgggccgcctccccgcatcgataccgtcgacctcgatcgagacct
agaaaaacatggagcaatcacaagtagcaatacagcagctaccaatgctgattgtgcctggctagaagcacaagaggaggaggaggtg
ggttttccagtcacacctcaggtacctttaagaccaatgacttacaaggcagctgtagatcttagccactttttaaaagaaaaggggg
gactggaagggctaattcactcccaacgaagacaagatatccttgatctgtggatctaccacacacaaggctacttccctgattggca
gaactacacaccagggccagggatcagatatccactgacctttggatggtgctacaagctagtaccagttgagcaagagaaggtagaa
gaagccaatgaaggagagaacacccgcttgttacaccctgtgagcctgcatgggatggatgacccggagagagaagtattagagtgga
ggtttgacagccgcctagcatttcatcacatggcccgagagctgcatccggactgtactgggtctctctggttagaccagatctgagc
```

-continued ctgggagctctctggctaactagggaacccactgcttaagcctcaataaagcttgccttgagtgcttcaagtagtgtgtgcccgtctg ttgtgtgactctggtaactagagatccctcagaccccttttagtcagtgtggaaaatctctagcagcatgtgagcaaaaggccagcaaa aggccaggaaccgtaaaaggccgcgttgctggcgttttccataggctccgccccctgacgagcatcacaaaaatcgacgctcaag tcagaggtggcgaaacccgacaggactataaagataccaggcgtttccccctggaagctccctcgtgcgctctcctgttccgaccctg ccgcttaccggatacctgtccgcctttctcccttcgggaagcgtggcgctttctcatagctcacgctgtaggtatctcagttcggtgt aggtcgttcgctccaagctgggctgtgtgcacgaaccccccgttcagcccgaccgctgcgccttatccggtaactatcgtcttgagtc caacccggtaagacacgacttatcgccactggcagcagccactggtaacaggattagcagagcgaggtatgtaggcggtgctacagag ttcttgaagtggtggcctaactacggctacactagaagaacagtatttggtatctgcgctctgctgaagccagttaccttcggaaaaa gagttggtagctcttgatccggcaaacaaaccaccgctggtagcggtggtttttttgtttgcaagcagcagattacgcgcagaaaaaa aggatctcaagaagatcctttgatcttttctacggggtctgacgctcagtggaacgaaaactcacgttaagggattttggtcatgaga ttatcaaaaaggatcttcacctagatccttttaaattaaaaatgaagttttaaatcaatctaaagtatatatgagtaaacttggtctg acagttaccaatgcttaatcagtgaggcacctatctcagcgatctgtctatttcgttcatccatagttgcctgactccccgtcgtgta gataactacgatacgggagggcttaccatctggccccagtgctgcaatgataccgcgagacccacgctcaccggctccagatttatca gcaataaaccagccagccggaagggccgagcgcagaagtggtcctgcaactttatccgcctccatccagtctattaattgttgccggg aagctagagtaagtagttcgccagttaatagtttgcgcaacgttgttgccattgctacaggcatcgtggtgtcacgctcgtcgtttgg tatggcttcattcagctccggttcccaacgatcaaggcgagttacatgatcccccatgttgtgcaaaaaagcggttagctccttcggt cctccgatcgttgtcagaagtaagttggccgcagtgttatcactcatggttatggcagcactgcataattctcttactgtcatgccat ccgtaagatgcttttctgtgactggtgagtactcaaccaagtcattctgagaatagtgtatgcggcgaccgagttgctcttgcccggc gtcaatacgggataataccgcgccacatagcagaactttaaaagtgctcatcattggaaaacgttcttcggggcgaaaactctcaagg atcttaccgctgttgagatccagttcgatgtaacccactcgtgcacccaactgatcttcagcatcttttactttcaccagcgtttctg ggtgagcaaaaacaggaaggcaaaatgccgcaaaaaagggaataagggcgacacggaaatgttgaatactcatactcttcctttttca atattattgaagcatttatcagggttattgtctcatgagcggatacatatttgaatgtatttagaaaaataaacaataggggttccg cgcacatttccccgaaaagtgccacctgac Truncated HSPA6 Promoter Construct 8; synthetic bioswitch comprises a truncated
promoter (2622-2739) and a reporter (2746-3303)

SEQ ID NO: 8
gtcgacggatcgggagatctcccgatcccctatggtgcactctcagtacaatctgactgatgccgcatagttaagccagtatctgacc ctgcttgtgtgttggaggtcgctgagtagtgcgcgagcaaaatttaagctacaacaaggcaaggcttgaccgacaattgcatgaagaa tctgcttagggttaggcgttttgcgctgatcgcgatgtacgggccagatatacgcgttgacattgattattgactagttattaatagt aatcaattacggggtcattagttcatagcccatatatggagttccgcgttacataacttacggtaaatggcccgcctggctgaccgcc caacgacccccgcccattgacgtcaataatgacgtatgttcccatagtaacgccaatagggactttccattgacgtcaatgggtggag tatttacggtaaactgcccacttggcagtacatcaagtgtatcatatgccaagtacgccccctattgacgtcaatgacggtaaatggc ccgcctggcattatgcccagtacatgaccttatgggactttcctacttggcagtacatctacgtattagtcatcgctattaccatggt gatgcggttttggcagtacatcaatgggcgtggatagcggtttgactcacggggatttccaagtaccacccattgacgtcaatggga gtttgttttggcaccaaaatcaacgggactttccaaaatgtcgtaacaactccgccccattgacgcaaatgggcggtaggcgtgtacg gtgggaggtctatataagcagcgcgttttgcctgtactgggtctctctggttagaccagatctgagcctgggagctctctggctaact agggaacccactgcttaagcctcaataaagcttgccttgagtgcttcaagtagtgtgtgcccgtctgttgtgtgactctggtaactag agatccctcagaccccttttagtcagtgtggaaaatctctagcagtggcgcccgaacagggacttgaaagcgaaagggaaaccagagga gactacgacgcaggactcggcttgctgaagcgcgcacggcaagaggcgaggggcggcgactggtgagtacgccaaaaattttgactag cggaggctagaaggagagagatgggtgcgagagcgtcagtattaagcgggggagaattagatcgcgatgggaaaaaattcggttaagg ccagggggaaagaaaaaatataaattaaaacatatagtatgggcaagcagggagctagaacgattcgcagttaatcctggcctgttag aaacatcagaaggctgtagacaaatactgggacagctacaaccatccatcagacaggatcagaagaacttagatcattatataataca -continued

```
gtagcaaccactattgtgtgcatcaaaggatagagataaaagacaccaaggaagctttagacaagatagaggaagagcaaaacaaaag taagaccaccgcacagcaagcggccggccgcgctgatcttcagacctggaggaggagatatgagggacaattggagaagtgaattata taaatataaagtagtaaaaattgaaccattaggagtagcacccaccaaggcaaagagaagagtggtgcagagagaaaaaagagcagtg ggaataggagctttgttccttgggttcttgggagcagcaggaagcactatgggcgcagcgtcaatgacgctgacggtacaggccagac aattattgtctggtatagtgcagcagcagaacaatttgctgagggctattgaggcgcaacagcatctgttgcaactcacagtctgggg catcaagcagaccaggcaagaatcctggctgtggaaagatacctaaaggatcaacagctcctggggatttggggttgactggaaaact catttgcaccactgctgtgccttggaatgctagttggagtaataaatctctggaacagatttggaatcacacgacctggatggagtgg gacagagaaattaacaattacacaagcttaatacactccttaattgaagaatcgcaaaaccagcaagaaaagaatgaacaagaattat tggaattagataaatgggcaagtttgtggaattggtttaacataacaaattggctgtggtatataaaattattcataatgatagtagg aggcttggtaggtttaagaatagttttgctgtactttctatagtgaatagagttaggcagggatattccaccattatcgtttcagacc caccctcccaaccccgaggggacccgacaggcccgaaggaatagaagaagaaggtggagagagagacagagacagatccattcgattag tgaacggatcggcactgcgtgcgccaattctgcagacaaatggcagtattcatccacaattttaaaagaaaaggggggattgggggt acagtgcaggggaaagaatagtagacataatagcaacagacatacaaactaaagaattacaaaaacaaattacaaaaattcaaaattt tcgggtttattacagggacagcagagatccagtttggttagtaccgggcccgctctagacgaaagttcgcggcggcggggtcggtg aggcgcaaaaggataaaaagcccgtggaagcggagctgagcagatccgagccgggctggctgcagagaaaccgcagggagagcctcac taccggtatgggagtcaaagttctgtttgccctgatctgcatcgctgtggccgaggccaagcccaccgagaacaacgaagacttcaac atcgtggccgtggccagcaacttcgcgaccacggatctcgatgctgaccgcgggaagttgcccggcaagaagctgccgctggaggtgc tcaaagagatggaagccaatgcccggaaagctggctgcaccaggggctgtctgatctgcctgtcccacatcaagtgcacgcccaagat gaagaagttcatcccaggacgctgccacacctacgaaggcgacaaagagtccgcacagggcggcataggcgaggcgatcgtcgacatt cctgagattcctgggttcaaggacttggagcctatggagcagttcatcgcacaggtcgatctgtgtgtggactgcacaactggctgcc tcaaagggcttgccaacgtgcagtgttctgacctgctcaagaagtggctgccgcaacgctgtgcgacctttgccagcaagatccaggg ccaggtggacaagatcaaggggggccggtggtgactaactcgaggtcgacggtatcgataagctcgcttcacgagattccagcaggtcg agggacctaataacttcgtatagcatacattatacgaagttatattaaggggttccaagcttaagcggccgctgaaagaccccacctgt aggtttggcaagctagctgcagtaacgccattttgcaaggcatggaaaaataccaaaccaagaatagagaagttcagatcaagggcgg gtacatgaaaatagctaacgttgggcaaacaggatatctgcggtgagcagtttcggccccggcccggggccaagaacagatggtcac cgcagtttcggccccggcccgaggccaagaacagatggtccccagatatggcccaaccctcagcagtttcttaagacccatcagatgt ttccaggctccccaaggacctgaaatgaccctgcgccttatttgaattaaccaatcagcctgcttctcgcttctgttcgcgcgcttc tgcttcccgagctctataaaagagctcacaacccctcactcggcgcgccagtcctccgattgactgagtcgcccggatcccgccacca tggtgagcaagggcgaggaggataacatggccatcatcaaggagttcatgcgcttcaaggtgcacatggagggctccgtgaacggcca cgagttcgagatcgagggcgagggcgagggccgcccctacgagggcacccagaccgccaagctgaaggtgaccaaggggtggccccctg cccttcgcctgggacatcctgtcccctcagttcatgtacggctccaaggcctacgtgaagcaccccgccgacatccccgactacttga agctgtccttccccgagggcttcaagtgggagcgcgtgatgaacttcgaggacggcggcgtggtgaccgtgacccaggactcctccct gcaggacggcgagttcatctacaaggtgaagctgcgcggcaccaacttcccctccgacggccccgtaatgcagaagaagaccatgggc tgggaggcctcctccgagcggatgtaccccgaggacggcgccctgaagggcgagatcaagcagaggctgaagctgaaggacggcggcc actacgacgctgaggtcaagacccacctacaaggccaagaagcccgtgcagctgcccggcgcctacaacgtcaacatcaagttggacat cacctcccacaacgaggactacaccatcgtggaacagtacgaacgcgccgagggccgccactccaccggcggcatggacgagctgtac aagtaagaattcgtcgagggacctaataacttcgtatagcatacattatacgaagttatacatgtttaagggttccggttccactagg tacaattcgatatcaagatatcgataatcaacctctggattacaaaatttgtgaaagattgactggtattataactatgttgctcctt ttacgctatgtggatacgctgattaatgcctttgtatcatgctattgcttcccgtatggctttcattttctcctccttgtataaatcc tggttgctgtctattatgaggagttgtggcccgttgtcaggcaacgtggcgtggtgtgcactgtgtttgctgacgcaaccccactgg ttggggcattgccaccacctgtcagctcctttccgggactttcgctttccccctccctattgccacggcggaactcatcgccgcctgc
```

-continued

```
cttgcccgctgctggacagggctcggctgttgggcactgacaattccgtggtgttgtcggggaaatcatcgtcctttccttggctgc
tcgcctgtgttgccacctggattctgcgcgggacgtccttctgctacgtcccttcggccctcaatccagcggaccttccttcccgcgg
cctgctgccggctctgcggcctcttccgcgtcttcgccttcgccctcagacgagtcggatctcccttgggccgcctccccgcatcga
taccgtcgacctcgatcgagacctagaaaaacatggagcaatcacaagtagcaatacagcagctaccaatgctgattgtgcctggcta
gaagcacaagaggaggaggaggtgggttttccagtcacacctcaggtacctttaagaccaatgacttacaaggcagctgtagatctta
gccacttttaaaagaaaagggggactggaagggctaattcactcccaacgaagacaagatatccttgatctgtggatctaccacac
acaaggctacttccctgattggcagaactacacaccagggccagggatcagatatccactgacctttggatggtgctacaagctagta
ccagttgagcaagagaaggtagaagaagccaatgaaggagagaacacccgcttgttacaccctgtgagcctgcatgggatggatgacc
cggagagagaagtattagagtggaggtttgacagccgcctagcatttcatcacatggcccgagagctgcatccggactgtactgggtc
tctctggttagaccagatctgagcctgggagctctctggctaactagggaacccactgcttaagcctcaataaagcttgccttgagtg
cttcaagtagtgtgtgcccgtctgttgtgtgactctggtaactagagatccctcagacccttttagtcagtgtggaaaatctctagca
gcatgtgagcaaaaggccagcaaaaggccaggaaccgtaaaaaggccgcgttgctggcgtttttccataggctccgcccccctgacga
gcatcacaaaaatcgacgctcaagtcagaggtggcgaaacccgacaggactataaagataccaggcgtttcccctggaagctccctc
gtgcgctctcctgttccgaccctgccgcttaccggatacctgtccgcctttctcccttcgggaagcgtggcgctttctcatagctcac
gctgtaggtatctcagttcggtgtaggtcgttcgctccaagctgggctgtgtgcacgaaccccccgttcagcccgaccgctgcgcctt
atccggtaactatcgtcttgagtccaacccggtaagacacgacttatcgccactggcagcagccactggtaacaggattagcagagcg
aggtatgtaggcggtgctacagagttatgaagtggtggcctaactacggctacactagaagaacagtatttggtatctgcgctctgct
gaagccagttaccttcggaaaaagagttggtagctcttgatccggcaaacaaaccaccgctggtagcggtggtttttttgtttgcaag
cagcagattacgcgcagaaaaaaaggatctcaagaagatcctttgatcttttctacggggtctgacgctcagtggaacgaaaactcac
gttaagggattttggtcatgagattatcaaaaaggatcttcacctagatccttttaaattaaaaatgaagttttaaatcaatctaaag
tatatatgagtaaacttggtctgacagttaccaatgataatcagtgaggcacctatctcagcgatctgtctatttcgttcatccatag
ttgcctgactccccgtcgtgtagataactacgatacgggagggcttaccatctggccccagtgctgcaatgataccgcgagacccacg
ctcaccggctccagatttatcagcaataaaccagccagccggaagggccgagcgcagaagtggtcctgcaactttatccgcctccatc
cagtctattaattgttgccgggaagctagagtaagtagttcgccagttaatagtttgcgcaacgttgttgccattgctacaggcatcg
tggtgtcacgctcgtcgtttggtatggcttcattcagctccggttcccaacgatcaaggcgagttacatgatcccccatgttgtgcaa
aaaagcggttagctccttcggtcctccgatcgttgtcagaagtaagttggccgcagtgttatcactcatggttatggcagcactgcat
aattctatactgtcatgccatccgtaagatgatttctgtgactggtgagtactcaaccaagtcattctgagaatagtgtatgcggcga
ccgagttgctcttgcccggcgtcaatacgggataataccgcgccacatagcagaactttaaaagtgctcatcattggaaaacgttatc
ggggcgaaaactctcaaggatcttaccgctgttgagatccagttcgatgtaacccactcgtgcacccaactgatcttcagcatctttt
actttcaccagcgtttctgggtgagcaaaaacaggaaggcaaaatgccgcaaaaaagggaataagggcgacacggaaatgttgaatac
tcatactatccttttcaatattattgaagcatttatcagggttattgtctcatgagcggatacatatttgaatgtatttagaaaaat
aaacaaataggggttccgcgcacatttccccgaaaagtgccacctgac
```

RBPJ-kappa (repressor) binding site                                    SEQ ID NO: 9
gaattcccacaac RBPJ-kappa (repressor) binding site                                    SEQ ID NO: 10
tctttcccatgct RBPJ-kappa (repressor) binding site                                    SEQ ID NO: 11
aaagtgggaaatg PPRE (hyperlipidemia) protein binding site                             SEQ ID NO: 12
ctttcacctttgccatgattgt -continued HIF (Hipoxia Inducible Factor) element
SEQ ID NO: 13
cccagccacgtggaact cAMP response element
SEQ ID NO: 21
aagtaatgacttaaatagaca Glucocorticoid receptor IR1 site
SEQ ID NO: 14
taactcttggagatg Glucocorticoid receptor IR1 site
SEQ ID NO: 15
gtgctctcggagaga Heat Shock Element
SEQ ID NO: 16
ttcctgaac Heat Shock Element
SEQ ID NO: 17
tgaacttcc Heat Shock Element
SEQ ID NO: 18
aagtttcctctgaa Heat Shock Element
SEQ ID NO: 19
ttcagaag Heat Shock Element
SEQ ID NO: 20
ttcagcggaa Heat Shock Element
SEQ ID NO: 22
gaattc Heat Shock Element
SEQ ID NO: 23
gaaccttc Heat Shock Element
SEQ ID NO: 24
gaaaggttcgcgaaagttc Heat Shock Element
SEQ ID NO: 25
gaagcttc Activating protein (AP)-1 binding site
SEQ ID NO: 26
ctctgaatcaggc Activating protein (AP)-1 binding site
SEQ ID NO: 27
gcctgagtcagag Activating protein (AP)-1 binding site
SEQ ID NO: 28
gctgagtcagc Glucocorticoid receptor IR2 binding site
SEQ ID NO: 29
ggctcctcggggata Glucocorticoid receptor IR2 binding site
SEQ ID NO: 30
agccccggggagacc HSE2 Synthetic Promoter (HSE elements are underlined; TATA box is bolded; 5'-UTR is italicized)
SEQ ID NO: 32
<u>AGAACGTTCTAGAA</u>gGTCt<u>AGAACGTTCTAGAA</u>CTTGCCATTAATA_gagacctgaagcaccgcctgctaaaaatacccggctgggcac_

_acataaaagcacgctggggctccagtccggcacttctcggatcctcagcccagtgcttctagatcctcagccttgaccagccaagaac_

_atgac_

-continued

HSE3 Synthetic Promoter

SEQ ID NO: 33 tGAAaGTTCTAGAACgaCGAGAACGTTCTAGAAgGTCtAGAACGTTCTAGAACTTGCCATTAATAgagacctgaagcaccgcctgcta aaaatacccggctgggcacacataaaagcacgctggggctccagtccggcacttctcggatcctcagcccagtgcttctagatcctca gccttgaccagccaagaacatgac HSE4 Synthetic Promoter

SEQ ID NO: 34

AGAAgcTTCTAGAAtGTgctGAAaGTTCTAGAACgaCGAGAACGTTCTAGAAgGTCtAGAACGTTCTAGAACTTGCCATTAATAgaga cctgaagcaccgcctgctaaaaatacccggctgggcacacataaaagcacgctggggctccagtccggcacttctcggatcctcagcc cagtgcttctagatcctcagccttgaccagccaagaacatgac HSE5 Synthetic Promoter

SEQ ID NO: 35

AGAACGTTCTAGAACcTgGAGAAgcTTCTAGAAtGTgctGAAaGTTCTAGAACgaCGAGAACGTTCTAGAAgGTCtAGAACGTTCTAG AACTTGCCATTAATAgagacctgaagcaccgcctgctaaaaatacccggctgggcacacataaaagcacgctggggctccagtccggc acttctcggatcctcagcccagtgcttctagatcctcagccttgaccagccaagaacatgac HSE6 Synthetic Promoter

SEQ ID NO: 36

AGAACGTTCatGAACGctGAGAACGTTCTAGAACcTgGAGAAgcTTCTAGAAtGTgctGAAaGTTCTAGAACgaCGAGAACGTTCTAG AAgGTCtAGAACGTTCTAGAACTTGCCATTAATAgagacctgaagcaccgcctgctaaaaatacccggctgggcacacataaaagcac gctggggctccagtccggcacttctcggatcctcagcccagtgcttctagatcctcagccttgaccagccaagaacatgac HSE7 Synthetic Promoter

SEQ ID NO: 37

AGAAgcTTCatGAACGTgcAGAACGTTCatGAACGctGAGAACGTTCTAGAACcTgGAGAAgcTTCTAGAAtGTgctGAAaGTTCTAG AACgaCGAGAACGTTCTAGAAgGTCtAGAACGTTCTAGAACTTGCCATTAATAgagacctgaagcaccgcctgctaaaaatacccggc tgggcacacataaaagcacgctggggctccagtccggcacttctcggatcctcagcccagtgcttctagatcctcagccttgaccagc caagaacatgac HSE Element

SEQ ID NO: 38

AGAACGTTCTAGAAg

HSE Element

SEQ ID NO: 39

AGAACGTTCTAGAAC

TATA box

SEQ ID NO: 40

CATTAATA

HSE Element

SEQ ID NO: 41 tGAAaGTTCTAGAAC

HSE Element

SEQ ID NO: 42

AGAAgcTTCTAGAAt

HSE Element
SEQ ID NO: 43
AGAACGTTCatGAAC

REFERENCES

[1] Auslander, S., and Fussenegger, M. (2013) From gene switches to mammalian designer cells: present and future prospects, *Trends Biotechnol* 31, 155-168.

[2] Lienert, F., Lohmueller, J. J., Garg, A., and Silver, P. A. (2014) Synthetic biology in mammalian cells: next generation research tools and therapeutics, *Nat Rev Mol Cell Bio* 15, 95-107.

[3] Fenno, L., Yizhar, O., and Deisseroth, K. (2011) The Development and Application of Optogenetics, *Annu Rev Neurosci* 34, 389-412.

[4] Swartz, M. A., Hirosue, S., and Hubbell, J. A. (2012) Engineering approaches to immunotherapy, *Sci Transl Med* 4, 148rv149.

[5] Park, J. S., Rhau, B., Hermann, A., McNally, K. A., Zhou, C., Gong, D., Weiner, O. D., Conklin, B. R., Onuffer, J., and Lim, W. A. (2014) Synthetic control of mammalian-cell motility by engineering chemotaxis to an orthogonal bioinert chemical signal, *Proc Natl Acad Sci USA* 111, 5896-5901.

[6] Huang, B., Abraham, W. D., Zheng, Y., Bustamante Lopez, S. C., Luo, S. S., and Irvine, D. J. (2015) Active targeting of chemotherapy to disseminated tumors using nanoparticle-carrying T cells, *Sci Transl Med* 7, 291ra294.

[7] Roybal, K. T., Rupp, L. J., Morsut, L., Walker, W. J., McNally, K. A., Park, J. S., and Lim, W. A. (2016) Precision Tumor Recognition by T Cells With Combinatorial Antigen-Sensing Circuits, *Cell* 164, 770-779.

[8] Jackson, H. J., Rafiq, S., and Brentjens, R. J. (2016) Driving CAR T-cells forward, *Nat Rev Clin Oncol* 13, 370-383.

[9] Murphy, A. G., and Zheng, L. (2015) Small molecule drugs with immunomodulatory effects in cancer, *Hum Vaccin Immunother* 11, 2463-2468.

[10] Baumeister, S. H., Freeman, G. J., Dranoff, G., and Sharpe, A. H. (2016) Coinhibitory Pathways in Immunotherapy for Cancer, *Annu Rev Immunol* 34, 539-573.

[11] Waldmann, T. A. (2006) The biology of interleukin-2 and interleukin-15: implications for cancer therapy and vaccine design, *Nat Rev Immunol* 6, 595-601.

[12] Kaehler, K. C., Piel, S., Livingstone, E., Schilling, B., Hauschild, A., and Schadendorf, D. (2010) Update on immunologic therapy with anti-CTLA-4 antibodies in melanoma: identification of clinical and biological response patterns, immune-related adverse events, and their management, *Semin Oncol* 37, 485-498.

[13] Tan, P., He, L., Han, G., and Zhou, Y. (2017) Optogenetic Immunomodulation: Shedding Light on Antitumor Immunity, *Trends Biotechnol* 35, 215-226.

[14] Fagnoni, F. F., Zerbini, A., Pelosi, G., and Missale, G. (2008) Combination of radiofrequency ablation and immunotherapy, *Front Biosci* 13, 369-381.

[15] Jain, P. K., Lee, K. S., El-Sayed, I. H., and El-Sayed, M. A. (2006) Calculated absorption and scattering properties of gold nanoparticles of different size, shape, and composition: applications in biological imaging and biomedicine, *J Phys Chem B* 110, 7238-7248.

[16] Lubner, M. G., Brace, C. L., Hinshaw, J. L., and Lee, F. T., Jr. (2010) Microwave tumor ablation: mechanism of action, clinical results, and devices, *J Vasc Interv Radiol* 21, S192-203.

[17] Haar, G. T., and Coussios, C. (2007) High intensity focused ultrasound: physical principles and devices, *Int J Hyperthermia* 23, 89-104.

[18] Sabel, M. S. (2009) Cryo-immunology: a review of the literature and proposed mechanisms for stimulatory versus suppressive immune responses, *Cryobiology* 58, 1-11.

[19] Wust, P., Hildebrandt, B., Sreenivasa, G., Rau, B., Gellermann, J., Riess, H., Felix, R., and Schlag, P. M. (2002) Hyperthermia in combined treatment of cancer, *Lancet Oncol* 3, 487-497.

[20] Chu, K. F., and Dupuy, D. E. (2014) Thermal ablation of tumours: biological mechanisms and advances in therapy, *Nat Rev Cancer* 14, 199-208.

[21] Kortmann, J., and Narberhaus, F. (2012) Bacterial RNA thermometers: molecular zippers and switches, *Nat Rev Microbiol* 10, 255-265.

[22] Gardner, T. S., Cantor, C. R., and Collins, J. J. (2000) Construction of a genetic toggle switch in *Escherichia coli*, *Nature* 403, 339-342.

[23] Piraner, D. I., Abedi, M. H., Moser, B. A., Lee-Gosselin, A., and Shapiro, M. G. (2017) Tunable thermal bioswitches for in vivo control of microbial therapeutics, *Nat Chem Biol* 13, 75-80.

[24] Lindquist, S. (1986) The heat-shock response, *Annu Rev Biochem* 55, 1151-1191.

[25] Feder, M. E., and Hofmann, G. E. (1999) Heat-shock proteins, molecular chaperones, and the stress response: evolutionary and ecological physiology, *Annu Rev Physiol* 61, 243-282.

[26] Miyako, E., Deguchi, T., Nakajima, Y., Yudasaka, M., Hagihara, Y., Horie, M., Shichiri, M., Higuchi, Y., Yamashita, F., Hashida, M., Shigeri, Y., Yoshida, Y., and Iijima, S. (2012) Photothermic regulation of gene expression triggered by laser-induced carbon nanohorns, *Proc Natl Acad Sci USA* 109, 7523-7528.

[27] Deguchi, T., Itoh, M., Urawa, H., Matsumoto, T., Nakayama, S., Kawasaki, T., Kitano, T., Oda, S., Mitani, H., Takahashi, T., Todo, T., Sato, J., Okada, K., Hatta, K., Yuba, S., and Kamei, Y. (2009) Infrared laser-mediated local gene induction in medaka, zebrafish and *Arabidopsis thaliana*, *Dev Growth Differ* 51, 769-775.

[28] Ramos, D. M., Kamal, F., Wimmer, E. A., Cartwright, A. N., and Monteiro, A. (2006) Temporal and spatial control of transgene expression using laser induction of the hsp70 promoter, *BMC Dev Biol* 6,55.

[29] Andersson, H. A., Kim, Y. S., O'Neill, B. E., Shi, Z. Z., and Serda, R. E. (2014) HSP70 promoter-driven activation of gene expression for immunotherapy using gold nanorods and near infrared light, *Vaccines (Basel)* 2, 216-227.

[30] Jaque, D., Martinez Maestro, L., del Rosal, B., Haro-Gonzalez, P., Benayas, A., Plaza, J. L., Martin Rodriguez, E., and Garcia Sole, J. (2014) Nanoparticles for photothermal therapies, *Nanoscale* 6, 9494-9530.

[31] Akerfelt, M., Morimoto, R. I., and Sistonen, L. (2010) Heat shock factors: integrators of cell stress, development and lifespan, *Nat Rev Mol Cell Biol* 11, 545-555.

[32] Richter, K., Haslbeck, M., and Buchner, J. (2010) The heat shock response: life on the verge of death, *Mol Cell* 40, 253-266.

[33] Ramirez, V. P., Stamatis, M., Shmukler, A., and Aneskievich, B. J. (2015) Basal and stress-inducible expression of HSPA6 in human keratinocytes is regulated by negative and positive promoter regions, *Cell Stress Chaperones* 20, 95-107.

[34] Hamajima, F., Hasegawa, T., Nakashima, I., and Isobe, K. (2002) Genomic cloning and promoter analysis of the GAHSP40 gene, *J Cell Biochem* 84, 401-407.

[35] von Maltzahn, G., Park, J. H., Lin, K. Y., Singh, N., Schwoppe, C., Mesters, R., Berdel, W. E., Ruoslahti, E., Sailor, M. J., and Bhatia, S. N. (2011) Nanoparticles that communicate in vivo to amplify tumour targeting, *Nat Mater* 10, 545-552.

[36] von Maltzahn, G., Park, J. H., Agrawal, A., Bandaru, N. K., Das, S. K., Sailor, M. J., and Bhatia, S. N. (2009) Computationally guided photothermal tumor therapy using long-circulating gold nanorod antennas, *Cancer Res* 69, 3892-3900.

[37] Kim, P. S., and Ahmed, R. (2010) Features of responding T cells in cancer and chronic infection, *Curr Opin Immunol* 22, 223-230.

[38] Kregel, K. C. (2002) Heat shock proteins: modifying factors in physiological stress responses and acquired thermotolerance, *J Appl Physiol* (1985) 92, 2177-2186.

[39] Rabindran, S. K., Haroun, R. I., Clos, J., Wisniewski, J., and Wu, C. (1993) Regulation of heat shock factor trimer formation: role of a conserved leucine zipper, *Science* 259, 230-234.

[40] Clos, J., Westwood, J. T., Becker, P. B., Wilson, S., Lambert, K., and Wu, C. (1990) Molecular cloning and expression of a hexameric *Drosophila* heat shock factor subject to negative regulation, *Cell* 63, 1085-1097.

[41] Hentze, N., Le Breton, L., Wiesner, J., Kempf, G., and Mayer, M. P. (2016) Molecular mechanism of thermosensory function of human heat shock transcription factor Hsf1, *Elife* 5.

[42] Hensen, S. M., Heldens, L., van Genesen, S. T., Pruijn, G. J., and Lubsen, N. H. (2013) A delayed antioxidant response in heat-stressed cells expressing a non-DNA binding HSF1 mutant, *Cell Stress Chaperones* 18, 455-473.
[43] Heldens, L., Dirks, R. P., Hensen, S. M., Onnekink, C., van Genesen, S. T., Rustenburg, F., and Lubsen, N. H. (2010) Co-chaperones are limiting in a depleted chaperone network, *Cell Mol Life Sci* 67, 4035-4048.
[44] Neef, D. W., Jaeger, A. M., and Thiele, D. J. (2013) Genetic selection for constitutively trimerized human HSF1 mutants identifies a role for coiled-coil motifs in DNA binding, *G3 (Bethesda)* 3, 1315-1324.
[45] Khlebtsov, N., and Dykman, L. (2011) Biodistribution and toxicity of engineered gold nanoparticles: a review of in vitro and in vivo studies, *Chem Soc Rev* 40, 1647-1671.
[46] Stephan, S. B., Taber, A. M., Jileaeva, I., Pegues, E. P., Sentman, C. L., and Stephan, M. T. (2015) Biopolymer implants enhance the efficacy of adoptive T-cell therapy, *Nature Biotechnology* 33, 97-U277.
[47] Jensen, M. C., and Riddell, S. R. (2015) Designing chimeric antigen receptors to effectively and safely target tumors, *Curr Opin Immunol* 33, 9-15.

While several possible embodiments are disclosed above, embodiments of the present disclosure are not so limited. These exemplary embodiments are not intended to be exhaustive or to unnecessarily limit the scope of the disclosure, but instead were chosen and described in order to explain the principles of the present disclosure so that others skilled in the art may practice the disclosure. Indeed, various modifications of the disclosure in addition to those described herein will become apparent to those skilled in the art from the foregoing description. Such modifications are intended to fall within the scope of the appended claims.

All patents, applications, publications, test methods, literature, and other materials cited herein are hereby incorporated by reference in their entirety as if physically present in this specification.

What is claimed is:

1. A first nucleic acid molecule comprising:
   a first synthetic bioswitch; and
   a first heterologous nucleic acid;
   wherein the first synthetic bioswitch is operably linked to the first heterologous nucleic acid and comprises a first control element that is regulated by a first stimulus; and
   wherein the first synthetic bioswitch comprises the sequence of SEQ ID NO: 45, SEQ ID NO: 46, SEQ ID NO: 47, SEQ ID NO: 48, SEQ ID NO: 49, or SEQ ID NO: 50.

2. The first nucleic acid molecule of claim 1, wherein the first synthetic bioswitch has no activity to normal basal activity in the absence of the first stimulus.

3. The first nucleic acid molecule of claim 2, wherein the first synthetic bioswitch has high activity in the presence of the first stimulus.

4. The first nucleic acid molecule of claim 3, wherein the first synthetic bioswitch has a strong induction or activation.

5. The first nucleic acid molecule of claim 4, wherein the first synthetic bioswitch has no activity to normal basal activity with a first orthogonal stimulus.

6. The first nucleic acid molecule of claim 1, wherein the first synthetic bioswitch further comprises a first spacer region between the first control element and the first heterologous nucleic acid.

7. The first nucleic acid molecule of claim 6, wherein the first spacer region comprises a first untranslated region.

8. The first nucleic acid molecule of claim 7, wherein the first untranslated region has a length between 1 to 500 nucleotides.

9. The first nucleic acid molecule of claim 8, wherein the first untranslated region comprises a first regulatory element.

10. The first nucleic acid molecule of claim 9, wherein the first regulatory element comprises a binding site for one or more of E2F, Ik-2, LXRalpha:RXRalpha, TBP, TBX5, AR, ELFI, Nkx3A, SPII, CDX-2, SOX10, Kid3, MAFB, IRF-7, RXR::RAR, UNR, and Mushashi.

11. The first nucleic acid molecule of claim 6, wherein the first spacer region comprises one or more of an upstream AUG, an upstream open reading frame (uORFs), and an internal ribosomal entry site (IRES).

12. The first nucleic acid molecule of claim 1, wherein the first heterologous nucleic acid comprises a gene that encodes a biologically active protein or biological therapeutic, or a nucleic acid that enables the manipulation of physiologic or genetic processes and/or protein expression in a live cell.

13. The first nucleic acid molecule of claim 12, wherein the first heterologous nucleic acid comprises a gene that encodes a genome editing or modifying protein; therapeutic antibody: Bi-specific T-cell engager; chimeric antigen receptor; transgenic T-cell receptor; transferase; differentiating factor; Yamanaka factor for induced pluripotency; transcription factor; structural protein; transposon; non-coding RNA; kinase; or transport protein.

14. The first nucleic acid molecule of claim 1, wherein the first heterologous nucleic acid comprises a gene that encodes a first chimeric antigen receptor.

15. A vector comprising the first nucleic acid molecule of claim 1.

16. A cell comprising the first nucleic acid molecule of claim 1.

17. A compound synthetic bioswitch system comprising:
the first nucleic acid molecule of claim 1; and
a second nucleic acid molecule comprising:
a second synthetic bioswitch; and
a second heterologous nucleic acid;
wherein the second synthetic bioswitch is operably linked to the second heterologous nucleic acid and comprises a second control element that is regulated by a second stimulus.

18. The compound synthetic bioswitch system of claim 17, wherein either or both:
the combination of the first and second nucleic acid molecules enable differential regulation of the expression of the first heterologous nucleic acid in response to the first stimulus and the second stimulus; and
the combination of the first and second nucleic acid molecules enable differential regulation of the expression of the first heterologous nucleic acid and the second heterologous nucleic acid in response to the first stimulus and the second stimulus.

19. The nucleic acid molecule of claim 1, wherein the first synthetic bioswitch comprises the sequence of SEQ ID NO: 45.

20. The nucleic acid molecule of claim 1, wherein the first synthetic bioswitch comprises the sequence of SEQ ID NO: 46.

21. The nucleic acid molecule of claim 1, wherein the first synthetic bioswitch comprises the sequence of SEQ ID NO: 47.

22. The nucleic acid molecule of claim 1, wherein the first synthetic bioswitch comprises the sequence of SEQ ID NO: 48.

23. The nucleic acid molecule of claim 1, wherein the first synthetic bioswitch comprises the sequence of SEQ ID NO: 49.

24. The nucleic acid molecule of claim 1, wherein the first synthetic bioswitch comprises the sequence of SEQ ID NO: 50.

25. The nucleic acid molecule of claim 1, wherein the first synthetic bioswitch comprises two or more control elements and a first spacer region between the two or more control elements and the heterologous nucleic acid.

26. The nucleic acid molecule of claim 25, wherein the first spacer region comprises a 5' untranslated region.

27. The nucleic acid molecule of claim 26, wherein the 5' untranslated region comprises a regulatory element.

28. The nucleic acid molecule of claim 27, wherein the regulatory element comprises a binding site for one or more of E2F, Ik-2, LXRalpha: RXRalpha, TBP, TBX5, AR, ELFI, Nkx3A, SPII, CDX-2, SOXI0, Kid3, MAFB, IRF-7, RXR::RAR, UNR, and Mushashi.

29. The nucleic acid molecule of claim 25, wherein the first spacer region comprises one or more of an upstream AUG, an upstream open reading frame (uORF), and an internal ribosomal entry site (IRES).

30. The nucleic acid molecule of claim 1, wherein the bioswitch further comprises a TATA box.

31. The nucleic acid molecule of claim 1, wherein the first synthetic bioswitch further comprises a TATA box and a first spacer region between the first control element and the first heterologous nucleic acid comprising a first untranslated region, wherein the first synthetic bioswitch comprises the sequence of SEQ ID NO: 32, SEQ ID NO: 33, SEQ ID NO: 34, SEQ ID NO: 35, SEQ ID NO: 36, or SEQ ID NO: 37.

32. The nucleic acid molecule of claim 1, wherein the heterologous nucleic acid encodes a protein or interfering nucleic acid.

33. The nucleic acid molecule of claim 32, wherein the protein is a chimeric antigen receptor, antibody, T cell receptor, cytokine, chemokine, gene editing protein, bispecific T cell engager, transferase, differentiating factor, Yamanaka factor for induced pluripotency, transcription factor, structural protein, kinase, or transport protein.

34. The nucleic acid of claim 31, wherein the first synthetic bioswitch further comprises a TATA box and a first spacer region between the first control element and the first heterologous nucleic acid comprising a first untranslated region, wherein the first synthetic bioswitch comprises the sequence of SEQ ID NO: 32.

35. The nucleic acid of claim 31, wherein the first synthetic bioswitch further comprises a TATA box and a first spacer region between the first control element and the first heterologous nucleic acid comprising a first untranslated region, wherein the first synthetic bioswitch comprises the sequence of SEQ ID NO: 33.

36. The nucleic acid of claim 31, wherein the first synthetic bioswitch further comprises a TATA box and a first spacer region between the first control element and the first heterologous nucleic acid comprising a first untranslated region, wherein the first synthetic bioswitch comprises the sequence of SEQ ID NO: 34.

37. The nucleic acid of claim 31, wherein the first synthetic bioswitch further comprises a TATA box and a first spacer region between the first control element and the first heterologous nucleic acid comprising a first untranslated region, wherein the first synthetic bioswitch comprises the sequence of SEQ ID NO: 35.

38. The nucleic acid of claim 31, wherein the first synthetic bioswitch further comprises a TATA box and a first spacer region between the first control element and the first heterologous nucleic acid comprising a first untranslated region, wherein the first synthetic bioswitch comprises the sequence of SEQ ID NO: 36.

39. The nucleic acid of claim 31, wherein the first synthetic bioswitch further comprises a TATA box and a first spacer region between the first control element and the first heterologous nucleic acid comprising a first untranslated region, wherein the first synthetic bioswitch comprises the sequence of SEQ ID NO: 37.

40. The nucleic acid of claim 32, wherein the protein is a CD19 chimeric antigen receptor.

* * * * *

SEQUENCE LISTING

```
<160> NUMBER OF SEQ ID NOS: 50

<210> SEQ ID NO 1
<211> LENGTH: 10775
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 1
gtcgacggat cgggagatct cccgatcccc tatggtgcac tctcagtaca atctgctctg    60
atgccgcata gttaagccag tatctgctcc ctgcttgtgt gttggaggtc gctgagtagt   120
gcgcgagcaa aatttaagct acaacaaggc aaggcttgac cgacaattgc atgaagaatc   180
tgcttagggt taggcgtttt gcgctgcttc gcgatgtacg ggccagatat acgcgttgac   240
attgattatt gactagttat taatagtaat caattacggg gtcattagtt catagcccat   300
atatggagtt ccgcgttaca taacttacgg taaatggccc gcctggctga ccgcccaacg   360 accccgccc attgacgtca ataatgacgt atgttcccat agtaacgcca atagggactt   420
tccattgacg tcaatgggtg gagtatttac ggtaaactgc ccacttggca gtacatcaag   480
tgtatcatat gccaagtacg cccctattg acgtcaatga cggtaaatgg cccgcctggc   540
attatgccca gtacatgacc ttatgggact ttcctacttg gcagtacatc tacgtattag   600
tcatcgctat taccatggtg atgcggtttt ggcagtacat caatgggcgt ggatagcggt   660
ttgactcacg gggatttcca agtctccacc ccattgacgt caatgggagt ttgttttggc   720
accaaaatca acgggacttt ccaaaatgtc gtaacaactc cgccccattg acgcaaatgg   780
gcggtaggcg tgtacggtgg gaggtctata taagcagcgc gttttgcctg tactgggtct   840
ctctggttag accagatctg agcctgggag ctctctggct aactagggaa cccactgctt   900
aagcctcaat aaagcttgcc ttgagtgctt caagtagtgt gtgcccgtct gttgtgtgac   960
tctggtaact agagatccct cagacccttt tagtcagtgt ggaaaatctc tagcagtggc  1020
gcccgaacag ggacttgaaa gcgaaaggga aaccagagga gctctctcga cgcaggactc  1080
ggcttgctga agcgcgcacg gcaagaggcg aggggcggcg actggtgagt acgccaaaaa  1140
ttttgactag cggaggctag aaggagagag atgggtgcga gagcgtcagt attaagcggg  1200
ggagaattag atcgcgatgg gaaaaaattc ggttaaggcc aggggga
aag aaaaaatata  1260
```

```
aattaaaaca tatagtatgg gcaagcaggg agctagaacg attcgcagtt aatcctggcc    1320
tgttagaaac atcagaaggc tgtagacaaa tactgggaca gctacaacca tcccttcaga    1380
caggatcaga agaacttaga tcattatata atacagtagc aaccctctat tgtgtgcatc    1440
aaaggataga gataaaagac accaaggaag ctttagacaa gatagaggaa gagcaaaaca    1500
aaagtaagac caccgcacag caagcggccg ccgcgctga tcttcagacc tggaggagga     1560
gatatgaggg acaattggag aagtgaatta tataaatata aagtagtaaa aattgaacca    1620
ttaggagtag caccccaccaa ggcaaagaga agagtggtgc agagagaaaa aagagcagtg   1680
ggaataggag ctttgttcct tgggttcttg ggagcagcag gaagcactat gggcgcagcg    1740
tcaatgacgc tgacggtaca ggccagacaa ttattgtctg gtatagtgca gcagcagaac    1800
aatttgctga gggctattga ggcgcaacag catctgttgc aactcacagt ctggggcatc    1860
aagcagctcc aggcaagaat cctggctgtg gaaagatacc taaaggatca acagctcctg    1920
gggatttggg gttgctctgg aaaactcatt tgcaccactg ctgtgccttg gaatgctagt    1980
tggagtaata aatctctgga acagatttgg aatcacacga cctggatgga gtgggacaga    2040
gaaattaaca attacacaag cttaatacac tccttaattg aagaatcgca aaaccagcaa    2100
gaaaagaatg aacaagaatt attggaatta gataaatggg caagtttgtg gaattggttt    2160
aacataacaa attggctgtg gtatataaaa ttattcataa tgatagtagg aggcttggta    2220
ggtttaagaa tagttttttgc tgtactttct atagtgaata gagttaggca gggatattca    2280
ccattatcgt ttcagaccca cctcccaacc ccgaggggac ccgacaggcc cgaaggaata    2340
gaagaagaag gtggagagag agacagagac agatccattc gattagtgaa cggatcggca    2400
ctgcgtgcgc caattctgca gacaaatggc agtattcatc cacaattta aaagaaaagg    2460 ggggattggg gggtacagtg caggggaaag aatagtagac ataatagcaa cagacataca    2520
aactaaagaa ttacaaaaac aaattacaaa aattcaaaat tttcgggttt attacaggga    2580
cagcagagat ccagtttggt tagtaccggg cccgctctag atcatcttga attcccacaa    2640
cacatgggag ggacccagtg gaaggtaact gaatcatggg gcaggtcttt cccatgctgt    2700
tcttgtgata gtgaataagt ctcatgagat ctgatggttt taaaaagggg agtttccctg    2760
cacaagctct ctcttctctt gtttgccacc atgtgagaca tgactttcac cttttgccat    2820
gattgtgagg cctcccagcc acgtggaact gtaagtccat taaacctctt tctttttgtaa   2880 attgccccgt ctcaggtatg tctttattag cagtgtgaga atgggctaac acatacaact    2940
tgcttttttt ttgtactcaa tattgagtcg tgagctttgc accacattag aatgtctatt    3000
taagtcatta ctttaaggtc ggttctattt ttaaagctac tcaaactaag ctactaaaca    3060
taagtggata tatttaagtg tatgtataaa atttatacta ggccagctgc agtggctcat    3120
gcctgtaatc ccaaagctgt ggaaggtaga ggtgggactg attgaggcca cgagttcaag    3180
gctgcagtga gctgtgattg catcactgta ctccagcctg agggacagag caggaaccag    3240
aaaaaaataa aataaaaaga aacaaacaaa aaaaccccca acaaccctac agtggctctt    3300
ttagaaaaaa caaacaaaca aaaccaaaac tgtactgcat gcataagctc ccctatgcta    3360
tgtttgaacc actctgaaga gatcaattaa aaagaagtga gtgatattgg aagcatgcct    3420
ctgtgatgct gtggtaacat tcataggctg cgttagggct atgcctgtaa ctcttggaga    3480
tgagtgggta agtggggttt tgaggtggct ggggctgga agagaaggtt ggaggagccc     3540
acacaagaca gccccttaac acgccggggc acagaacccc aggctgggcc aacttttccc    3600
```

-continued

```
tgctgaggtg aagacccgtc tcttgcaggc cgttggcaaa tgtcttgact ctggcatcca    3660
ggtgtgacca gcttagaccc tgagagtgag tgaatttaaa gttgacagct tctttccctt    3720
ttggaattat gaaataggtt acttcttttc aaggacagtt tgattttcca ctgtgtaagt    3780
catatattgc acatttcttt aaacattccc tttttcctg aactgatcac cttaccagta     3840
cggctgatcc tctcaagcag caaactctac cagctgtcac tggtgctctc ggagagacga    3900
ttaaccaagg aacccagccc gggaacagta ctgacctcta cttctggact cctgcctccc    3960
tcttaaaaag tcccttgaac ttcctagtgg gttctaacct gtcaaaggag aaaatagcca    4020
tctatggagt aagggttttt agtttctctt tttacaaatg gaagtttcct ctgaatcagg    4080
caagtaacgt taaatagaag ccaactttta agtttctcta acacactgct aaattgtaac    4140
accagactgt accacatact ctccagctgc cagctattgc agttgccatc cttgttacta    4200
tagtggtgag tatctctgcc tgtcatgcgt gagagagggg gtcgattccc cgacggggag    4260
gtcacgggaa attgtgtgag gattttgtca accttcagaa gtctcagaaa tgtctccttg    4320
ttttggcttt cagcggaaat ccgaacgcca gcagatctga atggaatgtt ctggattgaa    4380
gaaagtggga aatggcctca attcacaaag tcacaacctg ataaaaacca gtgtgacttt    4440
actgcccagt gaacccatct cgtcctccag cctttaggag gtaggttgga ctggagcctg    4500
cagtagttta ctctccacct gagtcctggt ctccagctgg gaacccactt aggccataaa    4560
gaaaaacgca cactgtgcct ctccaccggg cctctggaga cgaggctcct cggggataca    4620
aacagtgggg agaacatgag ggacatcccg accgtactct gcgtcctcct ttcccaggtg    4680
ttgcgttctc tcttgggctg agtggcgagg tctctcccga gtcccagggc cacagtgcaa    4740
tgtcacatct cctttgtgga aagtgactgg taaaggagag agaacaaaac tggaggaatg    4800
taaagtcttc agccacctgg tttaatttat tcaagagtga ttaatcctag atgagaaaaa    4860
gaattgaaat ggatcggaaa aaaatgaaag tgcattggcc gggaatcgaa cccgggcctc    4920
ccgcgtggca ggcgagaatt ctaccactga accaccaatg ctactgtcag ctaaagacct    4980
gcagtattgt ctcttaaagc tcactatctc tggccattca ctaaggaacc aggcaccgtc    5040
ttaaatcgcg gtttggaaaa tattttgttc aagataaaac tgttttaaga tatacgtgta    5100
tatatcttat atatctgtat tcgcatggta acatatcttc ggccttcctg agccgctggg    5160
ctctcagcgg ccctccaagg cagcccgcag gcccctgtgt gcctcaggga tccgacctcc    5220
cacagccccg gggagacctt gcctctaaag ttgctgcttt tgcagcctct gccacaaccg    5280
cgcgtcctca gagccagccc ggaggagcta gaaccttccc cgcatttctt tcagcagcct    5340
gagtcagagg cgggctggcc tggcgtagcc gcccagcctc gcggctcatg ccccgatctg    5400
cccgaacctt ctcccggggt cagcgccgcg ccgcgccacc cggctgagtc agcccgggcg    5460
ggcgagaggc tctcaactgg gcgggaaggt gcgggaaggt gcggaaaggt tcgcgaaagt    5520
tcgcggcggc gggggtcggg tgaggcgcaa aaggataaaa agcccgtgga agcggagctg    5580
agcagatccg agccgggctg gctgcagaga accgcaggg agagcctcac tgctgagcgc     5640
ccctcgacgg cggagcggca gcagcctccg tggcctccag catccgacaa gaagcttcag    5700
ccaccggtat gggagtcaaa gttctgtttg ccctgatctg catcgctgtg gccgaggcca    5760
agcccaccga gaacaacgaa gacttcaaca tcgtggccgt ggccagcaac ttcgcgacca    5820
cggatctcga tgctgaccgc gggaagttgc ccggcaagaa gctgccgctg gaggtgctca    5880
aagagatgga agccaatgcc cggaaagctg gctgcaccag gggctgtctg atctgcctgt    5940
cccacatcaa gtgcacgccc aagatgaaga agttcatccc aggacgctgc cacacctacg    6000
```

```
aaggcgacaa agagtccgca cagggcggca taggcgaggc gatcgtcgac attcctgaga    6060
ttcctgggtt caaggacttg gagcctatgg agcagttcat cgcacaggtc gatctgtgtg    6120
tggactgcac aactggctgc ctcaaagggc ttgccaacgt gcagtgttct gacctgctca    6180
agaagtggct gccgcaacgc tgtgcgacct ttgccagcaa gatccagggc caggtggaca    6240
agatcaaggg ggccggtggt gactaactcg aggtcgacgg tatcgataag ctcgcttcac    6300
gagattccag caggtcgagg gacctaataa cttcgtatag catacattat acgaagttat    6360
attaagggtt ccaagcttaa gcggccgctg aaagacccca cctgtaggtt tggcaagcta    6420
gctgcagtaa cgccattttg caaggcatgg aaaaatacca aaccaagaat agagaagttc    6480
agatcaaggg cgggtacatg aaaatagcta acgttgggcc aaacaggata tctgcggtga    6540
gcagtttcgg ccccggcccg gggccaagaa cagatggtca ccgcagtttc ggccccggcc    6600
cgaggccaag aacagatggt ccccagatat ggcccaaccc tcagcagttt cttaagaccc    6660
atcagatgtt tccaggctcc cccaaggacc tgaaatgacc ctgcgcctta tttgaattaa    6720
ccaatcagcc tgcttctcgc ttctgttcgc gcgcttctgc ttcccgagct ctataaaaga    6780
gctcacaacc cctcactcgg cgcgccagtc ctccgattga ctgagtcgcc cggatcccgc    6840
caccatggtg agcaagggcg aggaggataa catggccatc atcaaggagt tcatgcgctt    6900
caaggtgcac atggagggct ccgtgaacgg ccacgagttc gagatcgagg gcgagggcga    6960
gggccgcccc tacgagggca cccagaccgc caagctgaag gtgaccaagg gtggcccct    7020
gcccttcgcc tgggacatcc tgtcccctca gttcatgtac ggctccaagg cctacgtgaa    7080
gcaccccgcc gacatccccg actacttgaa gctgtccttc cccgagggct tcaagtggga    7140
gcgcgtgatg aacttcgagg acggcggcgt ggtgaccgtg acccaggact cctcccctgca    7200
ggacggcgag ttcatctaca aggtgaagct gcgcggcacc aacttcccct ccgacggccc    7260
cgtaatgcag aagaagacca tgggctggga ggcctcctcc gagcggatgt accccgagga    7320
cggcgccctg aagggcgaga tcaagcagag gctgaagctg aaggacggcg gccactacga    7380
cgctgaggtc aagaccacct acaaggccaa gaagcccgtg cagctgcccg cgcctacaa    7440
cgtcaacatc aagttggaca tcacctccca caacgaggac tacaccatcg tggaacagta    7500
cgaacgcgcc gagggccgcc actccaccgg cggcatggac gagctgtaca agtaagaatt    7560
cgtcgaggga cctaataact tcgtatagca tacattatac gaagttatac atgtttaagg    7620
gttccggttc cactaggtac aattcgatat caagcttatc gataatcaac ctctggatta    7680
caaaatttgt gaaagattga ctggtattct taactatgtt gctccttta cgctatgtgg    7740
atacgctgct ttaatgcctt tgtatcatgc tattgcttcc cgtatggctt tcattttctc    7800
ctccttgtat aaatcctggt tgctgtctct ttatgaggag ttgtggcccg ttgtcaggca    7860
acgtggcgtg gtgtgcactg tgtttgctga cgcaaccccc actggttggg gcattgccac    7920
cacctgtcag ctcctttccg ggactttcgc ttttccccctc cctattgcca cggcggaact    7980
catcgccgcc tgccttgccc gctgctggac aggggctcgg ctgttgggca ctgacaattc    8040
cgtggtgttg tcggggaaat catcgtcctt ccttggctg ctcgcctgtg ttgccacctg    8100
gattctgcgc gggacgtcct tctgctacgt ccctcggcc ctcaatccag cggaccttcc    8160
ttcccgcggc ctgctgccgg ctctgcggcc tcttccgcgt cttcgccttc gccctcagac    8220
gagtcggatc tccctttggg ccgcctcccc gcatcgatac cgtcgacctc gatcgagacc    8280
tagaaaaaca tggagcaatc acaagtagca atacagcagc taccaatgct gattgtgcct    8340
```

```
ggctagaagc acaagaggag gaggaggtgg gttttccagt cacacctcag gtacctttaa    8400
gaccaatgac ttacaaggca gctgtagatc ttagccactt tttaaaagaa aaggggggac    8460
tggaagggct aattcactcc caacgaagac aagatatcct tgatctgtgg atctaccaca    8520
cacaaggcta cttccctgat ggcagaact acacaccagg gccagggatc agatatccac     8580
tgacctttgg atggtgctac aagctagtac cagttgagca agagaaggta gaagaagcca    8640
atgaaggaga gaacacccgc ttgttacacc ctgtgagcct gcatgggatg gatgacccgg    8700
agagagaagt attagagtgg aggtttgaca gccgcctagc atttcatcac atggcccgag    8760
agctgcatcc ggactgtact gggtctctct ggttagacca gatctgagcc tgggagctct    8820
ctggctaact agggaaccca ctgcttaagc ctcaataaag cttgccttga gtgcttcaag    8880
tagtgtgtgc ccgtctgttg tgtgactctg gtaactagag atccctcaga ccctttagt     8940 cagtgtggaa aatctctagc agcatgtgag caaaaggcca gcaaaggcc aggaaccgta     9000 aaaaggccgc gttgctggcg ttttccata ggctccgccc ccctgacgag catcacaaaa     9060
atcgacgctc aagtcagagg tggcgaaacc cgacaggact ataaagatac caggcgtttc    9120
cccctggaag ctccctcgtg cgctctcctg ttccgaccct gccgcttacc ggatacctgt    9180 ccgccttct cccttcggga agcgtggcgc tttctcatag ctcacgctgt aggtatctca     9240
gttcggtgta ggtcgttcgc tccaagctgg gctgtgtgca cgaaccccc gttcagcccg     9300 accgctgcgc cttatccggt aactatcgtc ttgagtccaa cccggtaaga cacgacttat    9360
cgccactggc agcagccact ggtaacagga ttagcagagc gaggtatgta ggcggtgcta    9420
cagagttctt gaagtggtgg cctaactacg gctacactag aagaacagta tttggtatct    9480
gcgctctgct gaagccagtt accttcggaa aaagagttgg tagctcttga tccggcaaac    9540
aaaccaccgc tggtagcggt ggtttttttg tttgcaagca gcagattacg cgcagaaaaa    9600
aaggatctca agaagatcct ttgatctttt ctacgggtc tgacgctcag tggaacgaaa     9660
actcacgtta agggattttg gtcatgagat tatcaaaaag gatcttcacc tagatccttt    9720
taaattaaaa atgaagtttt aaatcaatct aaagtatata tgagtaaact tggtctgaca    9780
gttaccaatg cttaatcagt gaggcaccta tctcagcgat ctgtctattt cgttcatcca    9840
tagttgcctg actccccgtc gtgtagataa ctacgatacg ggagggctta ccatctggcc    9900
ccagtgctgc aatgataccg cgagacccac gctcaccggc tccagattta tcagcaataa    9960
accagccagc cggaagggcc gagcgcagaa gtggtcctgc aactttatcc gcctccatcc    10020
agtctattaa ttgttgccgg gaagctagag taagtagttc gccagttaat agtttgcgca    10080
acgttgttgc cattgctaca ggcatcgtgg tgtcacgctc gtcgtttggt atggcttcat    10140
tcagctccgg ttcccaacga tcaaggcgag ttacatgatc ccccatgttg tgcaaaaaag    10200
cggttagctc cttcggtcct ccgatcgttg tcagaagtaa gttggccgca gtgttatcac    10260
tcatggttat ggcagcactg cataattctc ttactgtcat gccatccgta agatgctttt    10320
ctgtgactgg tgagtactca accaagtcat tctgagaata gtgtatgcgg cgaccgagtt    10380
gctcttgccc ggcgtcaata cgggataata ccgcgccaca tagcagaact taaaagtgc     10440 tcatcattgg aaaacgttct cggggcgaa aactctcaag gatcttaccg ctgttgagat     10500
ccagttcgat gtaacccact cgtgcaccca actgatcttc agcatctttt actttcacca    10560
gcgtttctgg gtgagcaaaa acaggaaggc aaaatgccgc aaaaaaggga ataagggcga    10620
cacggaaatg ttgaatactc atactcttcc tttttcaata ttattgaagc atttatcagg    10680
gttattgtct catgagcgga tacatatttg aatgtattta gaaaaataaa caaatagggg    10740
```
ttccgcgcac atttccccga aaagtgccac ctgac        10775

<210> SEQ ID NO 2
<211> LENGTH: 9043
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 2
gtcgacggat cgggagatct cccgatcccc tatggtgcac tctcagtaca atctgctctg      60
atgccgcata gttaagccag tatctgctcc ctgcttgtgt gttggaggtc gctgagtagt     120
gcgcgagcaa aatttaagct acaacaaggc aaggcttgac cgacaattgc atgaagaatc     180
tgcttagggt taggcgtttt cgcgctgctt cgcgatgtac ggccagatat acgcgttgac     240
attgattatt gactagttat taatagtaat caattacggg gtcattagtt catagcccat     300
atatggagtt ccgcgttaca taacttacgg taaatggccc gcctggctga ccgcccaacg     360
accccgccc attgacgtca ataatgacgt atgttcccat agtaacgcca atagggactt     420
tccattgacg tcaatgggtg gagtatttac ggtaaactgc ccacttggca gtacatcaag     480
tgtatcatat gccaagtacg ccccctattg acgtcaatga cggtaaatgg cccgcctggc     540
attatgccca gtacatgacc ttatgggact ttcctacttg gcagtacatc tacgtattag     600
tcatcgctat taccatggtg atgcggtttt ggcagtacat caatgggcgt ggatagcggt     660
ttgactcacg gggatttcca agtctccacc ccattgacgt caatgggagt ttgttttggc     720
accaaaatca acgggacttt ccaaaatgtc gtaacaactc cgccccattg acgcaaatgg     780
gcggtaggcg tgtacggtgg gaggtctata taagcagcgc gttttgcctg tactgggtct     840
ctctggttag accagatctg agcctgggag ctctctggct aactagggaa cccactgctt     900
aagcctcaat aaagcttgcc ttgagtgctt caagtagtgt gtgcccgtct gttgtgtgac     960
tctggtaact agagatccct cagacccttt tagtcagtgt ggaaaatctc tagcagtggc    1020
gcccgaacag ggacttgaaa gcgaaaggga accagagga gctctctcga cgcaggactc    1080
ggcttgctga agcgcgcacg gcaagaggcg aggggcggcg actggtgagt acgccaaaaa    1140
ttttgactag cggaggctag aaggagagag atgggtgcga gagcgtcagt attaagcggg    1200
ggagaattag atcgcgatgg gaaaaaattc ggttaaggcc agggggaaag aaaaaatata    1260
aattaaaaca tatagtatgg gcaagcaggg agctagaacg attcgcagtt aatcctggcc    1320
tgttagaaac atcagaaggc tgtagacaaa tactgggaca gctacaacca tcccttcaga    1380
caggatcaga agaacttaga tcattatata atacagtagc aaccctctat tgtgtgcatc    1440
aaaggataga gataaaagac accaaggaag ctttagacaa gatagaggaa gagcaaaaca    1500
aaagtaagac caccgcacag caagcggccg ccgcgctga tcttcagacc tggaggagga    1560
gatatgaggg acaattggag aagtgaatta tataaatata agtagtaaa aattgaacca    1620
ttaggagtag cacccaccaa ggcaaagaga agagtggtgc agagagaaaa aagagcagtg    1680
ggaataggag ctttgttcct tgggttcttg ggagcagcag gaagcactat gggcgcagcg    1740
tcaatgacgc tgacggtaca ggccagacaa ttattgtctg gtatagtgca gcagcagaac    1800
aatttgctga gggctattga ggcgcaacag catctgttgc aactcacagt ctggggcatc    1860
aagcagctcc aggcaagaat cctggctgtg gaaagatacc taaaggatca acagctcctg    1920
gggatttggg gttgctctgg aaaactcatt tgcaccactg ctgtgccttg gaatgctagt    1980

```
tggagtaata aatctctgga acagatttgg aatcacacga cctggatgga gtgggacaga    2040
gaaattaaca attacacaag cttaatacac tccttaattg aagaatcgca aaaccagcaa    2100
gaaaagaatg aacaagaatt attggaatta gataaatggg caagtttgtg gaattggttt    2160
aacataacaa attggctgtg gtatataaaa ttattcataa tgatagtagg aggcttggta    2220
ggtttaagaa tagttttttgc tgtactttct atagtgaata gagttaggca gggatattca    2280
ccattatcgt ttcagacccca cctcccaacc ccgaggggac ccgacaggcc cgaaggaata    2340
gaagaagaag gtggagagag agacagagac agatccattc gattagtgaa cggatcggca    2400
ctgcgtgcgc caattctgca gacaaatggc agtattcatc cacaatttta aagaaaagg     2460 ggggattggg gggtacagtg caggggaaag aatagtagac ataatagcaa cagacataca    2520
aactaaagaa ttacaaaaac aaattacaaa aattcaaaat tttcgggttt attacaggga    2580
cagcagagat ccagtttggt tagtaccggg cccgctctag agatctgaat ggaatgttct    2640
ggattgaaga aagtgggaaa tggcctcaat tcacaaagtc acaacctgat aaaaaccagt    2700
gtgactttac tgcccagtga acccatctcg tcctccagcc tttaggaggt aggttggact    2760
ggagcctgca gtagtttact ctccacctga gtcctggtct ccagctggga acccacttag    2820
gccataaaga aaacgcaca ctgtgcctct ccaccgggcc tctggagacg aggctcctcg     2880
gggatacaaa cagtggggag aacatgaggg acatcccgac cgtactctgc gtcctccttt    2940
cccaggtgtt gcgttctctc ttgggctgag tggcgaggtc tctcccgagt cccagggcca    3000
cagtgcaatg tcacatctcc tttgtggaaa gtgactggta aaggagagag aacaaaactg    3060
gaggaatgta aagtcttcag ccacctggtt taatttattc aagagtgatt aatcctagat    3120
gagaaaaaga attgaaatgg atcggaaaaa aatgaaagtg cattggccgg gaatcgaacc    3180
cgggcctccc gcgtggcagg cgagaattct accactgaac caccaatgct actgtcagct    3240
aaagacctgc agtattgtct cttaaagctc actatctctg gccattcact aaggaaccag    3300
gcaccgtctt aaatcgcggt ttggaaaata ttttgttcaa gataaaactg ttttaagata    3360
tacgtgtata tatcttatat atctgtattc gcatggtaac atatcttcgg ccttcctgag    3420
ccgctgggct ctcagcggcc ctccaaggca gcccgcaggc ccctgtgtgc ctcagggatc    3480
cgacctccca cagccccggg gagaccttgc ctctaaagtt gctgcttttg cagcctctgc    3540
cacaaccgcg cgtcctcaga gccagcccgg aggagctaga accttccccg catttctttc    3600
agcagcctga gtcagaggcg ggctggcctg gcgtagccgc ccagcctcgc ggctcatgcc    3660
ccgatctgcc cgaaccttct cccggggtca gcgccgcgcc gcgccacccg gctgagtcag    3720
cccgggcggg cgagaggctc tcaactgggc gggaaggtgc gggaaggtgc ggaaaggttc    3780
gcgaaagttc gcggcggcgg gggtcggtg aggcgcaaaa ggataaaaag cccgtggaag     3840
cggagctgag cagatccgag ccgggctggc tgcagagaaa ccgcagggag agcctcactg    3900
ctgagcgccc ctcgacggcg gagcggcagc agcctccgtg gcctccagca tccgacaaga    3960
agcttcagcc accggtatgg gagtcaaagt tctgtttgcc ctgatctgca tcgctgtggc    4020
cgaggccaag cccaccgaga caacgaaga cttcaacatc gtggccgtgg ccagcaactt    4080
cgcgaccacg atctcgatg ctgaccgcgg gaagttgccc ggcaagaagc tgccgctgga    4140
ggtgctcaaa gagatggaag ccaatgcccg gaaagctggc tgcaccaggg gctgtctgat    4200
ctgcctgtcc cacatcaagt gcacgcccaa gatgaagaag ttcatcccag acgcgctgcca   4260 cacctacgaa ggcgacaaag agtccgcaca gggcggcata ggcgaggcga tcgtcgacat    4320
```

| | |
|---|---|
| tcctgagatt cctgggttca aggacttgga gcctatggag cagttcatcg cacaggtcga | 4380 |
| tctgtgtgtg gactgcacaa ctggctgcct caaagggctt gccaacgtgc agtgttctga | 4440 |
| cctgctcaag aagtggctgc cgcaacgctg tgcgaccttt gccagcaaga tccagggcca | 4500 |
| ggtggacaag atcaaggggg ccggtggtga ctaactcgag gtcgacggta tcgataagct | 4560 |
| cgcttcacga gattccagca ggtcgaggga cctaataact tcgtatagca tacattatac | 4620 |
| gaagttatat taagggttcc aagcttaagc ggccgctgaa agaccccacc tgtaggtttg | 4680 |
| gcaagctagc tgcagtaacg ccattttgca aggcatggaa aaataccaaa ccaagaatag | 4740 |
| agaagttcag atcaagggcg ggtacatgaa aatagctaac gttgggccaa acaggatatc | 4800 |
| tgcggtgagc agtttcggcc ccggcccggg gccaagaaca gatggtcacc gcagtttcgg | 4860 |
| ccccggcccg aggccaagaa cagatggtcc ccagatatgg cccaaccctc agcagtttct | 4920 |
| taagacccat cagatgtttc caggctcccc caaggacctg aaatgaccct gcgccttatt | 4980 |
| tgaattaacc aatcagcctg cttctcgctt ctgttcgcgc gcttctgctt cccgagctct | 5040 |
| ataaaagagc tcacaacccc tcactcggcg cgccagtcct ccgattgact gagtcgcccg | 5100 |
| gatcccgcca ccatggtgag caagggcgag gaggataaca tggccatcat caaggagttc | 5160 |
| atgcgcttca aggtgcacat ggagggctcc gtgaacggcc acgagttcga gatcgagggc | 5220 |
| gagggcgagg gccgccccta cgagggcacc cagaccgcca agctgaaggt gaccaagggt | 5280 |
| ggccccctgc ccttcgcctg gacatcctg tcccctcagt tcatgtacgg ctccaaggcc | 5340 |
| tacgtgaagc accccgccga catccccgac tacttgaagc tgtccttccc cgagggcttc | 5400 |
| aagtgggagc gcgtgatgaa cttcgaggac ggcggcgtgg tgaccgtgac ccaggactcc | 5460 |
| tccctgcagg acggcgagtt catctacaag gtgaagctgc gcggcaccaa cttcccctcc | 5520 |
| gacggccccg taatgcagaa gaagaccatg ggctgggagg cctcctccga gcggatgtac | 5580 |
| cccgaggacg gcgccctgaa gggcgagatc aagcagaggc tgaagctgaa ggacggcggc | 5640 |
| cactacgacg ctgaggtcaa gaccacctac aaggccaaga agcccgtgca gctgcccggc | 5700 |
| gcctacaacg tcaacatcaa gttggacatc acctcccaca acgaggacta caccatcgtg | 5760 |
| gaacagtacg aacgcgccga gggccgcac tccaccggcg gcatggacga gctgtacaag | 5820 |
| taagaattcg tcgagggacc taataacttc gtatagcata cattatacga agttatacat | 5880 |
| gtttaagggt tccggttcca ctaggtacaa ttcgatatca agcttatcga taatcaacct | 5940 |
| ctggattaca aaatttgtga agattgact ggtattctta actatgttgc tccttttacg | 6000 |
| ctatgtggat acgctgcttt aatgcctttg tatcatgcta ttgcttcccg tatggctttc | 6060 |
| attttctcct ccttgtataa atcctggttg ctgtctcttt atgaggagtt gtggcccgtt | 6120 |
| gtcaggcaac gtggcgtggt gtgcactgtg tttgctgacg caaccccac tggttggggc | 6180 |
| attgccacca cctgtcagct cctttccggg actttcgctt tccccctccc tattgccacg | 6240 |
| gcggaactca tcgccgcctg ccttgcccgc tgctggacag gggctcggct gttgggcact | 6300 |
| gacaattccg tggtgttgtc ggggaaatca tcgtcctttc cttggctgct cgcctgtgtt | 6360 |
| gccacctgga ttctgcgcgg gacgtccttc tgctacgtcc cttcggccct caatccagcg | 6420 |
| gaccttcctt cccgcggcct gctgccggct ctgcggcctc ttccgcgtct tcgccttcgc | 6480 |
| cctcagacga gtcggatctc cctttgggcc gcctccccgc atcgataccg tcgacctcga | 6540 |
| tcgagaccta gaaaaacatg gagcaatcac aagtagcaat acagcagcta ccaatgctga | 6600 |
| ttgtgcctgg ctagaagcac aagaggagga ggaggtgggt tttccagtca cacctcaggt | 6660 |
| acctttaaga ccaatgactt acaaggcagc tgtagatctt agccacttt taaaagaaaa | 6720 |

```
gggggggactg gaagggctaa ttcactccca acgaagacaa gatatccttg atctgtggat   6780
ctaccacaca caaggctact tccctgattg gcagaactac acaccagggc cagggatcag   6840
atatccactg acctttggat ggtgctacaa gctagtacca gttgagcaag agaaggtaga   6900
agaagccaat gaaggagaga acacccgctt gttacaccct gtgagcctgc atgggatgga   6960
tgacccggag agagaagtat tagagtggag gtttgacagc cgcctagcat tcatcacat    7020 ggcccgagag ctgcatccgg actgtactgg gtctctctgg ttagaccaga tctgagcctg   7080
ggagctctct ggctaactag ggaacccact gcttaagcct caataaagct tgccttgagt   7140
gcttcaagta gtgtgtgccc gtctgttgtg tgactctggt aactagagat ccctcagacc   7200
cttttagtca gtgtggaaaa tctctagcag catgtgagca aaaggccagc aaaaggccag   7260
gaaccgtaaa aaggccgcgt tgctggcgtt tttccatagg ctccgccccc ctgacgagca   7320
tcacaaaaat cgacgctcaa gtcagaggtg gcgaaaccccg acaggactat aaagatacca   7380
ggcgtttccc cctggaagct ccctcgtgcg ctctcctgtt ccgaccctgc cgcttaccgg   7440
atacctgtcc gcctttctcc cttcgggaag cgtggcgctt tctcatagct cacgctgtag   7500
gtatctcagt tcggtgtagg tcgttcgctc caagctgggc tgtgtgcacg aaccccccgt   7560
tcagcccgac cgctgcgcct tatccggtaa ctatcgtctt gagtccaacc cggtaagaca   7620
cgacttatcg ccactggcag cagccactgg taacaggatt agcagagcga ggtatgtagg   7680
cggtgctaca gagttcttga agtggtggcc taactacggc tacactagaa gaacagtatt   7740
tggtatctgc gctctgctga agccagttac cttcggaaaa agagttggta gctcttgatc   7800
cggcaaacaa accaccgctg gtagcggtgg ttttttgtt tgcaagcagc agattacgcg   7860
cagaaaaaaa ggatctcaag aagatccttt gatcttttct acggggtctg acgctcagtg   7920
gaacgaaaac tcacgttaag ggattttggt catgagatta tcaaaaagga tcttcaccta   7980
gatcctttta aattaaaaat gaagttttaa atcaatctaa agtatatatg agtaaacttg   8040
gtctgacagt taccaatgct taatcagtga ggcacctatc tcagcgatct gtctatttcg   8100
ttcatccata gttgcctgac tccccgtcgt gtagataact acgatacggg agggcttacc   8160
atctggcccc agtgctgcaa tgataccgcg agacccacgc tcaccggctc cagatttatc   8220
agcaataaac cagccagccg gaagggccga gcgcagaagt ggtcctgcaa ctttatccgc   8280
ctccatccag tctattaatt gttgccggga agctagagta agtagttcgc cagttaatag   8340
tttgcgcaac gttgttgcca ttgctacagg catcgtggtg tcacgctcgt cgtttggtat   8400
ggcttcattc agctccggtt cccaacgatc aaggcgagtt acatgatccc ccatgttgtg   8460
caaaaaagcg gttagctcct tcggtcctcc gatcgttgtc agaagtaagt tggccgcagt   8520
gttatcactc atggttatgg cagcactgca taattctctt actgtcatgc catccgtaag   8580
atgcttttct gtgactggtg agtactcaac caagtcattc tgagaatagt gtatgcggcg   8640
accgagttgc tcttgcccgg cgtcaatacg ggataatacc gcgccacata gcagaacttt   8700
aaaagtgctc atcattggaa aacgttcttc ggggcgaaaa ctctcaagga tcttaccgct   8760
gttgagatcc agttcgatgt aacccactcg tgcacccaac tgatcttcag catcttttac   8820
tttcaccagc gtttctgggt gagcaaaaac aggaaggcaa aatgccgcaa aaagggaat   8880 aagggcgaca cggaaatgtt gaatactcat actcttcctt tttcaatatt attgaagcat   8940
ttatcagggt tattgtctca tgagcggata catatttgaa tgtatttaga aaaataaaca   9000
aataggggtt ccgcgcacat ttccccgaaa agtgccacct gac                     9043
```

<210> SEQ ID NO 3
<211> LENGTH: 8461
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 3

| | | | | | |
|---|---|---|---|---|---|
| gtcgacggat | cgggagatct | cccgatcccc | tatggtgcac | tctcagtaca | atctgctctg | 60 |
| atgccgcata | gttaagccag | tatctgctcc | ctgcttgtgt | gttggaggtc | gctgagtagt | 120 |
| gcgcgagcaa | aatttaagct | acaacaaggc | aaggcttgac | cgacaattgc | atgaagaatc | 180 |
| tgcttagggt | taggcgtttt | gcgctgcttc | gcgatgtacg | ggccagatat | acgcgttgac | 240 |
| attgattatt | gactagttat | taatagtaat | caattacggg | gtcattagtt | catagcccat | 300 |
| atatggagtt | ccgcgttaca | taacttacgg | taaatggccc | gcctggctga | ccgcccaacg | 360 |
| acccccgccc | attgacgtca | ataatgacgt | atgttcccat | agtaacgcca | atagggactt | 420 |
| tccattgacg | tcaatgggtg | gagtatttac | ggtaaactgc | ccacttggca | gtacatcaag | 480 |
| tgtatcatat | gccaagtacg | ccccctattg | acgtcaatga | cggtaaatgg | cccgcctggc | 540 |
| attatgccca | gtacatgacc | ttatgggact | ttcctacttg | gcagtacatc | tacgtattag | 600 |
| tcatcgctat | taccatggtg | atgcggtttt | ggcagtacat | caatgggcgt | ggatagcggt | 660 |
| ttgactcacg | gggatttcca | agtctccacc | ccattgacgt | caatgggagt | ttgttttggc | 720 |
| accaaaatca | acgggacttt | ccaaaatgtc | gtaacaactc | cgccccattg | acgcaaatgg | 780 |
| gcggtaggcg | tgtacggtgg | gaggtctata | taagcagcgc | gttttgcctg | tactgggtct | 840 |
| ctctggttag | accagatctg | agcctgggag | ctctctggct | aactagggaa | cccactgctt | 900 |
| aagcctcaat | aaagcttgcc | ttgagtgctt | caagtagtgt | gtgcccgtct | gttgtgtgac | 960 |
| tctggtaact | agagatccct | cagacccttt | tagtcagtgt | ggaaaatctc | tagcagtggc | 1020 |
| gcccgaacag | ggacttgaaa | gcgaaaggga | aaccagagga | gctctctcga | cgcaggactc | 1080 |
| ggcttgctga | agcgcgcacg | gcaagaggcg | aggggcggcg | actggtgagt | acgccaaaaa | 1140 |
| ttttgactag | cggaggctag | aaggagagag | atgggtgcga | gagcgtcagt | attaagcggg | 1200 |
| ggagaattag | atcgcgatgg | gaaaaaattc | ggttaaggcc | aggggggaaag | aaaaaatata | 1260 |
| aattaaaaca | tatagtatgg | gcaagcaggg | agctagaacg | attcgcagtt | aatcctggcc | 1320 |
| tgttagaaac | atcagaaggc | tgtagacaaa | tactgggaca | gctacaacca | tcccttcaga | 1380 |
| caggatcaga | agaacttaga | tcattatata | atacagtagc | aaccctctat | tgtgtgcatc | 1440 |
| aaaggataga | gataaaagac | accaaggaag | ctttagacaa | gatagaggaa | gagcaaaaca | 1500 |
| aaagtaagac | caccgcacag | caagcggccg | gccgcgctga | tcttcagacc | tggaggagga | 1560 |
| gatatgaggg | acaattggag | aagtgaatta | tataaatata | aagtagtaaa | aattgaacca | 1620 |
| ttaggagtag | cacccaccaa | ggcaaagaga | agagtggtgc | agagagaaaa | aagagcagtg | 1680 |
| ggaataggag | ctttgttcct | tgggttcttg | ggagcagcag | gaagcactat | gggcgcagcg | 1740 |
| tcaatgacgc | tgacggtaca | ggccagacaa | ttattgtctg | gtatagtgca | gcagcagaac | 1800 |
| aatttgctga | gggctattga | ggcgcaacag | catctgttgc | aactcacagt | ctggggcatc | 1860 |
| aagcagctcc | aggcaagaat | cctggctgtg | gaaagatacc | taaaggatca | acagctcctg | 1920 |
| gggatttggg | gttgctctgg | aaaactcatt | tgcaccactg | ctgtgccttg | gaatgctagt | 1980 |
| tggagtaata | aatctctgga | acagatttgg | aatcacacga | cctggatgga | gtgggacaga | 2040 |

```
gaaattaaca attacacaag cttaatacac tccttaattg aagaatcgca aaaccagcaa    2100
gaaaagaatg aacaagaatt attggaatta gataaatggg caagtttgtg gaattggttt    2160
aacataacaa attggctgtg gtatataaaa ttattcataa tgatagtagg aggcttggta    2220
ggtttaagaa tagttttgc tgtactttct atagtgaata gagttaggca gggatattca     2280
ccattatcgt ttcagaccca cctcccaacc ccgaggggac ccgacaggcc cgaaggaata    2340
gaagaagaag gtggagagag agacagagac agatccattc gattagtgaa cggatcggca    2400
ctgcgtgcgc caattctgca gacaaatggc agtattcatc cacaatttta aaagaaaagg    2460
ggggattggg gggtacagtg caggggaaag aatagtagac ataatagcaa cagacataca    2520
aactaaagaa ttacaaaaac aaattacaaa aattcaaaat tttcgggttt attacaggga    2580
cagcagagat ccagtttggt tagtaccggg cccgctctag aaattctacc actgaaccac    2640
caatgctact gtcagctaaa gacctgcagt attgtctctt aaagctcact atctctggcc    2700
attcactaag gaaccaggca ccgtcttaaa tcgcggtttg gaaatatttt tgttcaagat    2760
aaaactgttt taagatatac gtgtatatat cttatatatc tgtattcgca tggtaacata    2820
tcttcggcct tcctgagccg ctgggctctc agcggccctc caaggcagcc cgcaggcccc    2880
tgtgtgcctc agggatccga cctcccacag ccccggggag accttgcctc taaagttgct    2940
gcttttgcag cctctgccac aaccgcgcgt cctcagagcc agcccggagg agctagaacc    3000
ttccccgcat ttctttcagc agcctgagtc agaggcgggc tggcctggcg tagccgccca    3060
gcctcgcggc tcatgccccg atctgcccga accttctccc ggggtcagcg ccgcgccgcg    3120
ccacccggct gagtcagccc gggcgggcga gaggctctca actgggcggg aaggtgcggg    3180
aaggtgcgga aaggttcgcg aaagttcgcg gcggcggggg tcgggtgagg cgcaaaagga    3240
taaaaagccc gtggaagcgg agctgagcag atccgagccg ggctggctgc agagaaaccg    3300
cagggagagc ctcactagct gagcgcccct cgacggcgga gcggcagcag cctccgtggc    3360
ctccagcatc cgacaagaag cttcagccac cggtatggga gtcaaagttc tgtttgccct    3420
gatctgcatc gctgtggccg aggccaagcc caccgagaac aacgaagact caacatcgt     3480
ggccgtggca agcaacttcg cgaccacgga tctcgatgct gaccgcggga agttgcccgg    3540
caagaagctg ccgctggagg tgctcaaaga gatggaagcc aatgcccgga agctggctg     3600
caccagggc tgtctgatct gcctgtccca catcaagtgc acgcccaaga tgaagaagtt     3660
catcccagga cgctgccaca cctacgaagg cgacaaagag tccgcacagg cggcatagg     3720
cgaggcgatc gtcgacattc ctgagattcc tgggttcaag acttggagc ctatggagca    3780
gttcatcgca caggtcgatc tgtgtgtgga ctgcacaact ggctgcctca aagggcttgc    3840
caacgtgcag tgttctgacc tgctcaagaa gtggctgccg caacgctgtg cgacctttgc    3900
cagcaagatc cagggccagg tggacaagat caaggggggcc ggtggtgact aactcgaggt    3960
cgacggtatc gataagctcg cttcacgaga ttccagcagg tcgagggacc taataacttc    4020
gtatagcata cattatacga agttatatta agggttccaa gcttaagcgg ccgctgaaag    4080
acccccacctg taggtttggc aagctagctg cagtaacgcc attttgcaag gcatggaaaa    4140
ataccaaacc aagaatagag aagttcagat caagggcggg tacatgaaaa tagctaacgt    4200
tgggccaaac aggatatctg cggtgagcag tttcggcccc ggcccggggc caagaacaga    4260
tggtcaccgc agtttcggcc ccggcccgag gccaagaaca gatggtcccc agatatggcc    4320
caaccctcag cagtttctta agacccatca gatgtttcca ggctcccca aggacctgaa    4380
atgaccctgc gccttatttg aattaaccaa tcagcctgct tctcgcttct gttcgcgcgc    4440
```

```
ttctgcttcc cgagctctat aaaagagctc acaaccsctc actcggcgcg ccagtcctcc    4500
gattgactga gtcgcccgga tcccgccacc atggtgagca agggcgagga ggataacatg    4560
gccatcatca aggagttcat gcgcttcaag gtgcacatgg agggctccgt gaacggccac    4620
gagttcgaga tcgagggcga gggcgagggc cgcccctacg agggcaccca gaccgccaag    4680
ctgaaggtga ccaagggtgg ccccctgccc ttcgcctggg acatcctgtc ccctcagttc    4740
atgtacggct ccaaggccta cgtgaagcac cccgccgaca tccccgacta cttgaagctg    4800
tccttccccg agggcttcaa gtgggagcgc gtgatgaact tcgaggacgg cggcgtggtg    4860
accgtgaccc aggactcctc cctgcaggac ggcgagttca tctacaaggt gaagctgcgc    4920
ggcaccaact cccctccga cggccccgta atgcagaaga gaccatgggg ctgggaggcc    4980
tcctccgagc ggatgtaccc cgaggacggc gccctgaagg gcgagatcaa gcagaggctg    5040
aagctgaagg acggcggcca ctacgacgct gaggtcaaga ccacctacaa ggccaagaag    5100
cccgtgcagc tgcccggcgc ctacaacgtc aacatcaagt tggacatcac ctcccacaac    5160
gaggactaca ccatcgtgga acagtacgaa cgcgccgagg ccgccactc accggcggc    5220 atggacgagc tgtacaagta agaattcgtc gagggaccta ataacttcgt atagcataca    5280 ttatcgaag ttatacatgt ttaagggttc cggttccact aggtacaatt cgatatcaag    5340
cttatcgata tcaacctct ggattacaaa atttgtgaaa gattgactgg tattcttaac    5400
tatgttgctc cttttacgct atgtggatac gctgctttaa tgcctttgta tcatgctatt    5460
gcttcccgta tggctttcat tttctcctcc ttgtataaat cctggttgct gtctctttat    5520
gaggagttgt ggcccgttgt caggcaacgt ggcgtggtgt gcactgtgtt tgctgacgca    5580 accccactg gttggggcat tgccaccacc tgtcagctcc tttccgggac tttcgctttc    5640 cccctccta ttgccacggc ggaactcatc gccgcctgcc ttgcccgctg ctggacaggg    5700
gctcggctgt tgggcactga caattccgtg gtgttgtcgg ggaaatcatc gtcctttcct    5760
tggctgctcg cctgtgttgc cacctggatt ctgcgcggga cgtccttctg ctacgtccct    5820
tcggccctca atccagcgga ccttccttcc cgcggcctgc tgccggctct gcggcctctt    5880
ccgcgtcttc gccttcgccc tcagacgagt cggatctccc tttgggccgc ctccccgcat    5940
cgataccgtc gacctcgatc gagacctaga aaaacatgga gcaatcacaa gtagcaatac    6000
agcagctacc aatgctgatt gtgcctggct agaagcacaa gaggaggagg aggtgggttt    6060
tccagtcaca cctcaggtac ctttaagacc aatgacttac aaggcagctg tagatcttag    6120 ccactttta aaagaaaagg ggggactgga agggctaatt cactcccaac gaagacaaga    6180
tatccttgat ctgtggatct accacacaca aggctacttc cctgattggc agaactacac    6240
accagggcca gggatcagat atccactgac ctttggatgg tgctacaagc tagtaccagt    6300
tgagcaagag aaggtagaag aagccaatga aggagagaac cccgcttgt tacaccctgt    6360 gagcctgcat gggatggatg acccggagag agaagtatta gagtggaggt ttgacagccg    6420
cctagcattt catcacatgg cccgagagct gcatccggac tgtactgggt ctctctggtt    6480
agaccagatc tgagcctggg agctctctgg ctaactaggg aacccactgc ttaagcctca    6540
ataaagcttg ccttgagtgc ttcaagtagt gtgtgcccgt ctgttgtgtg actctggtaa    6600
ctagagatcc ctcagaccct tttagtcagt gtggaaaatc tctagcagca tgtgagcaaa    6660
aggccagcaa aaggccagga accgtaaaaa ggccgcgttg ctggcgtttt tccataggct    6720
ccgcccccct gacgagcatc acaaaaatcg acgctcaagt cagaggtggc gaaacccgac    6780
```

-continued

| | |
|---|---|
| aggactataa agataccagg cgtttccccc tggaagctcc ctcgtgcgct ctcctgttcc | 6840 |
| gaccctgccg cttaccggat acctgtccgc ctttctccct tcgggaagcg tggcgctttc | 6900 |
| tcatagctca cgctgtaggt atctcagttc ggtgtaggtc gttcgctcca agctgggctg | 6960 |
| tgtgcacgaa ccccccgttc agcccgaccg ctgcgcctta tccggtaact atcgtcttga | 7020 |
| gtccaacccg gtaagacacg acttatcgcc actggcagca gccactggta acaggattag | 7080 |
| cagagcgagg tatgtaggcg gtgctacaga gttcttgaag tggtggccta actacggcta | 7140 |
| cactagaaga acagtatttg gtatctgcgc tctgctgaag ccagttacct tcggaaaaag | 7200 |
| agttggtagc tcttgatccg gcaaacaaac caccgctggt agcggtggtt ttttgtttg | 7260 |
| caagcagcag attacgcgca gaaaaaagg atctcaagaa gatcctttga tcttttctac | 7320 |
| ggggtctgac gctcagtgga acgaaaactc acgttaaggg attttggtca tgagattatc | 7380 |
| aaaaaggatc ttcacctaga tccttttaaa ttaaaaatga agttttaaat caatctaaag | 7440 |
| tatatatgag taaacttggt ctgacagtta ccaatgctta atcagtgagg cacctatctc | 7500 |
| agcgatctgt ctatttcgtt catccatagt tgcctgactc cccgtcgtgt agataactac | 7560 |
| gatacgggag ggcttaccat ctggccccag tgctgcaatg ataccgcgag acccacgctc | 7620 |
| accggctcca gatttatcag caataaacca gccagccgga agggccgagc gcagaagtgg | 7680 |
| tcctgcaact ttatccgcct ccatccagtc tattaattgt tgccgggaag ctagagtaag | 7740 |
| tagttcgcca gttaatagtt tgcgcaacgt tgttgccatt gctacaggca tcgtggtgtc | 7800 |
| acgctcgtcg tttggtatgg cttcattcag ctccggttcc caacgatcaa ggcgagttac | 7860 |
| atgatccccc atgttgtgca aaaaagcggt tagctccttc ggtcctccga tcgttgtcag | 7920 |
| aagtaagttg gccgcagtgt tatcactcat ggttatggca gcactgcata attctcttac | 7980 |
| tgtcatgcca tccgtaagat gcttttctgt gactggtgag tactcaacca agtcattctg | 8040 |
| agaatagtgt atgcggcgac cgagttgctc ttgcccggcg tcaatacggg ataataccgc | 8100 |
| gccacatagc agaactttaa aagtgctcat cattggaaaa cgttcttcgg ggcgaaaact | 8160 |
| ctcaaggatc ttaccgctgt tgagatccag ttcgatgtaa cccactcgtg cacccaactg | 8220 |
| atcttcagca tcttttactt tcaccagcgt ttctgggtga gcaaaaacag gaaggcaaaa | 8280 |
| tgccgcaaaa aagggaataa gggcgacacg gaaatgttga atactcatac tcttcctttt | 8340 |
| tcaatattat tgaagcattt atcagggtta ttgtctcatg agcggataca tatttgaatg | 8400 |
| tatttagaaa aataaacaaa tagggggttcc gcgcacattt ccccgaaaag tgccacctga | 8460 |
| c | 8461 |

<210> SEQ ID NO 4
<211> LENGTH: 7883
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 4

| | |
|---|---|
| gtcgacggat cgggagatct cccgatcccc tatggtgcac tctcagtaca atctgctctg | 60 |
| atgccgcata gttaagccag tatctgctcc ctgcttgtgt gttggaggtc gctgagtagt | 120 |
| gcgcgagcaa aatttaagct acaacaaggc aaggcttgac cgacaattgc atgaagaatc | 180 |
| tgcttagggt taggcgtttt gcgctgcttc gcgatgtacg ggccagatat acgcgttgac | 240 |
| attgattatt gactagttat taatagtaat caattacggg gtcattagtt catagcccat | 300 |

```
atatggagtt ccgcgttaca taacttacgg taaatggccc gcctggctga ccgcccaacg    360 accccccgccc attgacgtca ataatgacgt atgttcccat agtaacgcca atagggactt    420
tccattgacg tcaatgggtg gagtatttac ggtaaactgc ccacttggca gtacatcaag    480
tgtatcatat gccaagtacg cccccctattg acgtcaatga cggtaaatgg cccgcctggc    540
attatgccca gtacatgacc ttatgggact ttcctacttg gcagtacatc tacgtattag    600
tcatcgctat taccatggtg atgcggtttt ggcagtacat caatgggcgt ggatagcggt    660
ttgactcacg gggatttcca agtctccacc ccattgacgt caatgggagt ttgttttggc    720
accaaaatca acgggacttt ccaaaatgtc gtaacaactc cgccccattg acgcaaatgg    780
gcggtaggcg tgtacggtgg gaggtctata taagcagcgc gttttgcctg tactgggtct    840
ctctggttag accagatctg agcctgggag ctctctggct aactagggaa cccactgctt    900
aagcctcaat aaagcttgcc ttgagtgctt caagtagtgt gtgcccgtct gttgtgtgac    960
tctggtaact agagatccct cagacccttt tagtcagtgt ggaaaatctc tagcagtggc   1020
gcccgaacag ggacttgaaa gcgaaaggga accagagga gctctctcga cgcaggactc   1080
ggcttgctga agcgcgcacg gcaagaggcg aggggcggcg actggtgagt acgccaaaaa   1140
ttttgactag cggaggctag aaggagagag atgggtgcga gagcgtcagt attaagcggg   1200
ggagaattag atcgcgatgg gaaaaaattc ggttaaggcc agggggaaag aaaaaatata   1260
aattaaaaca tatagtatgg gcaagcaggg agctagaacg attcgcagtt aatcctggcc   1320
tgttagaaac atcagaaggc tgtagacaaa tactgggaca gctacaacca tcccttcaga   1380
caggatcaga gaacttagat cattatata atacagtagc aaccctctat tgtgtgcatc   1440
aaaggataga gataaaagac accaaggaag ctttagacaa gatagaggaa gagcaaaaca   1500
aaagtaagac caccgcacag caagcggccg gccgcgctga tcttcagacc tggaggagga   1560
gatatgaggg acaattggag aagtgaatta tataaatata agtagtaaaa aattgaacca   1620
ttaggagtag cacccaccaa ggcaaagaga agagtggtgc agagagaaaa aagagcagtg   1680
ggaataggag ctttgttcct tgggttcttg ggagcagcag gaagcactat gggcgcagcg   1740
tcaatgacgc tgacggtaca ggccagacaa ttattgtctg gtatagtgca gcagcagaac   1800
aatttgctga gggctattga ggcgcaacag catctgttgc aactcacagt ctggggcatc   1860
aagcagctcc aggcaagaat cctggctgtg gaaagatacc taaaggatca acagctcctg   1920
gggatttggg gttgctctgg aaaactcatt tgcaccactg ctgtgccttg gaatgctagt   1980
tggagtaata aatctctgga acagatttgg aatcacacga cctggatgga gtgggacaga   2040
gaaattaaca attacacaag cttaatacac tccttaattg aagaatcgca aaaccagcaa   2100
gaaaagaatg aacaagaatt attggaatta gataaatggg caagtttgtg gaattggttt   2160
aacataacaa attggctgtg gtatataaaa ttattcataa tgatagtagg aggcttggta   2220
ggtttaagaa tagttttgc tgtactttct atagtgaata gagttaggca gggatattca   2280
ccattatcgt ttcagaccca cctcccaacc ccgagggac ccgacaggcc cgaaggaata   2340
gaagaagaag gtggagagag agacagagac agatccattc gattagtgaa cggatcggca   2400
ctgcgtgcgc caattctgca gacaaatggc agtattcatc cacaattttta aaagaaaagg   2460 ggggattggg gggtacagtg caggggaaag aatagtagac ataatagcaa cagacataca   2520
aactaaagaa ttacaaaaac aaattacaaa aattcaaaat tttcgggttt attacaggga   2580
cagcagagat ccagtttggt tagtaccggg cccgctctag acgaaagttc gcggcggcg   2640 gggtcgggtg aggcgcaaaa ggataaaaag cccgtggaag cggagctgag cagatccgag   2700
```

```
ccgggctggc tgcagagaaa ccgcagggag agcctcactg ctgagcgccc ctcgacggcg    2760
gagcggcagc agcctccgtg gcctccagca tccgacaaga agcttcagcc accggtatgg    2820
gagtcaaagt tctgtttgcc ctgatctgca tcgctgtggc cgaggccaag cccaccgaga    2880
acaacgaaga cttcaacatc gtggccgtgg ccagcaactt cgcgaccacg gatctcgatg    2940
ctgaccgcgg gaagttgccc ggcaagaagc tgccgctgga ggtgctcaaa gagatggaag    3000
ccaatgcccg gaaagctggc tgcaccaggg gctgtctgat ctgcctgtcc cacatcaagt    3060
gcacgcccaa gatgaagaag ttcatcccag acgctgccac cctacgaa ggcgacaaag      3120 agtccgcaca gggcggcata ggcgaggcga tcgtcgacat tcctgagatt cctgggttca    3180
aggacttgga gcctatggag cagttcatcg cacaggtcga tctgtgtgtg gactgcacaa    3240
ctggctgcct caaagggctt gccaacgtgc agtgttctga cctgctcaag aagtggctgc    3300
cgcaacgctg tgcgaccttt gccagcaaga tccagggcca ggtggacaag atcaagggg    3360 ccggtggtga ctaactcgag gtcgacggta tcgataagct cgcttcacga gattccagca    3420
ggtcgaggga cctaataact tcgtatagca tacattatac gaagttatat taagggttcc    3480
aagcttaagc ggccgctgaa agaccccacc tgtaggtttg gcaagctagc tgcagtaacg    3540
ccattttgca aggcatggaa aaataccaaa ccaagaatag agaagttcag atcaagggcg    3600
ggtacatgaa aatagctaac gttgggccaa acaggatatc tgcggtgagc agtttcggcc    3660
ccggcccggg gccaagaaca gatggtcacc gcagtttcgg ccccggcccg aggccaagaa    3720
cagatggtcc ccagatatgg cccaaccctc agcagtttct taagacccat cagatgtttc    3780
caggctcccc caaggacctg aaatgaccct gcgccttatt tgaattaacc aatcagcctg    3840
cttctcgctt ctgttcgcgc gcttctgctt cccgagctct ataaaagagc tcacaacccc    3900
tcactcggcg cgccagtcct ccgattgact gagtcgcccg gatcccgcca ccatggtgag    3960
caagggcgag gaggataaca tggccatcat caaggagttc atgcgcttca aggtgcacat    4020
ggagggctcc gtgaacggcc acgagttcga gatcgagggc gagggcgagg ccgcccctta    4080
cgagggcacc cagaccgcca agctgaaggt gaccaagggt ggccccctgc ccttcgcctg    4140
ggacatcctg tcccctcagt tcatgtacgg ctccaaggcc tacgtgaagc accccgccga    4200
catccccgac tacttgaagc tgtccttccc cgagggcttc aagtgggagc gcgtgatgaa    4260
cttcgaggac ggcggcgtgg tgaccgtgac ccaggactcc tccctgcagg acggcgagtt    4320
catctacaag gtgaagctgc gcggcaccaa cttcccctcc gacggccccg taatgcagaa    4380
gaagaccatg ggctgggagg cctcctccga gcggatgtac cccgaggacg gcgccctgaa    4440
gggcgagatc aagcagaggc tgaagctgaa ggacggcggc cactacgacg ctgaggtcaa    4500
gaccacctac aaggccaaga gcccgtgca gctgcccggc gcctacaacg tcaacatcaa    4560
gttggacatc acctcccaca acgaggacta caccatcgtg aacagtacg aacgcgccga     4620 gggccgccac tccaccggcg gcatggacga gctgtacaag taagaattcg tcagggacc     4680 taataacttc gtatagcata cattatacga agttatacat gtttaagggt tccggttcca    4740
ctaggtacaa ttcgatatca agcttatcga taatcaacct ctggattaca aaatttgtga    4800
aagattgact ggtattctta actatgttgc tccttttacg ctatgtggat acgctgcttt    4860
aatgcctttg tatcatgcta ttgcttcccg tatggctttc attttctcct ccttgtataa    4920
atcctggttg ctgtctcttt atgaggagtt gtggcccgtt gtcaggcaac gtggcgtggt    4980
gtgcactgtg tttgctgacg caacccccac tggttggggc attgccacca cctgtcagct    5040
```

```
cctttccggg actttcgctt tccccctccc tattgccacg gcggaactca tcgccgcctg   5100
ccttgcccgc tgctggacag gggctcggct gttgggcact gacaattccg tggtgttgtc   5160
ggggaaatca tcgtcctttc cttggctgct cgcctgtgtt gccacctgga ttctgcgcgg   5220
gacgtccttc tgctacgtcc cttcggccct caatccagcg gaccttcctt cccgcggcct   5280
gctgccggct ctgcggcctc ttccgcgtct tcgccttcgc cctcagacga gtcggatctc   5340
cctttgggcc gcctcccogc atcgataccg tcgacctcga tcgagaccta gaaaaacatg   5400
gagcaatcac aagtagcaat acagcagcta ccaatgctga ttgtgcctgg ctagaagcac   5460
aagaggagga ggaggtgggt tttccagtca cacctcaggt accttttaaga ccaatgactt   5520 acaaggcagc tgtagatctt agccactttt taaaagaaaa gggggggactg aagggctaa    5580 ttcactccca acgaagacaa gatatccttg atctgtggat ctaccacaca caaggctact   5640
tccctgattg gcagaactac acaccagggc cagggatcag atatccactg acctttggat   5700
ggtgctacaa gctagtacca gttgagcaag agaaggtaga agaagccaat gaaggagaga   5760 acaccccgctt gttacaccct gtgagcctgc atgggatgga tgaccggag agagaagtat    5820 tagagtggag gtttgacagc cgcctagcat ttcatcacat ggcccgagag ctgcatccgg   5880
actgtactgg gtctctctgg ttagaccaga tctgagcctg ggagctctct ggctaactag   5940
ggaacccact gcttaagcct caataaagct tgccttgagt gcttcaagta gtgtgtgccc   6000
gtctgttgtg tgactctggt aactagagat ccctcagacc cttttagtca gtgtggaaaa   6060
tctctagcag catgtgagca aaaggccagc aaaaggccag gaaccgtaaa aaggccgcgt   6120
tgctggcgtt tttccatagg ctccgccccc ctgacgagca tcacaaaaat cgacgctcaa   6180
gtcagaggtg gcgaaacccg acaggactat aaagatacca ggcgtttccc cctggaagct   6240
ccctcgtgcg ctctcctgtt ccgaccctgc cgcttaccgg atacctgtcc gcctttctcc   6300
cttcgggaag cgtggcgctt tctcatagct cacgctgtag gtatctcagt tcggtgtagg   6360
tcgttcgctc caagctgggc tgtgtgcacg aaccccccgt tcagcccgac cgctgcgcct   6420
tatccggtaa ctatcgtctt gagtccaacc cggtaagaca cgacttatcg ccactggcag   6480
cagccactgg taacaggatt agcagagcga ggtatgtagg cggtgctaca gagttcttga   6540
agtggtggcc taactacggc tacactagaa gaacagtatt tggtatctgc gctctgctga   6600
agccagttac cttcggaaaa agagttggta gctcttgatc cggcaaacaa accaccgctg   6660
gtagcggtgg ttttttttgtt tgcaagcagc agattacgcg cagaaaaaaa ggatctcaag   6720
aagatccttt gatcttttct acggggtctg acgctcagtg gaacgaaaac tcacgttaag   6780
ggattttggt catgagatta tcaaaaagga tcttcaccta gatccttttaa aattaaaaat   6840 gaagttttaa atcaatctaa agtatatatg agtaaacttg gtctgacagt taccaatgct   6900
taatcagtga ggcacctatc tcagcgatct gtctatttcg ttcatccata gttgcctgac   6960
tccccgtcgt gtagataact acgatacggg agggcttacc atctggcccc agtgctgcaa   7020
tgataccgcg agacccacgc tcaccggctc cagatttatc agcaataaac cagccagccg   7080
gaagggccga gcgcagaagt ggtcctgcaa ctttatccgc ctccatccag tctattaatt   7140
gttgccggga agctagagta agtagttcgc cagttaatag tttgcgcaac gttgttgcca   7200
ttgctacagg catcgtggtg tcacgctcgt cgtttggtat ggcttcattc agctccggtt   7260
cccaacgatc aaggcgagtt acatgatccc ccatgttgtg caaaaaagcg gttagctcct   7320
tcggtcctcc gatcgttgtc agaagtaagt tggccgcagt gttatcactc atggttatgg   7380
cagcactgca taattctctt actgtcatgc catccgtaag atgcttttct gtgactggtg   7440
```

```
agtactcaac caagtcattc tgagaatagt gtatgcggcg accgagttgc tcttgcccgg    7500
cgtcaatacg ggataatacc gcgccacata gcagaacttt aaaagtgctc atcattggaa    7560
aacgttcttc ggggcgaaaa ctctcaagga tcttaccgct gttgagatcc agttcgatgt    7620
aacccactcg tgcacccaac tgatcttcag catcttttac tttcaccagc gtttctgggt    7680
gagcaaaaac aggaaggcaa aatgccgcaa aaaagggaat aagggcgaca cggaaatgtt    7740
gaatactcat actcttcctt tttcaatatt attgaagcat ttatcagggt tattgtctca    7800
tgagcggata catatttgaa tgtatttaga aaaataaaca aatagggggtt ccgcgcacat    7860 ttccccgaaa agtgccacct gac                                            7883

<210> SEQ ID NO 5
<211> LENGTH: 10775
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 5
gtcgacggat cgggagatct cccgatcccc tatggtgcac tctcagtaca atctgctctg      60
atgccgcata gttaagccag tatctgctcc ctgcttgtgt gttggaggtc gctgagtagt     120
gcgcgagcaa aatttaagct acaacaaggc aaggcttgac cgacaattgc atgaagaatc     180
tgcttagggt taggcgtttt gcgctgcttc gcgatgtacg ggccagatat acgcgttgac     240
attgattatt gactagttat taatagtaat caattacggg gtcattagtt catagcccat     300
atatggagtt ccgcgttaca taacttacgg taaatggccc gcctggctga ccgcccaacg     360
acccccgccc attgacgtca ataatgacgt atgttcccat agtaacgcca atagggactt     420
tccattgacg tcaatgggtg gagtatttac ggtaaactgc ccacttggca gtacatcaag     480
tgtatcatat gccaagtacg ccccctattg acgtcaatga cggtaaatgg cccgcctggc     540
attatgccca gtacatgacc ttatgggact ttcctacttg gcagtacatc tacgtattag     600
tcatcgctat taccatggtg atgcggtttt ggcagtacat caatgggcgt ggatagcggt     660
ttgactcacg gggatttcca agtctccacc ccattgacgt caatgggagt ttgttttggc     720
accaaaatca acgggacttt ccaaaatgtc gtaacaactc cgccccattg acgcaaatgg     780
gcggtaggcg tgtacggtgg gaggtctata taagcagcgc gttttgcctg tactgggtct     840
ctctggttag accagatctg agcctgggag ctctctggct aactagggaa cccactgctt     900
aagcctcaat aaagcttgcc ttgagtgctt caagtagtgt gtgcccgtct gttgtgtgac     960
tctggtaact agagatccct cagaccctt tagtcagtgt ggaaaatctc tagcagtggc     1020
gcccgaacag ggacttgaaa gcgaaaggga accagagga gctctctcga cgcaggactc     1080
ggcttgctga agcgcgcacg gcaagaggcg aggggcggcg actggtgagt acgccaaaaa    1140
ttttgactag cggaggctag aaggagagag atgggtgcga gagcgtcagt attaagcggg    1200
ggagaattag atcgcgatgg gaaaaaattc ggttaaggcc agggggaaag aaaaaatata    1260
aattaaaaca tatagtatgg gcaagcaggg agctagaacg attcgcagtt aatcctggcc    1320
tgttagaaac atcagaaggc tgtagacaaa tactgggaca gctacaacca tcccttcaga    1380
caggatcaga gaacttagat cattatata atacagtagc aaccctctat tgtgtgcatc    1440
aaaggataga gataaaagac accaaggaag ctttagacaa gatagaggaa gagcaaaaca    1500
aaagtaagac caccgcacag caagcggccg gccgcgctga tcttcagacc tggaggagga    1560
```

-continued

```
gatatgaggg acaattggag aagtgaatta tataaatata aagtagtaaa aattgaacca    1620
ttaggagtag cacccaccaa ggcaaagaga agagtggtgc agagagaaaa aagagcagtg    1680
ggaataggag ctttgttcct tgggttcttg ggagcagcag gaagcactat gggcgcagcg    1740
tcaatgacgc tgacggtaca ggccagacaa ttattgtctg gtatagtgca gcagcagaac    1800
aatttgctga gggctattga ggcgcaacag catctgttgc aactcacagt ctggggcatc    1860
aagcagctcc aggcaagaat cctggctgtg gaaagatacc taaaggatca acagctcctg    1920
gggatttggg gttgctctgg aaaactcatt tgcaccactg ctgtgccttg gaatgctagt    1980
tggagtaata aatctctgga acagatttgg aatcacacga cctggatgga gtgggacaga    2040
gaaattaaca attacacaag cttaatacac tccttaattg aagaatcgca aaaccagcaa    2100
gaaaagaatg aacaagaatt attggaatta gataaatggg caagtttgtg gaattggttt    2160
aacataacaa attggctgtg gtatataaaa ttattcataa tgatagtagg aggcttggta    2220
ggtttaagaa tagttttgc tgtactttct atagtgaata gagttaggca gggatattca    2280
ccattatcgt ttcagaccca cctcccaacc ccgagggac ccgacaggcc cgaaggaata    2340
gaagaagaag gtggagagag agacagagac agatccattc gattagtgaa cggatcggca    2400
ctgcgtgcgc caattctgca gacaaatggc agtattcatc cacaattta aaagaaaagg    2460 ggggattggg gggtacagtg caggggaaag aatagtagac ataatagcaa cagacataca    2520
aactaaagaa ttacaaaaac aaattacaaa aattcaaaat tttcgggttt attacaggga    2580
cagcagagat ccagtttggt tagtaccggg cccgctctag atcatcttga attcccacaa    2640
cacatgggag ggacccagtg gaaggtaact gaatcatggg gcaggtcttt cccatgctgt    2700
tcttgtgata gtgaataagt ctcatgagat ctgatggttt taaaaagggg agtttccctg    2760
cacaagctct ctcttctctt gtttgccacc atgtgagaca tgactttcac cttttgccat    2820
gattgtgagg cctcccagcc acgtggaact gtaagtccat taaacctctt tctttgtaa    2880 attgccccgt ctcaggtatg tctttattag cagtgtgaga atgggctaac acatacaact    2940
tgcttttttt ttgtactcaa tattgagtcg tgagctttgc accacattag aatgtctatt    3000
taagtcatta ctttaaggtc ggttctattt ttaaagctac tcaaactaag ctactaaaca    3060
taagtggata tatttaagtg tatgtataaa atttatacta ggccagctgc agtggctcat    3120
gcctgtaatc ccaaagctgt ggaaggtaga ggtgggacta attgaggcca cgagttcaag    3180
gctgcagtga gctgtgattg catcactgta ctccagcctg agggacagag caggaaccag    3240 aaaaaataa aataaaaga aacaaacaaa aaacccccca acaaccctac agtggctctt    3300
ttagaaaaaa caaacaaaca aaaccaaaac tgtactgcat gcataagctc ccctatgcta    3360
tgtttgaacc actctgaaga gatcaattaa aagaagtga gtgatattgg aagcatgcct    3420
ctgtgatgct gtggtaacat tcataggctg cgttagggct atgcctgtaa ctcttggaga    3480
tgagtgggta agtgggttt tgaggtggct ggggctgga agagaaggtt ggaggagccc    3540
acacaagaca gcccctta acgccgggc acagaaccc aggctgggcc aactttccc     3600 tgctgaggtg aagacccgtc tcttgcaggc cgttggcaaa tgtcttgact ctggcatcca    3660
ggtgtgacca gcttagaccc tgagagtgag tgaatttaaa gttgacagct tctttccctt    3720
ttggaattat gaaataggtt acttcttttc aaggacagtt tgattttcca ctgtgtaagt    3780
catatattgc acatttcttt aaacattccc tttttttcctg aactgatcac cttaccagta    3840
cggctgatcc tctcaagcag caaactctac cagctgtcac tggtgctctc ggagagacga    3900
```

```
ttaaccaagg aacccagccc gggaacagta ctgacctcta cttctggact cctgcctccc   3960
tcttaaaaag tcccttgaac ttcctagtgg gttctaacct gtcaaaggag aaaatagcca   4020
tctatggagt aagggttttt agtttctctt tttacaaatg gaagtttcct ctgaatcagg   4080
caagtaacgt taaatagaag ccaactttta agtttctcta acacactgct aaattgtaac   4140
accagactgt accacatact ctccagctgc cagctattgc agttgccatc cttgttacta   4200
tagtggtgag tatctctgcc tgtcatgcgt gagagagggg gtcgattccc cgacggggag   4260
gtcacgggaa attgtgtgag gattttgtca accttcagaa gtctcagaaa tgtctccttg   4320
ttttggcttt cagcggaaat ccgaacgcca gcagatctga atggaatgtt ctggattgaa   4380
gaaagtggga aatggcctca attcacaaag tcacaacctg ataaaaacca gtgtgacttt   4440
actgcccagt gaacccatct cgtcctccag cctttaggag gtaggttgga ctggagcctg   4500
cagtagttta ctctccacct gagtcctggt ctccagctgg gaacccactt aggccataaa   4560
gaaaaacgca cactgtgcct ctccaccggg cctctggaga cgaggctcct cggggataca   4620
aacagtgggg agaacatgag ggacatcccg accgtactct gcgtcctcct ttcccaggtg   4680
ttgcgttctc tcttgggctg agtggcgagg tctctcccga gtcccagggc cacagtgcaa   4740
tgtcacatct cctttgtgga aagtgactgg taaaggagag agaacaaaac tggaggaatg   4800
taaagtcttc agccacctgg tttaatttat tcaagagtga ttaatcctag atgagaaaaa   4860
gaattgaaat ggatcggaaa aaaatgaaag tgcattggcc gggaatcgaa cccgggcctc   4920
ccgcgtggca ggcgagaatt ctaccactga accaccaatg ctactgtcag ctaaagacct   4980
gcagtattgt ctcttaaagc tcactatctc tggccattca ctaaggaacc aggcaccgtc   5040
ttaaatcgcg gtttggaaaa tattttgttc aagataaaac tgttttaaga tatacgtgta   5100
tatatcttat atatctgtat tcgcatggta acatatcttc ggccttcctg agccgctggg   5160
ctctcagcgg ccctccaagg cagcccgcag gcccctgtgt gcctcaggga tccgacctcc   5220
cacagccccg gggagacctt gcctctaaag ttgctgcttt tgcagcctct gccacaaccg   5280
cgcgtcctca gagccagccc ggaggagcta gaaccttccc cgcatttctt tcagcagcct   5340
gagtcagagg cgggctggcc tggcgtagcc gcccagcctc gcggctcatg ccccgatctg   5400
cccgaacctt ctcccggggt cagcgccgcg ccgcgccacc cggctgagtc agcccgggcg   5460
ggcgagaggc tctcaactgg gcgggaaggt gcgggaaggt gcggaaaggt tcgcgaaagt   5520
tcgcggcggc gggggtcggg tgaggcgcaa aaggataaaa agcccgtgga agcggagctg   5580
agcagatccg agccgggctg gctgcagaga accgcaggg agagcctcac tgctgagcgc   5640
ccctcgacgg cggagcggca gcagcctccg tggcctccag catccgacaa gaagcttcag   5700
ccaccggtat gggagtcaaa gttctgtttg ccctgatctg catcgctgtg gccgaggcca   5760
agcccaccga gaacaacgaa gacttcaaca tcgtggccgt ggccagcaac ttcgcgacca   5820
cggatctcga tgctgaccgc gggaagttgc ccggcaagaa gctgccgctg gaggtgctca   5880
aagagatgga agccaatgcc cggaaagctg gctgcaccag gggctgtctg atctgcctgt   5940
cccacatcaa gtgcacgccc aagatgaaga agttcatccc aggacgctgc cacacctacg   6000
aaggcgacaa agagtccgca cagggcggca taggcgaggc gatcgtcgac attcctgaga   6060
ttcctgggtt caaggacttg gagcctatgg agcagttcat cgcacaggtc gatctgtgtg   6120
tggactgcac aactgctgc ctcaaagggc ttgccaacgt gcagtgttct gacctgctca   6180
agaagtggct gccgcaacgc tgtgcgacct ttgccagcaa gatccagggc caggtggaca   6240
agatcaaggg ggccggtggt gactaactcg aggtcgacgg tatcgataag ctcgcttcac   6300
```

```
gagattccag caggtcgagg gacctaataa cttcgtatag catacattat acgaagttat    6360
attaagggtt ccaagcttaa gcggccgctg aaagacccca cctgtaggtt tggcaagcta    6420
gctgcagtaa cgccattttg caaggcatgg aaaatacca aaccaagaat agagaagttc    6480
agatcaaggg cgggtacatg aaaatagcta acgttgggcc aaacaggata tctgcggtga    6540
gcagtttcgg ccccggcccg ggccaagaa cagatggtca ccgcagtttc ggccccggcc    6600
cgaggccaag aacagatggt ccccagatat ggcccaaccc tcagcagttt cttaagaccc    6660
atcagatgtt tccaggctcc cccaaggacc tgaaatgacc ctgcgcctta tttgaattaa    6720
ccaatcagcc tgcttctcgc ttctgttcgc gcgcttctgc ttcccgagct ctataaaaga    6780
gctcacaacc cctcactcgg cgcgccagtc ctccgattga ctgagtcgcc cggatcccgc    6840
caccatggtg agcaagggcg aggaggataa catggccatc atcaaggagt tcatgcgctt    6900
caaggtgcac atggagggct ccgtgaacgg ccacgagttc gagatcgagg gcgagggcga    6960
gggccgcccc tacgagggca cccagaccgc caagctgaag gtgaccaagg gtggcccct    7020
gcccttcgcc tgggacatcc tgtcccctca gttcatgtac ggctccaagg cctacgtgaa    7080
gcaccccgcc gacatccccg actacttgaa gctgtccttc cccgagggct tcaagtggga    7140
gcgcgtgatg aacttcgagg acggcggcgt ggtgaccgtg acccaggact cctccctgca    7200
ggacggcgag ttcatctaca aggtgaagct gcgcggcacc aacttcccct ccgacggccc    7260
cgtaatgcag aagaagacca tgggctggga ggcctcctcc gagcggatgt accccgagga    7320
cggcgccctg aagggcgaga tcaagcagag gctgaagctg aaggacggcg gccactacga    7380
cgctgaggtc aagaccacct acaaggccaa gaagcccgtg cagctgcccg gcgcctacaa    7440
cgtcaacatc aagttggaca tcacctccca caacgaggac tacaccatcg tggaacagta    7500
cgaacgcgcc gagggccgcc actccaccgg cggcatggac gagctgtaca gtaagaatt    7560
cgtcgaggga cctaataact tcgtatagca tacattatac gaagttatac atgtttaagg    7620
gttccggttc cactaggtac aattcgatat caagcttatc gataatcaac ctctggatta    7680
caaaatttgt gaaagattga ctggtattct taactatgtt gctccttta cgctatgtgg    7740
atacgctgct ttaatgcctt tgtatcatgc tattgcttcc cgtatggctt tcattttctc    7800
ctccttgtat aaatcctggt tgctgtctct ttatgaggag ttgtggcccg ttgtcaggca    7860
acgtggcgtg gtgtgcactg tgtttgctga cgcaacccc actggttggg cattgccac     7920
cacctgtcag ctccttttccg ggactttcgc ttccccctc cctattgcca cggcggaact    7980
catcgccgcc tgccttgccc gctgctggac aggggctcgg ctgttgggca ctgacaattc    8040
cgtggtgttg tcggggaaat catcgtcctt ccttggctg ctcgcctgtg ttgccacctg    8100
gattctgcgc gggacgtcct tctgctacgt cccttcggcc ctcaatccag cggaccttcc    8160
ttcccgcggc ctgctgccgg ctctgcggcc tcttccgcgt cttcgccttc gccctcagac    8220
gagtcggatc tccctttggg ccgcctcccc gcatcgatac cgtcgacctc gatcgagacc    8280
tagaaaaaca tggagcaatc acaagtagca atacagcagc taccaatgct gattgtgcct    8340
ggctagaagc acaagaggag gaggaggtgg gttttccagt cacacctcag gtacctttaa    8400
gaccaatgac ttacaaggca gctgtagatc ttagccactt tttaaaagaa aagggggac    8460
tggaagggct aattcactcc caacgaagac aagatatcct tgatctgtgg atctaccaca    8520
cacaaggcta cttccctgat tggcagaact acacaccagg gccagggatc agatatccac    8580
tgacctttgg atggtgctac aagctagtac cagttgagca agagaaggta gaagaagcca    8640
```

```
atgaaggaga gaacacccgc ttgttacacc ctgtgagcct gcatgggatg gatgacccgg    8700
agagagaagt attagagtgg aggtttgaca gccgcctagc atttcatcac atggcccgag    8760
agctgcatcc ggactgtact gggtctctct ggttagacca gatctgagcc tgggagctct    8820
ctggctaact agggaaccca ctgcttaagc ctcaataaag cttgccttga gtgcttcaag    8880
tagtgtgtgc ccgtctgttg tgtgactctg gtaactagag atccctcaga ccctttagt    8940 cagtgtggaa aatctctagc agcatgtgag caaaaggcca gcaaaaggcc aggaaccgta    9000
aaaaggccgc gttgctggcg ttttcccata ggctccgccc ccctgacgag catcacaaaa    9060
atcgacgctc aagtcagagg tggcgaaacc cgacaggact ataaagatac caggcgtttc    9120
cccctggaag ctccctcgtg cgctctcctg ttccgaccct gccgcttacc ggatacctgt    9180
ccgcctttct cccttcggga agcgtggcgc tttctcatag ctcacgctgt aggtatctca    9240
gttcggtgta ggtcgttcgc tccaagctgg gctgtgtgca cgaaccccc gttcagcccg    9300 accgctgcgc cttatccggt aactatcgtc ttgagtccaa cccggtaaga cacgacttat    9360
cgccactggc agcagccact ggtaacagga ttagcagagc gaggtatgta ggcggtgcta    9420
cagagttctt gaagtggtgg cctaactacg gctacactag aagaacagta tttggtatct    9480
gcgctctgct gaagccagtt accttcggaa aaagagttgg tagctcttga tccggcaaac    9540
aaaccaccgc tggtagcggt ggtttttttg tttgcaagca gcagattacg cgcagaaaaa    9600
aaggatctca agaagatcct ttgatctttt ctacggggtc tgacgctcag tggaacgaaa    9660
actcacgtta agggattttg gtcatgagat tatcaaaaag gatcttcacc tagatccttt    9720
taaattaaaa atgaagtttt aaatcaatct aaagtatata tgagtaaact tggtctgaca    9780
gttaccaatg cttaatcagt gaggcaccta tctcagcgat ctgtctattt cgttcatcca    9840
tagttgcctg actccccgtc gtgtagataa ctacgatacg ggagggctta ccatctggcc    9900
ccagtgctgc aatgataccg cgagacccac gctcaccggc tccagattta tcagcaataa    9960
accagccagc cggaagggcc gagcgcagaa gtggtcctgc aactttatcc gcctccatcc    10020
agtctattaa ttgttgccgg gaagctagag taagtagttc gccagttaat agtttgcgca    10080
acgttgttgc cattgctaca ggcatcgtgg tgtcacgctc gtcgtttggt atggcttcat    10140
tcagctccgg ttcccaacga tcaaggcgag ttacatgatc ccccatgttg tgcaaaaaag    10200
cggttagctc cttcggtcct ccgatcgttg tcagaagtaa gttggccgca gtgttatcac    10260
tcatggttat ggcagcactg cataattctc ttactgtcat gccatccgta agatgctttt    10320
ctgtgactgg tgagtactca accaagtcat tctgagaata gtgtatgcgg cgaccgagtt    10380
gctcttgccc ggcgtcaata cgggataata ccgcgccaca tagcagaact ttaaaagtgc    10440
tcatcattgg aaaacgttct tcggggcgaa aactctcaag gatcttaccg ctgttgagat    10500
ccagttcgat gtaacccact cgtgcaccca actgatcttc agcatctttt actttcacca    10560
gcgtttctgg gtgagcaaaa acaggaaggc aaaatgccgc aaaaaaggga ataagggcga    10620
cacggaaatg ttgaatactc atactcttcc tttttcaata ttattgaagc atttatcagg    10680
gttattgtct catgagcgga tacatatttg aatgtattta gaaaaataaa caaatagggg    10740
ttccgcgcac atttccccga aaagtgccac ctgac                              10775

<210> SEQ ID NO 6
<211> LENGTH: 8972
<212> TYPE: DNA
<213> ORGANISM: Artificial Sequence
<220> FEATURE:
<223> OTHER INFORMATION: Description of Artificial Sequence: Synthetic
``` polynucleotide

<400> SEQUENCE: 6

```
gtcgacggat cgggagatct cccgatcccc tatggtgcac tctcagtaca atctgctctg      60
atgccgcata gttaagccag tatctgctcc ctgcttgtgt gttggaggtc gctgagtagt     120
gcgcgagcaa aatttaagct acaacaaggc aaggcttgac cgacaattgc atgaagaatc     180
tgcttagggt taggcgtttt gcgctgcttc gcgatgtacg ggccagatat acgcgttgac     240
attgattatt gactagttat taatagtaat caattacggg gtcattagtt catagcccat     300
atatggagtt ccgcgttaca taacttacgg taaatggccc gcctggctga ccgcccaacg     360
acccccgccc attgacgtca ataatgacgt atgttcccat agtaacgcca atagggactt     420
tccattgacg tcaatgggtg gagtatttac ggtaaactgc ccacttggca gtacatcaag     480
tgtatcatat gccaagtacg ccccctattg acgtcaatga cggtaaatgg cccgcctggc     540
attatgccca gtacatgacc ttatgggact ttcctacttg gcagtacatc tacgtattag     600
tcatcgctat taccatggtg atgcggtttt ggcagtacat caatgggcgt ggatagcggt     660
ttgactcacg gggatttcca agtctccacc ccattgacgt caatgggagt ttgttttggc     720
accaaaatca acgggacttt ccaaaatgtc gtaacaactc cgccccattg acgcaaatgg     780
gcggtaggcg tgtacggtgg gaggtctata taagcagcgc gttttgcctg tactgggtct     840
ctctggttag accagatctg agcctgggag ctctctggct aactagggaa cccactgctt     900
aagcctcaat aaagcttgcc ttgagtgctt caagtagtgt gtgcccgtct gttgtgtgac     960
tctggtaact agagatccct cagaccctt tagtcagtgt ggaaaatctc tagcagtggc     1020
gcccgaacag ggacttgaaa gcgaaaggga accagagga gctctctcga cgcaggactc     1080
ggcttgctga agcgcgcacg gcaagaggcg aggggcggcg actggtgagt acgccaaaaa     1140
ttttgactag cggaggctag aaggagagag atgggtgcga gagcgtcagt attaagcggg     1200
ggagaattag atcgcgatgg gaaaaaattc ggttaaggcc agggggaaag aaaaaatata     1260
aattaaaaca tatagtatgg gcaagcaggg agctagaacg attcgcagtt aatcctggcc     1320
tgttagaaac atcagaaggc tgtagacaaa tactgggaca gctacaacca tcccttcaga     1380
caggatcaga agaacttaga tcattatata atacagtagc aaccctctat tgtgtgcatc     1440
aaaggataga gataaaagac accaaggaag ctttagacaa gatagaggaa gagcaaaaca     1500
aaagtaagac caccgcacag caagcggccg ccgcgctga tcttcagacc tggaggagga     1560
gatatgaggg acaattggag aagtgaatta tataaatata agtagtaaa aattgaacca     1620
ttaggagtag cacccaccaa ggcaaagaga agagtggtgc agagagaaaa aagagcagtg     1680
ggaataggag cttgttcct tgggttcttg ggagcagcag gaagcactat gggcgcagcg     1740
tcaatgacgc tgacggtaca ggccagacaa ttattgtctg gtatagtgca gcagcagaac     1800
aatttgctga gggctattga ggcgcaacag catctgttgc aactcacagt ctggggcatc     1860
aagcagctcc aggcaagaat cctggctgtg gaaagatacc taaaggatca acagctcctg     1920
gggatttggg gttgctctgg aaaactcatt tgcaccactg ctgtgccttg gaatgctagt     1980
tggagtaata atctctgga acagatttgg aatcacacga cctggatgga gtgggacaga     2040
gaaattaaca attcacaag cttaatacac tccttaattg aagaatcgca aaaccagcaa     2100
gaaaagaatg aacaagaatt attggaatta gataaatggg caagtttgtg gaattggttt     2160
aacataacaa attggctgtg gtatataaaa ttattcataa tgatagtagg aggcttggta     2220
ggtttaagaa tagttttgc tgtactttct atagtgaata gagttaggca gggatattca     2280
```

```
ccattatcgt tcagaccca cctcccaacc ccgaggggac ccgacaggcc cgaaggaata    2340
gaagaagaag gtggagagag agacagagac agatccattc gattagtgaa cggatcggca    2400
ctgcgtgcgc caattctgca gacaaatggc agtattcatc cacaatttta aaagaaaagg    2460
ggggattggg gggtacagtg caggggaaag aatagtagac ataatagcaa cagacataca    2520
aactaaagaa ttacaaaaac aaattacaaa aattcaaaat tttcgggttt attacaggga    2580
cagcagagat ccagtttggt tagtaccggg cccgctctag agatctgaat ggaatgttct    2640
ggattgaaga agtgggaaa tggcctcaat tcacaaagtc acaacctgat aaaaaccagt    2700
gtgactttac tgcccagtga acccatctcg tcctccagcc tttaggaggt aggttggact    2760
ggagcctgca gtagtttact ctccacctga gtcctggtct ccagctggga acccacttag    2820
gccataaaga aaaacgcaca ctgtgcctct ccaccgggcc tctggagacg aggctcctcg    2880
gggatacaaa cagtggggag aacatgaggg acatcccgac cgtactctgc gtcctccttt    2940
cccaggtgtt gcgttctctc ttgggctgag tggcgaggtc tctcccgagt cccagggcca    3000
cagtgcaatg tcacatctcc tttgtggaaa gtgactggta aaggagagag aacaaaactg    3060
gaggaatgta aagtcttcag ccacctggtt taatttattc aagagtgatt aatcctagat    3120
gagaaaaaga attgaaatgg atcggaaaaa aatgaaagtg cattggccgg gaatcgaacc    3180
cgggcctccc gcgtggcagg cgagaattct accactgaac caccaatgct actgtcagct    3240
aaagacctgc agtattgtct cttaaagctc actatctctg gccattcact aaggaaccag    3300
gcaccgtctt aaatcgcggt ttggaaaata ttttgttcaa gataaaactg ttttaagata    3360
tacgtgtata tatcttatat atctgtattc gcatggtaac atatcttcgg ccttcctgag    3420
ccgctgggct ctcagcggcc ctccaaggca gcccgcaggc ccctgtgtgc ctcagggatc    3480
cgacctccca cagccccggg gagaccttgc ctctaaagtt gctgcttttg cagcctctgc    3540
cacaaccgcg cgtcctcaga gccagcccgg aggagctaga accttccccg catttctttc    3600
agcagcctga gtcagaggcg ggctggcctg gcgtagccgc ccagcctcgc ggctcatgcc    3660
ccgatctgcc cgaaccttct cccggggtca gcgccgcgcc gcgccacccg gctgagtcag    3720
cccgggcggg cgagaggctc tcaactgggc gggaaggtgc gggaaggtgc ggaaaggttc    3780
gcgaaagttc gcggcggcgg gggtcgggtg aggcgcaaaa ggataaaaag cccgtggaag    3840
cggagctgag cagatccgag ccgggctggc tgcagagaaa ccgcagggag agcctcacta    3900
ccggtatggg agtcaaagtt ctgtttgccc tgatctgcat cgctgtggcc gaggccaagc    3960
ccaccgagaa caacgaagac ttcaacatcg tggccgtggc cagcaacttc gcgaccacgg    4020
atctcgatgc tgaccgcggg aagttgcccg gcaagaagct gccgctggag gtgctcaaag    4080
agatggaagc caatgcccgg aaagctggct gcaccagggg ctgtctgatc tgcctgtccc    4140
acatcaagtg cacgcccaag atgaagaagt tcatcccagg acgctgccac acctacgaag    4200
gcgacaaaga gtccgcacag gcggcatag gcgaggcgat cgtcgacatt cctgagattc    4260
ctgggttcaa ggacttggag cctatggagc agttcatcgc acaggtcgat ctgtgtgtgg    4320
actgcacaac tggctgcctc aaagggcttg ccaacgtgca gtgttctgac ctgctcaaga    4380
agtggctgcc gcaacgctgt gcgacctttg ccagcaagat ccagggccag gtggacaaga    4440
tcaagggggc cggtggtgac taactcgagg tcgacggtat cgataagctc gcttcacgag    4500
attccagcag gtcgagggac ctaataactt cgtatagcat acattatacg aagttatatt    4560
aagggttcca agcttaagcg gccgctgaaa gaccccacct gtaggtttgg caagctagct    4620
```

```
gcagtaacgc cattttgcaa ggcatggaaa aataccaaac caagaataga gaagttcaga    4680
tcaagggcgg gtacatgaaa atagctaacg ttgggccaaa caggatatct gcggtgagca    4740
gtttcggccc cggccgggg ccaagaacag atggtcaccg cagtttcggc cccggcccga    4800
ggccaagaac agatggtccc cagatatggc ccaaccctca gcagtttctt aagacccatc    4860
agatgtttcc aggctccccc aaggacctga aatgaccctg cgccttattt gaattaacca    4920
atcagcctgc ttctcgcttc tgttcgcgcg cttctgcttc ccgagctcta taaaagagct    4980
cacaacccct cactcggcgc gccagtcctc cgattgactg agtcgcccgg atcccgccac    5040
catggtgagc aagggcgagg aggataacat ggccatcatc aaggagttca tgcgcttcaa    5100
ggtgcacatg gagggctccg tgaacggcca cgagttcgag atcgagggcg agggcgaggg    5160
ccgcccctac gagggcaccc agaccgccaa gctgaaggtg accaagggtg gccccctgcc    5220
cttcgcctgg gacatcctgt cccctcagtt catgtacggc tccaaggcct acgtgaagca    5280
ccccgccgac atccccgact acttgaagct gtccttcccc gagggcttca gtgggagcg    5340 cgtgatgaac ttcgaggacg gcggcgtggt gaccgtgacc caggactcct ccctgcagga    5400
cggcgagttc atctacaagg tgaagctgcg cggcaccaac ttcccctccg acggccccgt    5460
aatgcagaag aagaccatgg gctgggaggc ctcctccgag cggatgtacc ccgaggacgg    5520
cgccctgaag ggcgagatca gcagaggct gaagctgaag gacggcggcc actacgacgc    5580
tgaggtcaag accacctaca aggccaagaa gcccgtgcag ctgcccggcg cctacaacgt    5640
caacatcaag ttggacatca cctcccacaa cgaggactac accatcgtgg aacagtacga    5700
acgcgccgag ggccgccact ccaccggcgg catggacgag ctgtacaagt aagaattcgt    5760
cgagggacct aataacttcg tatagcatac attatacgaa gttatacatg tttaagggtt    5820
ccggttccac taggtacaat tcgatatcaa gcttatcgat aatcaacctc tggattacaa    5880
aatttgtgaa agattgactg gtattcttaa ctatgttgct ccttttacgc tatgtggata    5940
cgctgcttta atgcctttgt atcatgctat tgcttcccgt atggctttca ttttctcctc    6000
cttgtataaa tcctggttgc tgtctcttta tgaggagttg tggcccgttg tcaggcaacg    6060
tggcgtggtg tgcactgtgt ttgctgacgc aaccccact ggttgggca ttgccaccac    6120 ctgtcagctc ctttccggga ctttcgcttt ccccctccct attgccacgg cggaactcat    6180
cgccgcctgc cttgcccgct gctggacagg ggctcggctg ttgggcactg acaattccgt    6240
ggtgttgtcg gggaaatcat cgtccttttcc ttggctgctc gcctgtgttg ccacctggat    6300
tctgcgcggg acgtccttct gctacgtccc ttcggccctc aatccagcgg accttccttc    6360
ccgcggcctg ctgccggctc tgcggcctct tccgcgtctt cgccttcgcc ctcagacgag    6420
tcggatctcc ctttgggccg cctccccgca tcgataccgt cgacctcgat cgagacctag    6480
aaaaacatgg agcaatcaca gtagcaata cagcagctac caatgctgat tgtgcctggc    6540
tagaagcaca agaggaggag gaggtgggtt ttccagtcac acctcaggta cctttaagac    6600
caatgactta caaggcagct gtagatctta gccacttttt aaaagaaaag gggggactgg    6660
aagggctaat tcactcccaa cgaagacaag atatccttga tctgtggatc taccacacac    6720
aaggctactt ccctgattgg cagaactaca caccagggcc agggatcaga tatccactga    6780
cctttggatg gtgctacaag ctagtaccag ttgagcaaga gaaggtagaa gaagccaatg    6840
aaggagagaa cacccgcttg ttacacccctg tgagcctgca tgggatggat gacccggaga    6900
gagaagtatt agagtggagg tttgacagcc gcctagcatt tcatcacatg gcccgagagc    6960
tgcatccgga ctgtactggg tctctctggt tagaccagat ctgagcctgg gagctctctg    7020
```

```
gctaactagg gaacccactg cttaagcctc aataaagctt gccttgagtg cttcaagtag    7080
tgtgtgcccg tctgttgtgt gactctggta actagagatc cctcagaccc ttttagtcag    7140
tgtggaaaat ctctagcagc atgtgagcaa aaggccagca aaggccagg aaccgtaaaa     7200 aggccgcgtt gctggcgttt ttccataggc tccgccccc tgacgagcat cacaaaaatc     7260
gacgctcaag tcagaggtgg cgaaacccga caggactata agataccag gcgtttcccc     7320 ctggaagctc cctcgtgcgc tctcctgttc cgaccctgcc gcttaccgga tacctgtccg    7380
cctttctccc ttcgggaagc gtggcgcttt ctcatagctc acgctgtagg tatctcagtt    7440
cggtgtaggt cgttcgctcc aagctgggct gtgtgcacga accccccgtt cagcccgacc    7500
gctgcgcctt atccggtaac tatcgtcttg agtccaaccc ggtaagacac gacttatcgc    7560
cactggcagc agccactggt aacaggatta gcagagcgag gtatgtaggc ggtgctacag    7620
agttcttgaa gtggtggcct aactacggct acactagaag aacagtattt ggtatctgcg    7680
ctctgctgaa gccagttacc ttcggaaaaa gagttggtag ctcttgatcc ggcaaacaaa    7740
ccaccgctgg tagcggtggt ttttttgttt gcaagcagca gattacgcgc agaaaaaaag    7800
gatctcaaga agatcctttg atcttttcta cggggtctga cgctcagtgg aacgaaaact    7860
cacgttaagg attttggtc atgagattat caaaaaggat cttcacctag atccttttaa     7920
attaaaaatg aagttttaaa tcaatctaaa gtatatatga gtaaacttgg tctgacagtt    7980
accaatgctt aatcagtgag gcacctatct cagcgatctg tctatttcgt tcatccatag    8040
ttgcctgact ccccgtcgtg tagataacta cgatacggga gggcttacca tctggcccca   8100
gtgctgcaat gataccgcga gacccacgct caccggctcc agatttatca gcaataaacc    8160
agccagccgg aagggccgag cgcagaagtg gtcctgcaac tttatccgcc tccatccagt    8220
ctattaattg ttgccgggaa gctagagtaa gtagttcgcc agttaatagt ttgcgcaacg    8280
ttgttgccat tgctacaggc atcgtggtgt cacgctcgtc gtttggtatg gcttcattca    8340
gctccggttc ccaacgatca aggcgagtta catgatcccc catgttgtgc aaaaaagcgg    8400
ttagctcctt cggtcctccg atcgttgtca gaagtaagtt ggccgcagtg ttatcactca    8460
tggttatggc agcactgcat aattctctta ctgtcatgcc atccgtaaga tgcttttctg    8520
tgactggtga gtactcaacc aagtcattct gagaatagtg tatgcggcga ccgagttgct    8580
cttgcccggc gtcaatacgg gataataccg cgccacatag cagaacttta aaagtgctca    8640
tcattggaaa acgttcttcg gggcgaaaac tctcaaggat cttaccgctg ttgagatcca    8700
gttcgatgta acccactcgt gcacccaact gatcttcagc atcttttact ttcaccagcg    8760
tttctgggtg agcaaaaaca ggaaggcaaa atgccgcaaa aaagggaata agggcgacac    8820
ggaaatgttg aatactcata ctcttccttt ttcaatatta ttgaagcatt tatcagggtt    8880
attgtctcat gagcggatac atatttgaat gtatttagaa aaataaacaa ataggggttc    8940
cgcgcacatt tccccgaaaa gtgccacctg ac                                  8972
```

<210> SEQ ID NO 7
<211> LENGTH: 8390
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 7

```
gtcgacggat cgggagatct cccgatcccc tatggtgcac tctcagtaca atctgctctg     60
```

```
atgccgcata gttaagccag tatctgctcc ctgcttgtgt gttggaggtc gctgagtagt    120
gcgcgagcaa aatttaagct acaacaaggc aaggcttgac cgacaattgc atgaagaatc    180
tgcttagggt taggcgtttt gcgctgcttc gcgatgtacg ggccagatat acgcgttgac    240
attgattatt gactagttat taatagtaat caattacggg gtcattagtt catagcccat    300
atatggagtt ccgcgttaca taacttacgg taaatggccc gcctggctga ccgcccaacg    360 accccgccc attgacgtca ataatgacgt atgttcccat agtaacgcca atagggactt    420
tccattgacg tcaatgggtg gagtatttac ggtaaactgc ccacttggca gtacatcaag    480
tgtatcatat gccaagtacg cccctattg acgtcaatga cggtaaatgg cccgcctggc    540
attatgccca gtacatgacc ttatgggact ttcctacttg gcagtacatc tacgtattag    600
tcatcgctat taccatggtg atgcggtttt ggcagtacat caatgggcgt ggatagcggt    660
ttgactcacg gggatttcca agtctccacc ccattgacgt caatgggagt ttgttttggc    720
accaaaatca acgggacttt ccaaaatgtc gtaacaactc cgccccattg acgcaaatgg    780
gcggtaggcg tgtacggtgg gaggtctata taagcagcgc gttttgcctg tactgggtct    840
ctctggttag accagatctg agcctgggag ctctctggct aactagggaa cccactgctt    900
aagcctcaat aaagcttgcc ttgagtgctt caagtagtgt gtgcccgtct gttgtgtgac    960
tctggtaact agagatccct cagacccttt tagtcagtgt ggaaaatctc tagcagtggc   1020
gcccgaacag ggacttgaaa gcgaaaggga accagagga gctctctcga cgcaggactc   1080
ggcttgctga agcgcgcacg gcaagaggcg aggggcggcg actggtgagt acgccaaaaa   1140
ttttgactag cggaggctag aaggagagag atgggtgcga gagcgtcagt attaagcggg   1200
ggagaattag atcgcgatgg gaaaaaattc ggttaaggcc agggggaaag aaaaaatata   1260
aattaaaaca tatagtatgg gcaagcaggg agctagaacg attcgcagtt aatcctggcc   1320
tgttagaaac atcagaaggc tgtagacaaa tactgggaca gctacaacca tcccttcaga   1380
caggatcaga agaacttaga tcattatata atacagtagc aaccctctat tgtgtgcatc   1440
aaaggataga gataaaagac accaaggaag ctttagacaa gatagaggaa gagcaaaaca   1500
aaagtaagac caccgcacag caagcggccg gccgcgctga tcttcagacc tggaggagga   1560
gatatgaggg acaattggag aagtgaatta tataaatata agtagtaaa aattgaacca   1620 ttaggagtag cacccaccaa ggcaaagaga agagtggtgc agagagaaaa aagagcagtg   1680
ggaataggag ctttgttcct tgggttcttg ggagcagcag gaagcactat gggcgcagcg   1740
tcaatgacgc tgacggtaca ggccagacaa ttattgtctg gtatagtgca gcagcagaac   1800
aatttgctga gggctattga ggcgcaacag catctgttgc aactcacagt ctggggcatc   1860
aagcagctcc aggcaagaat cctggctgtg gaaagatacc taaaggatca acagctcctg   1920
gggatttggg gttgctctgg aaaactcatt tgcaccactg ctgtgccttg aatgctagt   1980 tggagtaata atctctggaa acagatttgg aatcacacga cctggatgga gtgggacaga   2040
gaaattaaca attcacaag cttaatacac tccttaattg aagaatcgca aaaccagcaa   2100
gaaaagaatg aacaagaatt attggaatta gataaatggg caagtttgtg gaattggttt   2160
aacataacaa attggctgtg gtatataaaa ttattcataa tgatagtagg aggcttggta   2220
ggtttaagaa tagttttgc tgtactttct atagtgaata gagttaggca gggatattca   2280
ccattatcgt ttcagaccca cctcccaacc ccgaggggac ccgacaggcc cgaaggaata   2340
gaagaagaag gtggagagag agacagagac agatccattc gattagtgaa cggatcggca   2400
```

```
ctgcgtgcgc caattctgca gacaaatggc agtattcatc cacaatttta aaagaaaagg    2460
ggggattggg gggtacagtg caggggaaag aatagtagac ataatagcaa cagacataca    2520
aactaaagaa ttacaaaaac aaattacaaa aattcaaaat tttcgggttt attacaggga    2580
cagcagagat ccagtttggt tagtaccggg cccgctctag aaattctacc actgaaccac    2640
caatgctact gtcagctaaa gacctgcagt attgtctctt aaagctcact atctctggcc    2700
attcactaag gaaccaggca ccgtcttaaa tcgcggtttg gaaaatattt tgttcaagat    2760
aaaactgttt taagatatac gtgtatatat cttatatatc tgtattcgca tggtaacata    2820
tcttcggcct tcctgagccg ctgggctctc agcggccctc caaggcagcc cgcaggcccc    2880
tgtgtgcctc agggatccga cctcccacag ccccgggag accttgcctc taaagttgct    2940
gcttttgcag cctctgccac aaccgcgcgt cctcagagcc agcccggagg agctagaacc    3000
ttccccgcat ttctttcagc agcctgagtc agaggcgggc tggcctggcg tagccgccca    3060
gcctcgcggc tcatgccccg atctgcccga accttctccc ggggtcagcg ccgcgccgcg    3120
ccacccggct gagtcagccc gggcgggcga gaggctctca actgggcggg aaggtgcggg    3180
aaggtgcgga aaggttcgcg aaagttcgcg gcggcggggg tcgggtgagg cgcaaaagga    3240
taaaaagccc gtggaagcgg agctgagcag atccgagccg gctggctgc agagaaaccg    3300
cagggagagc ctcactaacc ggtatgggag tcaaagttct gtttgccctg atctgcatcg    3360
ctgtggccga ggccaagccc accgagaaca acgaagactt caacatcgtg gccgtggcca    3420
gcaacttcgc gaccacggat ctcgatgctg accgcgggaa gttgcccggc aagaagctgc    3480
cgctggaggt gctcaaagag atggaagcca atgcccggaa agctggctgc accaggggct    3540
gtctgatctg cctgtcccac atcaagtgca cgcccaagat gaagaagttc atcccaggac    3600
gctgccacac ctacgaaggc gacaaagagt ccgcacaggg cggcataggc gaggcgatcg    3660
tcgacattcc tgagattcct gggttcaagg acttggagcc tatggagcag ttcatcgcac    3720
aggtcgatct gtgtgtggac tgcacaactg gctgcctcaa agggcttgcc aacgtgcagt    3780
gttctgacct gctcaagaag tggctgccgc aacgctgtgc gacctttgcc agcaagatcc    3840
agggccaggg ggacaagatc aagggggccg gtggtgacta actcgaggtc gacggtatcg    3900
ataagctcgc ttcacgagat tccagcaggt cgagggacct aataacttcg tatagcatac    3960
attatacgaa gttatattaa gggttccaag cttaagcggc cgctgaaaga ccccacctgt    4020
aggtttggca agctagctgc agtaacgcca ttttgcaagg catggaaaaa taccaaacca    4080
agaatagaga agttcagatc aagggcgggt acatgaaaat agctaacgtt gggccaaaca    4140
ggatatctgc ggtgagcagt tcggccccg gccgggggcc aagaacagat ggtcaccgca    4200
gtttcggccc cggcccgagg ccaagaacag atggtcccca gatatggccc aaccctcagc    4260
agtttcttaa gacccatcag atgtttccag gctcccccaa ggacctgaaa tgaccctgcg    4320
ccttatttga attaaccaat cagcctgctt ctcgcttctg ttcgcgcgct tctgcttccc    4380
gagctctata aaagagctca caacccctca ctcggcgcgc cagtcctccg attgactgag    4440
tcgcccggat cccgccacca tggtgagcaa gggcgaggag gataacatgg ccatcatcaa    4500
ggagttcatg cgcttcaagg tgcacatgga gggctccgtg aacggccacg agttcgagat    4560
cgagggcgag ggcgagggcc gcccctacga gggcacccag accgccaagc tgaaggtgac    4620
caagggtggc cccctgccct cgcctggga catcctgtcc cctcagttca tgtacggctc    4680
caaggcctac gtgaagcacc ccgccgacat ccccgactac ttgaagctgt ccttccccga    4740
gggcttcaag tgggagcgcg tgatgaactt cgaggacggc ggcgtggtga ccgtgaccca    4800
```

```
ggactcctcc ctgcaggacg gcgagttcat ctacaaggtg aagctgcgcg gcaccaactt    4860
cccctccgac ggccccgtaa tgcagaagaa gaccatgggc tgggaggcct cctccgagcg    4920
gatgtacccc gaggacggcg ccctgaaggg cgagatcaag cagaggctga agctgaagga    4980
cggcggccac tacgacgctg aggtcaagac cacctcaaag gccaagaagc ccgtgcagct    5040
gcccggcgcc tacaacgtca acatcaagtt ggacatcacc tcccacaacg aggactacac    5100
catcgtggaa cagtacgaac gcgccgaggg ccgccactcc accggcggca tggacgagct    5160
gtacaagtaa gaattcgtcg agggacctaa taacttcgta tagcatacat tatacgaagt    5220
tatacatgtt taagggttcc ggttccacta ggtacaattc gatatcaagc ttatcgataa    5280
tcaacctctg gattacaaaa tttgtgaaag attgactggt attcttaact atgttgctcc    5340
ttttacgcta tgtggatacg ctgctttaat gcctttgtat catgctattg cttcccgtat    5400
ggctttcatt ttctcctcct tgtataaatc ctggttgctg tctctttatg aggagttgtg    5460
gcccgttgtc aggcaacgtg gcgtggtgtg cactgtgttt gctgacgcaa ccccactgg    5520 ttggggcatt gccaccacct gtcagctcct ttccgggact ttcgctttcc cctccctat    5580 tgccacggcg gaactcatcg ccgcctgcct gcccgctgc tggacagggg ctcggctgtt    5640
gggcactgac aattccgtgg tgttgtcggg gaaatcatcg tcctttcctt ggctgctcgc    5700
ctgtgttgcc acctggattc tgcgcgggac gtccttctgc tacgtcccctt cggccctcaa    5760 tccagcggac cttccttccc gcggcctgct gccggctctg cggcctcttc cgcgtcttcg    5820
ccttcgccct cagacgagtc ggatctccct ttgggccgcc tccccgcatc gataccgtcg    5880
acctcgatcg agacctagaa aaacatggag caatcacaag tagcaataca gcagctacca    5940
atgctgattg tgcctggcta gaagcacaag gaggaggagga ggtgggtttt ccagtcacac    6000
ctcaggtacc tttaagacca atgacttaca aggcagctgt agatcttagc cactttttaa    6060
aagaaaaggg gggactggaa gggctaattc actcccaacg aagacaagat atccttgatc    6120
tgtggatcta ccacacacaa ggctacttcc ctgattggca gaactacaca ccagggccag    6180
ggatcagata tccactgacc tttggatggt gctacaagct agtaccagtt gagcaagaga    6240
aggtagaaga agccaatgaa ggagagaaca cccgcttgtt acaccctgtg agcctgcatg    6300
ggatggatga cccggagaga gaagtattag agtggaggtt tgacagccgc ctagcatttc    6360
atcacatggc ccgagagctg catccggact gtactgggtc tctctggtta gaccagatct    6420
gagcctggga gctctctggc taactaggga acccactgct taagcctcaa taaagcttgc    6480
cttgagtgct tcaagtagtg tgtgcccgtc tgttgtgtga ctctggtaac tagagatccc    6540
tcagaccctt ttagtcagtg tggaaaatct ctagcagcat gtgagcaaaa ggccagcaaa    6600
aggccaggaa ccgtaaaaag gccgcgttgc tggcgttttt ccataggctc cgcccccctg    6660
acgagcatca caaaaatcga cgctcaagtc agaggtggcg aaacccgaca ggactataaa    6720
gataccaggc gtttccccct ggaagctccc tcgtgcgctc tcctgttccg accctgccgc    6780
ttaccggata cctgtccgcc tttctccctt cgggaagcgt ggcgctttct catagctcac    6840
gctgtaggta tctcagttcg gtgtaggtcg ttcgctccaa gctgggctgt gtgcacgaac    6900
cccccgttca gcccgaccgc tgcgccttat ccggtaacta tcgtcttgag tccaacccgg    6960
taagacacga cttatcgcca ctggcagcag ccactggtaa caggattagc agagcgaggt    7020
atgtaggcgg tgctacagag ttcttgaagt ggtggcctaa ctacggctac actagaagaa    7080
cagtatttgg tatctgcgct ctgctgaagc cagttacctt cggaaaaaga gttggtagct    7140
```

```
cttgatccgg caaacaaacc accgctggta gcggtggttt ttttgtttgc aagcagcaga    7200
ttacgcgcag aaaaaaagga tctcaagaag atcctttgat cttttctacg gggtctgacg    7260
ctcagtggaa cgaaaactca cgttaaggga ttttggtcat gagattatca aaaaggatct    7320
tcacctagat ccttttaaat taaaaatgaa gttttaaatc aatctaaagt atatatgagt    7380
aaacttggtc tgacagttac caatgcttaa tcagtgaggc acctatctca gcgatctgtc    7440
tatttcgttc atccatagtt gcctgactcc ccgtcgtgta gataactacg atacgggagg    7500
gcttaccatc tggccccagt gctgcaatga taccgcgaga cccacgctca ccggctccag    7560
atttatcagc aataaaccag ccagccggaa gggccgagcg cagaagtggt cctgcaactt    7620
tatccgcctc catccagtct attaattgtt gccgggaagc tagagtaagt agttcgccag    7680
ttaatagttt gcgcaacgtt gttgccattg ctacaggcat cgtggtgtca cgctcgtcgt    7740
ttggtatggc ttcattcagc tccggttccc aacgatcaag gcgagttaca tgatccccca    7800
tgttgtgcaa aaaagcggtt agctccttcg gtcctccgat cgttgtcaga agtaagttgg    7860
ccgcagtgtt atcactcatg gttatggcag cactgcataa ttctcttact gtcatgccat    7920
ccgtaagatg cttttctgtg actggtgagt actcaaccaa gtcattctga gaatagtgta    7980
tgcggcgacc gagttgctct tgcccggcgt caatacggga taataccgcg ccacatagca    8040
gaactttaaa agtgctcatc attggaaaac gttcttcggg gcgaaaactc tcaaggatct    8100
taccgctgtt gagatccagt tcgatgtaac ccactcgtgc acccaactga tcttcagcat    8160
cttttacttt caccagcgtt tctgggtgag caaaaacagg aaggcaaaat gccgcaaaaa    8220
agggaataag ggcgacacgg aaatgttgaa tactcatact cttcctttt caatattatt    8280 gaagcattta tcagggttat tgtctcatga gcggatacat atttgaatgt atttagaaaa    8340
ataaacaaat aggggttccg cgcacatttc cccgaaaagt gccacctgac                8390

<210> SEQ ID NO 8
<211> LENGTH: 7812
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 8
gtcgacggat cgggagatct cccgatcccc tatggtgcac tctcagtaca atctgctctg      60
atgccgcata gttaagccag tatctgctcc ctgcttgtgt gttggaggtc gctgagtagt     120
gcgcgagcaa aatttaagct acaacaaggc aaggcttgac cgacaattgc atgaagaatc     180
tgcttagggt taggcgtttt gcgctgcttc gcgatgtacg ggccagatat acgcgttgac     240
attgattatt gactagttat taatagtaat caattacggg gtcattagtt catagcccat     300
atatggagtt ccgcgttaca taacttacgg taaatggccc gcctggctga ccgcccaacg     360 accccgccc attgacgtca ataatgacgt atgttcccat agtaacgcca atagggactt     420
tccattgacg tcaatgggtg gagtatttac ggtaaactgc ccacttggca gtacatcaag     480
tgtatcatat gccaagtacg ccccctattg acgtcaatga cggtaaatgg cccgcctggc     540
attatgccca gtacatgacc ttatgggact ttcctacttg gcagtacatc tacgtattag     600
tcatcgctat taccatggtg atgcggtttt ggcagtacat caatgggcgt ggatagcggt     660
ttgactcacg gggatttcca agtctccacc ccattgacgt caatgggagt ttgttttggc     720
accaaaatca acgggacttt ccaaaatgtc gtaacaactc cgccccattg acgcaaatgg     780
```

```
gcggtaggcg tgtacggtgg gaggtctata taagcagcgc gttttgcctg tactgggtct      840
ctctggttag accagatctg agcctgggag ctctctggct aactagggaa cccactgctt      900
aagcctcaat aaagcttgcc ttgagtgctt caagtagtgt gtgcccgtct gttgtgtgac      960
tctggtaact agagatccct cagacccttt tagtcagtgt ggaaaatctc tagcagtggc     1020
gcccgaacag ggacttgaaa gcgaaaggga aaccagagga gctctctcga cgcaggactc     1080
ggcttgctga agcgcgcacg gcaagaggcg aggggcggcg actggtgagt acgccaaaaa     1140
ttttgactag cggaggctag aaggagagag atgggtgcga gagcgtcagt attaagcggg     1200
ggagaattag atcgcgatgg gaaaaaattc ggttaaggcc agggggaaag aaaaaatata     1260
aattaaaaca tatagtatgg gcaagcaggg agctagaacg attcgcagtt aatcctggcc     1320
tgttagaaac atcagaaggc tgtagacaaa tactgggaca gctacaacca tcccttcaga     1380
caggatcaga agaacttaga tcattatata atacagtagc aaccctctat tgtgtgcatc     1440
aaaggataga gataaaagac accaaggaag ctttagacaa gatagaggaa gagcaaaaca     1500
aaagtaagac caccgcacag caagcggccg gccgcgctga tcttcagacc tggaggagga     1560
gatatgaggg acaattggag aagtgaatta tataaatata agtagtaaaa aattgaacca     1620
ttaggagtag cacccaccaa ggcaaagaga agagtggtgc agagagaaaa aagagcagtg     1680
ggaataggag ctttgttcct tgggttcttg ggagcagcag gaagcactat gggcgcagcg     1740
tcaatgacgc tgacggtaca ggccagacaa ttattgtctg gtatagtgca gcagcagaac     1800
aatttgctga gggctattga ggcgcaacag catctgttgc aactcacagt ctggggcatc     1860
aagcagctcc aggcaagaat cctggctgtg gaaagatacc taaaggatca acagctcctg     1920
gggatttggg gttgctctgg aaaactcatt tgcaccactg ctgtgccttg gaatgctagt     1980
tggagtaata aatctctgga acagatttgg aatcacacga cctggatgga gtgggacaga     2040
gaaattaaca attacacaag cttaatacac tccttaattg aagaatcgca aaaccagcaa     2100
gaaaagaatg aacaagaatt attggaatta gataaatggg caagtttgtg gaattggttt     2160
aacataacaa attggctgtg gtatataaaa ttattcataa tgatagtagg aggcttggta     2220
ggtttaagaa tagttttgc tgtactttct atagtgaata gagttaggca gggatattca     2280
ccattatcgt ttcagaccca cctcccaacc ccgagggac ccgacaggcc cgaaggaata     2340
gaagaagaag gtggagagag agacagagac agatccattc gattagtgaa cggatcggca     2400
ctgcgtgcgc caattctgca gacaaatggc agtattcatc cacaattta aaagaaaagg     2460 ggggattggg gggtacagtg caggggaaag aatagtagac ataatagcaa cagacataca     2520
aactaaagaa ttacaaaaac aaattacaaa aattcaaaat tttcgggttt attacaggga     2580
cagcagagat ccagtttggt tagtaccggg cccgctctag acgaaagttc gcggcggcgg     2640
gggtcgggtg aggcgcaaaa ggataaaaag cccgtggaag cggagctgag cagatccgag     2700
ccgggctggc tgcagagaaa ccgcaggag agcctcacta ccggtatggg agtcaaagtt     2760
ctgtttgccc tgatctgcat cgctgtggcc gaggccaagc ccaccgagaa caacgaagac     2820
ttcaacatcg tggccgtggc cagcaacttc gcgaccacgg atctcgatgc tgaccgcggg     2880
aagttgcccg gcaagaagct gccgctggag gtgctcaaag atgtgaagc caatgcccgg     2940 aaagctggct gcaccagggg ctgtctgatc tgcctgtccc acatcaagtg cacgcccaag     3000
atgaagaagt tcatcccagg acgctgccac acctacgaag gcgacaaaga gtccgcacag     3060
ggcggcatag gcgaggcgat cgtcgacatt cctgagattc tgggttcaa ggacttggag     3120 cctatggagc agttcatcgc acaggtcgat ctgtgtgtgg actgcacaac tggctgcctc     3180
```

| | | | | |
|---|---|---|---|---|
| aaagggcttg | ccaacgtgca | gtgttctgac | ctgctcaaga | agtggctgcc gcaacgctgt | 3240 |
| gcgacctttg | ccagcaagat | ccagggccag | gtggacaaga | tcaaggggc cggtggtgac | 3300 |
| taactcgagg | tcgacggtat | cgataagctc | gcttcacgag | attccagcag gtcgagggac | 3360 |
| ctaataactt | cgtatagcat | acattatacg | aagttatatt | aagggttcca agcttaagcg | 3420 |
| gccgctgaaa | gaccccacct | gtaggtttgg | caagctagct | gcagtaacgc cattttgcaa | 3480 |
| ggcatggaaa | ataccaaac | caagaataga | gaagttcaga | tcaagggcgg gtacatgaaa | 3540 |
| atagctaacg | ttgggccaaa | caggatatct | gcggtgagca | gtttcggccc cggcccgggg | 3600 |
| ccaagaacag | atggtcaccg | cagtttcggc | cccggcccga | ggccaagaac agatggtccc | 3660 |
| cagatatggc | ccaaccctca | gcagtttctt | aagacccatc | agatgtttcc aggctccccc | 3720 |
| aaggacctga | aatgaccctg | cgccttattt | gaattaacca | atcagcctgc ttctcgcttc | 3780 |
| tgttcgcgcg | cttctgcttc | ccgagctcta | taaagagct | cacaacccct cactcggcgc | 3840 |
| gccagtcctc | cgattgactg | agtcgcccgg | atcgccac | catggtgagc aagggcgagg | 3900 |
| aggataacat | ggccatcatc | aaggagttca | tgcgcttcaa | ggtgcacatg gagggctccg | 3960 |
| tgaacggcca | cgagttcgag | atcgagggcg | agggcgaggg | ccgcccctac gagggcaccc | 4020 |
| agaccgccaa | gctgaaggtg | accaagggtg | gccccctgcc | cttcgcctgg gacatcctgt | 4080 |
| cccctcagtt | catgtacggc | tccaaggcct | acgtgaagca | cccgccgac atccccgact | 4140 |
| acttgaagct | gtccttcccc | gagggcttca | gtgggagcg | cgtgatgaac ttcgaggacg | 4200 |
| gcggcgtggt | gaccgtgacc | caggactcct | ccctgcagga | cggcgagttc atctacaagg | 4260 |
| tgaagctgcg | cggcaccaac | ttcccctccg | acggccccgt | aatgcagaag aagaccatgg | 4320 |
| gctgggaggc | ctcctccgag | cggatgtacc | ccgaggacgg | cgccctgaag ggcgagatca | 4380 |
| agcagaggct | gaagctgaag | gacggcggcc | actacgacgc | tgaggtcaag accacctaca | 4440 |
| aggccaagaa | gcccgtgcag | ctgcccggcg | cctacaacgt | caacatcaag ttggacatca | 4500 |
| cctcccacaa | cgaggactac | accatcgtgg | aacagtacga | acgcgccgag ggccgccact | 4560 |
| ccaccggcgg | catggacgag | ctgtacaagt | aagaattcgt | cgaggaccct aataacttcg | 4620 |
| tatagcatac | attatacgaa | gttatacatg | tttaagggtt | ccggttccac taggtacaat | 4680 |
| tcgatatcaa | gcttatcgat | aatcaacctc | tggattacaa | aatttgtgaa agattgactg | 4740 |
| gtattcttaa | ctatgttgct | ccttttacgc | tatgtggata | cgctgcttta atgcctttgt | 4800 |
| atcatgctat | tgcttcccgt | atggctttca | ttttctcctc | cttgtataaa tcctggttgc | 4860 |
| tgtctcttta | tgaggagttg | tggcccgttg | tcaggcaacg | tggcgtggtg tgcactgtgt | 4920 |
| ttgctgacgc | aaccccact | ggttgggca | ttgccaccac | ctgtcagctc ctttccggga | 4980 |
| ctttcgcttt | ccccctccct | attgccacgg | cggaactcat | cgccgcctgc cttgcccgct | 5040 |
| gctggacagg | ggctcggctg | ttgggcactg | acaattccgt | ggtgttgtcg ggaaatcat | 5100 |
| cgtcctttcc | ttggctgctc | gcctgtgttg | ccacctggat | tctgcgcggg acgtccttct | 5160 |
| gctacgtccc | ttcggccctc | aatccagcgg | accttccttc | ccgcggcctg ctgccggctc | 5220 |
| tgcggcctct | tccgcgtctt | cgccttcgcc | ctcagacgag | tcggatctcc ctttgggccg | 5280 |
| cctccccgca | tcgataccgt | cgacctcgat | cgagacctag | aaaaacatgg agcaatcaca | 5340 |
| agtagcaata | cagcagctac | caatgctgat | tgtgcctggc | tagaagcaca agaggaggag | 5400 |
| gaggtggggt | ttccagtcac | acctcaggta | cctttaagac | caatgactta caaggcagct | 5460 |
| gtagatctta | gccactttttt | aaaagaaaag | ggggactgg | aagggctaat tcactcccaa | 5520 |

```
cgaagacaag atatccttga tctgtggatc taccacacac aaggctactt ccctgattgg    5580
cagaactaca caccagggcc agggatcaga tatccactga cctttggatg gtgctacaag    5640
ctagtaccag ttgagcaaga gaaggtagaa gaagccaatg aaggagagaa cacccgcttg    5700
ttacaccctg tgagcctgca tgggatggat gacccggaga gagaagtatt agagtggagg    5760
tttgacagcc gcctagcatt tcatcacatg gcccgagagc tgcatccgga ctgtactggg    5820
tctctctggt tagaccagat ctgagcctgg gagctctctg gctaactagg gaacccactg    5880
cttaagcctc aataaagctt gccttgagtg cttcaagtag tgtgtgcccg tctgttgtgt    5940
gactctggta actagagatc cctcagaccc ttttagtcag tgtggaaaat ctctagcagc    6000
atgtgagcaa aaggccagca aaaggccagg aaccgtaaaa aggccgcgtt gctggcgttt    6060
ttccataggc tccgcccccc tgacgagcat cacaaaaatc gacgctcaag tcagaggtgg    6120
cgaaacccga caggactata agataccagg cgtttccccc tggaagctcc ctcgtgcgc    6180 tctcctgttc cgaccctgcc gcttaccgga tacctgtccg cctttctccc ttcgggaagc    6240
gtggcgcttt ctcatagctc acgctgtagg tatctcagtt cggtgtaggt cgttcgctcc    6300
aagctgggct gtgtgcacga accccccgtt cagcccgacc gctgcgcctt atccggtaac    6360
tatcgtcttg agtccaaccc ggtaagacac gacttatcgc cactggcagc agccactggt    6420
aacaggatta gcagagcgag gtatgtaggc ggtgctacag agttcttgaa gtggtggcct    6480
aactacggct acactagaag aacagtattt ggtatctgcg ctctgctgaa gccagttacc    6540
ttcggaaaaa gagttggtag ctcttgatcc ggcaaacaaa ccaccgctgg tagcggtggt    6600
ttttttgttt gcaagcagca gattacgcgc agaaaaaaag gatctcaaga agatcctttg    6660
atcttttcta cggggtctga cgctcagtgg aacgaaaact cacgttaagg gattttggtc    6720
atgagattat caaaaaggat cttcacctag atccttttaa attaaaaatg aagttttaaa    6780
tcaatctaaa gtatatatga gtaaacttgg tctgacagtt accaatgctt aatcagtgag    6840
gcacctatct cagcgatctg tctatttcgt tcatccatag ttgcctgact ccccgtcgtg    6900
tagataacta cgatacggga gggcttacca tctggcccca gtgctgcaat gataccgcga    6960
gacccacgct caccggctcc agatttatca gcaataaacc agccagccgg aagggccgag    7020
cgcagaagtg gtcctgcaac tttatccgcc tccatccagt ctattaattg ttgccgggaa    7080
gctagagtaa gtagttcgcc agttaatagt ttgcgcaacg ttgttgccat tgctacaggc    7140
atcgtggtgt cacgctcgtc gtttggtatg gcttcattca gctccggttc ccaacgatca    7200
aggcgagtta catgatcccc catgttgtgc aaaaaagcgg ttagctcctt cggtcctccg    7260
atcgttgtca agtaagtt ggccgcagtg ttatcactca tggttatggc agcactgcat    7320
aattctctta ctgtcatgcc atccgtaaga tgcttttctg tgactggtga gtactcaacc    7380
aagtcattct gagaatagtg tatgcggcga ccgagttgct cttgcccggc gtcaatacgg    7440
gataataccg cgccacatag cagaacttta aaagtgctca tcattggaaa acgttcttcg    7500
gggcgaaaac tctcaaggat cttaccgctg ttgagatcca gttcgatgta acccactcgt    7560
gcacccaact gatcttcagc atcttttact ttcaccagcg tttctgggtg agcaaaaaca    7620
ggaaggcaaa atgccgcaaa aaagggaata agggcgacac ggaaatgttg aatactcata    7680
ctcttccttt ttcaatatta ttgaagcatt tatcagggtt attgtctcat gagcggatac    7740
atatttgaat gtatttagaa aaataaacaa ataggggttc cgcgcacatt tccccgaaaa    7800
gtgccacctg ac                                                        7812
```

```
<210> SEQ ID NO 9
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
gaattcccac aac                                                          13

<210> SEQ ID NO 10
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
tctttcccat gct                                                          13

<210> SEQ ID NO 11
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 11
aaagtgggaa atg                                                          13

<210> SEQ ID NO 12
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 12
ctttcacctt ttgccatgat tgt                                               23

<210> SEQ ID NO 13
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 13
cccagccacg tggaact                                                      17

<210> SEQ ID NO 14
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 14
taactcttgg agatg                                                        15

<210> SEQ ID NO 15
```

```
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 15
gtgctctcgg agaga                                                      15

<210> SEQ ID NO 16
<211> LENGTH: 9
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 16 ttcctgaac                                                              9

<210> SEQ ID NO 17
<211> LENGTH: 9
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 17 tgaacttcc                                                              9

<210> SEQ ID NO 18
<211> LENGTH: 14
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 18
aagtttcctc tgaa                                                       14

<210> SEQ ID NO 19
<211> LENGTH: 8
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 19 ttcagaag                                                               8

<210> SEQ ID NO 20
<211> LENGTH: 10
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 20
ttcagcggaa                                                            10

<210> SEQ ID NO 21
<211> LENGTH: 21
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 21
aagtaatgac ttaaatagac a                                              21

<210> SEQ ID NO 22
<211> LENGTH: 6
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 22 gaattc                                                                6

<210> SEQ ID NO 23
<211> LENGTH: 8
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 23 gaaccttc                                                              8

<210> SEQ ID NO 24
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 24
gaaaggttcg cgaaagttc                                                 19

<210> SEQ ID NO 25
<211> LENGTH: 8
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 25 gaagcttc                                                              8

<210> SEQ ID NO 26
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 26
ctctgaatca ggc                                                       13

<210> SEQ ID NO 27
<211> LENGTH: 13
<212> TYPE: DNA
```

```
<213> ORGANISM: Artificial Sequence
<220> FEATURE:
<223> OTHER INFORMATION: Description of Artificial Sequence: Synthetic
      oligonucleotide

<400> SEQUENCE: 27
gcctgagtca gag                                                        13

<210> SEQ ID NO 28
<211> LENGTH: 11
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 28
gctgagtcag c                                                          11

<210> SEQ ID NO 29
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 29
ggctcctcgg ggata                                                      15

<210> SEQ ID NO 30
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 30
agccccgggg agacc                                                      15

<210> SEQ ID NO 31
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 31
aaggataaaa agcccgt                                                    17

<210> SEQ ID NO 32
<211> LENGTH: 181
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 32
agaacgttct agaaggtcta gaacgttcta gaacttgcca ttaatagaga cctgaagcac      60
cgcctgctaa aaatacccgg ctgggcacac ataaaagcac gctggggctc cagtccggca     120
cttctcggat cctcagccca gtgcttctag atcctcagcc ttgaccagcc aagaacatga     180
c                                                                    181
```

```
<210> SEQ ID NO 33
<211> LENGTH: 200
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 33
tgaaagttct agaacgacga gaacgttcta gaaggtctag aacgttctag aacttgccat      60
taatagagac ctgaagcacc gcctgctaaa atacccggc tgggcacaca taaaagcacg     120
ctggggctcc agtccggcac ttctcggatc ctcagcccag tgcttctaga tcctcagcct     180
tgaccagcca agaacatgac                                                 200

<210> SEQ ID NO 34
<211> LENGTH: 219
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 34
agaagcttct agaatgtgct gaaagttcta gaacgacgag aacgttctag aaggtctaga     60
acgttctaga acttgccatt aatagagacc tgaagcaccg cctgctaaaa atacccggct    120
gggcacacat aaaagcacgc tggggctcca gtccggcact tctcggatcc tcagcccagt    180
gcttctagat cctcagcctt gaccagccaa gaacatgac                            219

<210> SEQ ID NO 35
<211> LENGTH: 238
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 35
agaacgttct agaacctgga gaagcttcta gaatgtgctg aaagttctag aacgacgaga     60
acgttctaga aggtctagaa cgttctagaa cttgccatta atagagacct gaagcaccgc    120
ctgctaaaaa tacccggctg ggcacacata aaagcacgct ggggctccag tccggcactt    180
ctcggatcct cagcccagtg cttctagatc ctcagccttg accagccaag aacatgac     238

<210> SEQ ID NO 36
<211> LENGTH: 257
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 36
agaacgttca tgaacgctga gaacgttcta gaacctggag aagcttctag aatgtgctga     60
aagttctaga acgacgagaa cgttctagaa ggtctagaac gttctagaac ttgccattaa    120
tagagacctg aagcaccgcc tgctaaaaat acccggctgg gcacacataa agcacgctg     180 gggctccagt ccggcacttc tcggatcctc agcccagtgc ttctagatcc tcagccttga    240
ccagccaaga acatgac                                                    257
```

<210> SEQ ID NO 37
<211> LENGTH: 276
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 37
agaagcttca tgaacgtgca gaacgttcat gaacgctgag aacgttctag aacctggaga      60
agcttctaga atgtgctgaa agttctagaa cgacgagaac gttctagaag gtctagaacg     120
ttctagaact tgccattaat agagacctga agcaccgcct gctaaaaata cccggctggg     180
cacacataaa agcacgctgg ggctccagtc cggcacttct cggatcctca gcccagtgct     240
tctagatcct cagccttgac cagccaagaa catgac                               276

<210> SEQ ID NO 38
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 38
agaacgttct agaag                                                       15

<210> SEQ ID NO 39
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 39
agaacgttct agaac                                                       15

<210> SEQ ID NO 40
<211> LENGTH: 8
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 40 cattaata                                                                8

<210> SEQ ID NO 41
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 41
tgaaagttct agaac                                                       15

<210> SEQ ID NO 42
<211> LENGTH: 15
<212> TYPE: DNA
<213> ORGANISM: Artificial Sequence
<220> FEATURE:

```
<223> OTHER INFORMATION: Description of Artificial Sequence: Synthetic
      oligonucleotide

<400> SEQUENCE: 42
agaagcttct agaat                                                          15

<210> SEQ ID NO 43
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 43
agaacgttca tgaac                                                          15

<210> SEQ ID NO 44
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 44
agaagcttca tgaac                                                          15

<210> SEQ ID NO 45
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 45
agaacgttct agaaggtcta gaacgttcta gaacttgc                                 38

<210> SEQ ID NO 46
<211> LENGTH: 57
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 46
tgaaagttct agaacgacga gaacgttcta gaaggtctag aacgttctag aacttgc            57

<210> SEQ ID NO 47
<211> LENGTH: 76
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 47
agaagcttct agaatgtgct gaaagttcta gaacgacgag aacgttctag aaggtctaga         60
acgttctaga acttgc                                                         76

<210> SEQ ID NO 48
<211> LENGTH: 95
<212> TYPE: DNA
<213> ORGANISM: Artificial Sequence
```

```
<220> FEATURE:
<223> OTHER INFORMATION: Description of Artificial Sequence: Synthetic
      oligonucleotide

<400> SEQUENCE: 48
agaacgttct agaacctgga gaagcttcta gaatgtgctg aaagttctag aacgacgaga      60
acgttctaga aggtctagaa cgttctagaa cttgc                                95

<210> SEQ ID NO 49
<211> LENGTH: 114
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 49
agaacgttca tgaacgctga gaacgttcta gaacctggag aagcttctag aatgtgctga     60
aagttctaga acgacgagaa cgttctagaa ggtctagaac gttctagaac ttgc          114

<210> SEQ ID NO 50
<211> LENGTH: 133
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 50
agaagcttca tgaacgtgca gaacgttcat gaacgctgag aacgttctag aacctggaga    60
agcttctaga atgtgctgaa agttctagaa cgacgagaac gttctagaag gtctagaacg   120
ttctagaact tgc                                                      133
```